United States Patent
Nagaoka et al.

(10) Patent No.: US 7,872,817 B2
(45) Date of Patent: Jan. 18, 2011

(54) LENS BARREL, IMAGE PICKUP DEVICE, AND LENS BARREL MANUFACTURING METHOD

(75) Inventors: Eiichi Nagaoka, Hyogo (JP); Takayuki Hayashi, Kyoto (JP); Keiji Sakamoto, Osaka (JP); Kenichi Hayashi, Nara (JP); Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/354,430

(22) Filed: Jan. 15, 2009

(65) Prior Publication Data

US 2009/0153985 A1 Jun. 18, 2009

Related U.S. Application Data

(62) Division of application No. 12/278,948, filed as application No. PCT/JP2007/052395 on Feb. 9, 2007.

(30) Foreign Application Priority Data

| Feb. 10, 2006 | (JP) | ............................. 2006-034567 |
| Feb. 10, 2006 | (JP) | ............................. 2006-034568 |
| Feb. 10, 2006 | (JP) | ............................. 2006-034569 |
| Feb. 10, 2006 | (JP) | ............................. 2006-034570 |
| Feb. 10, 2006 | (JP) | ............................. 2006-034577 |
| Feb. 10, 2006 | (JP) | ............................. 2006-034578 |
| Feb. 10, 2006 | (JP) | ............................. 2006-034579 |

(51) Int. Cl.
*G02B 7/02* (2006.01)
(52) U.S. Cl. ..................................... 359/819; 359/826
(58) Field of Classification Search ......... 359/694–700, 359/819–824, 826
See application file for complete search history.

(56) References Cited

U.S. PATENT DOCUMENTS

| 4,128,321 A | 12/1978 | Kobori et al. ............... 396/271 |
| 4,969,723 A * | 11/1990 | Kato et al. .................. 359/429 |
| 5,526,083 A | 6/1996 | Misawa ....................... 396/51 |
| 5,601,525 A | 2/1997 | Okada ......................... 600/160 |
| 5,708,743 A * | 1/1998 | DeAndrea et al. ............. 385/88 |
| 6,033,078 A | 3/2000 | Su et al. ...................... 600/160 |
| 6,084,725 A * | 7/2000 | Miyamoto et al. .......... 359/819 |
| 6,522,480 B2 * | 2/2003 | Nakamura ................... 359/698 |

(Continued)

FOREIGN PATENT DOCUMENTS

JP 09-080136 A 3/1997

(Continued)

*Primary Examiner*—Mohammed Hasan
(74) *Attorney, Agent, or Firm*—Pearne & Gordon LLP

(57) ABSTRACT

A lens barrel includes a fourth lens, a prism, and a sixth lens. The fourth lens receives a light flux incident along a first optical axis. The prism includes a reflecting surface reflecting the light flux passing through the fourth lens to a direction along a second optical axis intersecting with the first optical axis. The sixth lens receives the light flux reflected by the prism. A second group frame includes an opening portion, a prism retaining frame that is arranged in a more inner position than the opening portion and in which the prism is contained, and a plurality of adhesive pockets arranged on an area around the prism retaining frame and being open to the side of the opening portion. Adhesive agent is filled in the adhesive pockets.

24 Claims, 79 Drawing Sheets

U.S. PATENT DOCUMENTS

2005/0036056 A1 * 2/2005 Ikemachi et al. ............ 348/335

FOREIGN PATENT DOCUMENTS

| | | |
|---|---|---|
| JP | 10-020191 A | 1/1998 |
| JP | 11-258678 A | 9/1999 |
| JP | 2001-305406 A | 10/2001 |
| JP | 2003-066309 A | 3/2003 |
| JP | 2004-102089 A | 4/2004 |
| JP | 2005-009930 A | 1/2005 |
| JP | 2005-010279 A | 1/2005 |
| JP | 2005-121912 A | 5/2005 |
| JP | 2005-121974 A | 5/2005 |
| JP | 2005-122045 A | 5/2005 |
| JP | 2005-345933 A | 12/2005 |

* cited by examiner

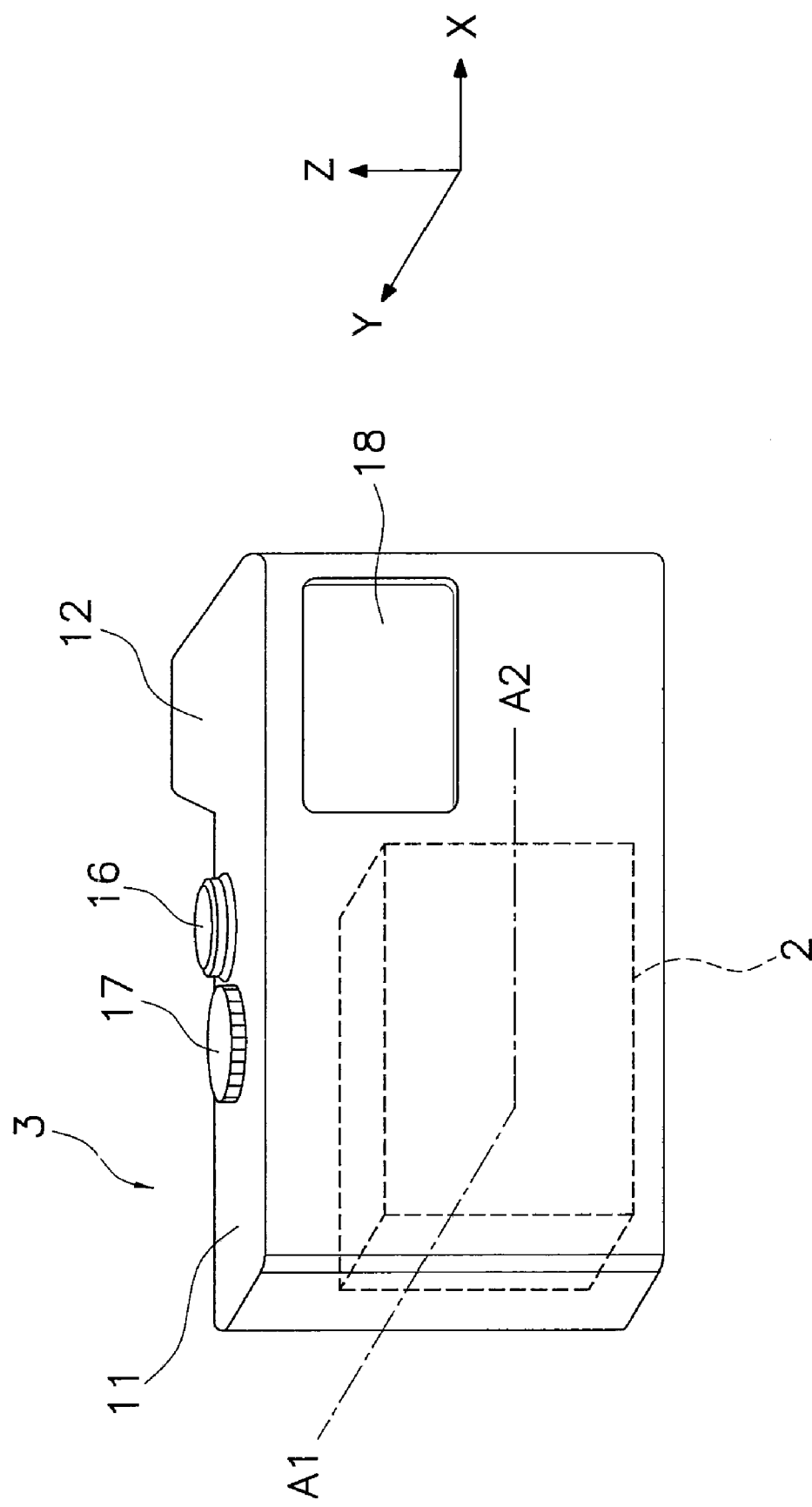

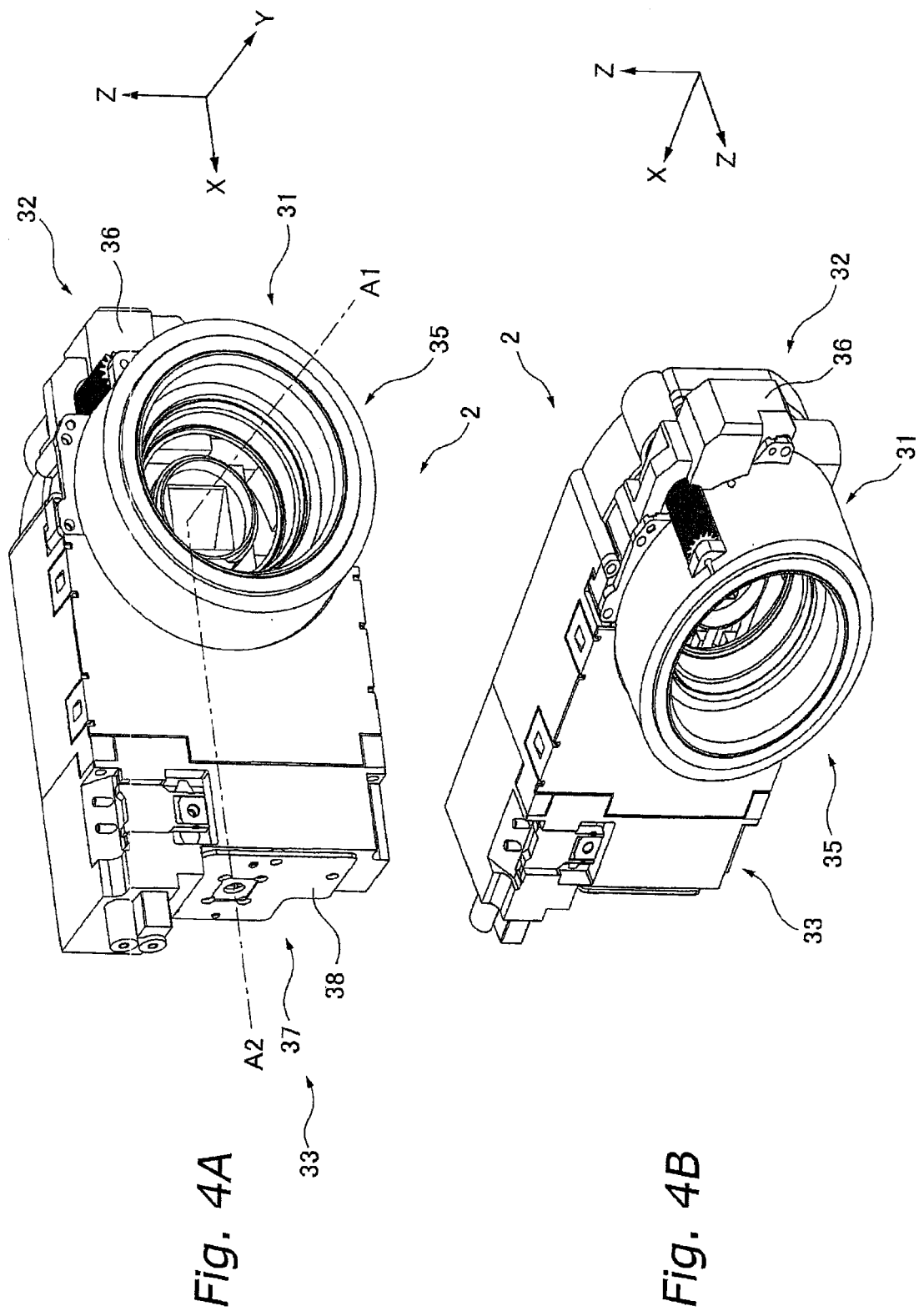

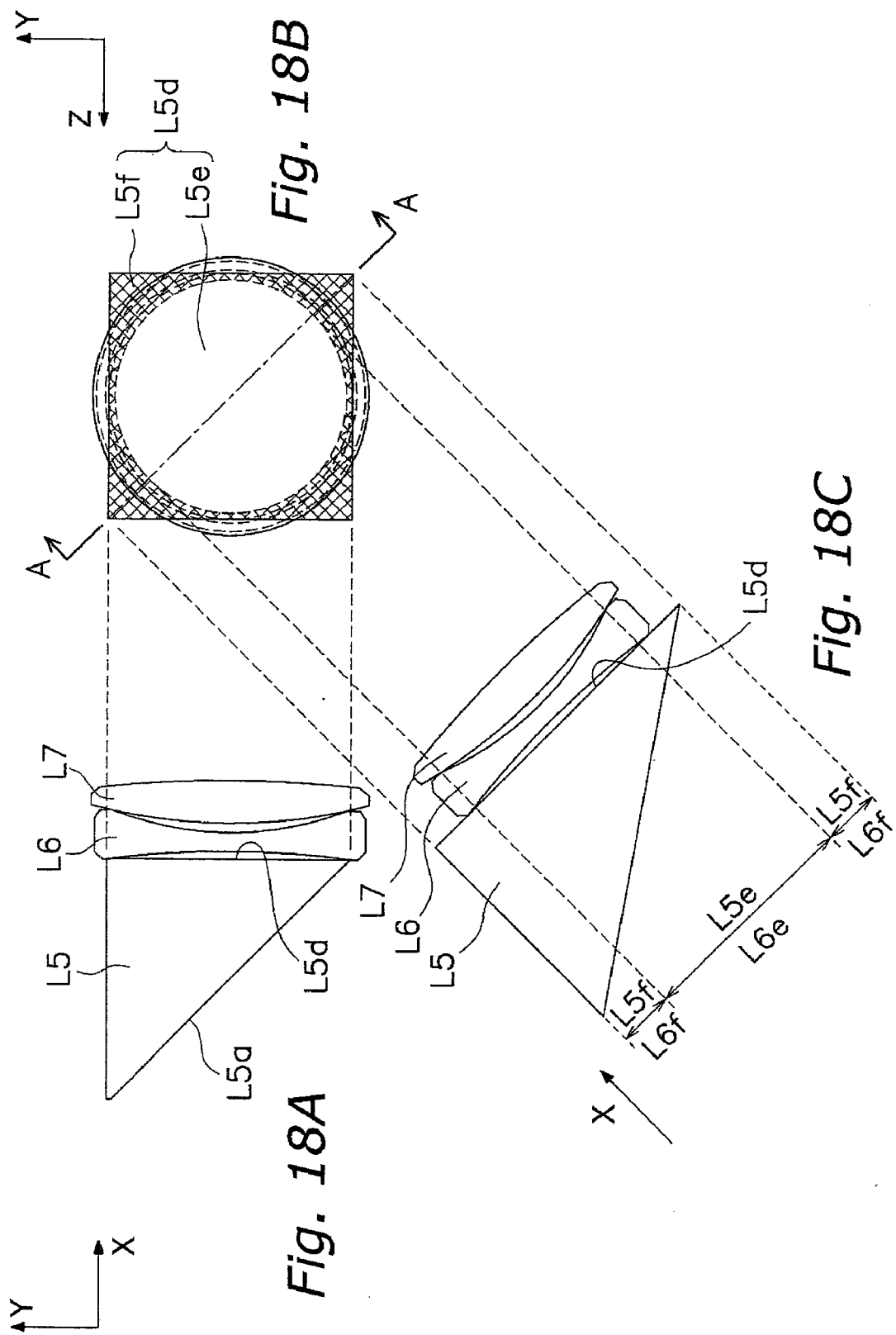

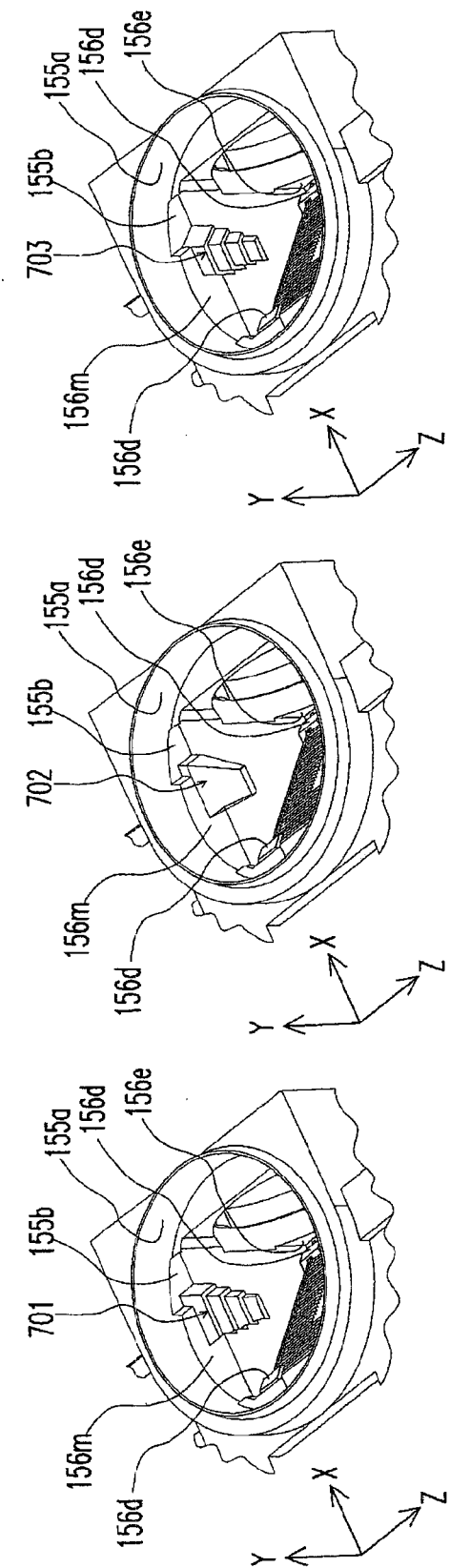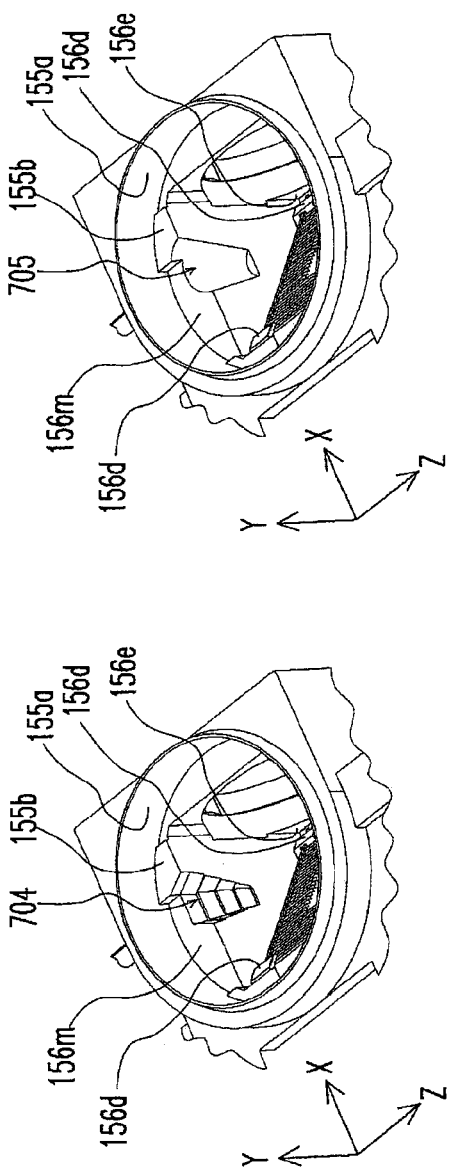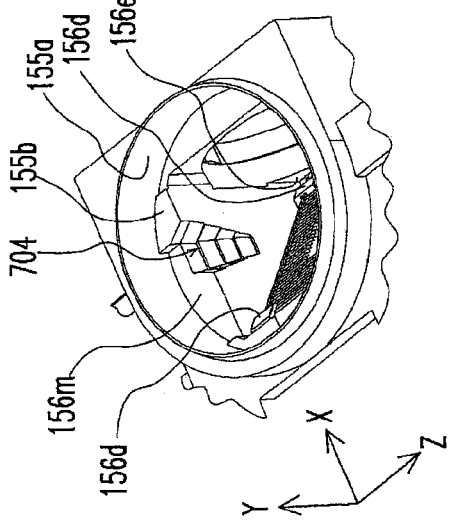

LENS BARREL, IMAGE PICKUP DEVICE, AND LENS BARREL MANUFACTURING METHOD

CROSS-REFERENCE TO RELATED APPLICATIONS

This application is a divisional of U.S. patent application Ser. No. 12/278,948 filed Aug. 8, 2008, which is incorporated herein by reference in its entirety. This application claims priority under 35 U.S.C. §119(a) to Japanese Patent Application Nos. 2006-034567, 2006-034568, 2006-034569, 2006-034570, 2006-034577, 2006-034578, and 2006-034579, filed in Japan on Feb. 10, 2006, the entire contents of which are hereby incorporated herein by reference.

BACKGROUND OF THE INVENTION

1. Field of the Invention

The present invention relates to a lens barrel and an image pickup device, and in particular relates to a lens barrel that includes a bending optical system, an image pickup device, and a lens barrel inspecting method and a lens barrel manufacturing method.

2. Background Information

Digital cameras which make use of image sensors such as a CCD (Charge Coupled Device) or CMOS (Complementary Metal Oxide Semiconductor) sensor to convert an optical image into an electrical signal, and to record by digitizing the electrical signal, have become very popular in recent years.

In this kind of digital camera, there is a need for a smaller size body in order to improve portability. To this end, there is a need for reduced size in an image pickup apparatus equipped with a lens barrel and image sensors, which is believed to contribute greatly to reducing the size of the housing. In these efforts to reduce the size of an image pickup apparatus, what is known as a bending optical system has been proposed, in which the apparatus is reduced in size by bending the zoom lens system at some point along the optical path, without changing the optical length (for example, refer to Patent Documents 1 and 2).

Patent Document 1: Japanese Patent Laid-Open Publication No. 2005-121974

Patent Document 2: Japanese Patent Laid-Open Publication No. 2005-10279

SUMMARY OF THE INVENTION

In this kind of lens barrel, a prism is fixed to the lens frame via an adhesive. Normally, the adhesive agent used for the fixation of the lens is an ultraviolet cure adhesive. Therefore, it is necessary to irradiate the adhesive agent that is filled in the gap between the prism side surface and the lens frame with ultraviolet radiation.

In this case, since the adhesive agent is thinly spread in the gap between the prism and the lens frame, it is necessary to irradiate the adhesive agent with the ultraviolet radiation via the prism. As a result, it is necessary to irradiate the adhesive agent on two side surfaces of the prism with the ultraviolet radiation from two directions. In particular, in the lens barrel described in Patent Document 2, in order to cure the adhesive agent inside the adhesive agent filling opening 5414, it is necessary to irradiate each adhesive agent filling opening 5414 with the ultraviolet radiation from a number of directions. As a result, the number of man-hour for irradiating the adhesive agent with the ultraviolet radiation increases, and it causes an increase in the manufacturing cost.

In addition, in a conventional lens barrel, depending on the accuracy of mounting the prism and the surrounding lens, the optical performance greatly varies. Below, the relationship between the accuracy of mounting the lens and the optical performance is described using FIGS. 79A and 79B.

As shown in FIG. 79A, a conventional bending optical system includes, for example, a first lens L94, a prism L95, and a second lens L96. The light flux incident from the first optical axis A91 passes through the first lens L94, and is reflected to a direction along the second optical axis A92 by the reflective surface L95a of the prism L95, and then exits in the direction along the second optical axis A92 from the second lens L96.

However, as shown in FIG. 79B, when the angle with respect to the first optical axis A91 of the reflective surface L95a changes due to a decrease in the accuracy of mounting the prism L95, the light flux reflected by the reflective surface L95a exits along a third optical axis A93 that is different from the second optical axis A92. Therefore, the light flux that exits from the prism L95 is no longer allowed to enter the second lens L96 in an appropriate angle, and it results in deterioration in the optical performance of the bending optical system that includes these lenses. In addition, even if the accuracy of mounting the prism L95 is enhanced, if the accuracy of mounting the first lens L94 and the second lens L96 decrease, the optical performance of the bending optical system still deteriorates.

On the other hand, in the lens barrel described in Patent Documents 1 and 2, the lenses that are arranged on the front and back of the prism are fixed to the lens frame. Therefore, if the accuracy of processing or forming the lens frame changes, the position of the lens with respect to the reflective surface of the prism changes depending on each product, and as a result, there is the possibility of deterioration in the optical performance of the lens barrel as described above.

In addition, in a conventional lens barrel, a prism is fixed via an adhesive to the lens frame. In the bonding step, the adhesive agent is filled via a needle, which is a long and thin tubular member. However, after the adhesive agent is filled, sometimes remaining adhesive agent drops like a thread from the tip of the needle. As a result, for example, the remaining adhesive agent may adhere to a supporting surface of the surrounding lens. As a result, the accuracy of mounting the lens deteriorates, and the optical performance of the lens barrel degrades.

Furthermore, in a conventional lens barrel, a prism is fixed to the lens frame via an adhesive. In the bonding step, the adhesive agent is filled via a needle, which is a long and thin tubular member. However, if the filled adhesive agent flows and flows onto an optical surface of the prism (entrance surface, reflective surface, output surface), the light flux passing through the prism when photographing passes through the adhesive agent, and therefore, photographing cannot be performed properly.

It is a first object of the present invention to reduce the manufacturing cost in a lens barrel including the bending optical system.

It is a second object of the present invention to obtain a high optical performance in the lens barrel including the bending optical system.

It is a third object of the present invention to prevent problems caused by the adhesive agent and obtain a high optical performance in the lens barrel including the bending optical system.

It is a fourth object of the present invention to prevent problems caused by the flowing adhesive agent and the like and obtain a high optical performance in the lens barrel including the bending optical system.

A lens barrel according to an aspect of the present invention includes a first lens, a bending member, a second lens, and a lens frame. The first lens takes in a light flux incident along a first optical axis. The bending member includes a reflecting surface reflecting the light flux passing through the first lens to a direction along a second optical axis intersecting with the first optical axis. The second lens takes in the light flux passing through the bending member. The bending member is fixed by an adhesive agent on the lens frame. The lens frame includes at least one opening portion in which either the first lens or second lens is retained, a retaining portion arranged in a more inner position than the opening portion and in which the bending member is contained, and a plurality of concave portions being open to the side of the opening portion and arranged on the periphery of the retaining portion. The adhesive agent is filled in the concave portions.

In this lens barrel, since the concave portions are open to the side of the opening portion, it is possible to fill adhesive agent in the concave portions from the opening portion and simultaneously irradiate the adhesive agent filled in the plurality of concave portions with ultraviolet light irradiation via the opening portion. Therefore, unlike in a conventional way, it is not necessary to change the position of the lens frame or to irradiate separately the plurality of concave portions with ultraviolet light irradiation, in the bonding step of the bending member. Therefore, in this lens barrel, it is possible to reduce the manufacturing steps, and it is possible to reduce the manufacturing cost.

BRIEF DESCRIPTION OF THE DRAWINGS

FIG. 2 is a perspective view showing the appearance of a digital camera;

FIGS. 4A and 4B are perspective views of the assembly of the image pickup device;

FIGS. 18A to 18C are illustrations of a fixation method of the lens;

FIGS. 58A to 58E are illustrations of adhesive pockets as other modified embodiments;

DETAILED DESCRIPTION OF THE PREFERRED EMBODIMENTS

Figure 1:
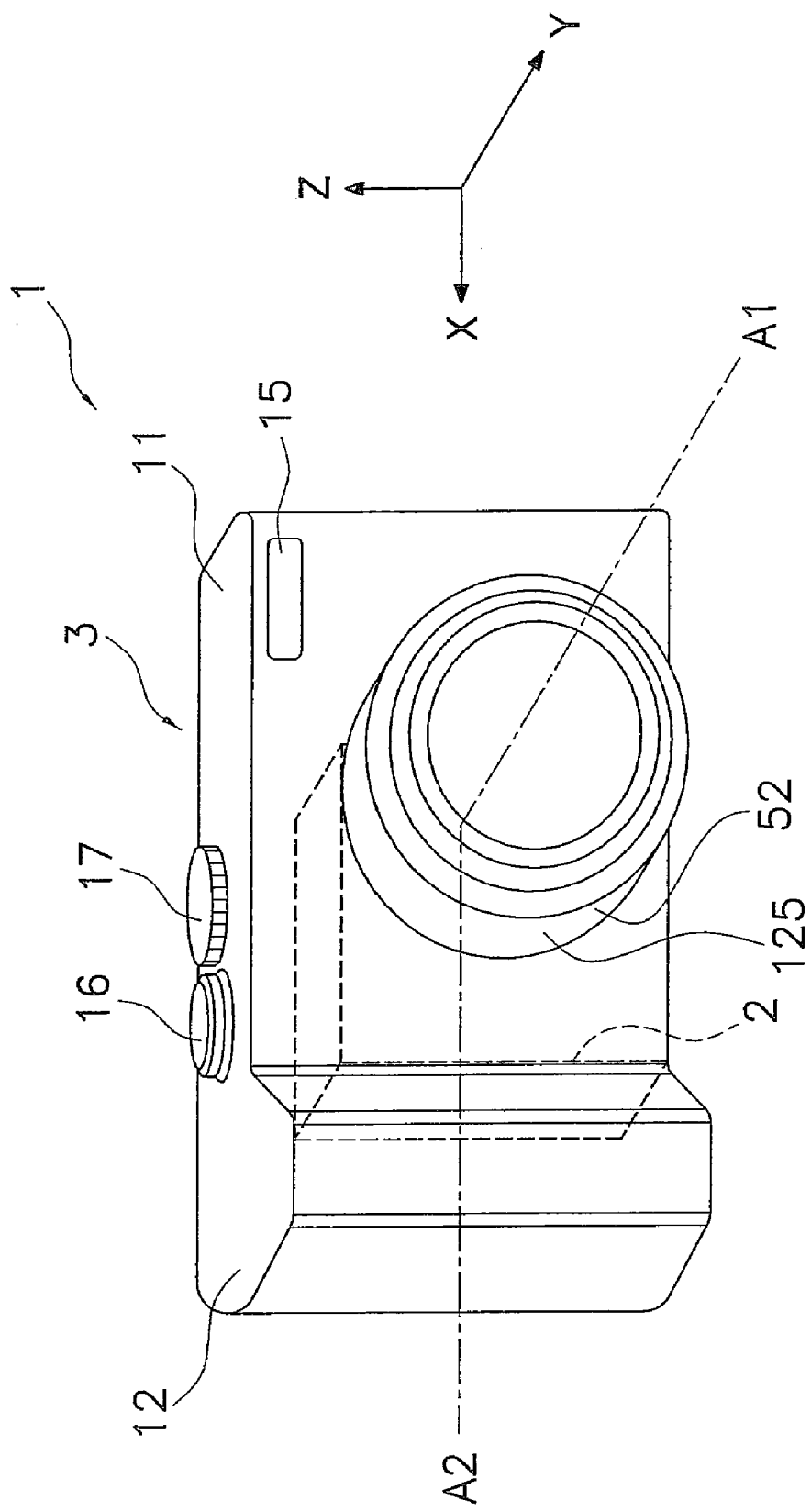
FIG. 1 is a perspective view showing the appearance of a digital camera.

A lens barrel according to a first aspect of the present invention includes a first lens, a bending member, a second lens, and a lens frame. The first lens takes in a light flux incident along a first optical axis. The bending member includes a reflecting surface reflecting the light flux passing through the first lens to a direction along a second optical axis intersecting with the first optical axis. The second lens takes in the light flux passing through the bending member. The bending member is fixed by an adhesive agent on the lens frame. The lens frame includes at least one opening portion in which either the first lens or second lens is retained, a retaining portion arranged in a more inner position than the opening portion and in which the bending member is contained, and a plurality of concave portions being open to the side of the opening portion and arranged on the periphery of the retaining portion. The adhesive agent is filled in the concave portions.

In this lens barrel, since the concave portions are open to the side of the opening portion, it is possible to fill adhesive agent in the concave portions from the opening portion and simultaneously irradiate the adhesive agent filled in the plurality of concave portions with ultraviolet light irradiation via the opening portion. Therefore, unlike in a conventional way, it is not necessary to change the position of the lens frame or to irradiate separately the plurality of concave portions with ultraviolet light irradiation, in the bonding step of the bending member. Therefore, in this lens barrel, it is possible to reduce the manufacturing steps, and it is possible to reduce the manufacturing cost.

Here, the phrase "along the first optical axis" means, for example, being parallel to the first optical axis. In addition, the phrase "along the second optical axis" means, for example, being parallel to the second optical axis. In addition, the bending member is, for example, a reflecting mirror, or a prism.

A lens barrel according to a second aspect of the present invention is the lens barrel of the first aspect, wherein the bending member further includes an entrance surface in which the light flux passing through the first lens enters, and an output surface from which the light flux reflected by the reflecting surface exits. When the concave portion and an imaginary line passing the center of gravity of the bending member and being perpendicular to either the entrance surface or output surface are projected on an imaginary surface that includes the first optical axis and second optical axis, a portion of the projection image of the imaginary line is arranged within the range of the projection image of the concave portion on the imaginary surface.

In this case, since a portion of the projection image of the imaginary line is arranged within the range of the projection image of the concave portion, it is possible to support the area around the center of gravity of the bending member efficiently, and it is possible to fix the bending member to the lens frame strongly.

A lens barrel according to a third aspect of the present invention is the lens barrel of the first aspect, wherein the bending member further includes an entrance surface in which the light flux passing through the first lens enters, and an output surface from which the light flux reflected by the reflecting surface exits. When the center of gravity of the bending member and the concave portion are projected on an imaginary surface that includes the first optical axis and second optical axis, the projection image of the center of gravity is arranged within the range of the projection image of the concave portion on the imaginary surface.

In this case, since the projection image of the center of gravity is arranged within the range of the projection image of the concave portion, it is possible to support the area around the center of gravity of the bending member efficiently, and it is possible to fix the bending member to the lens frame strongly.

A lens barrel according to a fourth aspect of the present invention is the lens barrel of any one of the first to the third aspects, wherein the end surface of the concave portion in the first optical axis direction is sloped with respect to the second optical axis.

Here, it is possible to make the distance between the end surface of the concave portion and the reflecting surface of the bending member large, and it is possible to prevent the adhesive agent filled in the concave portion from flowing to the side of the reflecting surface.

A lens barrel according to a fifth aspect of the present invention is the lens barrel of the fourth aspect, wherein when the reflecting surface and concave portion are projected on the imaginary surface that includes the first optical axis and second optical axis, the projection image of the end surface of the concave portion and the projection image of the reflecting surface are arranged substantially parallel on the imaginary surface.

A lens barrel according to a sixth aspect of the present invention is the lens barrel of any one of the first to the fourth aspects, and further includes a first lens group, a first movement mechanism, a driving unit, and a second lens group. The first lens group is arranged to be relatively movable with respect to the bending member in the first optical axis direction, and takes in the light flux incident along the first optical axis. The first movement mechanism includes the first lens group and relatively moves the first lens group and the bending unit in a direction along the first optical axis. The driving unit drives the first movement mechanism. The second lens group takes in the light flux reflected by the bending member.

An image pickup device according to a seventh aspect of the present invention includes the lens barrel of the sixth aspect, wherein an image pickup unit configured to receive the light flux exiting from the lens barrel.

A manufacturing method according to an eighth aspect of the present invention is a manufacturing method of a lens barrel including a first lens, a bending member, a second lens, and a lens frame. The first lens takes in a light flux incident along a first optical axis. The bending member reflects the light flux passing through the first lens to a direction along a second optical axis intersecting with the first optical axis. The second lens takes in the light flux passing through the bending member. The bending member is fixed to the lens frame. The lens frame includes an opening portion through which the bending member is able to pass, and a plurality of concave portions are open to the side of the opening portion. This manufacturing method includes a mounting step, a bonding step, and a curing step. In the mounting step, the bending member is fitted in the lens frame. In the bonding step, adhesive agent is filled in the plurality of concave portions. In the curing step, the adhesive agent filled in the plurality of concave portions is irradiated with ultraviolet light through the opening portion.

In this manufacturing method, since concave portions are open to the side of the opening portion, it is not necessary to change the position of the lens frame at the time of applying adhesive agent to the plurality of concave portions in the bonding step. Furthermore, in the curing step, it is possible to simultaneously perform ultraviolet light irradiation to the adhesive agent filled in the plurality of concave portions through the opening portion. Therefore, it is not necessary to change the position of the lens frame in the bonding step or the curing step like it is done conventionally, or perform ultraviolet light irradiation separately to the plurality of concave portions in the curing step. Therefore, in this manufacturing method, it is possible to reduce the manufacturing steps, and it is possible to reduce the manufacturing cost.

A manufacturing method according to a ninth aspect of the present invention is the manufacturing method of the eighth aspect, wherein the bending member further includes an entrance surface in which the light flux passing through the first lens enters, and an output surface from which the light flux reflected by the reflecting surface exits. When the concave portion and an imaginary line passing the center of gravity of the bending member and being perpendicular to either the entrance surface or output surface are projected on an imaginary surface that includes the first optical axis and second optical axis, a portion of the projection image of the imaginary line is arranged within the range of the projection image of the concave portion on the imaginary surface.

In this manufacturing method, since a portion of the projective image of the imaginary line is arranged within the range of the projection image of the concave portion, it is possible to support the area around the center of gravity of the bending member effectively, and it is possible to secure the bonding strength of the bending member even with a minimum bonding area. Therefore, it is possible to minimize the amount of the adhesive agent. For this reason, in this manufacturing method, it is possible to reduce the time of the ultraviolet light irradiation to the adhesive agent, and it is possible to reduce the manufacturing cost.

A manufacturing method according to a tenth aspect of the present invention is the manufacturing method of the eighth aspect, wherein the bending member further includes an entrance surface in which the light flux passing through the first lens enters, and an output surface from which the light flux reflected by the reflecting surface exits. When the center of gravity of the bending member and the concave portion are projected on an imaginary surface that includes the first optical axis and second optical axis, the projection image of the center of gravity is arranged within the range of the projection image of the concave portion on the imaginary surface.

In this manufacturing method, since the projection image of the center of gravity is arranged within the range of the projection image of the concave portion, it is possible to support the area around the center of gravity of the bending member effectively, and it is possible to secure the bonding strength of the bending member even with a minimum bonding area. Therefore, it is possible to minimize the amount of the adhesive agent. For this reason, in this manufacturing method, it is possible to reduce the time of ultraviolet light irradiation to the adhesive agent, and it is possible to reduce the manufacturing cost.

A lens barrel according to an eleventh aspect of the present invention includes a first lens, a bending member, and a second lens. The first lens takes in a light flux incident along a first optical axis. The bending member includes a reflecting surface reflecting the light flux passing through the first lens to a direction along a second optical axis intersecting with the first optical axis. The second lens takes in the light flux reflected by the bending member. At least one of the first and the second lens is fixed in a state of being in contact with the bending member.

In this lens barrel, at least one of the first and the second lens is fixed in a state of being in contact with the bending member. Therefore, for example, it is possible to prevent the relative movement of the bending member and the first lens. Even if the accuracy of mounting the bending member to the lens frame slightly deteriorates, it is possible to keep the position of the first lens constant with respect to the reflecting surface. Therefore, it is possible to prevent the optical performance from deteriorating due to the relative displacement between the bending member and the first lens, and it is possible to obtain high optical performance. This is the same when the bending member and the second lens are fixed.

Here, the phrase "along the first optical axis" means, for example, being parallel to the first optical axis. In addition, the phrase "along the second optical axis" means, for example, being parallel to the second optical axis. In addition, the bending member is, for example, a reflecting mirror, or a prism.

A lens barrel according to a twelfth aspect of the present invention is the lens barrel of the eleventh aspect, wherein at least one of the bending member and first lens includes a first flat surface portion having a planar shape. The bending member and first lens contact with each other via at least a part of the first flat surface portion.

Therefore, the position of the first lens with respect to the bending member is more stabilized.

A lens barrel according to a thirteenth aspect of the present invention is the lens barrel of the twelfth aspect, wherein the bending member includes an entrance surface. The entrance surface includes a first region through which the light flux from the first lens passes, and a second region which is arranged on the outer circumference side of the first region and includes the first flat surface portion.

In this case, the first lens is not in contact with the optically effective area of the entrance surface. Therefore, the light flux passing through the first lens is not affected by the contact portion between the entrance surface and the first lens.

A lens barrel according to a fourteenth aspect of the present invention is the lens barrel of any one of the eleventh to thirteenth aspects, wherein at least one of the bending member and second lens includes a second flat surface portion having a planar shape. The bending member and second lens contact with each other via at least a part of the second flat surface portion.

Therefore, the position of the second lens with respect to the bending member is more stabilized.

A lens barrel according to a fifteenth aspect of the present invention is the lens barrel of the fourteenth aspect, wherein the bending member includes an output surface. The output surface includes a third region through which the light flux reflected by the reflecting surface passes, and a fourth region which is arranged on the outer circumference side of the third region and includes the second flat surface portion.

In this case, the second lens is not in contact with the optically effective area of the output surface. Therefore, the light flux reflected by the reflecting surface is not affected by the contact portion between the output surface and the second lens.

A lens barrel according to a sixteenth aspect of the present invention is the lens barrel of the thirteenth aspect, wherein at least a part of the second region is covered by a light shielding material.

Here, it is possible to prevent unwanted light other than the light flux passing through the first lens from entering the bending member, or reflecting in the second region. Therefore, it is possible to prevent problems such as flare or ghost from occurring.

A lens barrel according to a seventeenth aspect of the present invention is the lens barrel of the fifteenth aspect, wherein at least a part of the fourth region is covered by a light shielding material.

Here, it is possible to prevent unwanted light other than the light flux reflected by the reflecting surface from exiting from the bending member, or reflecting in the fourth region. Therefore, it is possible to prevent problems such as flare or ghost from occurring.

A lens barrel according to an eighteenth aspect of the present invention includes a first lens, a bending member, a second lens, and a light shielding member. The first lens takes in a light flux incident along a first optical axis. The bending member includes a reflecting surface reflecting the light flux passing through the first lens to a direction along a second optical axis intersecting with the first optical axis. The second lens takes in the light flux passing through the bending member. The light shielding member is arranged between the bending member and at least one of the first and second lens, and in contact with the bending member and at least one of the first and second lens. The bending member, at least one of the first and second lens and the light shielding member are fixed to each other.

Here, the bending member, at least one of the first and second lens, and the light shielding member are fixed in a state of being in contact. Therefore, it is possible to, for example, prevent the relative movement of the bending member and the first lens. As a result, even if the accuracy of mounting the bending member to the lens frame slightly deteriorates, it is possible to keep the position of the first lens with respect to the reflecting surface constant. This is the same in the case of the second lens.

Here, the phrase "along the first optical axis" means, for example, being parallel to the first optical axis. In addition, the phrase "along the second optical axis" means, for example, being parallel to the second optical axis.

A lens barrel according to a nineteenth aspect of the present invention is the lens barrel of the eighteenth aspect, wherein that at least one of the light shielding member and first lens includes a first flat surface portion having a planar shape. The light shielding member and first lens are in contact with each other via at least a part of the first flat surface portion.

Therefore, the position of the light shielding member with respect to the bending member is more stabilized.

A lens barrel according to a twentieth aspect of the present invention is the lens barrel of the nineteenth aspect, wherein the bending member further includes an entrance surface. The entrance surface includes a first region through which the light flux from the first lens passes, and a second region which is arranged on the outer circumference side of the first region and includes the first flat surface portion.

Here, it is possible to prevent unwanted light other than the light flux passing through the first lens from entering the bending member or reflecting in the second region, via the light shielding member. Therefore, it is possible to prevent problems such as flare or ghost from occurring.

A lens barrel according to a twenty first aspect of the present invention is the lens barrel of any one of the eighteenth to twentieth aspects, and at least one of the light shielding member and second lens includes a second flat surface portion having a planar shape. The light shielding member and second lens are in contact with each other via at least a part of the second flat surface portion.

Therefore, the position of the light shielding member with respect to the bending member is more stabilized.

A lens barrel according to a twenty second aspect of the present invention is the lens barrel of the twenty first aspect, and the bending member includes an output surface. The output surface includes a third region through which the light flux reflected by the reflecting surface passes, and a fourth region which is arranged on the outer circumference side of the third region and includes the second flat surface portion.

Here, it is possible to prevent unwanted light other than the light flux reflected by the reflecting surface from exiting from the bending member or reflecting in the fourth region, via the light shielding member. Therefore, it is possible to prevent problems such as flare or ghost from occurring.

A lens barrel according to a twenty third aspect of the present invention is the lens barrel of any one of the eleventh to twenty second aspects, and further includes a third lens that is fixed in a state of being in contact with the second lens and takes in the light flux passing through the second lens.

In this case, the second lens and the third lens are integrated. Therefore, when the second lens is fixed to the bending member, it is possible to keep the positions of the second and the third lenses constant with respect to the reflecting surface of the bending member.

A lens barrel according to a twenty fourth aspect of the present invention is the lens barrel of the twenty third aspect, and at least one of the second and third lens includes a third flat surface portion having a planar shape. The second and third lenses are in contact with each other via at least a part of the third flat surface portion.

Therefore, the position of the third lens with respect to the second lens is more stabilized.

A lens barrel according to a twenty fifth aspect of the present invention is the lens barrel of the twenty fourth aspect, wherein the second lens includes a fifth region through which the light flux from the bending member passes, and a sixth region which is arranged on the outer circumference side of the fifth region and includes the third flat surface portion.

A lens barrel according to a twenty sixth aspect of the present invention is the lens barrel of any one of the eleventh to twenty fifth aspects, and further includes a first lens group, a first movement mechanism, a driving unit, and a second lens group. The first lens group is arranged to be relatively movable in the first optical axis direction with respect to the bending member, and takes in the light flux incident along the first optical axis. The first movement mechanism includes the first lens group and relatively moves the first lens group and the bending unit in a direction along the first optical axis. The driving unit drives the first movement mechanism. The second lens group takes in the light flux reflected by the bending member.

An image pickup device according to a twenty seventh aspect of the present invention includes the lens barrel of the twenty sixth aspect, wherein an image pickup unit configured to take in the light flux exiting from the lens barrel.

A lens barrel according to a twenty eighth aspect of the present invention includes a first lens, a bending member, a second lens, and a lens frame. The first lens takes in a light flux incident along a first optical axis. The bending member includes a reflecting surface reflecting the light flux passing through the first lens to a direction along a second optical axis intersecting with the first optical axis. The second lens takes in the light flux passing through the bending member. The bending member is fixed to the lens frame. The second lens is fixed to the lens frame by an adhesive agent in a state of being in contact with the bending member.

In this lens barrel, since the second lens is fixed to the lens frame by an adhesive agent, it is not necessary to perform fixation via thermal caulking like it is done conventionally. As a result, it is possible to prevent, for example, the relative movement of second lens and the bending member due to a large load on the bending member via the thermal caulking. In addition, even if the bending member is contracted due to a change in temperature, or is slightly moved due to a vibration, it is possible to prevent the relative movement of the bending member and the second lens. Therefore, in this lens barrel, it is possible to prevent the optical performance from deteriorating due to the relative displacement between the bending member and the second lens, and it is possible to obtain high optical performance.

Here, the phrase "along the first optical axis" means, for example, being parallel to the first optical axis. In addition, the phrase "along the second optical axis" means, for example, being parallel to the second optical axis. In addition, the bending member is, for example, a reflecting mirror, or a prism.

A lens barrel according to a twenty ninth aspect of the present invention is the lens barrel of the twenty eighth aspect, wherein the lens frame includes a plurality of first supporting portions that are arranged on the outer circumference side of the second lens and support the second lens in a direction perpendicular to the second optical axis, and a plurality of first fixation portions that are arranged between the adjacent first supporting portions and have adhesive agent that fixes the second lens.

In this case, since portions that support and portions that fix the second lens are separate, it is possible to fix the second lens to the lens frame by adhesive while supporting the second lens, and to fix the second lens becomes easy.

A lens barrel according to a thirtieth aspect of the present invention is the lens barrel of the twenty ninth aspect, wherein the first fixation portion includes a first concave portion that forms a space in which adhesive agent that fixes the second lens is filled.

Here, by filling the adhesive agent in the first concave portion, it is possible to easily bond the second lens to the lens frame via the first fixation portions.

A lens barrel of a thirty first aspect of the present invention is the lens barrel of any one of the twenty eighth to the thirtieth aspects, and further includes a third lens that is fixed by an adhesive agent to the lens frame in a state of being in contact with the second lens and takes in the light flux passing through the second lens.

Here, it is possible to prevent the relative movement of the second lens and the third lens, and it is possible to prevent the optical performance from deteriorating due to the relative displacement between the second lens and the third lens.

A lens barrel according to a thirty second aspect of the present invention is the lens barrel of the thirty first aspect, wherein the lens frame includes a plurality of second supporting portions that are arranged on the outer circumference side of the third lens and support the third lens in a direction perpendicular to the second optical axis, and a plurality of second fixation portions that are arranged between the adjacent second supporting portions and has adhesive agent that fixes the third lens.

In this case, since portions that support and portions that fix the third lens are separate, it is possible to fix the third lens to the lens frame by adhesive while supporting the third lens, and to fix the third lens becomes easy.

A lens barrel according to a thirty third aspect of the present invention is the lens barrel of the thirty first aspect, wherein the second fixation portion includes a second concave portion that forms a space in which adhesive agent that fixes the third lens is filled.

Here, by filling the adhesive agent in the second concave portion, it is possible to easily bond the third lens to the lens frame via the second fixation portions.

A lens barrel of a thirty fourth aspect of the present invention is the lens barrel of the thirtieth aspect, wherein the first lens includes a first facing portion, and the second lens includes a second facing portion that faces to the first facing portion in the first optical axis direction. The first concave portion is arranged in a region other than between the first and second facing portions.

In this case, since the first concave portion is arranged on a region other than between the first and second facing portions, it is possible to reduce the distance between the first and the second facing portions, and it is possible to arrange the first lens near the second lens and the bending member. Therefore, in this lens barrel, it is possible to reduce the dimension in the first optical axis direction.

In addition, for example, when the first lens is disposed near the second lens and the bending member, if the first concave portion is arranged between the first and the second facing portions, it is necessary to make the thickness of the fixation portions on the area around the first concave portion thin. As a result, the dimensional accuracy and strength of the fixation portions deteriorate. However, in this lens barrel, since the first concave portion is arranged in a region other than between the first and the second facing portions, it becomes unnecessary to fix the second lens to a thin portion, and it is possible to improve the accuracy of mounting the second lens, and at the same time, it is possible to prevent the fixation strength of the second lens from deteriorating.

A lens barrel according to a thirty fifth aspect of the present invention is the lens barrel of the thirty third aspect, wherein the first lens includes a first facing portion, and the first lens includes a third facing portion that faces to the first facing portion in the first optical axis direction. The second concave portion is arranged in a region other than between the first and third facing portions.

In this case, since the second concave portion is arranged on a region other than between the first and third facing portions, it is possible to reduce the distance between the first and the third facing portions, and it is possible to arrange the first lens near the third lens and the bending member. Therefore, in this lens barrel, it is possible to reduce the dimension in the first optical axis direction.

In addition, for example, when the first lens is disposed near the third lens and the bending member, if the second concave portion is arranged between the first and the third facing portions, it is necessary to make the thickness of the fixation portions on the area around the second concave portion thin. As a result, the dimensional accuracy and strength of the fixation portions deteriorate. However, in this lens barrel, since the second concave portion is arranged in a region other than between the first and the third facing portions, it becomes unnecessary to fix the third lens to a thin portion, and it is possible to improve the accuracy of mounting the third lens, and at the same time, it is possible to prevent the fixation strength of the third lens from deteriorating.

A lens barrel according to a thirty sixth aspect of the present invention is the lens barrel of the thirtieth aspect, wherein the first concave portion is continuous from an area around outer circumference portion of the second lens to the bending member.

In this case, by filling adhesive agent in the first concave portion, it is possible to bond the second lens to the lens frame, and at the same time, bond the second lens to the bending member.

A lens barrel according to a thirty seventh aspect of the present invention is the lens barrel of the thirty third aspect, wherein the second concave portion is continuous from an area around outer circumference portion of the third lens to the second lens.

In this case, by filling adhesive agent in the second concave portion, it is possible to bond the second and the third lenses simultaneously to the lens frame. Therefore, compared to the case of separately bonding the second lens and the third lens, it is possible to reduce the manufacturing steps, and it is possible to reduce the manufacturing cost.

A lens barrel according to a thirty eighth aspect of the present invention includes a first lens, a bending member, a second lens, a lens frame, and a biasing member. The first lens takes in a light flux incident along a first optical axis. The bending member includes a reflecting surface reflecting the light flux passing through the first lens to a direction along a second optical axis intersecting with the first optical axis. The second lens takes in the light flux passing through the bending member. The bending member is fixed to the lens frame. The biasing member biases at least one of the first and second lens toward the side of the bending member.

In this lens barrel, for example, the first lens is biased to the bending member by the biasing member. By doing so, it is possible to keep the state of the first lens being in contact with the bending member. As a result, it is possible to keep the position of the first lens with respect to the reflecting surface constant, and it is possible to obtain high optical performance. This is the same in the case with the second lens.

A lens barrel according to a thirty ninth aspect of the present invention is the lens barrel of any one of the twenty eighth to thirty eighth aspects, and further includes a first lens group, a first movement mechanism, a driving unit, and a second lens group. The first lens group is arranged to be relatively movable in the first optical axis direction with respect to the bending member, and takes in the light flux incident along the first optical axis. The first movement mechanism includes the first lens group and relatively moves the first lens group and the bending unit in a direction along the first optical axis. The driving unit drives the first movement mechanism. The second lens group takes in the light flux reflected by the bending member.

An image pickup device according to a fortieth aspect of the present invention includes the lens barrel of the thirty ninth aspect, wherein an image pickup unit configured to take in the light flux exiting from the lens barrel.

A lens barrel according to a forty first aspect of the present invention includes a first lens, a bending member, a second lens, and a lens frame. The first lens takes in a light flux incident along a first optical axis. The bending member reflects the light flux passing through the first lens to a direction along a second optical axis intersecting with the first optical axis. The second lens takes in the light flux passing through the bending member. The bending member is fixed to the lens frame. The bending member includes an entrance surface in which the light flux passing through the first lens enters, a reflecting surface reflecting the light flux incident from the entrance surface to a direction along the second optical axis, and an output surface from which the light flux reflected by the reflecting surface exits. The lens frame includes at least three first contact portions that are in contact with the reflecting surface, and at least two second contact portions that are in contact with the entrance surface or output surface. At least one of the first and second lens is fixed to the bending member.

In this lens barrel, the first and second contact portions can prevent the bending member from rotating in the direction horizontal to the reflecting surface with respect to the lens frame. As a result, for example, when the first lens is fixed to the bending member, it is possible to prevent the optical axis of the first lens from tilting with respect to the first optical axis. In addition, when the second lens is fixed to the bending member, it is possible to prevent the optical axis of the second lens from tilting with respect to the second optical axis. Therefore, in this lens barrel, it is possible to obtain high optical performance.

Here, the phrase "along the first optical axis" means, for example, being parallel to the first optical axis. In addition, the phrase "along the second optical axis" means, for example, being parallel to the second optical axis. In addition, the bending member is, for example, a reflecting mirror a prism.

A lens barrel according to a forty second aspect of the present invention is the lens barrel of the forty first aspect, wherein the bending member includes a first pressing surface that is parallel to the reflecting surface.

In this case, by pressing the first pressing surface in the bonding step, it is possible to improve the accuracy of mounting the bending member in the direction perpendicular to the reflecting surface, and it is possible to obtain higher optical performance.

A lens barrel according to a forty third aspect of the present invention is the lens barrel of the forty first or the forty second aspect, and the bending member includes a second pressing surface that is perpendicular to the reflecting surface.

In this case, by pressing the second pressing surface in the bonding step, it is possible to improve the accuracy of mounting the bending member in the direction parallel to the reflecting surface, and it is possible to obtain higher optical performance.

A lens barrel according to a forty fourth aspect of the present invention is the lens barrel of any one of the forty first to the forty third aspects, and further includes a first lens group, a first movement mechanism, a driving unit, and a second lens group. The first lens group is arranged to be relatively movable in the first optical axis direction with respect to the bending member, and takes in the light flux incident along the first optical axis. The first movement mechanism includes the first lens group and relatively moves the first lens group and the bending unit in a direction along the first optical axis. The driving unit drives the first movement mechanism. The second lens group takes in the light flux reflected by the bending member.

An image pickup device according to a forty fifth aspect of the present invention includes the lens barrel of the forty fourth aspect, wherein an image pickup unit configured to take in the light flux exiting from the lens barrel.

A manufacturing method according to a forty sixth aspect of the present invention is a manufacturing method of a lens barrel including a first lens, a bending member, a second lens, and a lens frame. The first lens takes in a light flux incident along a first optical axis. The bending member reflects the light flux passing through the first lens to a direction along a second optical axis intersecting with the first optical axis. The second lens takes in the light flux passing through the bending member. The bending member is fixed to the lens frame. This manufacturing method includes a mounting step, a pressing step, a bonding step, and a curing step. In the mounting step, the bending member is fitted in the lens frame. In the pressing step, the bending member is pressed against the lens frame. In the bonding step, adhesive agent is filled between the lens frame and the bending member while the pressing status in the pressing step is kept. In the curing step, adhesive agent is cured while the pressing status in the pressing step is kept.

In this manufacturing method, since the bending member is pressed against the lens frame in the pressing step, it is possible to improve the accuracy of mounting the bending member. In addition, since the pressing status is kept also in the bonding step and the curing step, when filling the adhesive agent and when curing the adhesive agent, the bending member is not moved, and it is possible to further improve the accuracy of mounting.

A manufacturing method according to a forty seventh aspect of the present invention is the manufacturing method of the forty sixth aspect, wherein the bending member includes a reflecting surface reflecting the light flux passing through the first lens to a direction along the second optical axis, and an output surface from which the light flux reflected by the reflecting surface exits. The lens frame includes at least three first contact portions that are in contact with the reflecting surface, and at least two second contact portions that are in contact with the entrance surface or output surface.

Here, in the pressing step, the bending member is pressed against the first contact portions, and pressed against the second contact portions. Therefore, it is possible to improve the accuracy of mounting the bending member.

A manufacturing method according to a forty eighth aspect of the present invention is the manufacturing method of the forty seventh aspect, wherein the bending member includes a first pressing surface that is parallel to the reflecting surface. In the pressing step, the first pressing surface is pressed.

Here, since the first pressing surface is pressed in the pressing step, it is possible to add a load to the bending member in the direction perpendicular to the reflecting surface. Therefore, the bending member can be bonded to the lens flame in a state where the bending member is pressed to the first contact portion, and it is possible to further improve the accuracy of the bending member.

A manufacturing method according to a forty ninth aspect of the present invention is the manufacturing method of the forty seventh or the forty eighth aspect, wherein the bending member includes a second pressing surface that is perpendicular to the reflecting surface. In the pressing step, the second pressing surface is pressed.

In this manufacturing method, since the second pressing surface is pressed in the pressing step, it is possible to add a load to the bending member in the direction parallel to the reflecting surface. Therefore, the bending member can be bonded to the lens flame in a state where the bending member is pressed to the second contact portion, and it is possible to further improve the accuracy of mounting the bending member.

A lens barrel according to a fiftieth aspect of the present invention includes a first lens, a bending member, a second lens and a lens frame. The first lens takes in a light flux incident along a first optical axis. The bending member includes a reflecting surface reflecting the light flux passing through the first lens to a direction along a second optical axis intersecting with the first optical axis. The second lens takes in the light flux passing through the bending member. The bending member is fixed to the lens frame. The lens frame includes a plurality of concave portions being open to the opposite side to the reflecting surface in the first optical axis direction. In the concave portion, the capacity of the first end area disposed on the reflecting surface side in the first optical axis direction is smaller than the capacity of the second end area disposed on the opposite side to the reflecting surface in the first optical axis direction.

Since the emitted ultraviolet light from the source of the ultraviolet light irradiation reaches the adhesive agent in the interior through the surface of the adhesive agent on the opening end side of the concave portion and the side surface of the bending member, normally it is not easy to cure adhesive agent on the portion in the back, and it becomes necessary to irradiate ultraviolet light for a long time, and the manufacturing time increases. However, according to this lens barrel, in the concave portion, the capacity of the end area disposed on the reflecting surface side in the first optical axis direction is smaller than the capacity of the end area disposed on the opposite side to the reflecting surface in the first optical axis direction. Therefore, adhesive agent does not exist on a position that is away from both the surface of the adhesive agent on the opening end side of the concave portions and the side surface of the bending member, and therefore, it is possible to reduce the time of the ultraviolet light irradiation, and it is possible to reduce the manufacturing cost.

Here, the phrase "along the first optical axis" means, for example, being parallel to the first optical axis. In addition, the phrase "along the second optical axis" means, for example, being parallel to the second optical axis. In addition, the bending member is, for example, a reflecting mirror, or a prism.

A lens barrel according to a fifty first aspect of the present invention is the lens barrel of the fiftieth aspect, wherein the sectional area of the concave portions perpendicular to the first optical axis direction gradually becomes smaller, as being closer to the side of the reflecting surface in the first optical axis direction.

Therefore, adhesive agent does not exist on a position that is away from both the surface of the adhesive agent on the opening end side of the concave portions and the side surface of the bending member, and it is possible to reduce the time of the ultraviolet light irradiation, and it is possible to reduce the manufacturing cost. In addition, since the sectional area of the concave portions gradually becomes smaller because of configuration thereof, a force that presses the bending member down is generated, due to the cure and contraction of the adhesive agent via the ultraviolet light irradiation. Therefore, it is possible to prevent the bending member from being uplifted, and it is possible to keep the position accuracy of the bending member high.

A lens barrel according to a fifty second aspect of the present invention is the lens barrel of the fifty first aspect, and the concave portion includes a sloped surface that faces the bending member.

A lens barrel according to a fifty third aspect of the present invention is the lens barrel of the fiftieth aspect, wherein the sectional area of the concave portions perpendicular to the first optical axis direction becomes smaller in a stepwise fashion, as being closer to the side of the reflecting surface in the first optical axis direction.

Therefore, adhesive agent does not exist on a position that is away from both the surface of the adhesive agent on the opening end side of the concave portions and the side surface of the bending member, and it is possible to reduce the time of the ultraviolet light irradiation, and it is possible to reduce the manufacturing cost. In addition, a force that presses the bending member down is generated, due to the cure and contraction of the adhesive agent via the ultraviolet light irradiation. Therefore, it is possible to prevent the bending member from being uplifted, and it is possible to keep the position accuracy of the bending member high.

A lens barrel according to a fifty fourth aspect of the present invention is the lens barrel of the fifty third aspect, and the concave portion includes a stepped portion that faces the bending member.

Therefore, it is possible to enlarge the surface area of the concave portions more than that of the sloped surface in the fifty second aspect, and it is possible to further improve the bonding strength of the bending member.

A lens barrel according to a fifty fifth aspect of the present invention is the lens barrel of any one of the fiftieth to fifty fourth aspects, and further includes a first lens group, a first movement mechanism, a driving unit, and a second lens group. The first lens group is arranged to be relatively movable in the first optical axis direction with respect to the bending member, and takes in the light flux incident along the first optical axis. The first movement mechanism includes the first lens group and relatively moves the first lens group and the bending unit in a direction along the first optical axis. The driving unit drives the first movement mechanism. The second lens group takes in the light flux reflected by the bending member.

The image pickup device according to a fifty sixth aspect of the present invention includes the lens barrel of the fifty fifth aspect, wherein an image pickup unit configured to take in the light flux exiting from the lens barrel.

The manufacturing method according to a fifty seventh aspect of the present invention is a manufacturing method of a lens barrel including a first lens, a bending member, a second lens, and a lens frame. The first lens takes in a light flux incident along a first optical axis. The bending member reflects the light flux passing through the first lens to a direction along a second optical axis intersecting with the first optical axis. The second lens takes in the light flux passing through the bending member. The bending member is fixed to the lens frame. The lens frame includes a plurality of concave portions being open to the opposite side to the reflecting surface in the first optical axis direction, and in the concave portion, capacity of a first end area disposed on the reflecting surface side in the first optical axis direction is smaller than capacity of a second end area disposed on the opposite side to the reflecting surface in the first optical axis direction. This manufacturing method includes a mounting step, a bonding step, and a curing step. In the mounting step, the bending member is fitted in the lens frame. In the bonding step, adhesive agent is filled in the plurality of concave portions. In the curing step, the adhesive agent filled in the plurality of concave portion is irradiated with ultraviolet light from the opposite side to the reflecting surface in the first optical axis direction.

In this manufacturing method, since the concave portions are irradiated with ultraviolet light from the bigger capacity area thereof to the smaller capacity area thereof in the curing step, so that the ultraviolet light easily reaches the portion that is far from the source of the ultraviolet light irradiation, and it becomes easy to cure the adhesive agent via ultraviolet light irradiation. Therefore, it is possible to reduce the time of ultraviolet light irradiation, and it is possible to reduce the manufacturing cost.

A manufacturing method according to a fifty eighth aspect of the present invention is the manufacturing method of the fifty seventh aspect, wherein the sectional area of the concave portions perpendicular to the first optical axis direction gradually becomes smaller, as being closer to the side of the reflecting surface in the first optical axis direction.

Therefore, adhesive agent does not exist on a position that is away from both the surface of the adhesive agent on the opening end side of the concave portions and the side surface of the bending member, and it is possible to reduce the time of the ultraviolet light irradiation, and it is possible to reduce the manufacturing cost. In addition, a force that presses the bending member down is generated, due to the cure and contraction of the adhesive agent via the ultraviolet light irradiation. Therefore, it is possible to prevent the bending member from being uplifted, and it is possible to keep the position accuracy of the bending member high.

A manufacturing method according to a fifty ninth aspect of the present invention is the manufacturing method of the fifty eighth aspect, wherein the concave portion includes a sloped surface that faces the bending member.

A manufacturing method according to a sixtieth aspect of the present invention is the manufacturing method of the fifty seventh aspect, wherein the sectional area of the concave portions perpendicular to the first optical axis direction becomes smaller in a stepwise fashion, as being closer to the side of the reflecting surface in the first optical axis direction.

Therefore, the ultraviolet light easily reaches the portion that is far from the source of the ultraviolet light irradiation, and it becomes easy to cure the adhesive agent via ultraviolet light irradiation.

A manufacturing method according to a sixty first aspect of the present invention is the manufacturing method of the fifty eighth aspect, wherein the concave portion includes a stepped portion that faces the bending member.

A lens barrel according to a sixty second aspect of the present invention includes a first lens, a bending member, a second lens, and a lens frame. The first lens takes in a light flux incident along a first optical axis. The bending member includes a reflecting surface reflecting the light flux passing through the first lens to a direction along a second optical axis intersecting with the first optical axis. The second lens includes at least the second lens configured to take in the light flux passing through the bending member. The bending member is fixed to the lens frame. The lens frame includes a plurality of concave portions being open to the opposite side to the reflecting surface in the first optical axis direction, a supporting surface being in contact with the first lens in the first optical axis direction, and a non-contact surface being formed on an area around the concave portions and arranged on the reflecting surface side in the first optical axis direction with respect to the supporting surface.

In this lens barrel, in the bonding step, adhesive agent is filled in the concave portions by a needle, as a supplying unit of adhesive agent. At that time, even if remaining adhesive agent drops from the tip of the needle like a thread, it is possible to attach the remaining adhesive agent to the non-contact surface by moving the needle above the non-contact surface, and it is possible to prevent the remaining adhesive agent from attaching to the supporting surface. Therefore, it is possible to prevent deteriorating the accuracy of mounting the first lens, and it is possible to obtain high optical performance.

Here, the phrase "along the first optical axis" means, for example, being parallel to the first optical axis. In addition, the phrase "along the second optical axis" means, for example, being parallel to the second optical axis. In addition, the bending member is, for example, a reflecting mirror, or a prism.

A lens barrel according to a sixty third aspect of the present invention is the lens barrel of the sixty second aspect, and the supporting surface is arranged on at least three or more places.

Therefore, the position of the first lens is stabilized.

A lens barrel according to a sixty fourth aspect of the present invention is the lens barrel of the sixty second or sixty third aspect, and the supporting surface is arranged in a region other than the outer circumference side of the second lens.

In this case, for example, even if a load acts on the supporting surface when mounting the first lens, the mounting portion of the second lens does not deform. Therefore, the accuracy of mounting the second lens does not deteriorate, and it is possible to obtain high optical performance.

A lens barrel according to a sixty fifth aspect of the present invention is the lens barrel of the sixty second or sixty third aspect, wherein the first lens includes a first facing portion, and the second lens includes a second facing portion that faces to the first facing portion in the first optical axis direction. The supporting surface is arranged in a region other than between the first lens and second lens.

In this case, for example, even if a load acts on the supporting surface when mounting the first lens, the mounting portion of the lens group does not deform. Therefore, the accuracy of mounting the lens group including the second lens does not deteriorate, and it is possible to obtain high optical performance.

A lens barrel according to a sixty sixth aspect of the present invention is the lens barrel of any one of the sixty second to sixty fifth aspects, and the lens frame further includes a middle portion being arranged in the concave portion and dividing the concave portion into at least two spaces.

Here, it is possible to enlarge the surface area of the concave portions via the middle portion. Therefore, it is possible to enlarge the bonding area, and it is possible to improve the bonding strength.

A lens barrel according to a sixty seventh aspect of the present invention includes a first lens, a bending member, a second lens, and a lens frame. The first lens takes in a light flux incident along a first optical axis. The bending member includes a reflecting surface reflecting the light flux passing through the first lens to a direction along a second optical axis intersecting with the first optical axis. The second lens takes in the light flux passing through the bending member. The bending member is fixed to the lens frame. The lens frame includes a plurality of concave portions being open to the opposite side to the reflecting surface in the first optical axis direction, and a middle portion being arranged in the concave portion and dividing the concave portion into at least two spaces.

Here, it is possible to enlarge the surface area of the concave portions via the middle portion. Therefore, it is possible to enlarge the bonding area, and it is possible to improve the bonding strength.

A lens barrel according to a sixty eighth aspect of the present invention is the lens barrel of the sixty sixth or sixty seventh aspect, wherein the middle portion divides the concave portion in the second optical axis direction.

By doing so, when the needle moves between the divided concave portions, it is possible to separate off the remaining adhesive agent dropping like a thread from the needle via the middle portion.

A lens barrel according to a sixty ninth aspect of the present invention is the lens barrel of any one of the sixty sixth to sixty eighth aspects, wherein the middle portion extends in the first optical axis direction, and the thickness thereof becomes thinner as being closer to the first optical axis direction.

In this case, since the thickness of the tip of the middle portion is thin, it is possible to reliably separate off the remaining adhesive agent dropping like a thread from the needle via the middle portion.

A lens barrel according to a seventieth aspect of the present invention is the lens barrel of any one of the sixty second to sixty ninth aspects, and further includes a first lens group, a first movement mechanism, a driving unit, and a second lens group. The first lens group is arranged to be relatively movable in the first optical axis direction with respect to the bending member, and takes in the light flux incident along the first optical axis. The first movement mechanism includes the first lens group and relatively moves the first lens group and the bending unit in a direction along the first optical axis. The driving unit drives the first movement mechanism. The second lens group takes in the light flux reflected by the bending member.

An image pickup device according to a seventy first aspect of the present invention includes the lens barrel of the seventieth aspect, wherein an image pickup unit configured to take in the light flux exiting from the lens barrel.

A manufacturing method according to a seventy second aspect of the present invention is a manufacturing method of a lens barrel including a first lens, a bending member, a second lens, and a lens frame. The first lens takes in a light flux incident along a first optical axis. The bending member reflects the light flux passing through the first lens to a direction along a second optical axis intersecting with the first optical axis. The second lens takes in the light flux passing through the bending member. The bending member is fixed to the lens frame. The lens frame includes a plurality of concave portions being open to the opposite side to the reflecting surface in the first optical axis direction, a support surface being in contact with the first lens in the first optical axis direction, and a non-contact surface being formed on an area around the concave portions and arranged on the reflecting surface side in the first optical axis direction with respect to the supporting surface. This manufacturing method includes a mounting step and a bonding step. In the mounting step, the bending member is fitted in the lens frame. In the bonding step, adhesive agent is filled in the plurality of concave portions by a supplying unit. After adhesive agent is filled in the concave portion, the supplying unit passes above the non-contact surface from the concave portion.

Here, it is possible to attach the remaining adhesive agent that drops like a thread from the supplying unit to the non-contact surface, and it is possible to prevent attaching to portions other than the non-contact surface.

A manufacturing method according to a seventy third aspect of the present invention is a manufacturing method of a lens barrel including a first lens, a bending member, a second lens, and a lens frame. The first lens takes in a light flux incident along a first optical axis. The bending member reflects the light flux passing through the first lens to a direction along a second optical axis intersecting with the first optical axis. The second lens takes in the light flux passing through the bending member. The bending member is fixed to the lens frame. The lens frame includes a plurality of concave portions being open to the opposite side to the reflecting surface in the first optical axis direction, and a middle portion being arranged in the concave portion and dividing the concave portion into at least two spaces. This manufacturing method includes a mounting step and a bonding step. In the mounting step, the bending member is fitted in the lens frame. In the bonding step, adhesive agent is filled in the plurality of concave portions by a supplying unit, and after adhesive agent is filled in the concave portions, the supplying unit passes above the middle portion.

Here, it is possible to separate off the remaining adhesive agent that drops like a thread from the supplying unit via the middle portion.

A lens barrel according to a seventy fourth aspect of the present invention includes a first lens, a bending member, a second lens, and a lens frame. The first lens takes in a light flux incident along a first optical axis. The bending member includes a reflecting surface reflecting the light flux passing through the first lens to a direction along a second optical axis intersecting with the first optical axis. The second lens takes in the light flux passing through the bending member. The bending member is fixed to the lens frame. The lens frame includes a antireflection portion that faces the reflecting surface through a gap, and a wall portion that is at least partly arranged on the outer circumference side of the antireflection portion and protrudes to the bending member side with respect to the antireflection portion. A gap is formed between the wall portion and the reflecting surface.

In this lens barrel, since the lens frame includes a wall portion, even if adhesive agent flows into between the lens frame and the bending member when fixing the bending member by the adhesive agent, the adhesive agent accumulates in the space on the exterior side of the wall portion and adhesive agent does not flow into between the reflecting surface and the antireflection portion. Therefore, it is possible to prevent adhesive agent from attaching to the reflecting surface, and it is possible to prevent problems such as flare or ghost due to unwanted reflecting light from occurring. In addition, with the effect of the surface tension of the adhesive agent, the adhesive agent flowing into between the wall portion and the bending member does not cross over the wall portion and spread to the inside. As a result, it is possible to reliably prevent adhesive agent from flowing into between the reflecting surface and the antireflection portion.

A lens barrel according to a seventy fifth aspect of the present invention is the lens barrel of the seventy fourth aspect, wherein the wall portion extends in the first and second optical axis direction.

A lens barrel according to a seventy sixth aspect of the present invention is the lens barrel of the seventy fourth or seventy fifth aspect, wherein the lens frame further includes a groove portion concaved on the opposite side to the bending member and arranged on the outer circumference side with respect to the wall portion.

In this lens barrel, since the lens frame includes a groove portion on the outer circumference side compared to the wall portion, even if adhesive agent flows into between the lens frame and the bending member when fixing the bending member by the adhesive agent, adhesive agent accumulates in the groove portion and adhesive agent does not flow into between the reflecting surface and the antireflection portion. Therefore, it is possible to more reliably prevent adhesive agent from attaching to the reflecting surface, and since the light flux passing the bending member when photographing is not affected by the adhesive agent, it is possible to photograph properly. In addition, it is possible to prevent problems such as flare or ghost due to unwanted reflecting light from occurring.

A lens barrel according to a seventy seventh aspect of the present invention is the lens barrel of any one of the seventy fourth to seventy sixth aspects, and the antireflection portion includes a plurality of concave-convex portions.

Here, it is possible to reduce unwanted reflecting light via the antireflection portion, and it is possible to prevent problems due to flare or ghost or the like from occurring.

A lens barrel according to a seventy eighth aspect of the present invention is the lens barrel of any one of the seventy fourth to seventy seventh aspects, and the antireflection portion is formed to be stepped.

Here, it is possible to reduce unwanted reflecting light via the antireflection portion, and it is possible to prevent problems due to flare or ghost or the like from occurring.

A lens barrel according to a seventy ninth aspect of the present invention includes a bending member that includes a reflecting surface reflecting a light flux incident along a first optical axis to a direction along a second optical axis intersecting with the first optical axis, a first retaining portion that includes a middle wall that supports the bending member and in which the bending member is contained, and a second retaining portion that is arranged to face the first retaining portion with the middle wall sandwiched and in which an inspection bending member that inspects the accuracy of mounting the bending member can be contained. The first retaining portion includes at least three first contact portions that are formed on the middle wall and are in contact with the reflecting surface. The second retaining portion includes at least two second contact portions that are formed on the middle wall and are in contact with one surface of the inspection bending member. The second contact portions are formed so that one surface of the inspection bending member becomes substantially parallel to the reflecting surface.

In this lens barrel, when the inspection bending member is mounted on the second retaining portion to be in contact with the second contact portions during the time of inspection, one surface of the inspection bending member becomes substantially parallel to the reflecting surface of the bending member. Therefore, the angle of the reflecting surface of the inspection bending member with respect to the reflecting surface of the bending member becomes constant, and it is possible to measure the distance to the reflecting surface of the bending member via a laser measuring instrument and the like, with the inspection bending member as the standard. Therefore, it is possible to easily evaluate the accuracy of mounting the bending member, compared to a conventional way, and it is possible to aim the quality stability.

Here, the meaning of "one surface of the inspection bending member substantially parallel to the reflecting surface" also includes, other than the case that one surface of the inspection bending member is completely parallel to the reflecting surface, the case that it is substantially parallel to the reflecting surface with the evaluation of the accuracy of mounting acceptable, taking into consideration the accuracy of mounting the reflecting surface of the bending member, measurement deviation of the laser measuring instrument and the like.

A lens barrel according to an eightieth aspect of the present invention is the lens barrel of the seventy ninth aspect, wherein the first contact portion and the second contact portion are arranged on positions that are substantially opposite with the middle wall sandwiched.

A lens barrel according to an eighty first aspect of the present invention is the lens barrel of the seventy ninth or eightieth aspect, wherein the middle wall includes a perforated portion through which the first retaining portion and the second retaining portion are communicated with each other, or a blocked portion that blocks the perforated portion.

In this case, for example, it is possible to measure the position and the amount of tilt of the bending member with respect to the lens frame with arranging a standard surface on the lens frame. As a result, it is possible to easily evaluate the accuracy of mounting the bending member, compared to a conventional way, and it is possible to aim the quality stability.

A lens barrel according to an eighty second aspect of the present invention includes a bending member that includes a reflecting surface reflecting a light flux incident along a first optical axis to a direction along a second optical axis intersecting with the first optical axis, a first retaining portion that includes a middle wall that supports the bending member and in which the bending member is contained, and a second retaining portion that is arranged to face the first retaining portion with the middle wall sandwiched and in which an inspection bending member that inspects the accuracy of mounting the bending member can be contained. The middle wall includes a perforated portion through which the first retaining portion and the second retaining portion are communicated with each other, or a blocked portion that blocks the opening portion.

In this case, for example, it is possible to measure the position and the amount of tilt of the bending member with respect to the lens frame with arranging a standard surface on the lens frame. As a result, it is possible to easily evaluate the accuracy of mounting the bending member, compared to a conventional way, and it is possible to aim the quality stability.

A lens barrel according to an eighty third aspect of the present invention is the lens barrel of the eighty first or eighty second aspect, and the perforated portion or the blocked portion is arranged in a position corresponding to an area around the center of the reflecting surface.

In this case, since it is possible to measure the position and the amount of tilt of the bending member in an area around the center of the reflecting surface, it is possible to evaluate the accuracy of mounting the bending member more properly.

A lens barrel according to an eighty fourth aspect of the present invention is the lens barrel of any one of the seventy ninth to eighty third inventions, and the second retaining portion includes at least three second contact portions.

A lens barrel according to an eighty fifth aspect of the present invention is the lens barrel of any one of the seventy ninth to eighty third aspects, and the second retaining portion includes at least two second contact portions that extend in one direction along the reflecting surface.

A lens barrel according to an eighty sixth aspect of the present invention is the lens barrel of any one of the seventy fourth to eighty fifth aspects, and further includes a first lens group, a first movement mechanism, a driving unit, and a second lens group. The first lens group is arranged to be relatively movable in the first optical axis direction with respect to the bending member, and takes in the light flux incident along the first optical axis. The first movement mechanism includes the first lens group and relatively moves the first lens group and the bending unit in a direction along the first optical axis. The driving unit drives the first movement mechanism. The second lens group takes in the light flux reflected by the bending member.

An image pickup device according to an eighty seventh aspect of the present invention includes the lens barrel of the eighty sixth aspect, wherein an image pickup unit configured to take in the light flux exiting from the lens barrel.

An inspecting method according to an eighty eighth aspect of the present invention is an inspecting method of a lens barrel including a bending member and a lens frame. The bending member includes a reflecting surface reflecting a light flux incident along a first optical axis to a direction along a second optical axis intersecting with the first optical axis. The lens frame includes a first retaining portion that includes a middle wall that supports the bending member and in which the bending member is contained, a second retaining portion in which an inspection bending member is contained, and a perforated portion formed on the middle wall and through which the first retaining portion and the second retaining portion are communicated with each other. This inspecting method includes an inspection bending member mounting step and a measuring step. In the inspection bending member mounting step, the inspection bending member is mounted on the second retaining portion. In the measuring step, via a measuring unit that is able to measure distances without being in contact, a light flux used for the measurement of the measuring unit is reflected via the reflecting surface of the inspection bending member, and the distance between the reflecting surface of the bending member of the portion corresponding to the perforated portion and the measuring unit is measured.

In this inspecting method, since an inspection bending member and a measuring unit are used, it is possible to easily and accurately measure the accuracy of mounting the bending member in a non-contact way.

An inspecting method according to an eighty ninth aspect of the present invention is the inspecting method of the eighty eighth aspect, wherein the first retaining portion includes at least three first contact portions being formed on the middle wall and being in contact with the reflecting surface of the bending member. The second retaining portion includes at least two second contact portions being formed on the middle wall and being in contact with one surface of the inspection bending member such that one surface of the inspection bending member and the reflecting surface become substantially parallel. In the inspection bending member mounting step, the inspection bending member is mounted on the second retaining portion to be in contact with the second contact portions of the second retaining portion.

Here, the meaning of "one surface of the inspection bending member substantially parallel to the reflecting surface" also includes, other than the case that one surface of the inspection bending member is completely parallel to the reflecting surface, the case that it is substantially parallel to the reflecting surface with the evaluation of the accuracy of mounting acceptable, taking into consideration the accuracy of mounting the reflecting surface of the bending member, measurement deviation of the laser measuring instrument and the like.

An inspecting method according to a ninetieth aspect of the present invention is the inspecting method of the eighty eighth or eighty ninth aspect, wherein the perforated portion is arranged on a position corresponding to an area around the center of the reflecting surface.

In this case, since it is possible to measure the position and the amount of tilt of the bending member in an area around the center of the reflecting surface, it is possible to evaluate the accuracy of mounting the bending member more properly.

An inspecting method according to a ninety first aspect of the present invention is the inspecting method of any one of the eighty eighth to ninetieth aspects, and the second retaining portion includes at least three the second contact portions.

An inspecting method according to a ninety second aspect of the present invention is the inspecting method of any one of the eighty eighth to ninety first inventions, and the second retaining portion includes at least two second contact portions that extend in one direction along the reflecting surface.

A manufacturing method according to a ninety third aspect of the present invention is a manufacturing method of a lens barrel including a first lens, a bending member, a second lens, and a lens frame. The first lens takes in a light flux incident along a first optical axis. The bending member includes a reflecting surface reflecting the light flux passing through the first lens to a direction along a second optical axis intersecting with the first optical axis. The second lens takes in the light flux passing through the bending member. The bending member is fixed to the lens frame. The lens frame includes a perforated portion that is penetrated, on the opposite side to the reflecting surface. This manufacturing method includes a mounting step in which the bending member is fitted in the lens frame, a bonding step in which adhesive agent is filled between the bending member and the lens frame, and an inspection step in which the accuracy of mounting the bending member is measured by the inspecting method of any one of the eighty eighth to ninety second aspects.

In this manufacturing method, since the inspecting method of any one of the eighty eighth to ninety second aspects is used, it is possible to inspect the accuracy of mounting the bending member easily, and it is possible to reduce the work of the inspection step. In addition, it is possible to evaluate the accuracy of mounting the bending member more properly, and it is possible to obtain high optical performance in the lens barrel.

1: Summary

An embodiment of the present invention will be described using FIGS. 1 to 48.

A digital camera of the present invention adopts a bending optical system in the optical system, and at the same time, the lens barrel on the photographic object side is formed to be able to draw out in multistage. Therefore, a high magnification zoom lens system and the miniaturization of the device are both realized. This digital camera has a characteristic mainly in the configuration of a second group frame unit thereof. The characteristics of these configurations will be described in the modified embodiments of "4.3.2: Configuration of the second group frame unit" and "6: Other Matters".

2: Digital Camera

The digital camera including a lens barrel in a first embodiment of the present invention will be described with reference to FIGS. 1 to 3.

2.1: Configuration of the Digital Camera

FIG. 1 is a perspective view showing the exterior outside of a digital camera 1 including a lens barrel in the first embodiment of the present invention.

The digital camera 1 includes an image pickup device 2 and a main body 3. The image pickup device 2 has a bending optical system bending the light flux incident along the first optical axis A1 to a direction along a second optical axis A2 perpendicular to the first optical axis A1 and leading the light flux to an image sensor. The main body 3 stores the image pickup device 2, and performs control or the like on the image pickup device 2.

First, before describing detailed configuration of the image pickup device 2, the configuration of the main body 3 will be described.

In addition, in the following description, the six faces of the digital camera 1 will be defined as follows.

The side facing the subject during image capture with the digital camera 1 is termed the front side, while the opposite side is termed the rear side. When image capture is performed so that the vertical top and bottom of the subject coincide with the top and bottom in the short side direction of the rectangular image captured with the digital camera 1 (the aspect ratio (ratio of long side to short side) is generally, 3:2, 4:3, 16:9, etc.), the side facing upward in the vertical direction is termed the top side. The side opposite to the top side is termed the bottom side. Furthermore, when image capture is performed so that the vertical top and bottom of the subject coincide with the top and bottom in the short side direction of the rectangular image captured with the digital camera 1, the side on the left when viewed from the subject side is termed the left side, and the opposite side is termed the right side. The above definitions do not limit the orientation in which the digital camera 1 is used.

According to the above definitions, FIG. 1 is a perspective view showing the front side, top side, and left side.

In addition, to the six sides of the digital camera 1, the six sides of the various constituent components disposed in the digital camera 1 are also defined likewise. In other words, the above definitions are applied to the six sides of the various constituent components in a state of being disposed in digital camera 1.

Furthermore, as shown in FIG. 1, the three dimensional perpendicular coordinate system (right-handed system) having a Y axis parallel to the first optical axis A1 and an X axis parallel to the second optical axis A2 will be defined. According to this definition, the Y axis positive direction is the direction from the rear side to the front side along the first optical axis A1, the X axis positive direction is the direction from the right side to the left side along the second optical axis A2, and the Z axis positive direction is the direction from the bottom side to the upper side along the perpendicular axis perpendicular to the first optical axis A1 and the second optical axis A2.

A description will be made below based on this XYZ coordinate system in each figure. In other words, the X axis positive direction, Y axis positive direction, and Z axis positive direction in each figure are showing the same direction each.

2.2: Configuration of the Main Body

The configuration of the main body 3 will be described with reference to FIG. 1, FIG. 2, and FIGS. 3A to 3C.

FIG. 2 is a perspective view showing the exterior outside of the rear side, upper side, and right side of the digital camera 1.

Figure 3A:
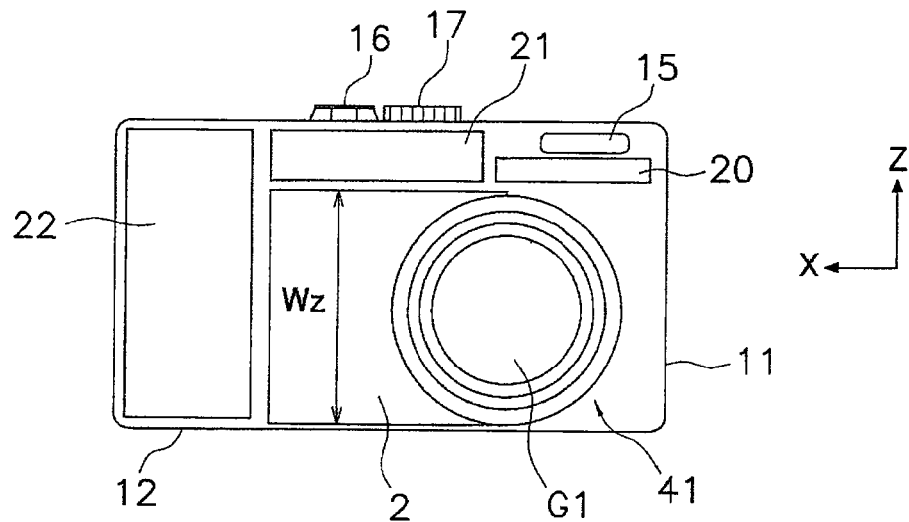
FIGS. 3A and 3C are schematic perspective plans showing the configuration of the main body.
Figure 3B:
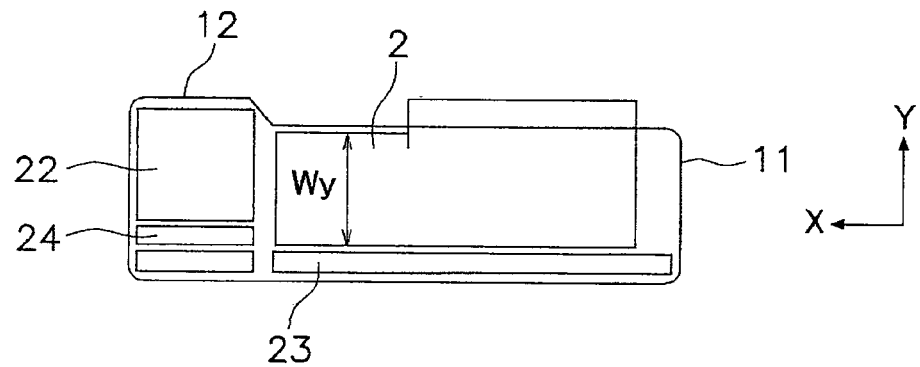
Figure 3C:
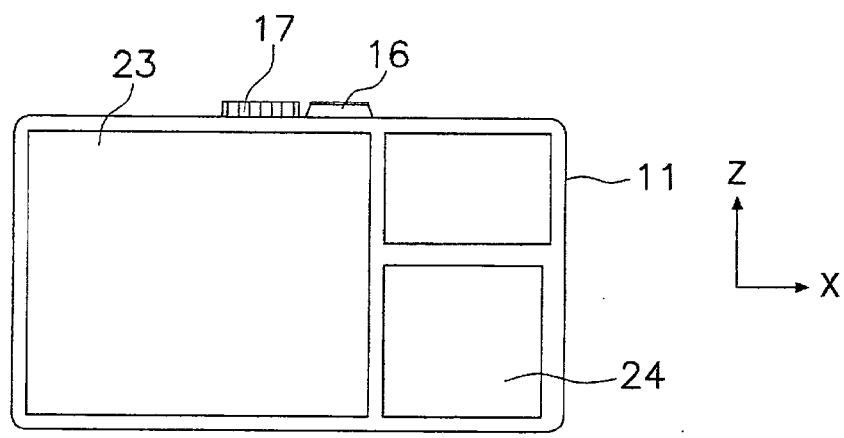

FIGS. 3A to 3C are perspective plans roughly showing the configuration of the main body 3. FIG. 3A is a perspective plan showing the configuration of a member disposed on the Y axis direction positive side (front side). FIG. 3B is a perspective plan showing the configuration of a member disposed on the Z axis direction negative side (bottom side). FIG.

3C is a perspective plan showing the configuration of a member disposed on the Y axis direction negative side (rear side).

As shown in FIGS. 1 to 3, the main body 3 mainly includes an outer case 11 and a grip portion 12 forming the chassis for storing the image pickup device 2, a flash lamp 15, a release button 16, an operation dial 17 and an image display unit 18 disposed on the surface of the outer case 11, and a main condenser 20, a sub-substrate 21, a battery 22, a main substrate 23 and a memory card 24 disposed inside the chassis formed by the outer case 11 and the grip portion 12.

As shown in FIG. 1, the outer case 11 is a housing which is substantially in a rectangular parallelepiped shape, long in the second optical axis A2 direction. On the X axis direction positive side, the grip portion 12 is disposed to protrude in the Y axis direction from the outer case 11 so that the user can grip the grip portion 12 when photographing. This makes the outer case 11 and the grip portion 12 form a hollow chassis which is substantially in an L-shape. From the outer case 11, a stationary frame 52 (refer to FIG. 9) of the image pickup device 2, which will be described later makes a portion of the cylindrical portion 125 thereof (refer to FIG. 10) protrude to the Y axis direction positive side. In addition, on the front side of the outer case 11, the flash lamp 15 is disposed. The flash lamp 15 flashes and irradiates the object to aid the exposure thereof when necessary such as when the object is dark. In addition, the release button 16 and the operation dial 17 are disposed on the grip portion 12 side of the upper side of the outer case 11. The release button 16 is pressed down toward the Z axis direction negative side when executing a photographing operation. The operation dial 17 is used to set various settings such as the setting for the photographing operation.

Furthermore, as shown in FIG. 2, on the rear side of the outer case 11, the image display portion 18 is provided as a visual unit for a user or the like to view the image captured by the image pickup device 2. The image display portion 18 has a rectangular outer shape such as, for example, an aspect ratio (ratio of long side to narrow side) of 3:2, 4:3, 16:9 or the like, and is provided so that the long side direction thereof is substantially parallel to the direction along the second optical axis A2 (X axis direction).

Note that, FIG. 1 and FIG. 2 show only the main members disposed on the surface of the outer case 11, and members other than the above described members may be provided.

Next, the interior configuration of the main body 3 will be described with reference to FIGS. 3A to 3C.

As shown in FIG. 3A, on the Y axis direction positive side inside the main body 3, the image pickup device 2 which is long in the second optical axis A2 direction (X axis direction positive side) is disposed so that the longitudinal direction thereof is disposed along the longitudinal direction of the outer case 11. The image pickup device 2 is disposed in the main body 3 so that a first group frame unit 41 retaining a first lens group G1 facing the object is located on the X axis direction negative side of the image pickup device 2. By doing so, the distance in the X axis direction from the first lens group G1 to the grip portion 12 is secured.

Furthermore, on the Z axis direction positive side of the image pickup device 2, the flash lamp 15, the main condenser 20, and the sub-substrate 21 are disposed. The main condenser 20 provides flash light energy to the flash lamp 15, through the electric charge from a battery 22 which will be described later. The sub-substrate 21 transforms voltage when necessary of the electric power from the battery 22 which will be described later, and controls the flash lamp 15. In addition, on the Y axis direction positive side inside the grip portion 12, the battery 22 is disposed as the electric power supply for operating the digital camera 1.

Furthermore, as shown in FIGS. 3B and 3C, a main substrate 23 is disposed on the Y axis direction negative side of the image pickup device 2. An image processing circuit which processes image signals from the image pickup device 2, a control circuit for controlling the image pickup device 2, or the like are implemented in the main substrate 23. In addition, a memory card 24 is disposed on the Y axis direction negative side of the battery 22. The memory card 24 records image signals from the image pickup device 2.

In addition, as shown in FIGS. 3A and 3B, the image pickup device 2 is formed to have a width in the Z axis direction thereof (Wz) which is greater than the width in the Y axis direction (Wy).

3: Image pickup device 3.1: Configuration of the Image Pickup Device

The configuration of the image pickup device 2 attached in the digital camera 1 will be described with reference to FIG. 4.

FIG. 4 is a perspective view of the assembly of the image pickup device 2. FIG. 4A is a perspective view showing the front side, upper side, and the left side of the image pickup device 2, and FIG. 4B is a perspective view showing the front side, upper side, and the right side of the image pickup device 2.

The image pickup device 2 includes a lens barrel 31 having an optical system 35, a motor unit 32 having a zoom motor 36 which drives the lens barrel 31, and a CCD unit 33 having a CCD 37 as an image pickup unit receiving the light flux passing through the lens barrel 31.

The lens barrel 31 is mechanistically characterized in that it includes a multistage retractable lens frame which is retractable and extendable in multistage in the first optical axis A1 direction, and is optically characterized in which it includes an optical system 35 which includes the bending optical system. The optical system 35 includes 5 groups including 12 pieces of optical elements (lens and prisms) which realize a high magnification zoom which is beyond 3 times optical zoom (for example, in the range of 6 times to 12 times optical zoom). With this configuration, the lens barrel 31 takes in the light flux incident along the first optical axis A1, and bends the light flux incident along the first optical axis A1 in a direction along the second optical axis A2 intersecting with the first optical axis A1, and furthermore, leads the light flux bent in the direction along the second optical axis A2 to CCD 37.

The motor unit 32 mainly includes, for example, a zoom motor 36 such as a DC motor, a flexible printed circuit board (FPC) (not shown in the figure) electrically connecting the zoom motor 36 to the main substrate 23 (refer to FIGS. 3A to 3C), and a photo sensor (not shown in the figure) provided to measure the position from the original point of the lens in the lens barrel 31 by the measurement of the motor rotation frequency of the zoom motor 36. The zoom motor 36 drives the lens barrel 31, and moves the optical system 35 between the wide angle end and the telephoto end. By doing so, the optical system 35 included in the lens barrel 31 operates as a zoom lens system to change the imaging magnification of the light flux in CCD 37. The photo sensor operates as follows. The photo sensor is a pair of transmission type photo sensor provided entering from the outside of the motor box (gear box). The photo sensor has a square U-shape, and a pair of light emitting element and light receiving element are provided on the opposite ends of the photo sensor. It is configured so that a gear directly coupled to the zoom motor 36 passes through between the light emitting element and the light receiving element, and by counting the number of times that the gear interrupts the space between this light emitting element and light receiving element per unit time, and therefore it is possible to count the number of rotations of the zoom motor without contact.

The CCD unit 33 is mainly made up of the CCD 37 which converts the received light flux passing through the lens barrel 31 into an electrical signal, a CCD plate 38 for fixing CCD 37 to the lens barrel 31, and an FPC (not shown in the figure) electrically connecting CCD 37 to the main substrate 23 (refer to FIGS. 3A to 3C).

3.2: Optical System 3.2.1: Configuration of Optical System

Before describing in detail configuration of the image pickup device 2, the configuration of the optical system 35 included in the lens barrel 31 will be described with reference to FIGS. 5 to 8.

Figure 5:
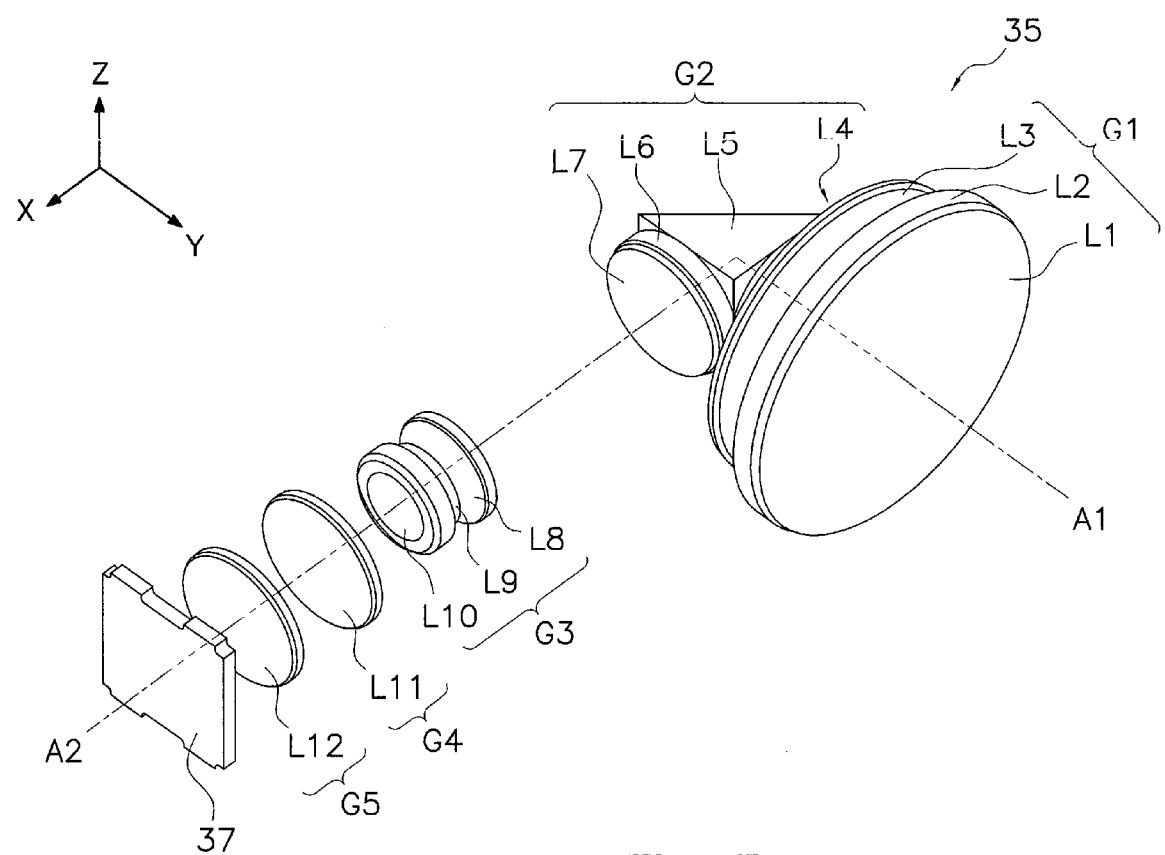
FIG. 5 is an illustration showing the configuration of the optical system (wide angle end)
Figure 6:
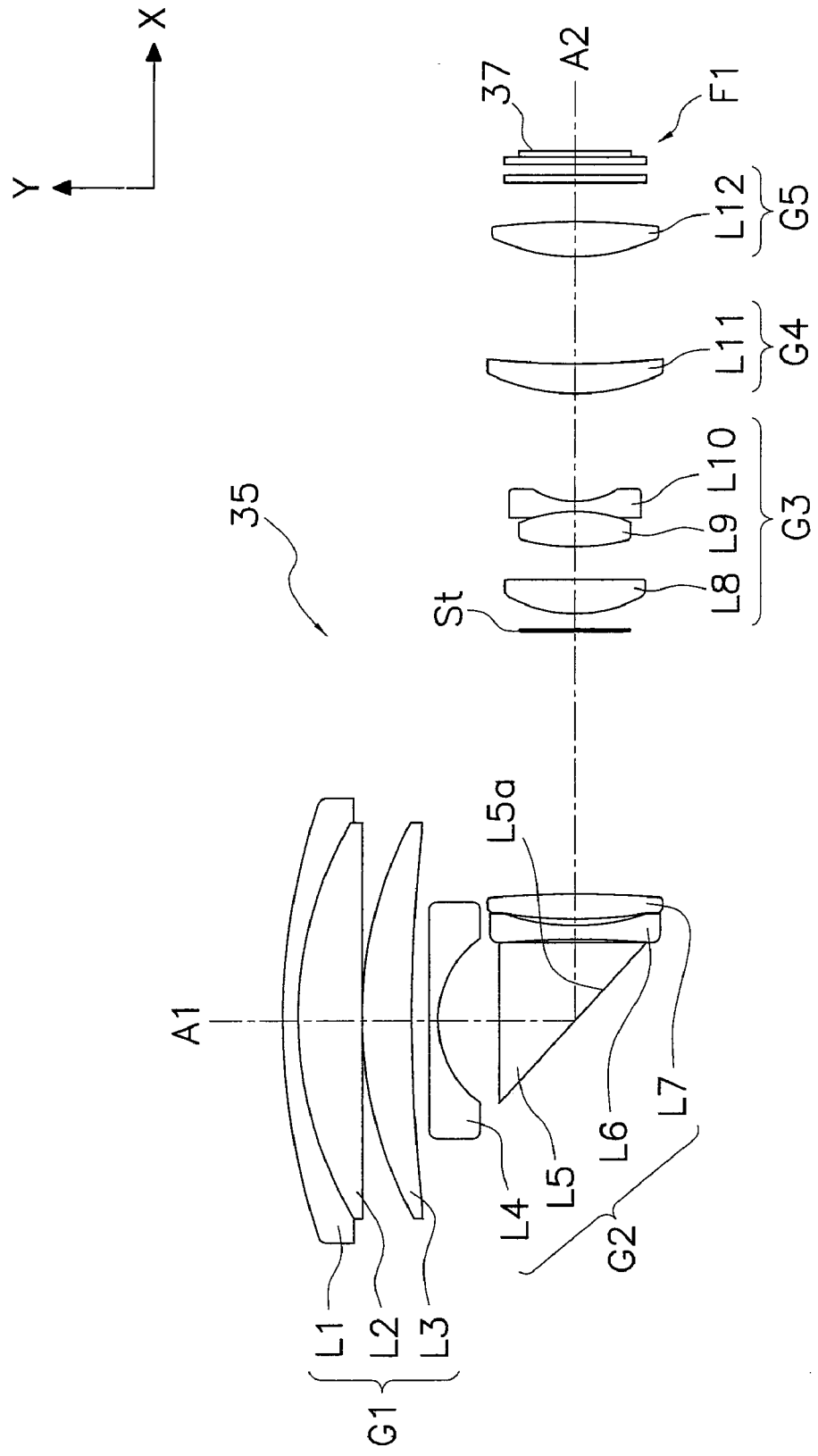
FIG. 6 is an illustration showing the configuration of the optical system (wide angle end)
Figure 7:
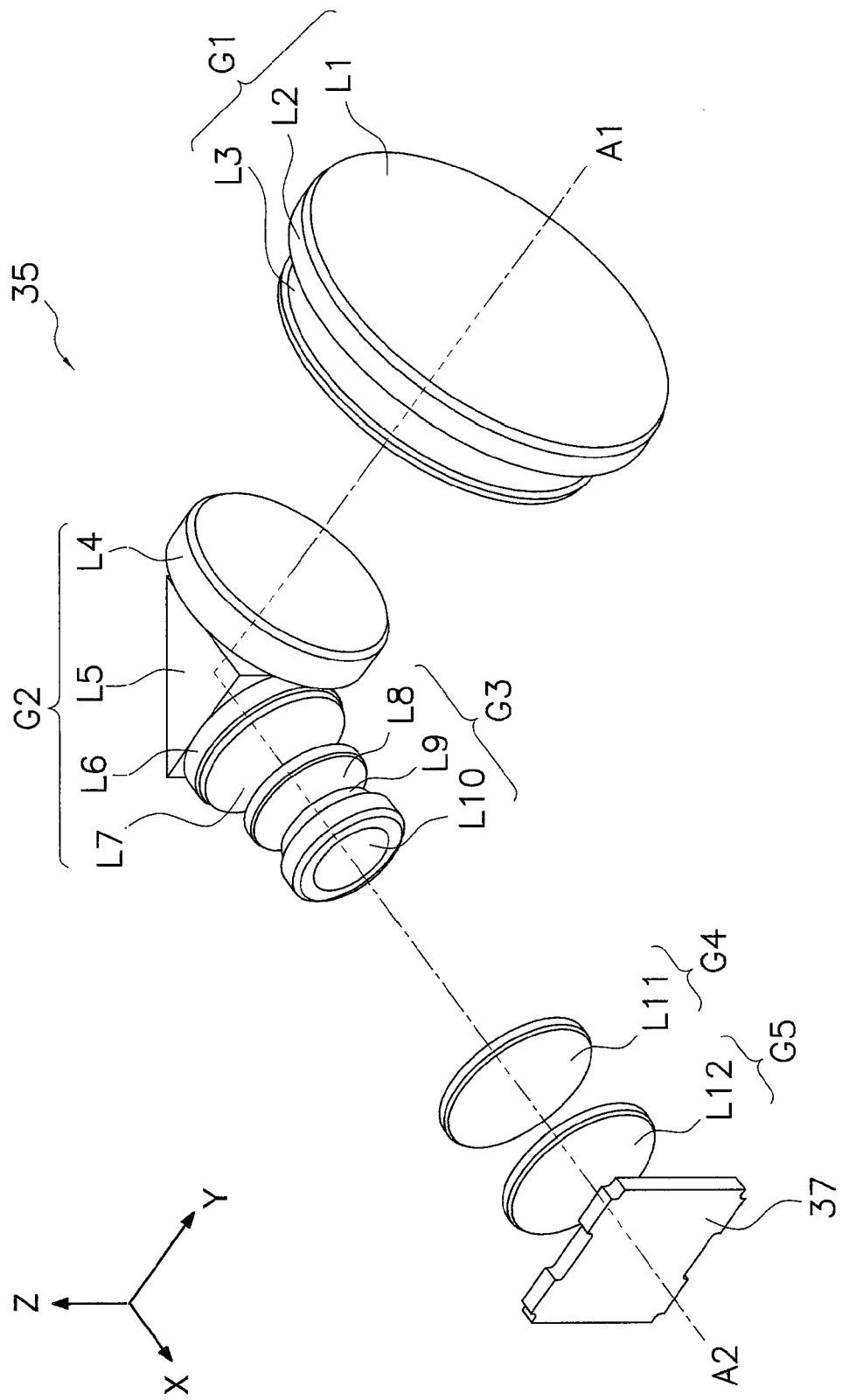
FIG. 7 is an illustration showing the configuration of the optical system (telescopic end)
Figure 8:
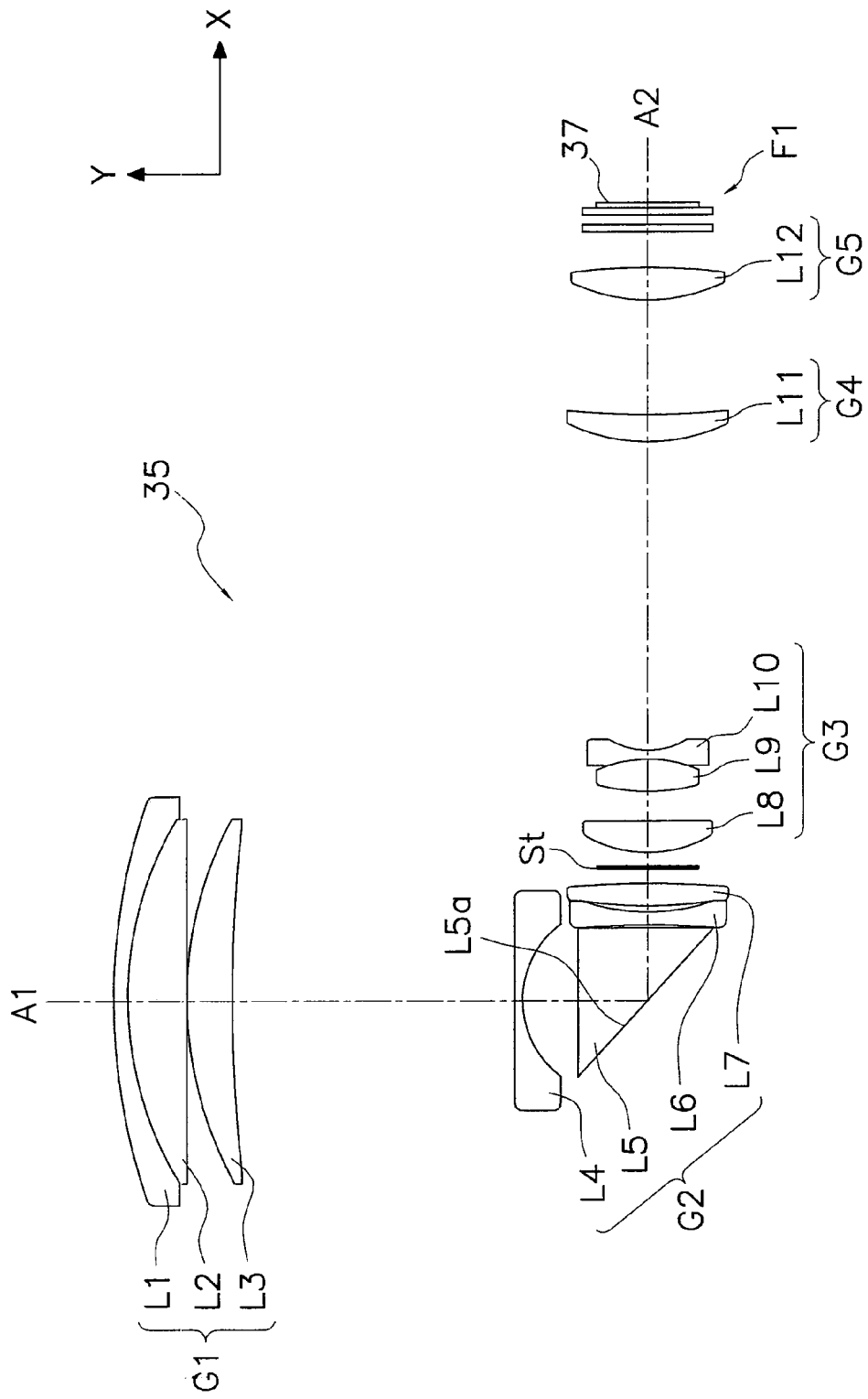
FIG. 8 is an illustration showing the configuration of the optical system (telescopic end)

FIGS. 5 to 8 show the configuration of the optical system 35 included in the lens barrel 31. FIGS. 5 and 6 show the arrangement of the optical system 35 when the optical system 35 is located at the wide angle end. FIGS. 7 and 8 show the arrangement of the optical system 35 when the optical system 35 is located at the telephoto end. FIGS. 5 and 7 show the arrangement of the optical system 35 when viewed from the same point as in FIG. 4. FIGS. 6 and 8 are sectional views in a plane including the optical axes of the optical system 35 shown in FIGS. 5 and 7.

As shown in FIGS. 5 to 8, the optical system 35 is made up of a first lens group G1, a second lens group G2, an exposure-adjustment member St (refer to FIG. 6 or FIG. 8), a third lens group G3, a fourth lens group G4, a fifth lens group G5 and an IR filter F1 (refer to FIG. 6 or FIG. 8) in order from the side of the object, and the optical system 35 is configured so that the light flux incident from the first lens group G1 passes through each of the lens groups G1 to G5 and the IR filter F1, and is conducted to the CCD 37. In addition, each of the lens groups G1 to G5 configures the zoom lens system by changing the distance between each of the lens groups.

The first lens group G1 has positive optical power as a whole, and includes a first lens L1, a second lens L2 and a third lens L3 disposed in order from the side of the object on the first optical axis A1.

The first lens L1 is a concave meniscus lens having the convex surface facing to the side of the object. The second lens L2 is a plane-convex lens having the convex surface facing to the side of the object. The third lens L3 is a convex meniscus lens having the convex surface facing to the side of the object.

The second lens group G2 has negative optical power as a whole, and includes a fourth lens L4 disposed on the first optical axis A1, a prism L5 bending the light flux incident along the first optical axis A1 to a direction along the second optical axis A2 which is substantially perpendicular to the first optical axis A1, a sixth lens L6 disposed on the second optical axis A2, and a seventh lens L7.

The fourth lens L4 is a concave meniscus lens having the convex surface facing the side of the object. The prism L5 includes a reflecting surface L5a (refer to FIG. 6 or FIG. 8) which reflects the light flux incident along the first optical axis A1 to a direction along the second optical axis A2 which is substantially perpendicular to the first optical axis A1. In addition, although a prism L5, in particular, an internal reflection prism is here used, any of a surface reflection prism, an internal reflection mirror and a surface reflection mirror with the same functions may be adopted. The sixth lens L6 is a biconcave lens. The seventh lens L7 is a biconvex lens.

The exposure-adjustment member St (refer to FIG. 6 or FIG. 8) is disposed on the second optical axis A2, and is a member such as an aperture or a shutter adjusting the amount of light incident into the CCD 37 along the second optical axis A2.

The third lens group G3 has positive optical power as a whole, and includes an eighth lens L8, a ninth lens L9 and a tenth lens L10.

The eighth lens L8 is a plane-convex lens having the convex surface facing to the side of the prism L5. The ninth lens L9 is a biconvex lens. The tenth lens L10 is a biconcave lens.

The fourth lens group G4 is used for focusing, and includes an eleventh lens L11 disposed on the second optical axis A2. The eleventh lens L11 is a convex meniscus lens having the convex surface facing to the side of the prism L5.

The fifth lens group G5 includes a twelfth lens L12 disposed on the second optical axis A2. The twelfth lens L12 is a biconvex lens.

The IR filter F1 (refer to FIG. 6 or FIG. 8) is a filter blocking off invisible light in the infrared region incident into the CCD 37. In addition, in the optical system 35, an optical lowpass filter may be disposed in the second optical axis A2 direction of the IR filter F1 (X axis direction positive side). The optical lowpass filter is a filter for removing the high spatial frequency component of the light flux incident into the CCD 37, and it is a filter for eliminating false color.

In addition, the configurations of the lenses including each of the lens groups G1 to G5 are not limited to those described above. It is possible to adopt another lens configuration, as long as the configuration has the same optical effects.

3.2.2: Operation of the Optical System

With Reference to FIGS. 6 and 8, the operation of the optical system 35 will be described.

As described above, FIG. 6 shows the arrangement of each of the lens groups G1 to G5 when the optical system 35 is located at the wide angle end. FIG. 8 shows the arrangement of each of the lens groups G1 to G5 when the optical system 35 is located at the telephoto end.

The first lens group G1 is movable in the first optical axis A1 direction. When the optical system 35 is located at the wide angle end, it is located at a place nearest to the second lens group G2 (refer to FIG. 6) within the movable range. When the optical system 35 is located at the telephoto end, it is located at a place farthest away from the second lens group G2 (refer to FIG. 8) within the movable range.

The second lens group G2, as shown in FIGS. 6 and 8, is relatively stationary with respect to the CCD 37, at the time of zooming of the optical system 35 from the wide angle end to the telephoto end.

The third lens group G3 is movable with the exposure-adjustment member St in the second optical axis A2 direction. When the optical system 35 is located at the wide angle end, the third lens group G3 is located at a place farthest away from the second lens group G2 (refer to FIG. 6) within the movable range. When the optical system 35 is located at the telephoto end, the third lens group G3 is located at a place nearest to the second lens group G2 (refer to FIG. 8) within the movable range.

The fourth lens group G4 is movable in the second optical axis A2 direction. The fourth lens group G4 performs the focusing operation, and corrects the out-of-focus state caused by the changes in imaging magnification due to the movement of first lens group G1 and the third lens group G3.

As shown in FIGS. 6 and 8, the fifth lens group G5 and the IR filter F1 are relatively stationary with respect to the CCD 37, when zooming with the optical system 35 from the wide angle end to the telephoto end.

Each of the lens groups G1 to G5 operates as described above. In particular, the first lens group G1 and the third lens group G3 moves in cooperation with each other, and changes the imaging magnification in the CCD 37.

In addition, in the lens barrel 31, the location of each of the lens groups G1 to G5 when the multistage retractable lens frame is retracted corresponds to the location of each of the lens groups G1 to G5 when the optical system 35 is located at the wide angle end.

4: Lens barrel 4.1: Configuration of the Lens Barrel

The configuration of the image pickup device 2, mainly the configuration of the lens barrel 31 will be described with reference to FIG. 9.

Figure 9:
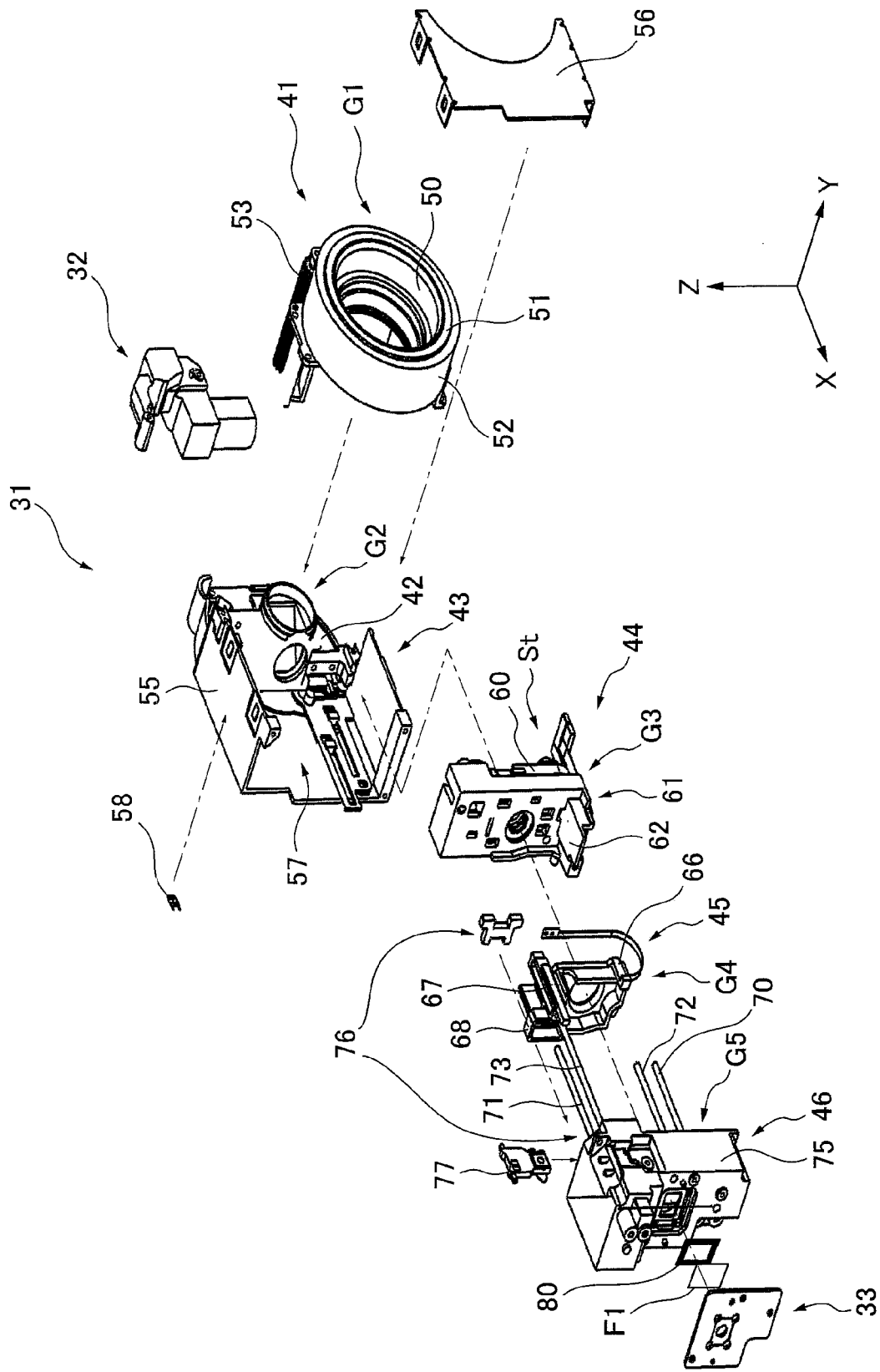
FIG. 9 is an exploded perspective view of the image pickup device.

FIG. 9 is an exploded perspective view of the image pickup device 2 when viewed from the same point as in FIG. 4A.

The lens barrel 31 is made up of a first group frame unit 41 retaining the first lens group G1, a base unit 43 to which a second group frame unit 42 retaining the second lens group G2 is fixed, a third group frame unit 44 retaining the exposure-adjustment member St and the third lens group G3, a fourth group frame unit 45 retaining the fourth lens group G4, and a master flange unit 46 retaining the fifth lens group G5.

The first group frame unit 41 is mainly made up of the first lens group G1 disposed on the first optical axis A1, a first group frame 50 retaining the first lens group G1, a driving frame 51 supporting the first group frame 50 to be movable in the first optical axis A1 direction (Y axis direction), a stationary frame 52 supporting the driving frame 51 to be movable in the first optical axis A1 direction (Y axis direction), and a driving gear 53 disposed to be rotatable along the Y axis direction between the stationary frame 52 and the base unit 43 and transmitting the driving force of the motor unit 32 to the driving frame 51.

The stationary frame 52 is fixed to the second group frame unit 42 retaining the second lens group G2. When the stationary frame 52 is fixed, the positions in the Z axis direction and X axis direction are determined so that the optical axis of the first lens group G1 and the optical axis of the fourth lens L4 of the second lens group G2 coincide with each other.

The base unit 43 is mainly made up of a base 55 making up the chassis of the lens barrel 31, a cover 56 making up the chassis with the base 55 and covering the front side of the base 55, the second group frame unit 42 fixed to the base 55, a third group movement mechanism 57 moving the third group frame unit 44 stored inside the chassis made up of the base 55 and the cover 56 along the second optical axis A2 direction (X axis direction), and a photo sensor 58 detecting the X axis direction position of the third group frame unit 44.

A motor unit 32 driving the driving gear 53 to rotate is attached on the X axis direction negative side of the base unit 43. The driving force of the motor unit 32 is transmitted to the third group movement mechanism 57 via the driving gear 53. The master flange unit 46 covering the X axis direction positive side of the base unit 43 is fixed on the X axis direction positive side of the base unit 43.

The third group frame unit 44 is mainly made up of a shutter unit 60 provided on the second optical axis A2 and including the exposure-adjustment member St performing the shutter operation and the aperture operation, the third lens group G3, an image blur correction mechanism 61 retaining the third lens group G3 to be movable in the Y axis direction and the Z axis direction, and a third group frame 62 supporting the shutter unit 60 and the image blur correction mechanism 61.

The third group frame 62 is fixed to the third group movement mechanism 57 of the base unit 43, and is driven to the X axis direction. When the third group frame 62 is fixed, the positions in the Y axis direction and the Z axis direction are determined so that the optical axis when the third lens group G3 is located at the center in the movable range coincides with the optical axes of the sixth lens L6 and the seventh lens L7 of the second lens group G2. Furthermore, the third group frame 62 is slidably fitted to third group guide poles 70, 71 extending on the X axis direction negative side from the master flange unit 46 which will be described later. This allows the third group frame unit 44 to move only in the X axis direction, that is, the second optical axis A2 direction.

The fourth group frame unit 45 is mainly made up of the fourth lens group G4, the fourth group frame 66 retaining the fourth lens group G4, a sensor magnet 67 and a coil 68 fixed to the fourth group frame 66.

The fourth group frame 66 is slidably fitted to the fourth group guide poles 72, 73 extending on the X axis direction negative side from the master flange unit 46 which will be described later. As a result, the fourth group frame 66 is positioned in the Y axis direction and the Z axis direction so that the optical axis of the fourth lens group G4 coincides with the optical axes of the sixth lens L6 and the seventh lens L7 of the second lens group G2, and is movable only in the X axis direction, that is, the second optical axis A2 direction.

The master flange unit 46 is mainly made up of the fifth lens group G5, a master flange 75 retaining the fifth lens group G5, the third group guide poles 70, 71 and the fourth group guide poles 72, 73 extending on the X axis direction negative side and fixed to the master flange 75, the IR filter F1 attached from the X axis direction positive side via a cushion rubber 80, a magnetic member 76 driving the fourth group frame unit 45 in cooperation with the coil 68, and an MR sensor 77 detecting the magnetism of the sensor magnet 67 and senses the X direction position of the fourth group frame unit 45.

The master flange 75 is fixed on the X axis direction positive side of the base 55. When the master flange 75 is fixed, the positions in the Y axis direction and the Z axis direction are determined so that the optical axis of the fifth lens group G5 coincides with the optical axes of the sixth lens L6 and the seventh lens L7 of the second lens group G2. Furthermore, a CCD unit 33 is fixed on the X axis direction positive side of the master flange unit 46.

The components included in the lens barrel 31 will be described in detail below.

4.2: First Group Frame Unit 4.2.1: Configuration of the First Group Frame Unit

The configuration of the first group frame unit 41 will be described in detail with reference to FIG. 10.

Figure 10:
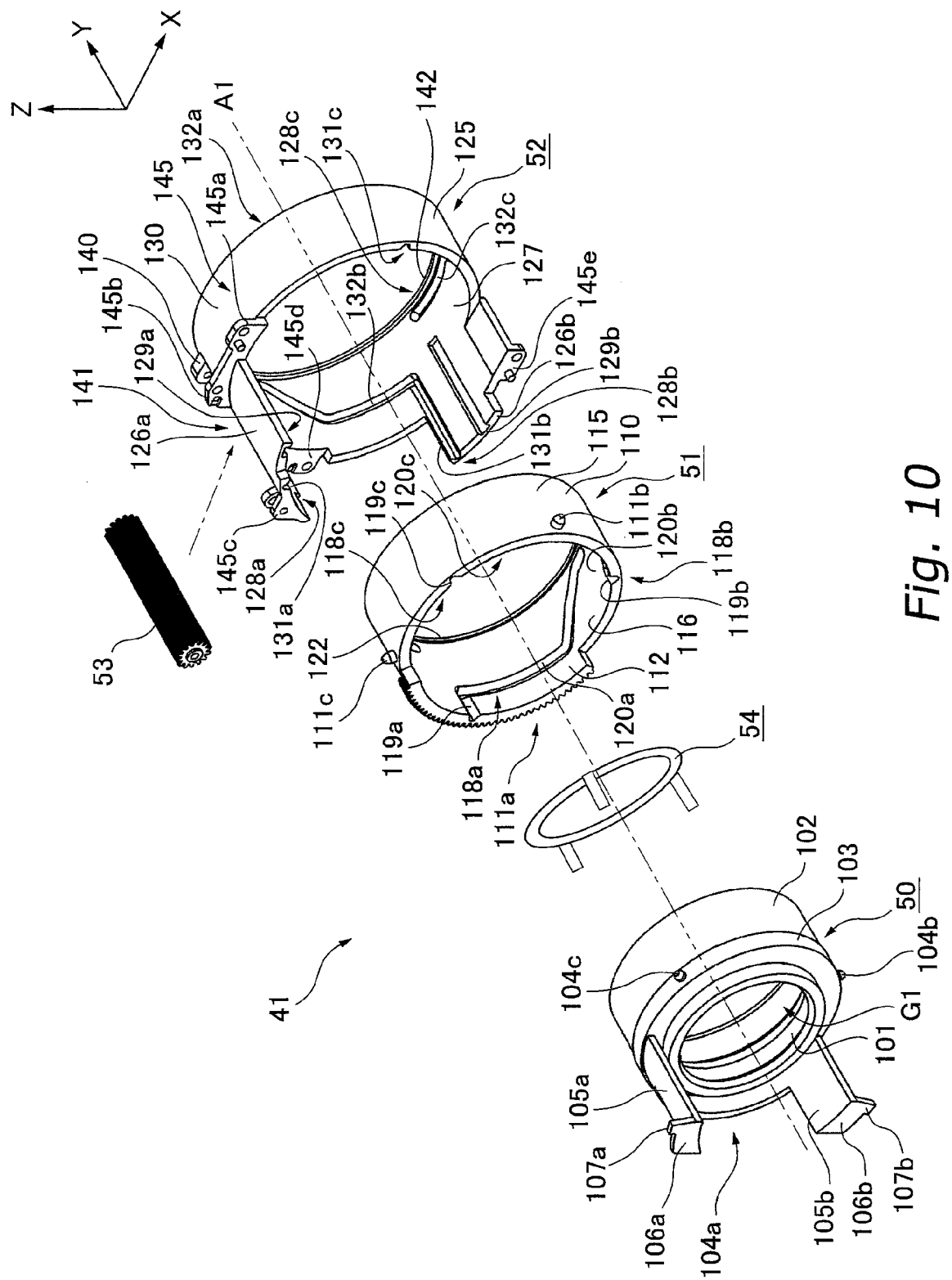
FIG. 10 is an exploded perspective view of the first group frame unit.

FIG. 10 is an exploded perspective view of the first group frame unit 41. The first group frame unit 41 supports the first lens group G1 with the multistage retractable frame body.

As shown in FIG. 10, the first group frame unit 41 is made up of the first lens group G1, the first group frame 50 retaining the first lens group, a first group DR (design ring) 54 attached to the first group frame 50, the driving frame 51 supporting the first group frame 50 to be movable, the stationary frame 52 supporting the driving frame 51 to be movable, and the driving gear 53 transmitting the driving from the motor unit 32 (refer to FIG. 9) to the driving frame 51.

The first lens group G1 is fixed to the inner peripheral surface 101 of the first group frame 50 by adhesive bonding or thermal caulking. Furthermore, on the inner peripheral surface 101 of the first group frame 50, the first group DR 54 is attached on the Y axis direction positive side of the first lens group G1. As a result, unwanted light is prevented from entering the first lens group G1. In addition, by mounting the first group DR 54, the fixation mark (adhesion mark) of the first lens group G1 on the first group frame 50 is covered, and the quality of the exterior outside is ensured.

The first group frame 50 includes a cylindrical portion 102, a flange portion 103, cam pins 104a to 104c, extension portions 105a, 105b, and engagement portions 106a, 106b.

The cylindrical portion 102 has the circular inner peripheral surface 101 on which the first lens group G1 is attached. The flange portion 103 has an outer peripheral surface formed on the edge of the cylindrical portion 102 on the Y axis direction negative side and having a diameter greater than that of the cylindrical portion 102. The cam pins 104a to 104c are provided to be spaced at a predetermined angle (for example, 120 degrees) away in the circumferential direction at a plurality of circumferential positions on the outer peripheral surface of the flange portion 103 (for example, three locations: for example, three o'clock, seven o'clock and eleven o'clock positions when viewed from the Y axis direction positive side), and protrude in the radiation direction of the first optical axis A1. The extension portions 105a and 105b are arc-shaped members extending toward the Y axis direction negative side and formed with a predetermined circumferential width (for example, 30 degrees) with two circumferential points (for example, one o'clock and five o'clock positions when viewed from the Y axis direction positive side) at the edge of the flange portion 103 on the Y axis direction negative side as the centers. The engagement portions 106a and 106b are formed on the tips of each of the extension portions 105a and 105b to extend in the radiation direction of the first optical axis A1, and end portions 107a and 107b are formed with a circumferential width narrower than the other portions at the ends of the engagement portions 106a and 106b in the radiation direction and at the ends thereof on the X axis direction positive side.

The driving frame 51 has a cylindrical portion 110, cam pins 111a to 111c, and a ring gear 112.

The cam pins 111a to 111c are provided to be spaced at a predetermined circumferential angle (for example, 120 degrees) away in the circumferential direction at a plurality of circumferential positions on the outer surface 115 of the cylindrical portion 110 (for example, three positions, one o'clock, five o'clock and nine o'clock positions when viewed from the Y axis direction positive side), and protrude in the radiation direction of the first optical axis A1. The ring gear 112 is formed integrally with the cylindrical portion 110 at a circumferential portion of the edge of the cylindrical portion 110 on the Y axis direction negative side (for example, from one o'clock position to five o'clock position when viewed from the Y axis direction positive side) so that the tooth tips protrude in the radiation direction of the first optical axis A1 compared to the outer surface 115. The radius of an imaginary circle which connects the tips of the cam pins 111a to 111c is formed larger than the radius of an imaginary circle which connects the tooth tips of the ring gear 112.

The circular inner surface 116 of the cylindrical portion 110 and the ring gear 112 has a radius larger than the radius of the flange portion 103 of the first group frame 50, and has a radius smaller than the radius of the imaginary circle which connects the tips of the cam pins 104a to 104c of the first group frame 50. Therefore, by engaging cam pins 104a to 104c with cam grooves 118a to 118c formed on the inner surface 116, it becomes possible to arrange the first group frame 50 inside the driving frame 51.

In addition, a circular flange portion 122 extending inward in the radiation direction of the first optical axis A1 is formed at the edge portion of the cylindrical portion 110 on the Y axis direction positive side. The radius of the inner surface of the flange portion 122 is formed to be substantially the same size as the radius of the outer peripheral surface of the cylindrical portion 102 of the first group frame 50. As a result, unwanted light is prevented from entering the interior of the lens barrel 31 through the gap formed between the first group frame 50 and the driving frame 51 in the radiation direction of the first optical axis A1.

Cam grooves 118a to 118c are formed in the inner surface 116 to be spaced at a predetermined circumferential angle (for example, 120 degrees). The cam grooves 118a to 118c have conducting ends opening at three positions (for example, three o'clock, seven o'clock and eleven o'clock positions) on the end portion of the inner surface 116 on the Y axis direction negative side, for conducting cam pins 104a to 104c to the cam grooves 118a to 118c. In addition, the cam grooves 118a to 118c have conducting grooves 119a to 119c extending to the Y axis direction positive side from the conducting ends, and sloped grooves 120a to 120c respectively continuing toward the conducting grooves 119a to 119c and extending toward the Y axis direction positive side and clockwise when viewed from the Y axis direction positive side. In addition, the conducting groove 119a of the cam groove 118a with the conducting end formed on the ring gear 112 side on the inner surface 116 has the length in the Y axis direction longer by the width size in the Y axis direction of the ring gear 112 compared to the other conducting grooves 119b and 119c.

The stationary frame 52 includes a cylindrical portion 125, and extension portions 126a, 126b. On the inner surface 127 of the cylindrical portion 125 and the extension portions 126a and 126b, cam grooves 128a to 128c and straight-movement grooves 129a and 129b are formed.

On a predetermined position in the circumferential direction of the outer surface 130 of the cylindrical portion 125 (for example, two o'clock position when viewed from the Y axis direction positive side), a protrusion portion 140 protruding in the radiation direction of the first optical axis A1, and a penetration groove 141 extending from the Y axis direction negative side of the protrusion portion 140 and passing through the cylindrical portion 125 in the radiation direction of the first optical axis A1 are formed. The protrusion portion 140 rotatably supports the end portion of the driving shaft of the driving gear 53 on the Y axis direction positive side. In the penetration groove 141, the driving gear 53 is disposed along the Y axis direction. The tooth tips of the driving gear 53 enter the inner side of the cylindrical portion 125 and mesh with the ring gear 112 of the driving frame 51 disposed inside the stationary frame 52.

In addition, on the edge portion of the cylindrical portion 125 on the Y axis direction positive side, a circular flange portion 142 extending inward in the radiation direction of the first optical axis A1 is formed. The radius of the inner surface of the flange portion 142 is formed to be substantially the same size as the radius of the outer surface 115 of the cylindrical portion 110 of the driving frame 51. As a result, unwanted light is prevented from entering the interior of the lens barrel 31 through the gap in the radiation direction of the first optical axis A1 between the driving frame 51 and the stationary frame 52.

On the edge portion of the cylindrical portion 125 on the Y axis direction negative side, a flange 145 extending outward in the radiation direction of the first optical axis A1 is formed on a portion in the circumferential direction. Fixing portions 145a and 145b are formed on the flange 145. The fixing portion 145a is positioned on a fixing portion 164c of the second group frame unit 42 which will be described later, and is fixed to the fixing portion 164c by screws or the like. The fixing portion 145b is positioned on an arm portion formed integrally with the motor unit 32, and is fixed thereto by screws or the like.

Extension portions 126a, 126b are arc-shaped members extending toward the Y axis direction negative side and formed with a predetermined circumferential width on two circumferential positions at the edge portion of the cylindrical portion 125 on the Y axis direction negative side. More specifically, the extension portions 126a and 126b each has an end portion on the X axis direction positive side at twelve o'clock position and six o'clock position when viewed from the Y axis direction positive side, and are formed with a predetermined circumferential width. Here, the predetermined width is a width which is sufficient to form each of the conducting grooves 131a and 131b and straight-movement grooves 129a and 129b of the cam grooves 128a and 128b which will be described later, on the inner surface 127 of the extension portions 126a and 126b.

On the end portion of the extension portion 126a on the Y axis direction negative side, a fixing portion 145c extending outward in the radiation direction of the first optical axis A1 is formed. The fixing portion 145c is positioned on the fixation portions 168b of the second group frame 42 which will be described later, and fixed by a screw or the like. A fixing portion 145d extending outward in the radiation direction of the first optical axis A1 is formed between the extension portion 126a and extension portion 126b in the circumferential direction to be adjacent to the extension portion 126a. The fixing portion 145d is positioned with respect to the front side of the motor unit 32 and fixed thereto by a screw or the like. Furthermore, a fixing portion 145e extending outward in the radiation direction of the first optical axis A1 is formed to be adjacent to the extension portion 126b in the circumferential direction. The fixing portion 145e is positioned with respect to a fixing portion 165d of the second group frame unit 42 which will be described later, and fixed by a screw or the like.

The circular inner surface 127 of the cylindrical portion 125 and the extension portions 126a and 126b has a radius larger than the radius of the imaginary circle which connects the ends of the ring gear 112 of the driving frame 51, and has a radius smaller than the radius of the imaginary circle which connects the ends of the cam pins 111a to 111c of the driving frame 51. For this reason, it becomes possible to arrange the driving frame 51 inside the driving frame 51, by engaging the cam pins 111a to 111c with the cam grooves 128a to 128c which are formed on the inner surface 127.

The cam grooves 128a to 128c are formed in the inner surface 127 to be spaced at a predetermined angle (for example, 120 degrees) away in the circumferential direction. The cam grooves 128a to 128c have conducting ends opening at three positions (for example, one o'clock, five o'clock and nine o'clock positions) on the end portion of the inner surface 127 on the Y axis direction negative side, for conducting the cam pins 111a to 111c to the cam grooves 128a to 128c. In addition, the cam grooves 128a to 128c have conducting grooves 131a to 131c extending to the Y axis direction positive side from the conducting ends respectively, and has sloped groove 132a to 132c continuing toward the conducting grooves 131a to 131c and extending toward counterclockwise the Y axis direction positive side when viewed from the Y axis direction positive side. In addition, the conducting grooves 131a and 131b of the cam grooves 128a and 128b with the conducting ends formed on the end of the extension portions 126a and 126b on the Y axis direction negative side have the length in the Y axis direction longer by the length of the extension portions 126a and 126b in the Y axis direction compared to the other conducting groove 131c.

The straight-movement grooves 129a and 129b engage with the end portions 107a and 107b of the first group frame 50, guide the first group frame 50 to move in the first optical axis A1 direction, and prevent the first group frame 50 from relatively rotating with respect to the stationary frame 52.

4.2.2: Operation of the First Group Frame Unit

The operation of the first group frame unit 41 having the above described configuration will be described.

First, when the optical system 35 is located at the wide angle end (refer to FIG. 5 or FIG. 6), the first group frame 50 is disposed inside the driving frame 51, in a state where the cam pins 104a to 104c engage with the end portion of the conducting grooves 119a to 119c of the driving frame 51 on the Y axis direction positive side. Furthermore, the driving frame 51 is disposed inside the stationary frame 52, in a state where the cam pins 111a to 111c engage with the end portion of the conducting grooves 131a to 131c of the stationary frame 52 on the Y axis direction positive side. In proximity to the end portion of the straight-movement grooves 129a and 129b of the stationary frame 52 on the Y axis direction negative side, end portions 107a and 107b of the first group frame 50 are engaged.

At this time, the Y axis direction position of each of the end portions of the cylindrical portion 102 of the first group frame 50, the cylindrical portion 110 of the driving frame 51, and the cylindrical portion 125 of the stationary frame 52 on the Y axis direction positive side substantially coincides with each other, and the arrangement of each configuration of the first group frame unit 41 is the same as the arrangement (retracting state) of the first group frame unit 41 when not using the image pickup device 2.

Next, when the driving gear 53 is driven to rotate in the clockwise direction when viewed from the Y axis direction positive side by the motor unit 32 (refer to FIG. 9), the driving in the counterclockwise direction when viewed from the Y axis direction positive side is transmitted to the driving frame 51 via the ring gear 112 meshing with the driving gear 53. A cylinder cam mechanism is formed between the driving frame 51 and the stationary frame 52. For this reason, when the driving frame 51 is driven to rotate, the driving frame 51 rotates around the first optical axis A1 with respect to the stationary frame 52, and moves in the direction along the first optical axis A1 (the Y axis direction positive side). In addition, a cylinder cam mechanism is formed between the driving frame 51 and the first group frame 50. Furthermore, the relative rotation of the first group frame 50 around the first optical axis A1 with respect to the stationary frame 52 is restricted by the engagement between the first group frame 50 and the stationary frame 52. As a result, when the driving frame 51 is driven to rotate, the first group frame 50 relatively moves in the first optical axis A1 direction (the Y axis direction positive side) with respect to the driving frame 51.

Finally, when the optical system 35 is located at the telephoto end, most part of the cylindrical portion 102 of the first group frame 50 extends to the Y axis direction positive side compared to the cylindrical portion 110 of the driving frame 51, under the state where the cam pins 104a to 104c engage with the end portions of the sloped grooves 120a to 120c of the driving frame 51 on the Y axis direction positive side. Furthermore, most part of the cylindrical portion 110 of the driving frame 51 extends to the Y axis direction positive side compared to the cylindrical portion 125 of the stationary frame 52, under the state where the cam pins 111a to 111c engages with the end portion of the sloped grooves 132a to 132c of the stationary frame 52 on the Y axis direction positive side. In other words, compared to the case which the optical system 35 is located at the wide angle end, when the optical system 35 is located at the telephoto end, the first lens group G1 moves to the Y axis direction positive side by the sum of the moving distance of the cylinder cam mechanism provided between the first group frame 50 and the driving frame 51 and the moving distance of the cylinder cam mechanism provided between the driving frame 51 and the stationary frame 52. Furthermore, in this state, the end portions 107a and 107b of the first group frame 50 are located in proximity to the end portion of the straight-movement grooves 129a and 129b on the Y axis direction positive side. In other words, the first lens group G1 moves in the first optical axis A1 direction substantially by the length of the straight-movement grooves 129a and 129b in the Y axis direction, compared to the case which the optical system 35 is located at the wide angle end.

In addition, while the above described first group frame unit 41 moves from the wide angle end to the telephoto end, a space is secured on the Y axis direction negative side of the cylindrical portion 125 of the stationary frame 52 and on the X axis direction positive side of the extension portions 126a and 126b, because each member of the first group frame unit 41 does not enter. For this reason, the third group frame unit 44 which will be described later can enter this space.

4.3: Base Unit
4.3.1: Configuration of the Base Unit

The configuration of the base unit 43 will be described with reference to FIG. 11.

Figure 11:
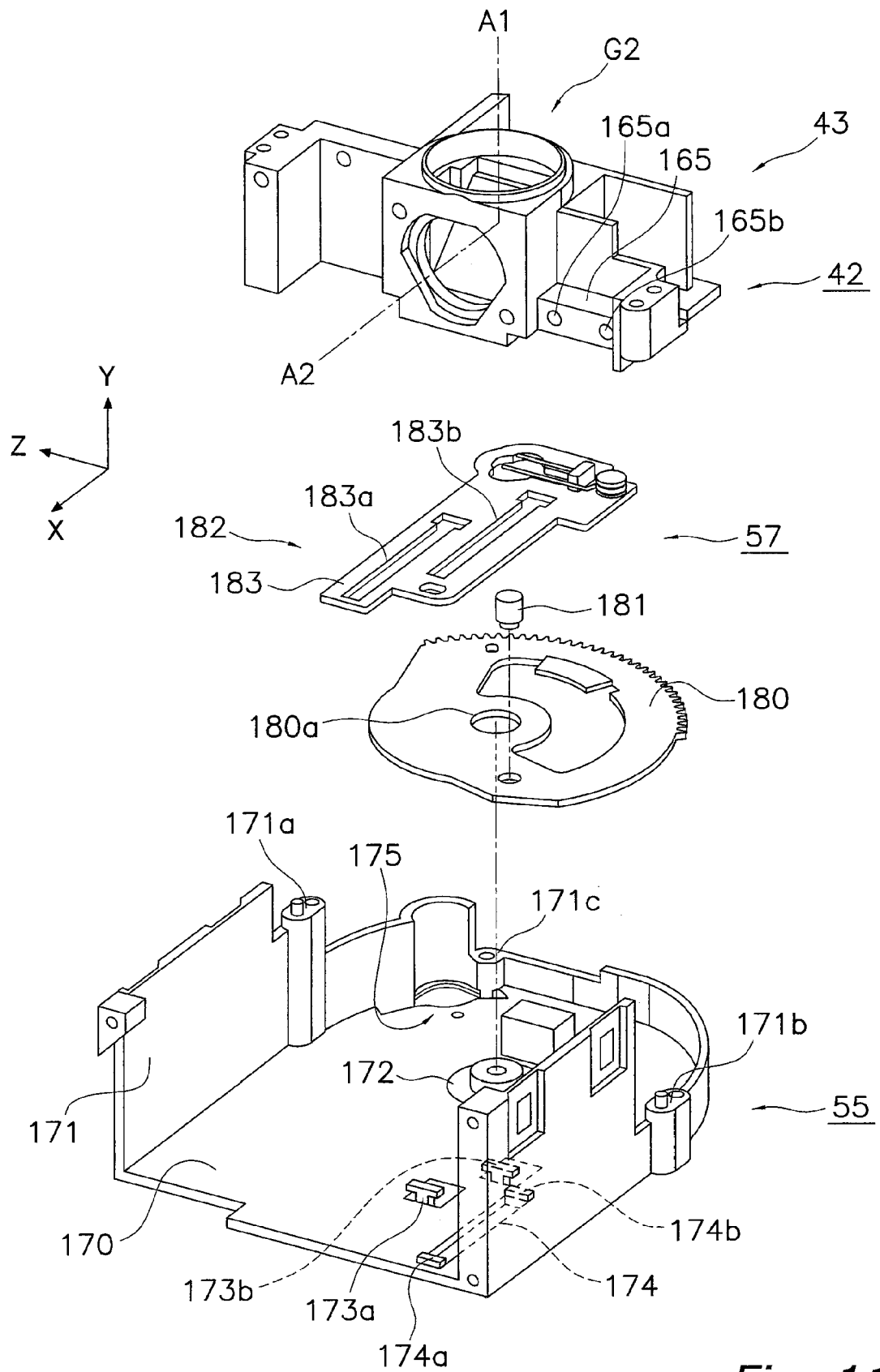
FIG. 11 is an exploded perspective view of the base unit.

FIG. 11 is an exploded perspective view of the base unit 43. The base unit 43 retains the second lens group G2 bending the light flux incident along the first optical axis A1 to the direction along the second optical axis perpendicular to the first optical axis A1. In addition, the base unit 43 includes a mechanism for moving the third lens group G3 (refer to FIGS. 5 to 8) making up the zoom lens system together with the first lens group G1 in the second optical axis A2 direction.

FIG. 11 shows the second group frame unit 42, the base 55 fixedly supporting the second group frame unit 42 from the Y axis direction negative side, and the third group movement mechanism 57 attached to the base 55 and disposed between the second group frame unit 42 and the base 55 in the Y axis direction, among the configurations of the base unit 43 described with reference to FIG. 9.

Detailed configurations of the second group frame unit 42, the base 55, and the third group movement mechanism 57 will be described below.

4.3.2: Configuration of the Second Group Frame Unit

The configuration of the second group frame unit 42 will be described referring to FIGS. 11 to 15.

Figure 12:
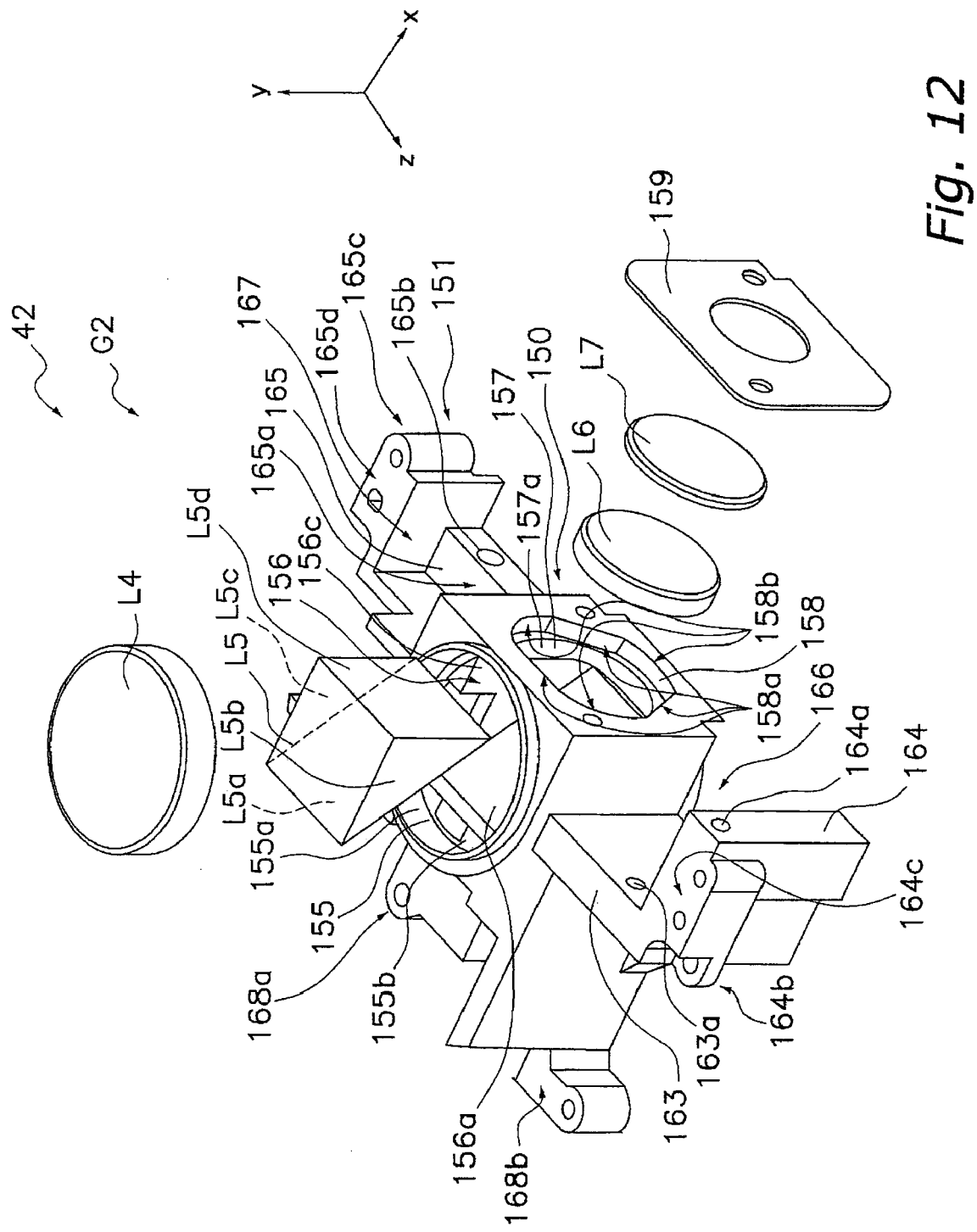
FIG. 12 is an exploded perspective view of the second group frame unit.
Figure 13:
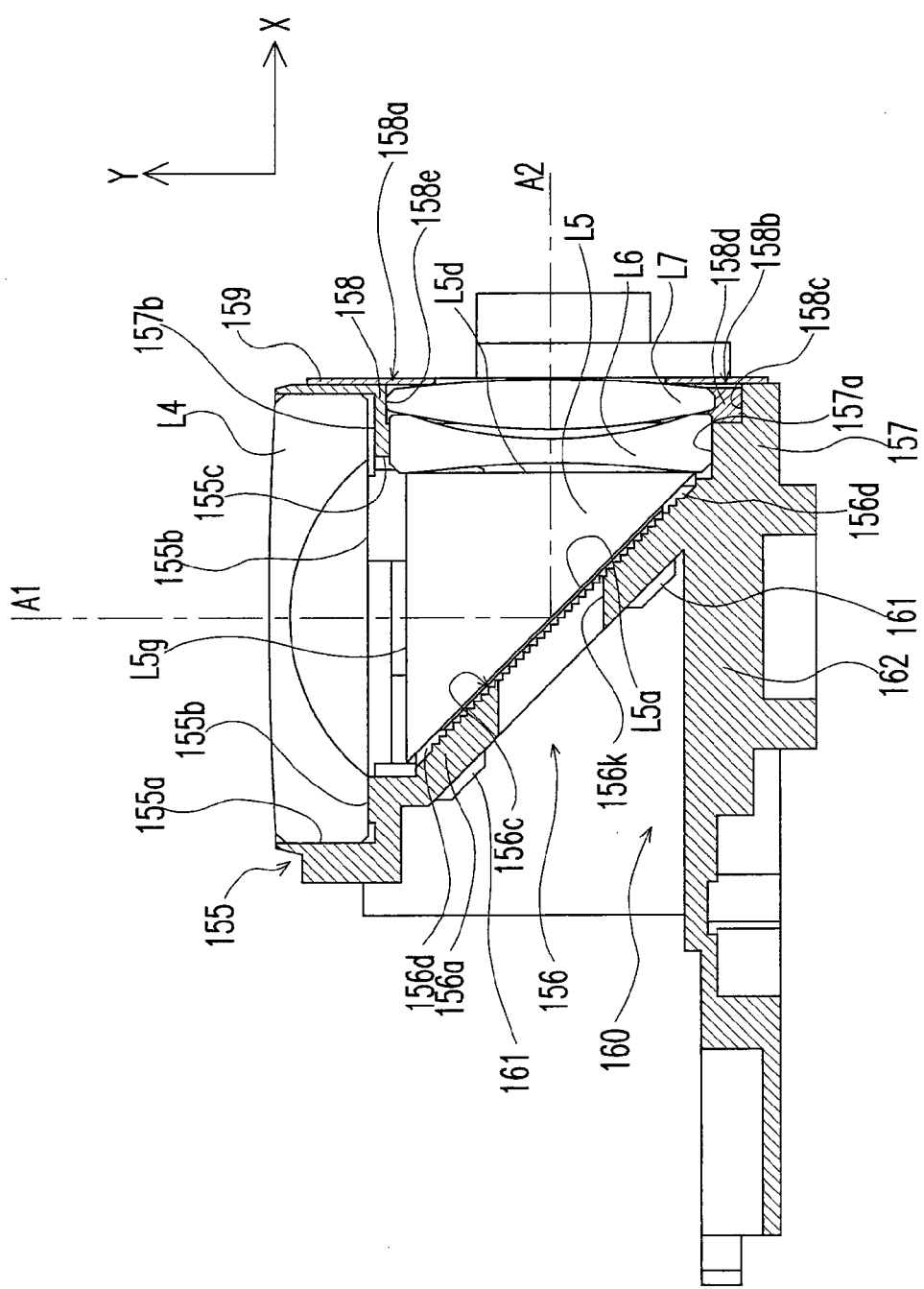
FIG. 13 is a section view of the second group frame unit.
Figure 14:
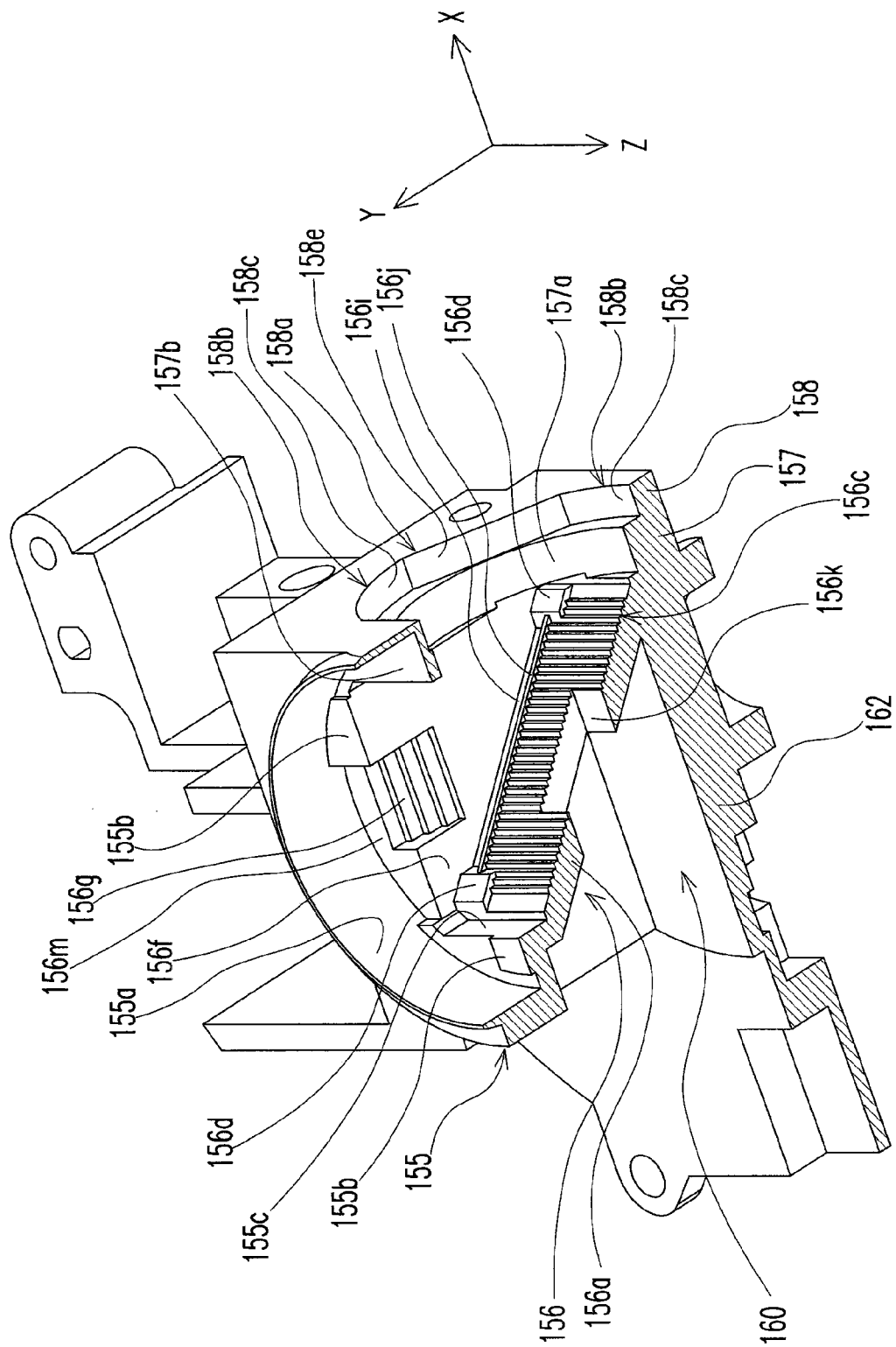
FIG. 14 is a perspective view of a second group frame when cut by a flat surface that includes a first optical axis A1 and a second optical axis A2.
Figure 15:
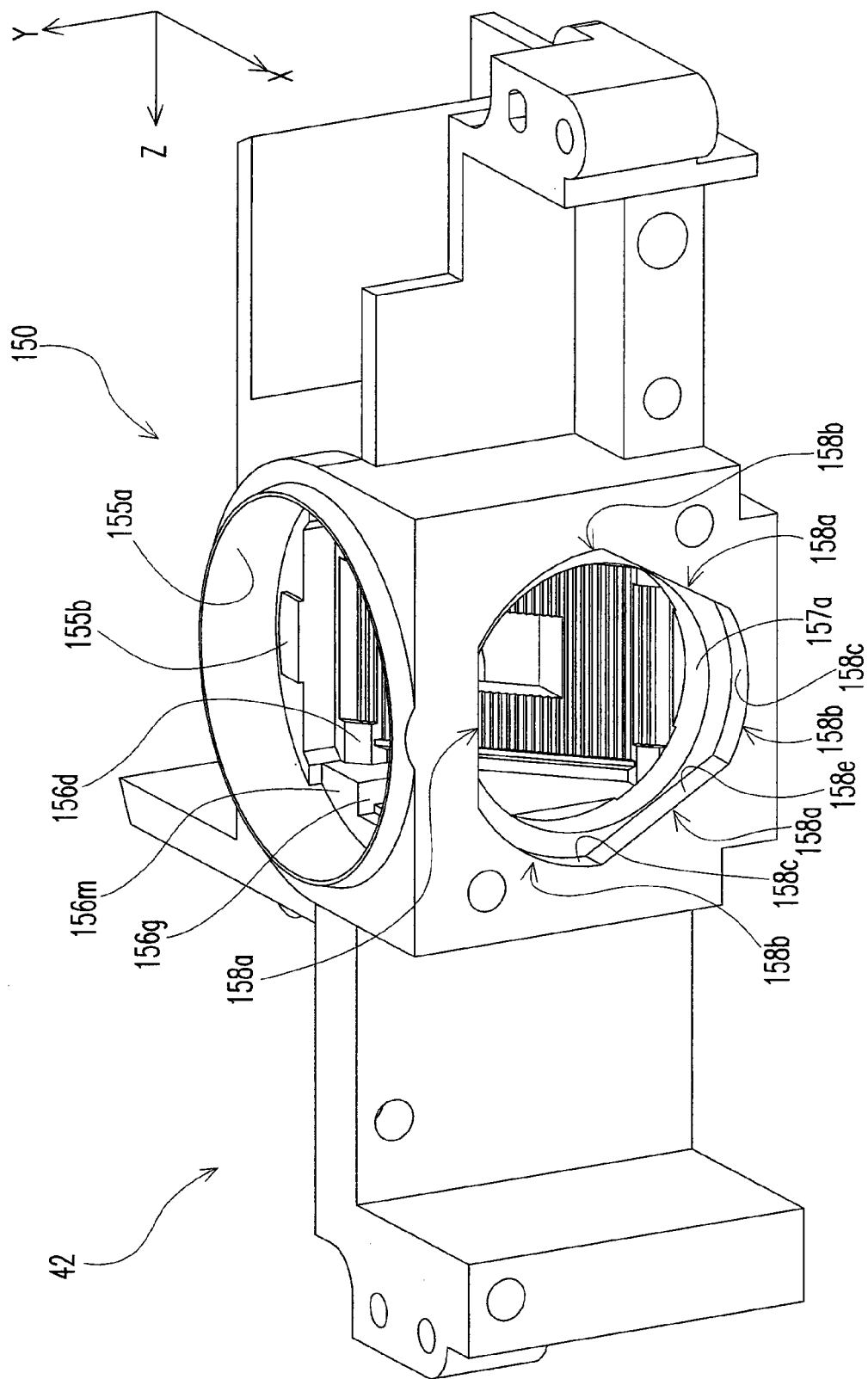
FIG. 15 is a perspective view of the second group frame.

FIG. 12 is an exploded perspective view of the second group frame unit 42. FIG. 13 is a section view of the second group frame unit 42 in a plane including the first optical axis A1 and the second optical axis A2. FIG. 14 is a perspective view of the second group frame 150 when cut in a plane including the first optical axis A1 and the second optical axis A2. FIG. 15 is a perspective view of the second group frame 150.

As shown in FIG. 12, the second group frame unit 42 includes a second lens group G2, a second group frame 150 that retains the second lens group G2, and a support portion 151 that supports the second group frame 150 and is mounted to the base 55.

Since details on the second lens group G2 was described using FIGS. 5 to 8, it will be omitted here.

The second group frame 150 mainly includes a fourth lens retaining frame 155 that retains the fourth lens L4, a prism retaining frame 156 (retaining portion) that retains the prism L5, a sixth lens retaining frame 157 that retains the sixth lens L6, and a seventh lens retaining frame 158 that retains the seventh lens L7.

The fourth lens retaining frame 155 is a tubular portion that extends in the Y axis direction, and includes an inner circumference surface 155a on the inner circumference side thereof. The fourth lens retaining frame 155 has an inner diameter that substantially matches the outer diameter of the fourth lens L4, and the fourth lens L4 fits in the inner circumference side thereof. The fourth lens L4 is fixed to the fourth lens retaining frame 155 by, for example, thermal caulking and the like. In addition, on the inner circumference side of the tip portion on the Y axis direction negative side of the inner circumference surface 155a, a supporting surface 155b (in particular refer to FIGS. 13, 14, and 15) orthogonal to the Y axis and supporting the fourth lens L4 towards the Y axis direction positive side is formed. The fourth lens L4 is arranged so that the surface on the Y axis direction negative side is in contact with this supporting surface 155b, and is positioned in the Y axis direction (first optical axis A1 direction). Details on the supporting surface 155b will be described later.

The prism retaining frame 156 stores the prism L5 in the interior thereof, is a frame body that opens in the first optical axis A1 direction and the second optical axis A2 direction, and formed integrally on the Y axis direction negative side of the fourth lens retaining frame 155. The prism retaining frame 156 includes an opening portion 155c that opens in the second optical axis A2 direction. In addition, in the prism retaining frame 156, a sloped portion 156a (refer to FIGS. 13 and 14) that is inclined downward at 45 degrees toward the X axis direction positive side and arranged opposite to the reflecting surface L5a (refer to FIG. 13) of the prism L5, and a pair of sidewall portions 156f (refer to FIG. 14) that stretch to be orthogonal to the Z axis from two ends in the Z axis direction of the sloped portion 156a and arranged opposite to the upper surface L5b and bottom surface L5c of the prism L5 respectively are formed. In the prism retaining frame 156, in the space that is formed by the sloped portion 156a and the pair of sidewall portions 156f, the prism L5 is stored and fixed by adhesive. Details on the fixation method of the prism L5 will be described later.

The sixth lens retaining frame 157 integral with the prism retaining frame 156 (refer to FIGS. 13 and 14) is formed on the X axis direction positive side of the prism retaining frame 156. The sixth lens retaining frame 157 has an inner diameter that substantially matches the outer diameter of the sixth lens L6, and includes a circular inner circumference surface 157a that extends in the X axis direction. The sixth lens L6 fits in the sixth lens retaining frame 157. In addition, on the X axis direction negative side of the inner circumference surface 157a, the output surface L5d of the prism L5 is disposed (refer to FIG. 13). The sixth lens L6 is arranged so as to be in contact with the output surface L5d on the surface on the X axis direction negative side, and be positioned in the X axis direction (second optical axis A2 direction). Details on the fixation method of the sixth lens will be described later.

The seventh lens retaining frame 158 integral with the sixth lens retaining frame 157 is formed on the X axis direction positive side of the sixth lens retaining frame 157. The seventh lens retaining frame 158 includes three supporting portions 158a as second supporting portions that support the seventh lens L7 in the radius direction, and three fixation portions 158b as second fixation portions that are arranged between the adjacent supporting portions 158a, and fix the seventh lens L7 by adhesive. The supporting portions 158a include supporting surfaces 158e that form a portion of each of the side surfaces of an imaginary equilateral triangular prism in which the seventh lens L7 is inscribed, and the supporting portions 158a is in contact with the seventh lens L7. The fixation portions 158b include a concave portion 158c as a second concave portion that is formed in the radial direction between the fixation portions 158b and the seventh lens L7, and an adhesive agent 158d that is filled and cured in the concave portion 158c.

In addition, on the X axis direction negative side of the seventh lens L7, the surface on the X axis direction positive side of the sixth lens L6 is disposed (refer to FIG. 13). The seventh lens L7 is arranged so that the surface on the X axis direction negative side thereof is in contact with the surface on the X axis direction positive side of the sixth lens L6, and positioned in the X axis direction (second optical axis A2 direction). Details on the fixation method of the seventh lens L7 will be described later.

On the end surface on the X axis direction positive side of the seventh lens retaining frame 158, an opening member 159, which is a plate member having an opening at the center portion, is fixed by a screw and the like. The opening member 159 is a member for blocking off unwanted lights passing in unwanted directions, out of the light exiting from the second group frame unit 42 along the second optical axis A2. The opening member 159 has a circular opening at substantially the center portion, and is mounted to the seventh lens retaining frame 158 so that the center of the opening thereof matches the second optical axis A2 (refer to FIG. 13).

The support portion 151 is formed toward the Z axis direction positive side from the center position in the X axis direction of the second group frame 150, and includes mainly a first member 163 having a surface facing the X axis direction positive side, a second member 164 extending toward the X axis direction positive side on the tip portion of the first member 163, a third member 165 having a surface facing the X axis direction positive side and formed on the Z axis direction negative side of the second group frame 150, and fixing portions 168a and 168b formed on the end portion on the X axis direction negative side.

The first member 163 includes an opening portion 163a on the surface facing the X axis direction positive side, for fitting and fixing the fourth group guide pole 73 (refer to FIG. 9).

The second member 164 includes a perforated portion 164a in a position of almost the same Y axis direction of the perforated portion 163a on the surface facing the X axis direction positive side, for fitting and fixing the third group guide pole 71 (refer to FIG. 9). In addition, on the end portion on the Z axis direction positive side on the second member 164, a fixing portion 164b is formed for fixing the second group frame unit 42 to the base 55, and a fixing portion 164c is formed for fixing the first group frame unit 41 to the second group frame unit 42. The fixing portion 164b is positioned with respect to the fixing portion 171a formed on the base 55, and is fixed by a screw and the like. The fixing portion 164c is positioned with respect to the fixing portion 145a formed on the fixed frame 52 of the first group frame unit 41, and is fixed by a screw and the like.

As described above, the first member 163 is formed toward the Z axis direction positive side from the center position in the X axis direction of the second group frame 150. The second member is formed toward the X axis direction positive side, on the tip portion of the first member 163. For this reason, between the surface on the Z axis direction positive side of the second group frame 150 and the surface on the Z axis direction negative side of the second member, a concaved space 166 is secured on the X axis direction negative side with respect to the end surface on the X axis direction positive side of the second group frame 150. A throttle actuator 202 that protrudes on the X axis direction negative side of a shutter unit 60 to be described later can enter this concaved space 166. This will be described later using FIGS. 34 to 36.

The third member 165 is formed toward the Z axis direction negative side from near the end portion on the Y axis direction negative side of the second group frame 150, and includes, in the order from the Z axis direction positive side on the surface facing the X axis direction positive side, a perforated portion 165a (refer to FIG. 11) for fitting and fixing the fourth group guide pole 72, and a perforated portion 165b for fitting and fixing the third group guide pole 70. In addition, on the third member 165, on the end portion on the Z axis direction negative side, a fixing portion 165c is formed for fixing the second group frame unit 42 to the base 55, and a fixing portion 165d is formed for fixing the first group frame unit 41 to the second group frame unit 42. The fixing portion 165c is positioned with respect to the fixing portion 171b formed on the base 55, and is fixed by a screw and the like. The fixing portion 165d is positioned with respect to the fixing portion 145e formed on the fixed frame 52 of the first group frame unit 41, and is fixed by a screw and the like.

As described above, the third member 165 is formed toward the Z axis direction negative side from near the end portion on the Y axis direction negative side of the second group frame 150. For this reason, on the Y axis direction positive side of the third member 165, a concaved space 167 that is adjacent to the second group frame 150 on the Z axis direction negative side is secured. A shutter actuator 203 that protrudes on the X axis direction negative side of a shutter unit 60 to be described later can enter this concaved space 167. This will be described later using FIGS. 34 to 36.

The fixing portion 168a is positioned with respect to a fixing portion arranged on the rear side of the motor unit 32, and is fixed.

The fixing portion 168b is positioned with respect to the fixing portion 171c formed on the base 55, is fixed by a screw and the like, and fixes the fixing portion 145c of the fixed frame 52.

Figure 16:
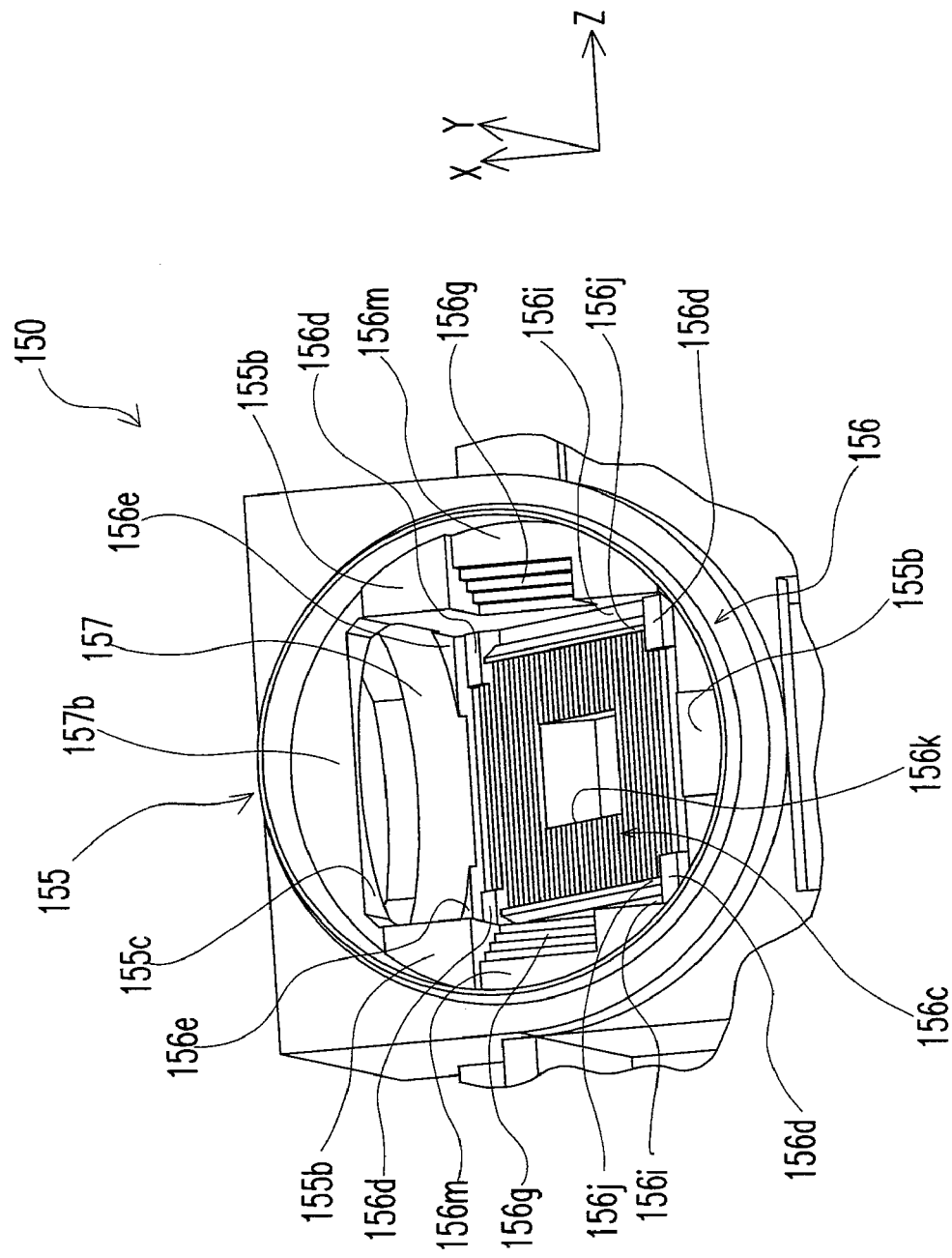
FIG. 16 is a perspective view of the second group frame.
Figures 17A, 17B:
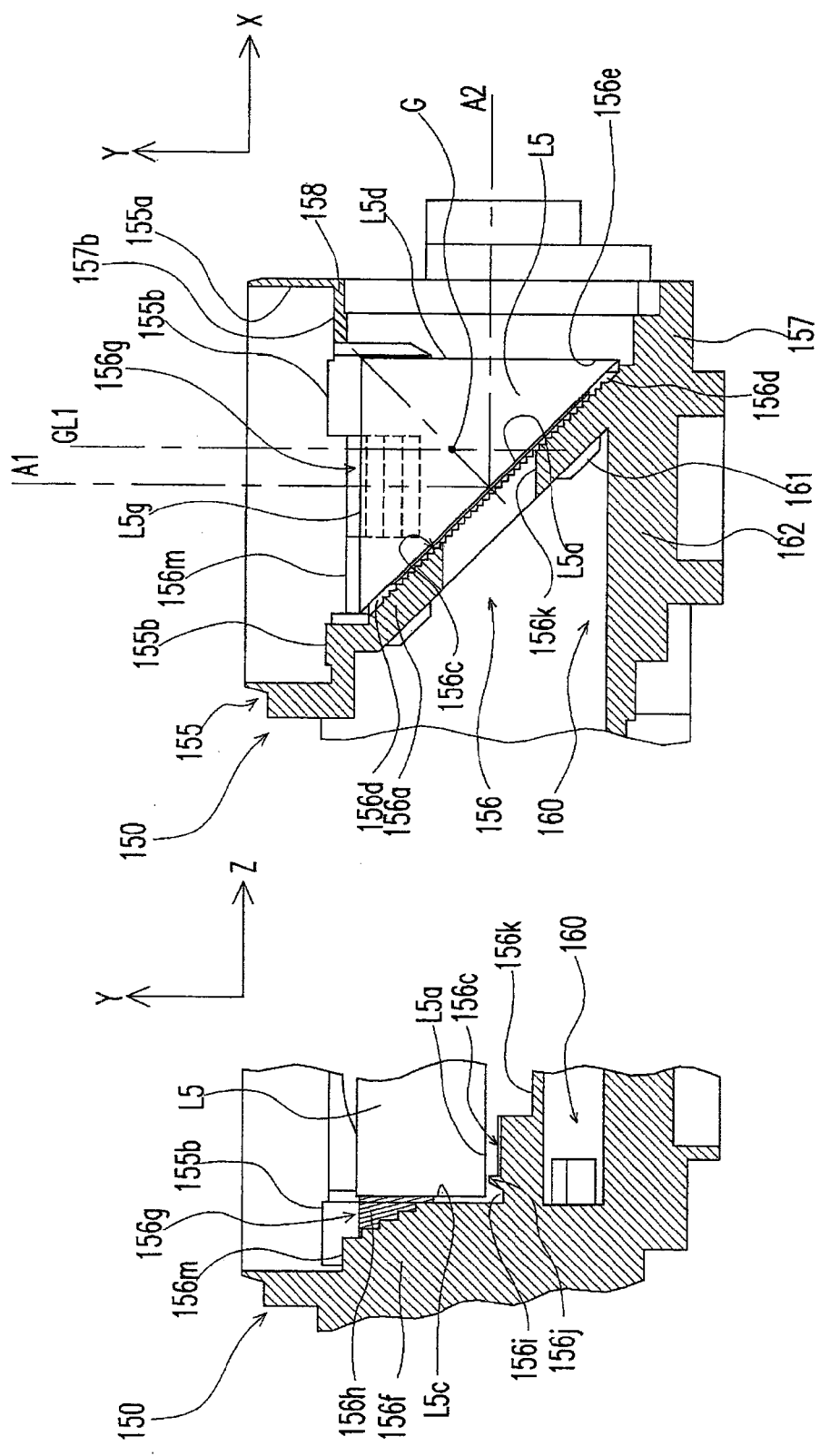
FIGS. 17A and 17B are section views of the second group frame unit.

Here, details on the fixation method of the prism L5, the sixth lens L6, the seventh lens L7, and the fourth lens L4 will be described using FIGS. 16 and 17. FIG. 16 is a perspective view of the second group frame 150 looking from the X axis direction positive side and the Y axis direction positive side. FIG. 17A is a section view of the second group frame unit 42 in a plane perpendicular to the second optical axis A2 and including the first optical axis A1. FIG. 17B is a section view of the second group frame unit 42 that is different in the Z axis direction position from the section view in FIG. 13.

4.3.2.1: Fixation Method of the Prism L5

Using FIGS. 16 and 17, the fixation method of the prism L5 will be described. The prism L5 is fixed to the prism retaining frame 156 by adhesive. More specifically, as shown in FIGS. 16 and 17, the prism retaining frame 156 includes four first contact portions 156d, two second contact portions 156e, and two adhesive pockets 156g as concave portions.

The first contact portions 156d are portions used for positioning the prism L5 in the direction perpendicular to the sloped portion 156a, and protrude to the side of the prism L5 from the sloped portion 156a (refer to FIG. 17B). The first contact portions 156d are arranged in positions corresponding to around four corners of the reflecting surface L5a of the prism L5, and are in contact with the reflecting surface L5a. In addition, in the present embodiment, the first contact portions 156d are arranged in four places. However, it is acceptable as long as they are arranged in three or more places.

The second contact portions 156e are portions for positioning the prism L5 in the X axis direction, and protrude to the X axis direction negative side from the sixth lens retaining frame 157 to be described later (refer to FIG. 17B). The second contact portions 156e are arranged around two corners on the Y axis direction negative side of the output surface L5d of the prism L5, and are in contact with the output surface L5d. It is possible to prevent the prism L5 from rotating in the direction horizontal to the reflecting surface L5a with respect to the second group frame 150, via the first contact portions 156d and the second contact portions 156e.

The adhesive pockets 156g are spaces in which the adhesive agents are filled, and are formed on the sidewall portion 156f. The adhesive pockets 156g are open on the Y axis direction positive side (opening portion 155c side), and are formed in a staircase pattern on the surfaces facing the upper surface L5b and bottom surface L5c of the prism L5. For this reason, the sectional area perpendicular to the Y axis of the adhesive pockets 156g is formed so that the sectional area becomes smaller in a stepwise fashion as being closer to the Y axis direction negative side. In other words, in the adhesive pockets 156g, the capacity of the end area disposed on the Y axis direction negative side (reflecting surface L5a side) is smaller than the capacity of the end area disposed on the Y axis direction positive side (the opposite side to the reflecting surface L5a). In the adhesive pockets 156g, adhesive agent 156h is filled, and the prism L5 is fixed to the prism retaining frame 156 by the adhesive agent 156h.

4.3.2.2: Positioning Method of the Fourth Lens L4

Using FIGS. 13 to 17, the fixation method of the fourth lens L4 will be described. As shown in FIG. 16, the fourth lens retaining frame 155 includes three supporting surfaces 155b. More specifically, the supporting surface 155b is arranged on the Y axis direction positive side of the sidewall portion 156f and on the X axis direction positive side of the adhesive pocket 156g, and arranged on the inner circumference side of the fourth lens retaining frame 155 and on the X axis direction negative side (refer to FIG. 16). On X axis direction positive side on the inner circumference side of the fourth lens retaining frame 155, a surface 157b formed on the outer circumference side of the sixth lens retaining frame 157 is arranged. The surface 157b is arranged on the Y axis direction negative side with respect to the supporting surface 155b, and is not in contact with the fourth lens L4 (refer to FIG. 13).

As it is clear in FIG. 16, the supporting surface 155b is not arranged on the outer circumference side of the sixth lens L6, and is arranged in a region other than the outer circumference side of the sixth lens L6. When the fourth lens L4 and the sixth lens L6 are mounted on the second group frame 150, it is configured that the supporting surface 155b is arranged in a position separated from the place between the fourth lens L4 and the sixth lens L6 in the Y axis direction.

In addition, the fourth lens retaining frame 155 further includes two non-contact surfaces 156m. More specifically, as shown in FIGS. 16 and 17A, the non-contact surfaces 156m are arranged in the vicinity of the adhesive pockets 156g, and arranged on the Y axis direction negative side with respect to the supporting surfaces 155b. For this reason, a gap is secured between the non-contact surface 156m and the fourth lens L4. In addition, the non-contact surfaces 156m only need to be arranged adjacent to area around the adhesive pockets 156g. In addition, the non-contact surfaces 156m are arranged on the Y axis direction negative side with respect to the entrance surface L5g of the prism L5. For this reason, a gap is secured between the non-contact surface 156m and the entrance surface L5g.

4.3.2.3: Fixation Method of the Sixth Lens L6 and the Seventh Lens L7

Figure 19:
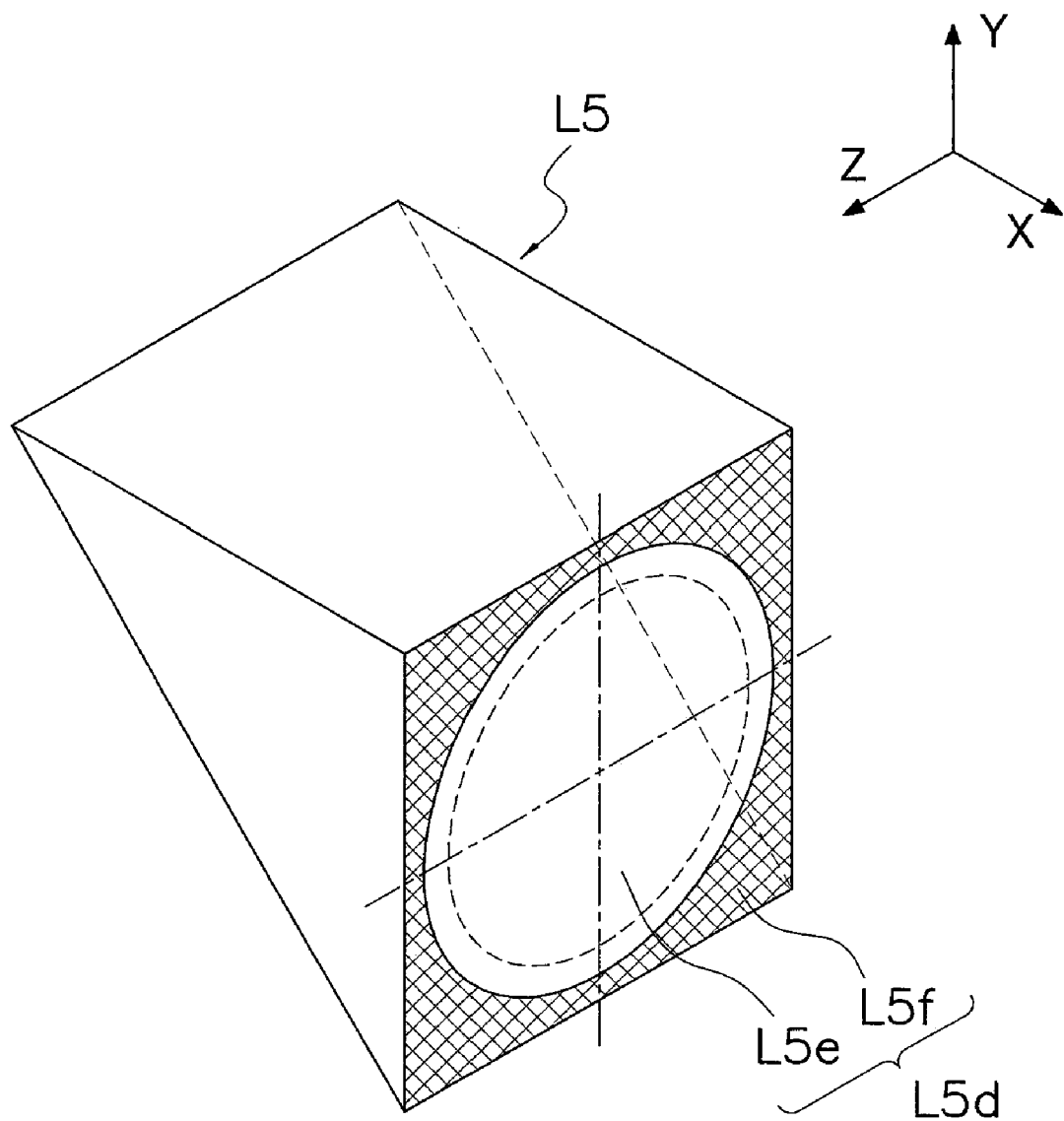
FIG. 19 is a perspective view of a prism.

Using FIGS. 13, 18A to 18C, and 19, the fixation method of the sixth lens L6 and the seventh lens L7 will be described. FIG. 18A is a section view of the prism L5, the sixth lens L6, and the seventh lens L7 in a plane including X axis and Y axis. FIG. 18B is a figure looking from the X axis direction. FIG. 18C is a section view at A-A in FIG. 18B. FIG. 19 is a perspective view of the prism L5.

As shown in FIGS. 13 and 18, the sixth lens L6 is in contact with the prism L5. More specifically, as shown in FIG. 18B, the surface on the X axis direction negative side of the sixth lens L6 is in contact with the areas near the four corners of the output surface L5d serving as the second flat surface portion and having a shape of a flat surface. In addition, as shown in FIGS. 18A and 18C, the surface on the X axis direction negative side of the seventh lens is in contact with the surface on the X axis direction positive side of the sixth lens L6.

In this way, by having the sixth lens L6 contact with the output surface L5d of the prism L5, the position of the sixth lens L6 with respect to the prism L5 is stabilized. In addition, by having the seventh lens L7 contact with the sixth lens L6, the position of the seventh lens L7 with respect to the sixth lens L6 is stabilized. Therefore, it is possible to obtain high optical performance of the lens barrel 31.

In addition, as shown in FIG. 19, the output surface L5d includes an optically effective area L5e as a third region, and a optically ineffective area L5f as a fourth region. The optically effective area L5e includes a region through which the light flux reflected by the reflecting surface L5a passes. For this reason, the optically effective area L5e can be said to be a region that directly affects the optical performance. On the other hand, the optically ineffective area L5f is arranged on the outer circumference side of the optically effective area L5e, and is a region through which the light flux reflected by the reflecting surface L5a does not pass. Therefore, the optically ineffective area L5f can be said to be a region that does not directly affect the optical performance. However, since there is the possibility that unwanted light reflects in the optically ineffective area L5f and indirectly affects the optical performance, a black color light shielding material, for example, Indian ink and the like, is applied on the optically ineffective area L5f (refer to FIG. 19). The sixth lens L6 is in contact with the optically ineffective area L5f (refer to FIGS. 18A to 18C). In addition, the second contact portions 156e described above (refer to FIGS. 16, 17A and 17B) are in contact with the optically ineffective area L5f.

In addition, as shown in FIGS. 18A to 18C, the sixth lens L6 includes an optically effective area L6e as a fifth region, and a optically ineffective area L6f as a sixth region, and the seventh lens L7 is in contact with the optically ineffective area L6f of the sixth lens L6. For this reason, same as described above, the contact portion does not affect the optical performance.

4.3.2.4: Positional Relationship Between the Adhesive Pockets 156g and the Prism L5

Using FIGS. 17A and 17B, the positional relationship between the adhesive pockets 156g and the prism L5 will be described. In FIG. 17B, the center of gravity G of the adhesive pocket 156g is shown. Here, suppose that an imaginary line GL1 passing through the center of gravity G and being perpendicular to the entrance surface L5g, and an imaginary surface (not shown in the figure) including the first optical axis A1 and the second optical axis A2. The drawing shown in FIG. 17B is a section view looking from the perpendicular direction (Z axis direction) with respect to the first optical axis A1 and the second optical axis A2. Therefore, the imaginary surface here may be arranged on the paper surface of the FIG. 17B, and with using the figure shown in FIG. 17B, it is possible to suppose the projection image to the imaginary surface.

When the imaginary line GL1 and the adhesive pocket 156g are projected on the imaginary surface, as shown in FIG. 17B, a portion of the projection image of the imaginary line GL1 on the imaginary surface is within the range of the projection image of the adhesive pocket 156g, and arranged near the center in the X axis direction of the projection image of the adhesive pocket 156g. In addition, it is preferable that the projection image of the imaginary line GL1 is arranged near the center of the projection image of the adhesive pocket 156g. However, it is acceptable as long as a portion thereof is arranged within the range of the projection image of the adhesive pocket 156g.

4.3.2.5: Groove Portions 156i and Wall Portions 156j

As shown in FIGS. 14 and 17, the prism retaining frame 156 further includes two groove portions 156i and two wall portions 156j. The groove portions 156i are arranged on the outer circumference side of the antireflection portion 156c, and are concaved to the opposite side of the reflecting surface L5a with respect to the antireflection portion 156c. The wall portions 156j are arranged between the groove portions 156i and the antireflection portion 156c, and protrude to the side of the prism L5 with respect to the antireflection portion 156c. The groove portions 156i and the wall portions 156j extend between the first contact portions 156d in the direction perpendicular to the Z axis. In addition, the first contact portions 156d described above protrude further to the side of the prism L5 with respect to the wall portions 156j. In other words, as shown in FIG. 17A, the wall portions 156j are not in contact with the reflecting surface L5a, and a gap is formed between the wall portions 156j and the reflecting surface L5a. The antireflection portion 156c, as shown in FIGS. 17B and 14, includes a plurality of concave-convex portions, and is formed in a staircase pattern in the present embodiment.

4.3.2.6: Inspection prism Insertion Portion 160

Figure 20:
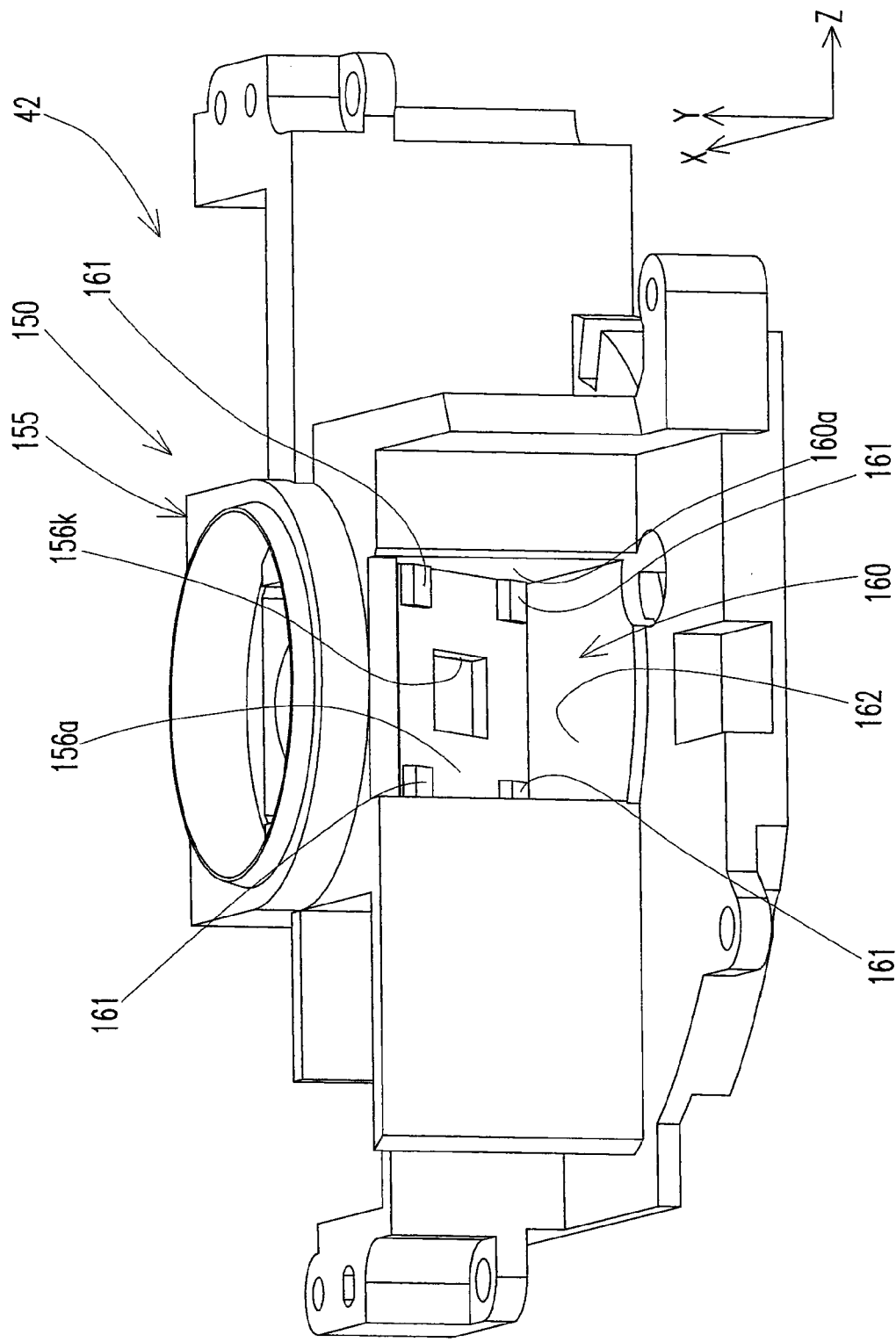
FIG. 20 is a perspective view of the second group frame.

In addition, the accuracy of mounting the prism L5 greatly affects the optical performance. For this reason, this lens barrel 31 is configured to be able to measure the accuracy of mounting the prism L5 easily. This will be described using FIGS. 13, 16, and 20. FIG. 20 is a perspective view looking from the X axis direction negative side of the second group frame 150.

As shown in FIGS. 13, 16, and 20, the prism retaining frame 156 includes an opening portion 156k, and an inspection prism insertion portion 160 as a second retaining portion. The perforated portion 156k is a quadrangle opening formed in a position corresponding to a position near the center of the reflecting surface L5a of the prism L5, and is penetrated on the opposite side to the reflecting surface L5a (refer to FIGS. 13 and 16). As will be described later, in the inspection step, the accuracy of the prism L5 is measured via the perforated portion 156k. In addition, in order to prevent unwanted light from entering and prevent dirt and the like from entering, the perforated portion 156k may be blocked by fixing such as a sheet or a resin member via an adhesive agent or the like after the inspection (blocked portion). In this case, the surface facing the sheet or the prism L5 made of the resin member is preferably formed uneven in order to prevent unwanted light from reflecting.

As shown in FIG. 20, the inspection prism insertion portion 160 is a space for inserting an inspection prism (to be described later), and is surrounded by the sloped portion 156a, a pair of sidewall portions 160a, and a bottom plate 162. The inspection prism insertion portion 160 is formed on the X axis direction negative side of the sloped portion 156a. On the surface on the X axis direction negative side of the sloped portion 156a, four third contact portions 161 are arranged. The third contact portions 161 protrude to the X axis direction negative side from the sloped portion 156a, and are arranged around the four corners of the sloped portion 156a. The third contact portions 161 and the first contact portions 156d are arranged on the front side and back side (opposite positions) with the sloped portion 156a sandwiched, and configured so that each of the contacting surface forms a parallel plane each other. The inspecting method using the inspection prism insertion portion 160 will be described later. In addition, in the present embodiment, the perforated portion 156k is preferably arranged in the position corresponding to a position near the center of the reflecting surface L5a. However, it may be positioned in a different position. In addition, in the present embodiment, the third contact portions 161 are arranged in four places. However, it is acceptable as long as they are arranged in three or more places.

4.3.3: Configuration of the Base

The configuration of the base 55 will be described with reference to FIG. 11.

The base 55 mainly includes a rear side 170 including the rear side of the lens barrel 31, and a side surface 171 extending to the Y axis direction positive side from the rear side 170.

On the rear side 170, a bearing portion 172 for rotatably supporting a center opening 180a of the ring gear 180 of the third group movement mechanism 57 (described later), guide pins 173a and 173b for guiding the translational movement of the rod unit 182 of the third group movement mechanism 57 (described later) to the X axis direction, a restricting portion 174 restricting the movement of the rod unit 182 to the X axis direction, and a driving shaft accommodating portion 175 accommodating the driving gear 53 are formed.

The bearing portion 172 is a cylindrical convex portion protruding to the Y axis direction positive side and is inserted into the center opening 180a provided in the rotation center of the ring gear 180, and supports the ring gear 180 to be rotatable.

The guide pins 173a and 173b are members protruding to the Y axis direction positive side and formed to have a predetermined space in both the X axis direction and the Z axis direction, and are respectively inserted into guide grooves 183a and 183b formed along the longitudinal direction of the rod unit 182, and guide the movement of the rod unit 182 to the X axis direction.

The restricting portion 174 is a longitudinal groove with a base and extends in the X axis direction. End portions 174a and 174b rising up to the Y axis direction positive side from the bottom of the groove of the restricting portion 174 are formed on the two ends thereof in the X axis direction.

The driving shaft accommodating portion 175 accommodates the end portion of the driving shaft of the driving gear 53 on the Y axis direction negative side of the first group frame unit 41.

Fixing portions 171a to 171c for fixing the second group frame unit 42 to the base 55 are formed on the side surface 171. The fixing portions 171a, 171b, and 171c are positioned with respect to the fixing portions 164b, 165c, and 168b of the second group frame unit 42 respectively, and are fixed by screws or the like.

4.3.4: Configuration of the Third Group Movement Mechanism The configuration of the third group movement mechanism 57 will be described with reference to FIG. 11. The third group movement mechanism 57 is a mechanism for moving the third group frame unit 44 to the direction along the second optical axis A2, and is driven by receiving the driving from the motor unit 32 (refer to FIG. 9).

The third group movement mechanism 57 is mainly made up of the ring gear 180 for converting the rotational drive transmitted from the motor unit 32 via the driving gear 53 into a drive in the direction along the second optical axis A2, the rod unit 182 in which the translational movement thereof in the direction along the second optical axis A2 is possible integrally with the third group frame unit 44, and a ring gear pin 181 functionally coupling the ring gear 180 and the rod unit 182.

The ring gear 180 is a plate member in which teeth are formed in an arc on the outer periphery thereof to mesh with the driving gear 53, and rotates within a predetermined rotational angle range. The ring gear 180 includes a center opening 180a in the rotational center thereof, and is attached to the base 55 by fitting the center opening 180a to the bearing portion 172 of the base 55.

The ring gear pin 181 is a cylindrical member having a predetermined length in the Y axis direction, and the end portion thereof on the Y axis direction negative side is fixed to the ring gear 180 by caulking or the like.

The rod unit 182 is functionally coupled to the ring gear 180 by engaging with the ring gear pin 181, and makes up the slider crank mechanism together with the ring gear 180.

Figure 21:
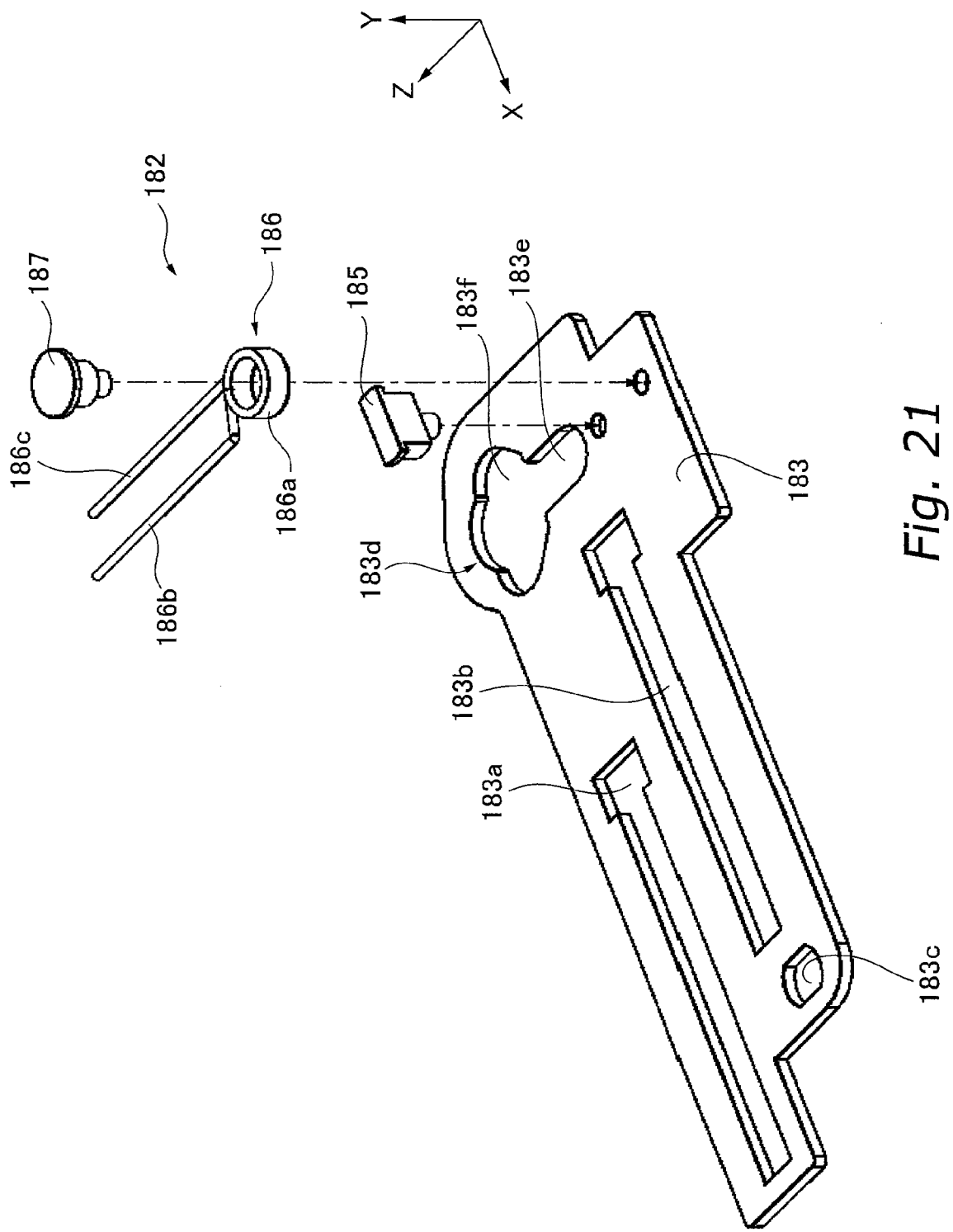
FIG. 21 is an exploded perspective view of the rod unit.

The configuration of the rod unit 182 will be described with reference to FIG. 21. FIG. 21 is an exploded perspective view of the rod unit 182.

As shown in FIG. 21, the rod unit 182 is mainly made up of a rod 183, a crimp spring 186 fixed to the rod 183, a spring pin 187 for fixing the crimp spring 186 to the rod 183, and a crimp spring restricting pin 185 restricting the crimp movement of the crimp spring 186. The elastic coupling mechanism is made up of the crimp spring 186, the spring pin 187, and the crimp spring restricting pin 185, to couple the ring gear 180 and the rod unit 182 elastically.

The rod 183 is a plate member which is long in the X axis direction. Two guide grooves 183a and 183b extending in the longitudinal direction, a through-hole 183c formed on the X axis direction positive side of the guide groove 183b, and an engagement opening 183d formed on the X axis direction negative side of the guide grooves 183a and 183b are formed in the rod 183.

As described with reference to FIG. 11, guide pins 173a and 173b formed on the base 55 are inserted in the guide grooves 183a and 183b, respectively. The guide grooves 183a and 183b are formed to be spaced at the same distance in the Z axis direction as the distance between the guide pins 173a and 173b in the Z axis direction. As a result, the movement of the rod 183 is restricted only to a translational movement in the X axis direction.

A protrusion portion 65 of the third group frame unit 44 which will be described later is inserted from the Y axis direction positive side into the through-hole 183c. The protrusion portion 65 is inserted so that the end thereof protrudes to the Y axis direction negative side of the rod 183.

The ring gear pin 181 is inserted from the Y axis direction negative side into the engagement opening 183d. The engagement opening 183d includes first engagement opening 183e extending in the Z axis direction and having a larger width in the X axis direction than the diameter of the ring gear pin 181, and a second engagement opening 183f having a larger width in the X axis direction than the first engagement opening 183e formed to be continuous with the first engagement opening 183e on the Z axis direction positive side thereof.

The crimp spring 186 is a torsion coil spring or the like made up of a coil 186a and two arm portions 186b and 186c which extend from the coil 186a. Each of the arm portions 186b and 186c is formed to be able to support the load in the direction that each of them extends when the crimp spring 186 is deformed elastically to involve the coil 186a.

The spring pin 187 is a member inserted into the coil 186a of the crimp spring 186 and fixed with one end thereof fitted to an opening formed on the rod 183, and fixes the crimp spring 186 to the rod 183. The spring pin 187 is disposed on the Z axis direction negative side of the first engagement opening 183e.

The crimp spring restricting pin 185 is a member for maintaining the crimp spring 186 in a predetermined elastically deformed state, is disposed between the arm portions 186b and 186c, and receives the crimping forces in directions toward the other arm portions 186c and 186b from each of the arm portions 186b and 186c respectively. The crimp spring restricting pin 185 is disposed on the Z axis direction negative side of the first engagement opening 183e. In addition, the X axis direction width of the contact surface with the crimp spring 186 on the crimp spring restricting pin 185 is wider than the X axis direction width of the first engagement opening 183e.

Figure 22:
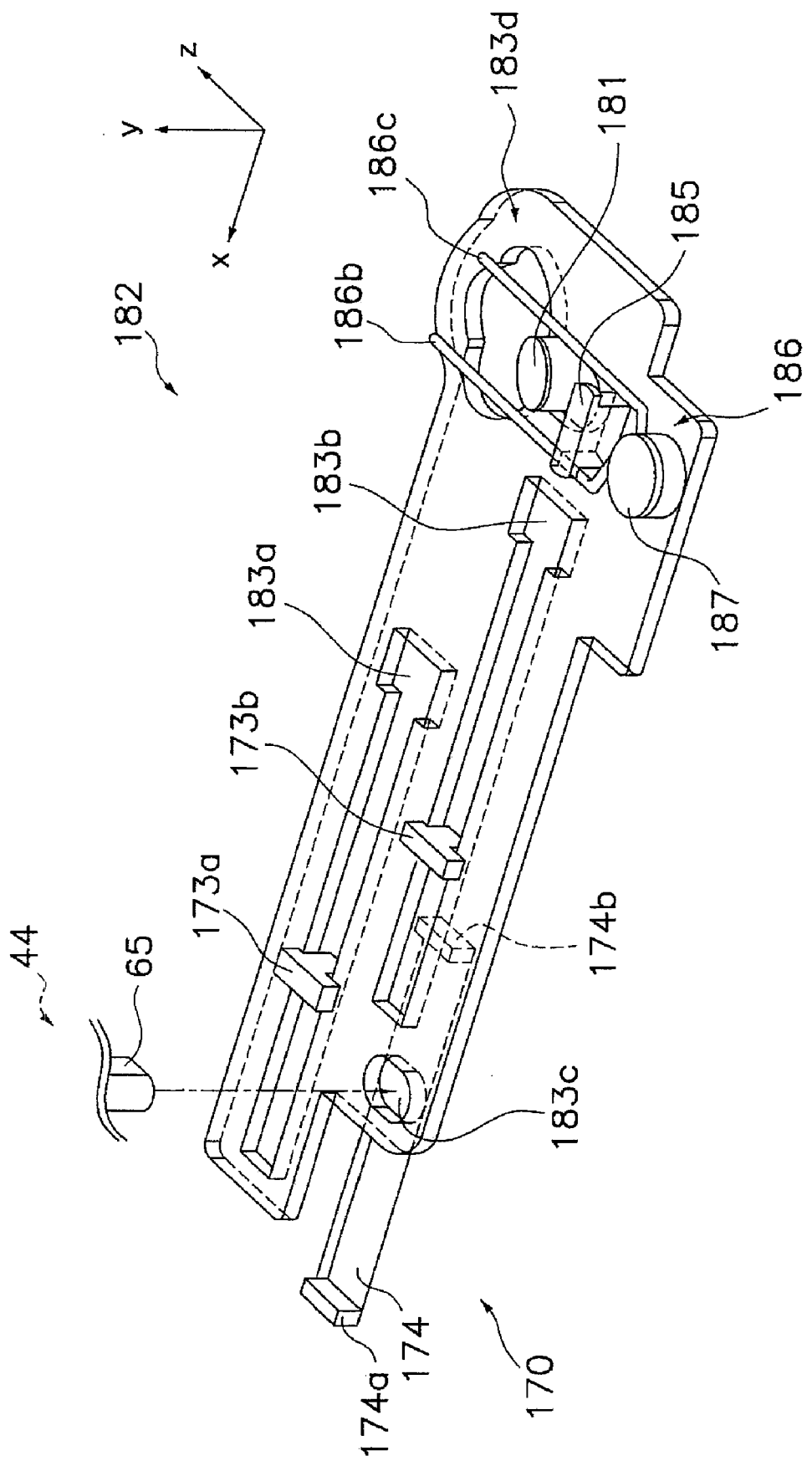
FIG. 22 is a perspective view of the assembly of the rod unit.

The assembling state of the third group movement mechanism 57 will be described with reference to FIG. 22. FIG. 22 is a perspective view showing mainly the assembling state of the rod unit 182.

As shown in FIG. 22, in the rod unit 182, the crimp spring 186 is fixed to the rod 183 by the spring pin 187. In an elastically deformed state, the crimp spring 186 is fixed via the crimp spring restricting pin 185 between each of the arm portions 186b and 186c. In this attached state, the arm portion 186b located on the X axis direction positive side contacts with the surface of the crimp spring restricting pin 185 on the X axis direction positive side, which a crimping force acts toward the X axis direction negative side with respect to the crimp spring restricting pin 185. On the other hand, the arm portion 186c located on the X axis direction negative side contacts with the surface of the crimp spring restricting pin 185 on the X axis direction negative side, and applies a crimping force toward the X axis direction positive side with respect to the crimp spring restricting pin 185.

The ring gear pin 181 fixed to the ring gear 180 (refer to FIG. 11) is inserted from the Y axis direction negative side into engagement opening 183d of the rod unit 182, in the middle in the X axis direction between the arm portions 186b and 186c of the crimp spring 186. As a result, if the ring gear 180 is driven to rotate and the X axis direction position of the ring gear pin 181 changes, the rod 183 is driven in the X axis direction while the opening edge of the engagement opening 183d slides to the outer periphery of the ring gear pin 181.

Each of the guide pins 173a and 173b formed on the base 55 (refer to FIG. 11) is inserted from the Y axis direction negative side into the guide grooves 183a and 183b which extend in the X axis direction of the rod 183. As a result, the rod 183 receiving the drive is in translational movement in the X axis direction.

The through-hole 183c of the rod 183 is located to be opposed to the Y axis direction positive side of the restricting portion 174 formed on the base 55. The protrusion portion 65 of the third group frame unit 44 which will be described later is inserted from the Y axis direction positive side into the through-hole 183c. The end of the protrusion portion 65 protrudes to the Y axis direction negative side of the rod 183, and furthermore, is inserted into the restricting portion 174.

Figure 23:
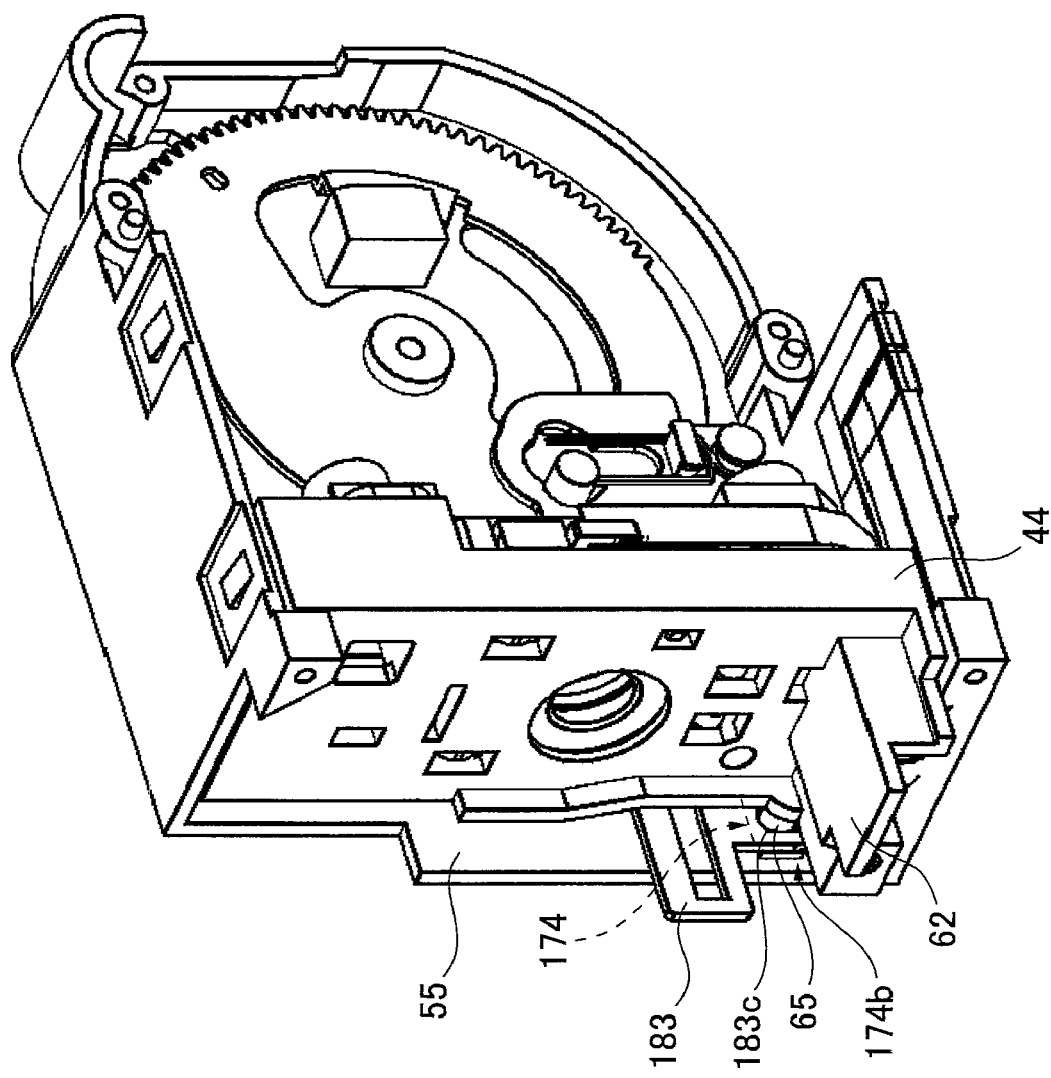
FIG. 23 is a perspective view showing the assembling state of a third group frame unit and a base unit.

FIG. 23 shows the engagement state of the protrusion portion 65 of the third group frame unit 44, the rod 183, and the restricting portion 174. As shown in the figure, the protrusion portion 65 protruding on the Y axis direction negative side formed on the third group frame 62 of the third group frame unit 44 is inserted into the through-hole 183c formed on the rod 183, and furthermore, the end thereof is inserted into the restricting portion 174 of the base 55.

As a result, the rod 183 is movable all the way to the position at which the protrusion portion 65 contacts with the end portion 174a on the X axis direction positive side, and is movable all the way to the position at which the protrusion portion 65 contacts with the end portion 174b on the X axis direction negative side (refer to FIG. 11 or FIG. 22).

4.3.5: Operation of the Base Unit

The operation of the base unit 43, in particular, the operation of the third group movement mechanism 57 will be described with reference to FIGS. 24 to 29.

Figure 24:
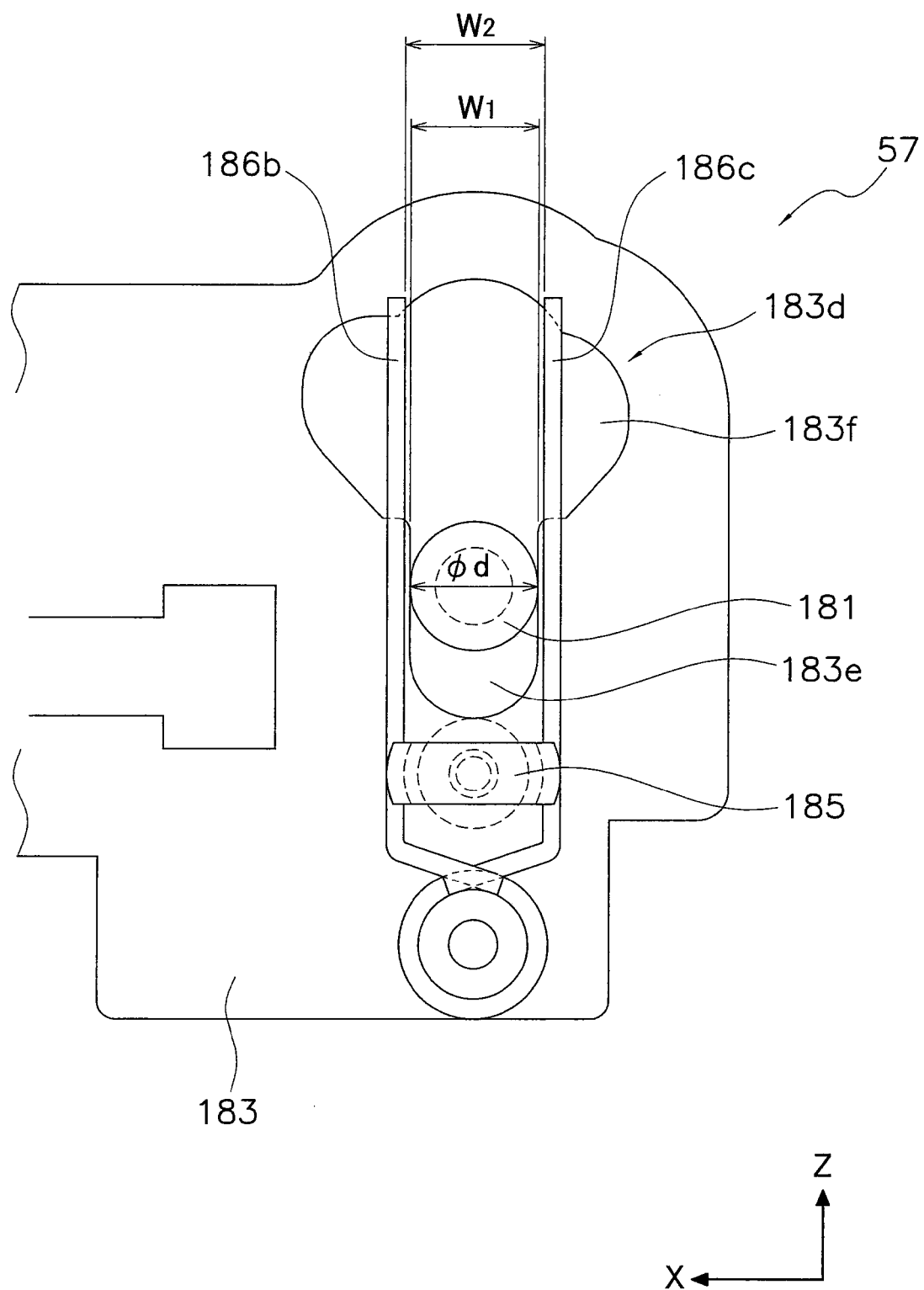
FIG. 24 is an illustration for describing the operation of a third group movement mechanism.

Out of the operations of the third group movement mechanism 57, the operation of the elastic coupling mechanism elastically coupling the ring gear 180 (refer to FIG. 11) and the rod 183 will be described with reference to FIG. 24. FIG. 24 shows the state where the ring gear pin 181 is inserted into the engagement opening 183d.

The X axis direction width W1 of the first engagement opening 183e of the engagement opening 183d is larger than the diameter d of the ring gear pin 181. Furthermore, the X axis direction width W2 of the contacting surfaces with the crimp spring 186 of the crimp spring restricting pin 185 is larger than the X axis direction width W1 of the first engagement opening 183e. Therefore, in the state where the ring gear pin 181 is inserted into the first engagement opening 183e, the arm portions 186b and 186c of the crimp spring 186 contact with the contacting surfaces on both ends in the X axis direction of the crimp spring restricting pin 185. Consequently, when the ring gear pin 181 is located in the first engagement opening 183e, the crimping force of the crimp spring 186 does not act on the ring gear pin 181.

On the other hand, when the ring gear pin 181 moves along the edge portion of the engagement opening 183d to the second engagement opening 183f having a width wider than the first engagement opening 183e in the X axis direction, the ring gear pin 181 contacts the edge portion of the second engagement opening 183f, and contacts the arm portion 186b or the arm portion 186c of the crimp spring 186. Consequently, when the ring gear pin 181 is located in the second engagement opening 183f, the crimping force of the crimp spring 186 acts on the ring gear pin 181.

More specifically, when the ring gear pin 181 is located on the X axis direction positive side of the second engagement opening 183f, the arm portion 186b on the X axis direction positive side is elastically deformed to the X axis direction positive side by the ring gear pin 181, and the arm portion 186b separates from the contacting surface of the crimp spring restricting pin 185 on the X axis direction positive side. For this reason, the crimping force of the crimp spring 186 acts on the contacting surface of the crimp spring restricting pin 185 on the X axis direction negative side from the arm portion 186c on the X axis direction negative side. As a result, the rod 183 receives a pressing force in the direction toward the X axis direction positive side, via the crimp spring restricting pin 185.

On the other hand, when the ring gear pin 181 is located on the X axis direction negative side of the second engagement opening 183f, the arm portion 186c on the X axis direction negative side is elastically deformed to the X axis direction negative side by the ring gear pin 181, and the arm portion 186c separates from the contacting surface of the crimp spring restricting pin 185 on the X axis direction negative side. For this reason, the crimping force of the crimp spring 186 acts on the contacting surface of the crimp spring restricting pin 185 on the X axis direction positive side from the arm portion 186b on the X axis direction positive side. As a result, the rod 183 receives a pressing force in the direction toward the X axis direction negative side, via the crimp spring restricting pin 185.

The operation of the ring gear 180 and the rod 183 coupled by the above described elastic coupling mechanism will be described with reference to FIGS. 25 to 29.

Figure 25:
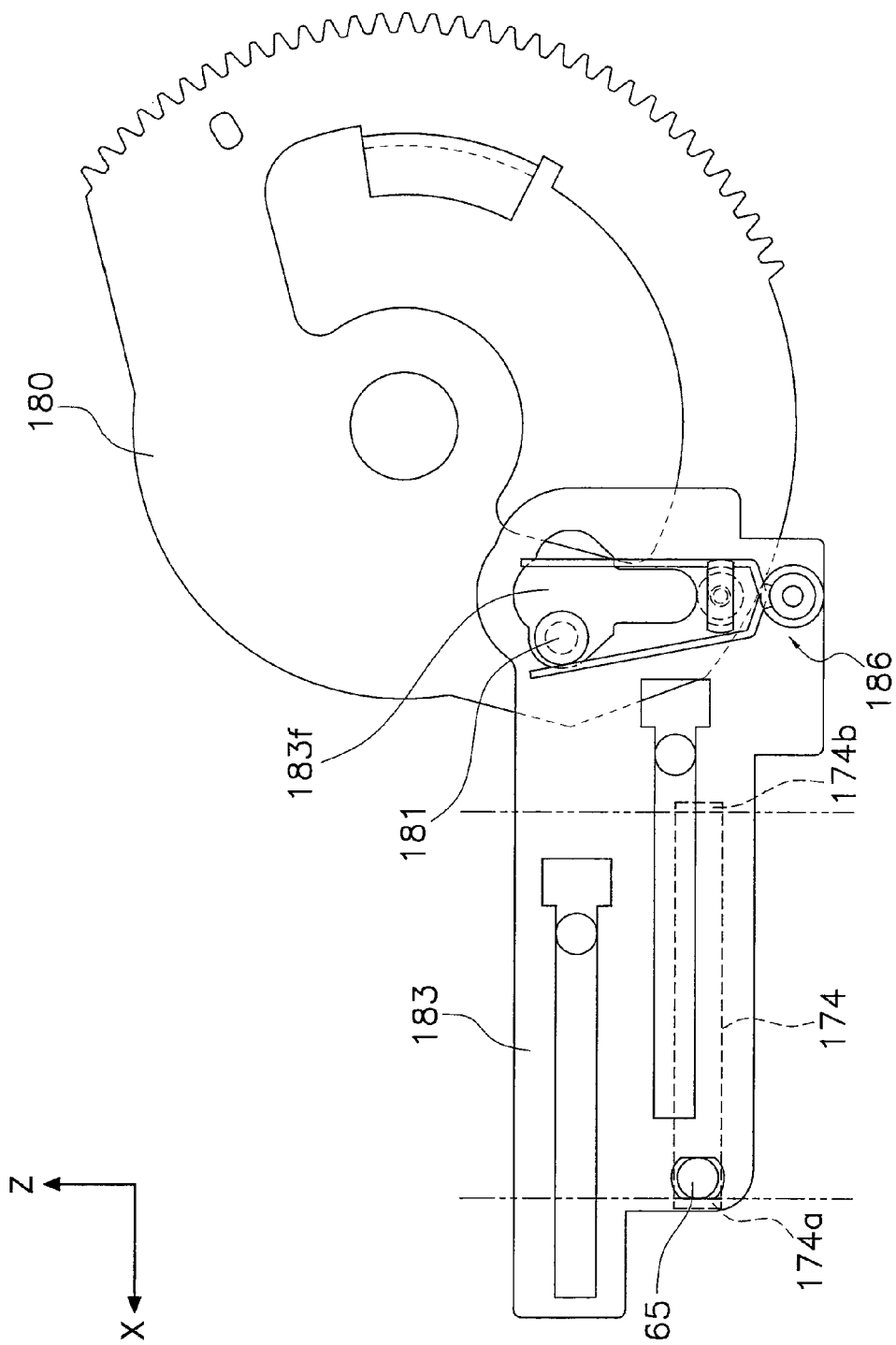
FIG. 25 is an illustration for describing the operation of the third group movement mechanism (wide angle end)
Figure 26:
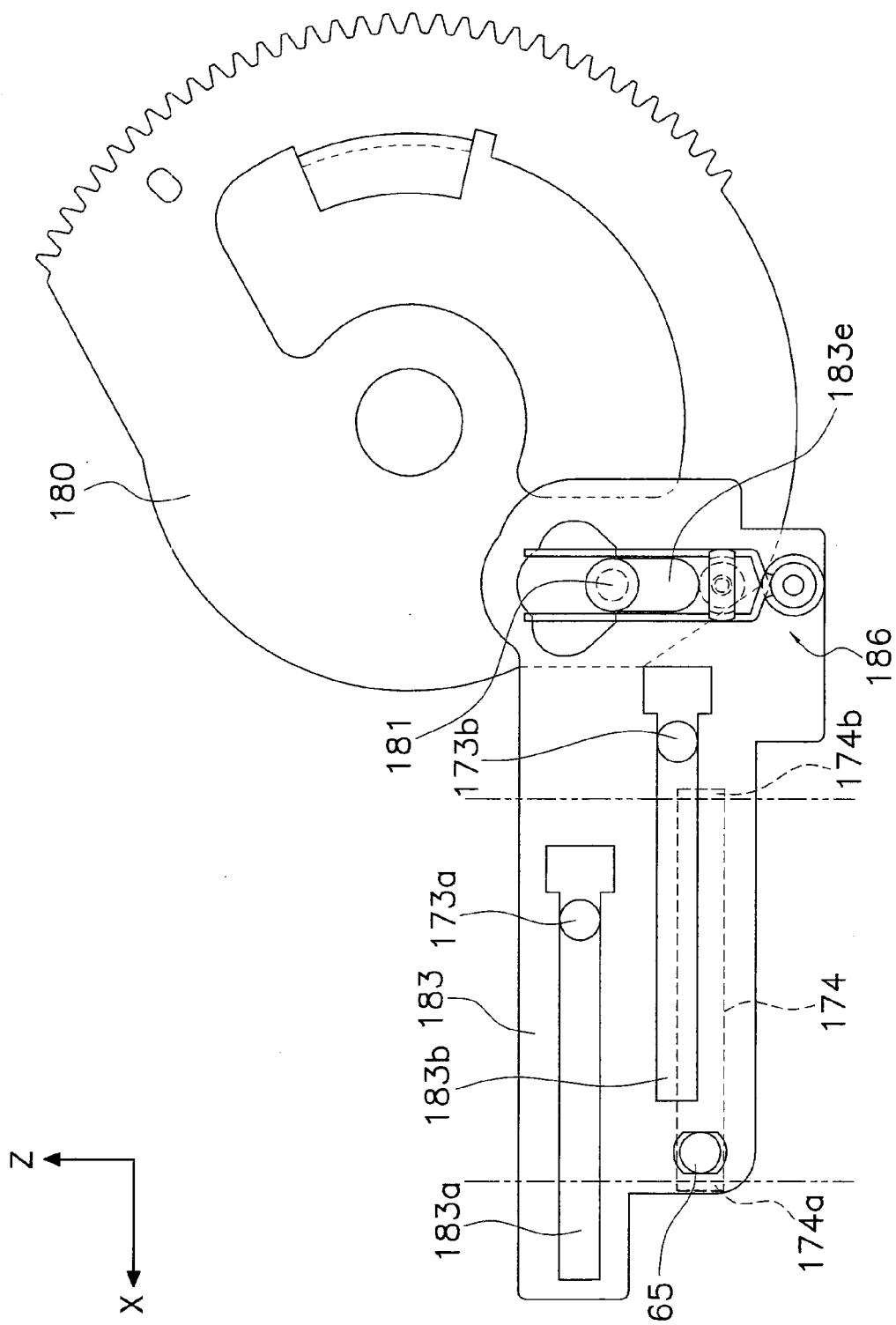
FIG. 26 is an illustration for describing the operation of the third group movement mechanism (wide angle side)
Figure 27:
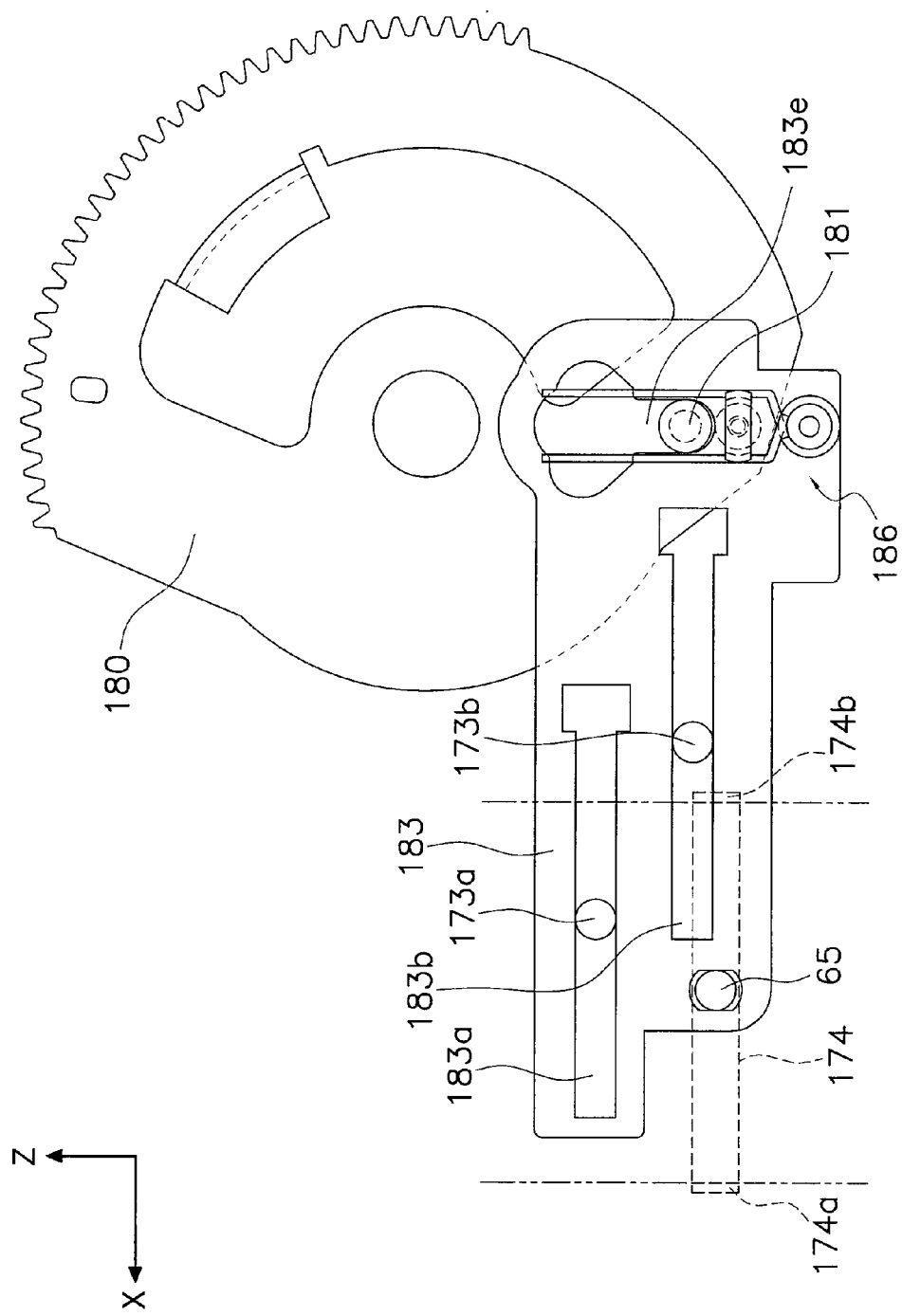
FIG. 27 is an illustration for describing the operation of the third group movement mechanism (normal position)
Figure 28:
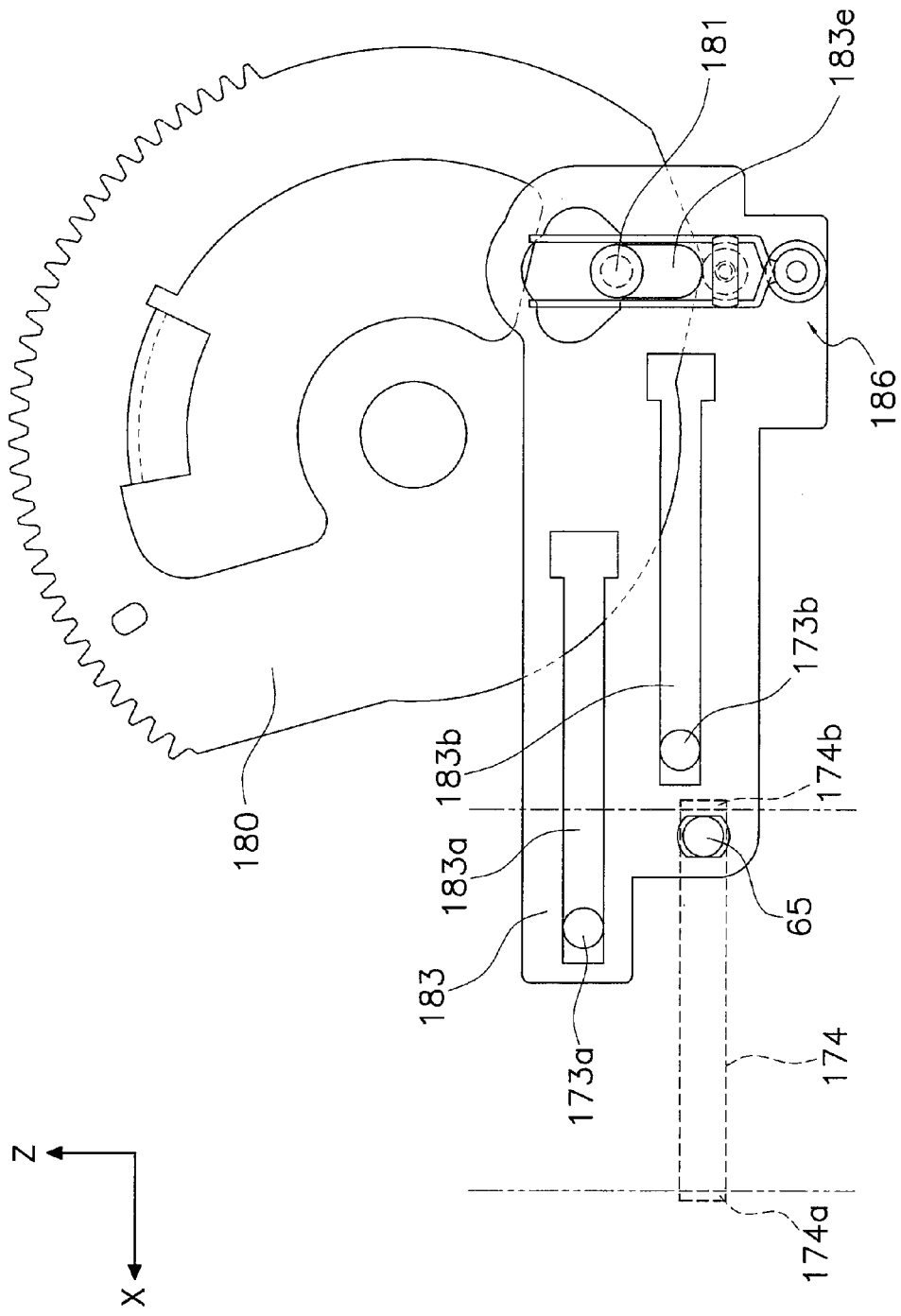
FIG. 28 is an illustration for describing the operation of the third group movement mechanism (telescopic side)
Figure 29:
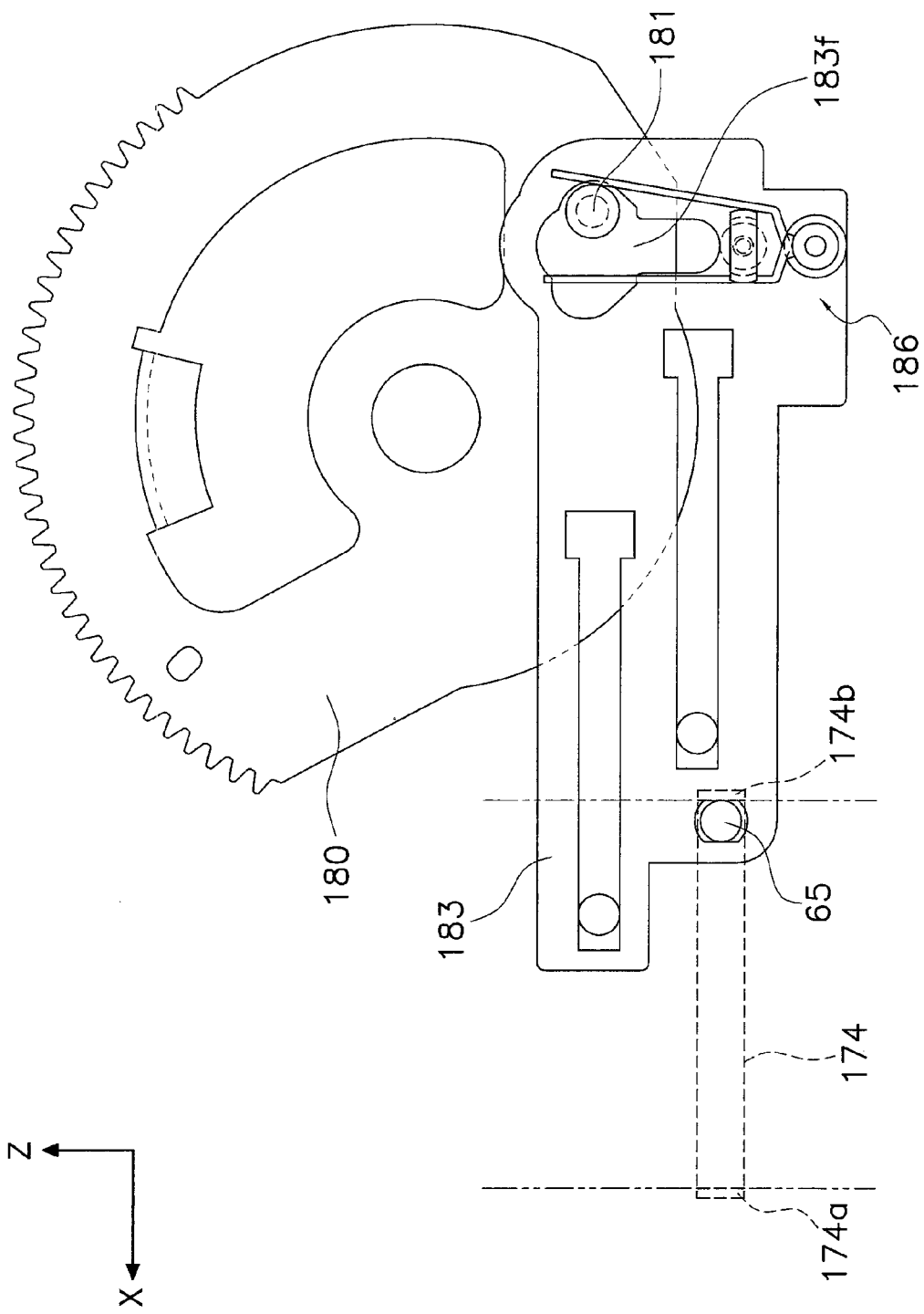
FIG. 29 is an illustration for describing the operation of the third group movement mechanism (telescopic end)

FIG. 25 shows rotational angle of the ring gear 180 when the optical system 35 is located at the wide angle end, and the operation of the elastic coupling mechanism and the operation of the rod 183 according to it. FIGS. 26 to 28 show the rotational angle of the ring gear 180 when the optical system 35 moves from the wide angle end to the telephoto end, and the operation of the elastic coupling mechanism and the operation of the rod 183 according to the rotational angle. In particular, FIG. 27 shows the rotational angle of the ring gear 180 when the optical system 35 is located in a normal position which is the middle position between the wide angle end and the telephoto end, and the operation of the elastic coupling mechanism and the operation of the rod 183 according to the rotational angle. FIG. 29 shows the rotational angle of the ring gear 180 when the optical system is located in the telephoto end, and the operation of the elastic coupling mechanism and the operation of the rod 183 according to the rotational angle.

In FIG. 25, the ring gear 180 is located at the end portion in the clockwise direction when viewed from the Y axis direction positive side. In this case, the ring gear pin 181 fixed to the ring gear 180 is located at the end portion on the positive side within the movable range to the X axis direction, and is engaged to the X axis direction positive side of the second engagement opening 183f of the rod 183. As described with reference to FIG. 17, when the ring gear pin 181 is located on the X axis direction positive side of the second engagement opening 183f, the crimp spring 186 presses the rod 183 to the X axis direction positive side. On the other hand, the protrusion portion 65 of the third group frame unit 44 inserted into the rod 183 and engaging with the restricting portion 174 of the base 55 is in contact with the end portion 174a on the X axis direction positive side of the restricting portion 174, and the movement to the X axis direction positive side is restricted. Consequently, when the optical system 35 is located at the wide angle end, movement of the rod 183 to the X axis direction positive side is restricted and the rod 183 is reliably fixed by the pressing to the X axis direction positive side.

Furthermore, in this embodiment, the state where the optical system 35 is located at the wide angle end is the same as the arrangement state (retracting state) of the optical system 35 when not using the image pickup device 2. For this reason, when not using the image pickup device 2, it is possible to reliably fix the rod 183.

In FIGS. 26 to 29, the ring gear 180 is driven to rotate in the counterclockwise direction from the end portion in the clockwise direction when viewed from the Y axis direction positive side. FIG. 26 shows the case which the ring gear 180 is located near the end portion in the clockwise direction when viewed from the Y axis direction positive side. FIG. 27 shows the case which the ring gear 180 is located in the center position in the movable range. FIG. 28 shows the case which the ring gear 180 is located near the end portion in the counterclockwise direction when viewed from the Y axis direction positive side.

In this case, the ring gear pin 181 fixed to the ring gear 180 engages with the first engagement opening 183e of the rod 183 and moves to the X axis direction negative side. As described with reference to FIG. 24, when the ring gear pin 181 is located at the first engagement opening 183e, the crimping force of the crimp spring 186 does not act on the ring gear pin 181. In this case, the ring gear 180 rotates in the counterclockwise direction while the ring gear pin 181 engages with the first engagement opening 183e of the rod 183, and as a result, the rod 183 is driven toward the X axis direction negative side. Since the rod 183 is driven while the guide grooves 183a and 183b engage with the guide pins 173a and 173b formed on the base 55, the rod 183 is in translational movement toward the X axis direction negative side. The protrusion portion 65 of the third group frame unit 44 fits in the rod 183. Therefore, the third group frame unit 44 moves toward the X axis direction negative side according to the movement of the rod 183.

In FIG. 22, the ring gear 180 is located on the end portion in the counterclockwise direction when viewed from the Y axis direction positive side. In this case, the ring gear pin 181 fixed to the ring gear 180 is located on the end portion on the negative side within the movable range to the X axis direction, and engages with the X axis direction negative side of the second engagement opening 183f of the rod 183. As described with reference to FIG. 24, when the ring gear pin 181 is located on the X axis direction negative side of the second engagement opening 183f, the crimp spring 186 presses the rod 183 to the X axis direction negative side. On the other hand, the protrusion portion 65 of the third group frame unit 44 inserted into the rod 183 and engaging with the restricting portion 174 of the base 55 is in contact with the end portion 174b of the restricting portion 174 on the X axis direction negative side, and the movement thereof to the X axis direction negative side is restricted. Consequently, when the optical system 35 is located at the telephoto end, the movement of the rod 183 to the X axis direction negative side is restricted, and the rod 183 is reliably fixed by pressing to the X axis direction negative side.

4.4: Third Group Frame Unit

The detailed configuration of the third group frame unit 44 will be described with reference to FIG. 30.

Figure 30:
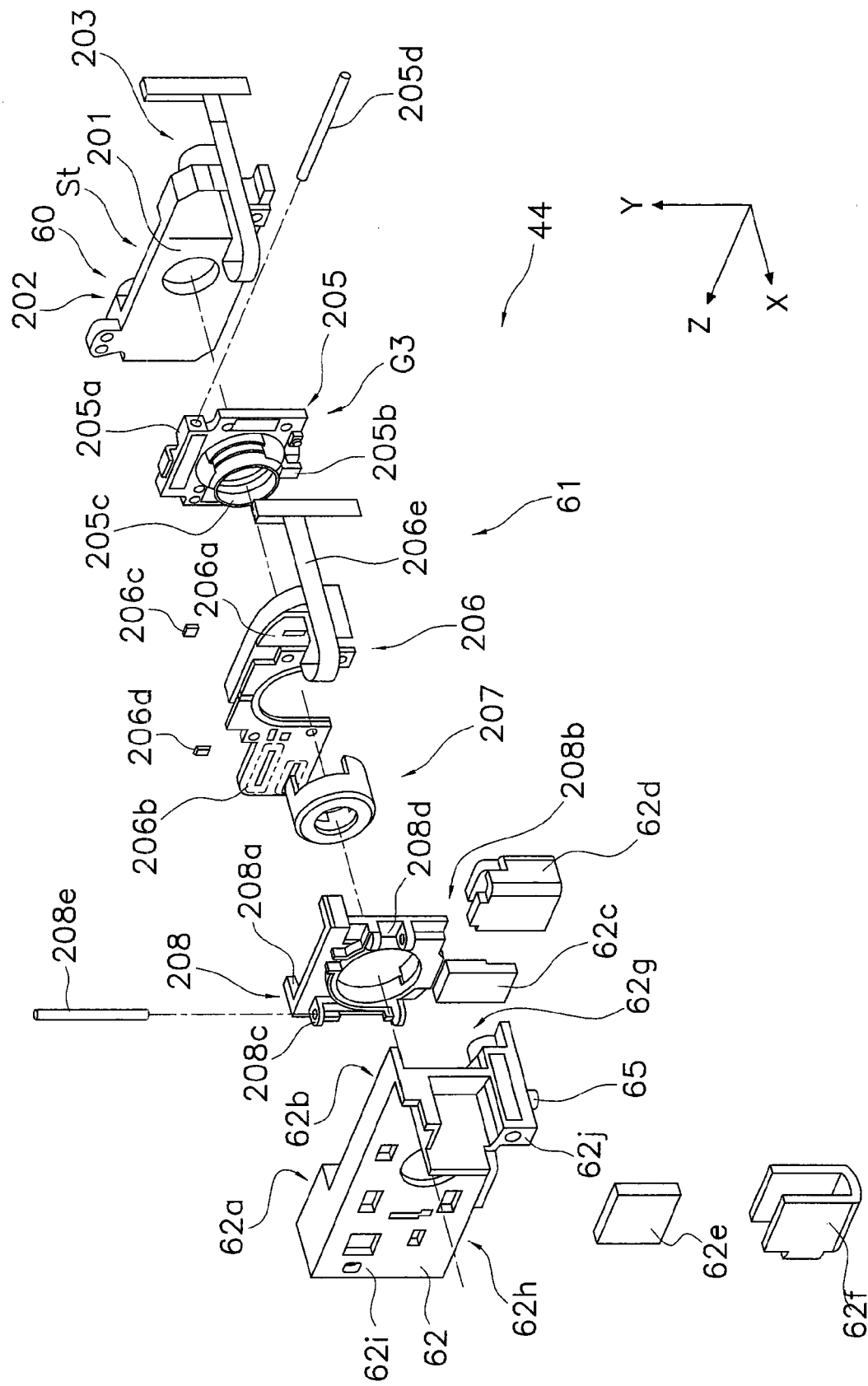
FIG. 30 is an exploded perspective view of a third group frame unit.

FIG. 30 is an exploded perspective view of the third group frame unit 44. The third group frame unit 44 is mainly made up of a shutter unit 60 provided on the second optical axis A2 and having the exposure-adjustment member St performing the shutter operation and the throttle operation, the third lens group G3, the image blur correction mechanism 61 retaining the third lens group G3 to be movable in the Y axis direction and the Z axis direction, and the third group frame 62 supporting the shutter unit 60 and the image blur correction mechanism 61.

Since details of the third lens group G3 has been described with reference to FIGS. 5 to 8, they will be omitted here.

The shutter unit 60 is mainly made up of a main body 201 provided on the second optical axis A2 and having the exposure-adjustment member St such as a throttle or shutter for controlling the exposure amount and the exposure time of the CCD 37 (refer to FIG. 9), an aperture actuator 202 provided on the Z axis direction positive side of the main body 201 to protrude to the X axis direction negative side, and a shutter actuator 203 disposed on the Z axis direction negative side of the main body 201 to protrude to the X axis direction negative side. The aperture actuator 202 and the shutter actuator 203 are provided to be spaced in the Z axis direction with the second optical axis A2 sandwiched. The shutter unit 60 is fixed to the third group frame 62 with the image blur correction mechanism 61 (which will be described later) sandwiched.

The image blur correction mechanism 61 is mainly made up of a pitching movement frame 205 retaining the third lens group G3 and is movable in the Z axis direction (pitching direction) and the Y axis direction (yawing direction) with respect to the third group frame 62, an electric substrate 206 attached on the X axis direction positive side of the pitching movement frame 205, a cap 207 attached to the pitching movement frame 205 from the X axis direction positive side of the electric substrate 206, and a yawing movement frame 208 movable in the Y axis direction with respect to the third group frame 62 and retaining the pitching movement frame 205 to be movable in the Z axis direction.

The pitching movement frame 205 has a cylindrical portion 205c retaining the third lens group G3 on the middle thereof and includes a bearing portion 205a on the Y axis direction positive side, and a rotation stopper 205b on the Y axis direction negative side. The pitching shaft 205d parallel to the Z axis direction is inserted into the bearing portion 205a. The both ends of the pitching shaft 205d are supported by a fixing portion 208a of the yawing movement frame 208 which will be described later. The rotation stopper 205b engages with an engagement portion 208b of the yawing movement frame 208 which will be described later, to be movable in the Z axis direction. By doing so, the pitching movement frame 205 is slidable with respect to the yawing movement frame 208 in the direction along the pitching shaft 205d.

On the electric substrate 206, a coil 206a configured to drive the third lens group G3 in the Z axis direction, a coil 206b configured to drive it in the Y axis direction, a hall element 206c for detecting the Z axis direction position of the third lens group G3, and a hall element 206d detecting the Y axis direction position are provided. Furthermore, coils 206a and 206b are, for example, configured integrally with the electric substrate 206 as a laminated coil. The FPC 206e transfers the signals between the coils 206a, 206b and hall elements 206c, 206c attached on the electric substrate 206 and the main substrate 23 (refer to FIG. 3).

The cap 207 is attached on the X axis direction positive side of the third lens group G3, and reduces flare or ghost or the like. The cap 207 is attached to cover the cylindrical portion 205c of the pitching movement frame 205 with the electric substrate 206 sandwiched.

The yawing movement frame 208 is a member having the cylindrical portion 205c retaining the third lens group G3 and an opening into which the cap 207 is inserted, at the middle. On the Y axis direction positive side, the fixing portion 208a supporting the both ends of the pitching shaft 205d is formed. On the Y axis direction negative side, the engagement portion 208b engaging with the rotation stopper 205b of the pitching movement frame 205 is formed. As a result, the yawing movement frame 208 supports the pitching movement frame 205 to be slidable in the Z axis direction. In addition, on the surface of the yawing movement frame 208 on the X axis direction positive side, the bearing portion 208c is formed on the Z axis direction positive side, and the rotation stopper 208d is formed on the Z axis direction negative side. The yawing shaft 208e parallel to the Y axis direction is inserted into the bearing portion 208c. The two ends of the yawing shaft 208e are supported by the fixing portion 62a of the third group frame 62 which will be described later. The rotation stopper 208d engages with the engagement portion 62b of the third group frame 62 which will be described later, to be movable in the Y axis direction. As a result, the yawing movement frame 208 is slidable in the direction along the yawing shaft 208e, with respect to the third group frame 62.

The third group frame 62 is disposed on the X axis direction positive side with respect to the yawing movement frame 208. On the surface thereof on the X axis direction negative side, the fixing portion 62a supporting the two ends of the yawing shaft 208e is formed on the Z axis direction positive side, and the engagement portion 62b engaging with the rotation stopper 208d of the yawing movement frame 208 is formed on the Z axis direction negative side. As a result, the third group frame 62 supports the yawing movement frame 208 to be movable in the Y axis direction.

On a fitting portion 62g of the third group frame 62 on the Z axis direction negative side, a yoke 62d is press fitted and fixed thereon. The yoke 62d has a section perpendicular to the Y axis in a square U-shape, and on the inner side thereof, a magnet 62c which has undergone dipolar magnetization in the Z axis direction is fixed. The yoke 62d is fixed such that the coil 206a of the electric substrate 206 faces the magnet 62c in the X axis direction. By doing so, an electromagnetic actuator in the pitching direction is configured. In addition, on a fitting portion 62h of the third group frame 62 on the Y axis direction negative side, a yoke 62f is press fitted and fixed. The yoke 62f has a section perpendicular to the Z axis in a square U-shape, and on the inner side thereof, a magnet 62e which has undergone tripolar magnetization in the Y axis direction is fixed. The yoke 62f is fixed so that the coil 206b of the electric substrate 206 faces the magnet 62e in the X axis direction. By doing so, an electromagnetic actuator in the yawing direction is configured.

According to the above configuration, when electric current flows in the coil 206a of the electric substrate 206, electromagnetic power is generated along the pitching direction (Z axis direction) by the magnet 62c and the yoke 62d. Similarly, when electric current flows in the coil 206b of the electric substrate 206, electromagnetic power is generated along the yawing direction (Y axis direction) by the magnet 62e and the yoke 62f.

As described above, with the image blur correction mechanism 61, it is possible to correct the image blur by driving the third lens group G3 in two directions (Y axis direction and Z axis direction) perpendicular to the second optical axis A2.

On the Y axis direction negative side of the third group frame 62, the protrusion portion 65 protruding to on the Y axis direction negative side is formed. The protrusion portion 65 engages with the through-hole 183c of the rod 183 (refer to FIG. 21). Therefore, the third group frame 62 receives the drive in the X axis direction from the rod unit 182.

In addition, on the third group frame 62, a bearing portion 62i and a bearing portion 62j are formed on the corner disposed on the Y axis direction positive side and Z axis direction positive side, and on the corner disposed on the Y axis direction negative side and Z axis direction negative side respectively. The third group guide pole 71 extending along the X axis direction from the master flange unit 46 (refer to FIG. 9) is inserted in the bearing portion 62i. The third group guide pole 70 extending along the X axis direction from the master flange unit 46 (refer to FIG. 9) is inserted in the bearing portion 62j. Therefore, the third group frame 62 is movable in the X axis direction along the third group guide poles 70 and 71.

Furthermore, on the third group frame 62, as described above, the image blur correction mechanism 61 is fixed, and the shutter unit 60 is attached from the X axis direction negative side thereof.

According to the above, the third group frame unit 44 integrally receives the drive to the X axis direction from the rod unit 182, and is integrally guided to the X axis direction by the third group guide poles 70 and 71 to move in the direction along the X axis direction, that is, the second optical axis A2.

4.5: Fourth Group Frame Unit

The detailed configuration of the fourth group frame unit 45 will be described with reference to FIG. 31.

Figure 31:
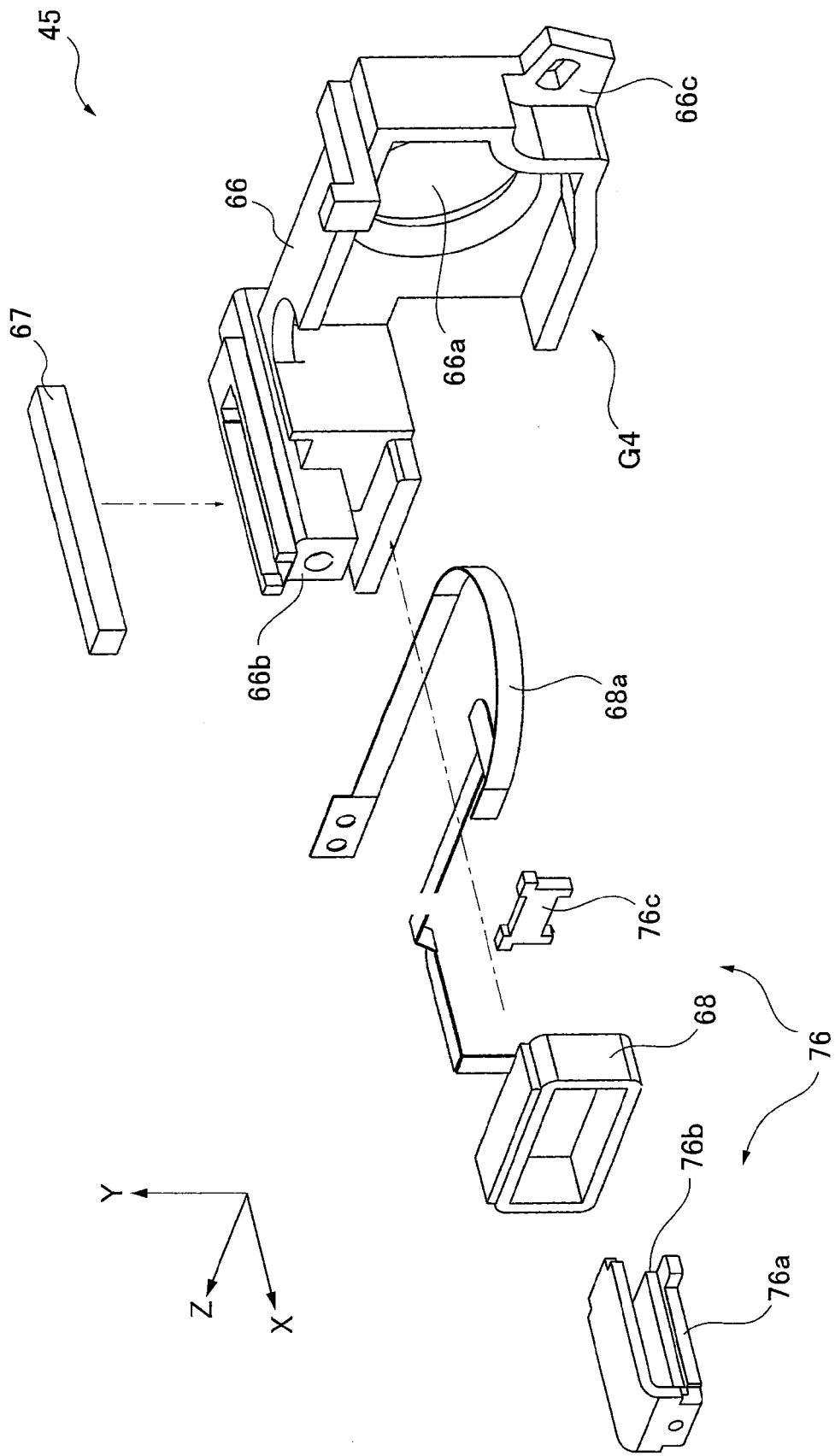
FIG. 31 is an exploded perspective view of a fourth group frame unit.

FIG. 31 is an exploded perspective view of the fourth group frame unit 45. The fourth group frame unit 45 retains the fourth lens group G4, moves along the second optical axis A2 and performs focusing operation, and corrects the out-of-focus state caused by the changes in imaging magnification due to the movement of first lens group G1 and the third lens group G3.

The fourth group frame unit 45 is mainly made up of the fourth lens group G4, the fourth group frame 66 retaining the fourth lens group G4, and sensor magnet 67 and coil 68 fixed to the fourth group frame 66.

Since the details on the fourth lens group G4 has been described with reference to FIGS. 5 to 8, they will be omitted here.

The fourth group frame 66 includes an opening 66a retaining the fourth lens group G4. The fourth lens group G4 is fixed to this opening 66a by an adhesion or caulking.

On the fourth group frame 66, a bearing portion 66b and a bearing portion 66c are formed on the corner disposed on the Y axis direction positive side and Z axis direction positive side, and on the corner disposed on the Y axis direction negative side and Z axis direction negative side respectively. The bearing portion 66b is a cylindrical bearing which is long in the X axis direction, and the fourth group guide pole 73 extending along the X axis direction from the master flange unit 46 (refer to FIG. 9) is inserted therein. In the bearing portion 66c, the fourth group guide pole 72 extending along the X axis direction from the master flange unit 46 (refer to FIG. 9) is inserted. Therefore, the fourth group frame 66 is movable along the fourth group guide poles 73 and 72 in the X axis direction.

On the fourth group frame 66, the sensor magnet 67 is fixed so that the longitudinal direction thereof is along the cylindrical bearing portion 66b. The sensor magnet 67 has undergone multipolar magnetization in the X axis direction. The sensor magnet 67 is disposed to face the MR sensor 77 (refer to FIG. 9) of the master flange unit 46 in the Y axis direction. Therefore, when the sensor magnet 67 moves in the X axis direction together with the fourth group frame 66, the MR sensor 77 detects the changes in the magnetic field in the vicinity thereof. Therefore, the position of the fourth group frame unit 45 is detected.

In addition, on the X axis direction positive side of the fourth group frame 66, the coil 68 is fixed by adhesive. An FPC 68a is connected to the coil 68. The FPC 68a is electrically connected to the coil 68 and the main substrate 23 (refer to FIG. 3).

A portion of a main yoke 76a which have a square U-shape section perpendicular to the Z axis and fixed to the master flange unit 46 which will be described later passes through the coil 68. A magnet 76b is fixed on the other portion of the main yoke 76a. In addition, the open end of the main yoke 76a on the X axis direction negative side is closed by a side yoke 76c in the state where the coil 68 is passed through. A magnetic member 76 including the above main yoke 76a, magnet 76b, and the side yoke 76c, and the coil 68 make up a voice coil-type linear motor. Therefore, when electric current flows in the coil 68, driving force is generated in the coil 68 in the X axis direction, and the fourth group frame unit 45 fixing the coil 68 and the coil 68 is driven in the X axis direction.

According to the above, the fourth group frame unit 45 receives the drive to the X axis direction from the voice coil-type linear motor, and is guided to the X axis direction by the fourth group guide poles 73 and 72, and thereby moves in the direction along the X axis direction, that is, the second optical axis A2.

In addition, although the case of driving the fourth group frame unit 45 using the linear motor is here shown, the fourth group frame unit 45 may be driven by another motor such as a stepping motor.

4.6: Master Flange Unit

The detailed configuration of the master flange unit 46 will be described with reference to FIG. 32.

Figure 32:
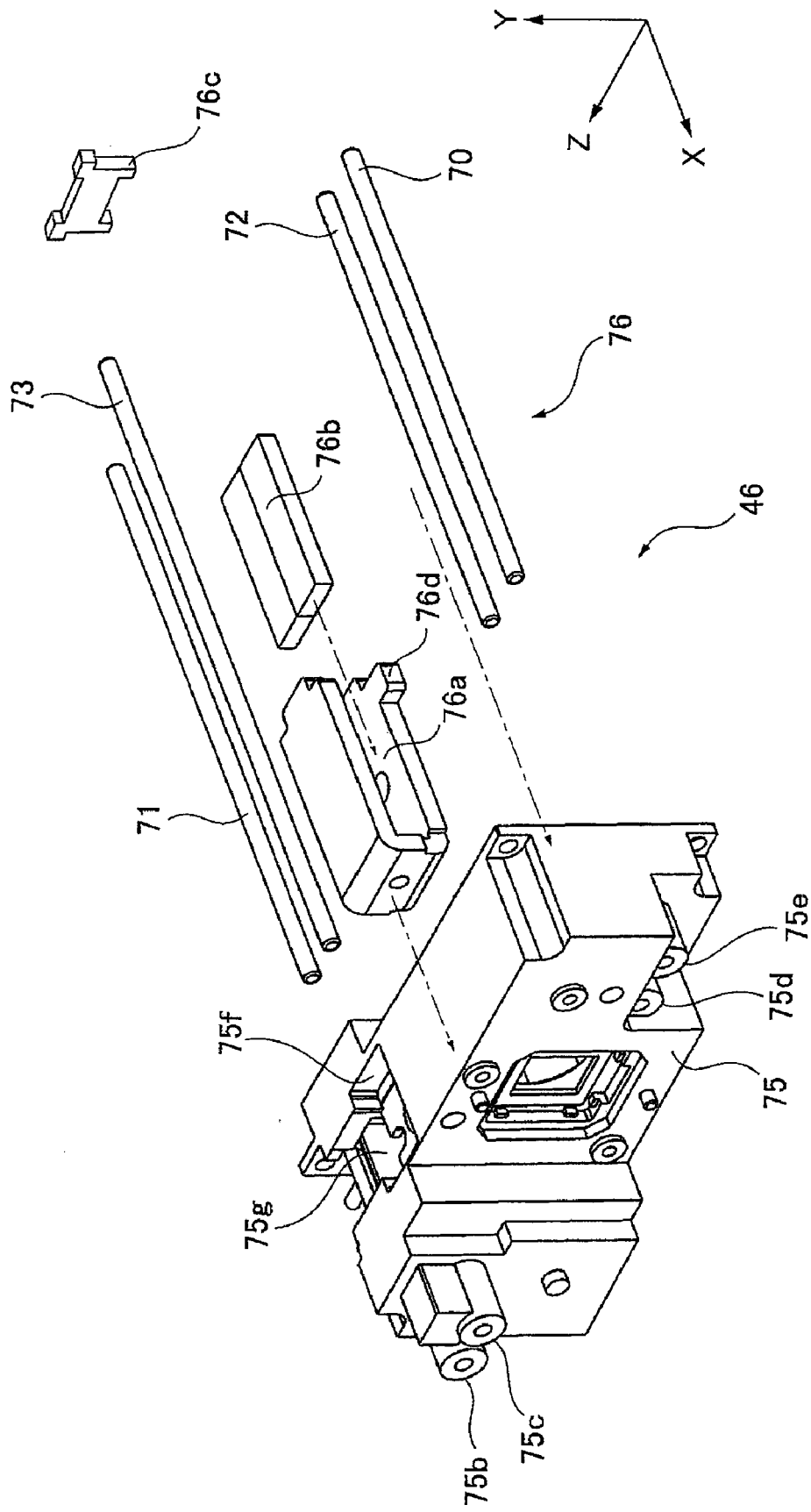
FIG. 32 is an exploded perspective view of a master flange unit.

FIG. 32 is an exploded perspective view of the master flange unit 46. The master flange unit 46 is a member making up the chassis of the lens barrel 31 together with the base unit 43, and is fixed by a screw or the like in the X axis direction of the base 55.

On the master flange unit 46, the magnetic member 76 making up the magnetic circuit together with the coil 68 of the fourth group frame unit 45 is fixed. More specifically, the magnetic member 76 is fixed by press fitting and fixing the press fit protrusion 76*d* of the main yoke 76*a* including the magnetic member 76 to a fitting portion (not shown in the figure) of the master flange unit 46. On the inner surface of the main yoke 76*a* on the Y axis direction negative side, the magnet 76*b* is fixed by an adhesive or the like. Furthermore, the coil 68 of the fourth group frame unit 45 passes through the main yoke 76*a*, and in the state where the coil 68 is passed through, the side yoke 76*c* is fixed on the open end of the main yoke 76*a* on the X axis direction negative side.

On the surface of the master flange unit 46 on the Y axis direction positive side, a fitting portion 75*f* for attaching the MR sensor 77 (refer to FIG. 9) is formed. One portion of the fitting portion 75*f* includes a penetration portion 75*g* penetrated through the inner side of the master flange unit 46. The MR sensor 77 is fixed to this fitting portion 75*f*, and faces the sensor magnet 67 (refer to FIG. 31) of the fourth group frame unit 45 located inside the master flange unit 46 in the Y axis direction via the penetration portion 75*g*. An FPC not shown in the figure is connected to the MR sensor 77, and the MR sensor 77 is electrically connected to the main substrate 23 (refer to FIG. 3) via the FPC.

On the corner of the master flange unit 46 on the Y axis direction positive side and the Z axis direction positive side, cylindrical guide pole support portions 75*b* and 75*c* which are adjacent in the Z axis direction are formed. The guide pole support portion 75*b* disposed on the Z axis direction positive side supports the end portion of the third group guide pole 71 on the X axis direction positive side. The guide pole support portion 75*c* disposed on the X axis direction negative side supports the end portion of the fourth group guide pole 73 on the X axis direction positive side. In addition, on the corner disposed on the Y axis direction negative side and on the Z axis direction negative side of the master flange unit 46, cylindrical guide pole support portions 75*d* and 75*e* which are adjacent in the Z axis direction are formed. The guide pole support portion 75*d* disposed on the Z axis direction positive side supports the end portion of the fourth group guide pole 72 on the X axis direction positive side. The guide pole support portion 75*e* disposed on the Z axis direction negative side supports the end portion of the third group guide pole 70 on the X axis direction positive side. In addition, end portions of the guide poles 70 to 73 on the X axis direction negative side are fixed to the second group frame unit 42.

4.7: Operation of the Lens Barrel

Figure 33A:
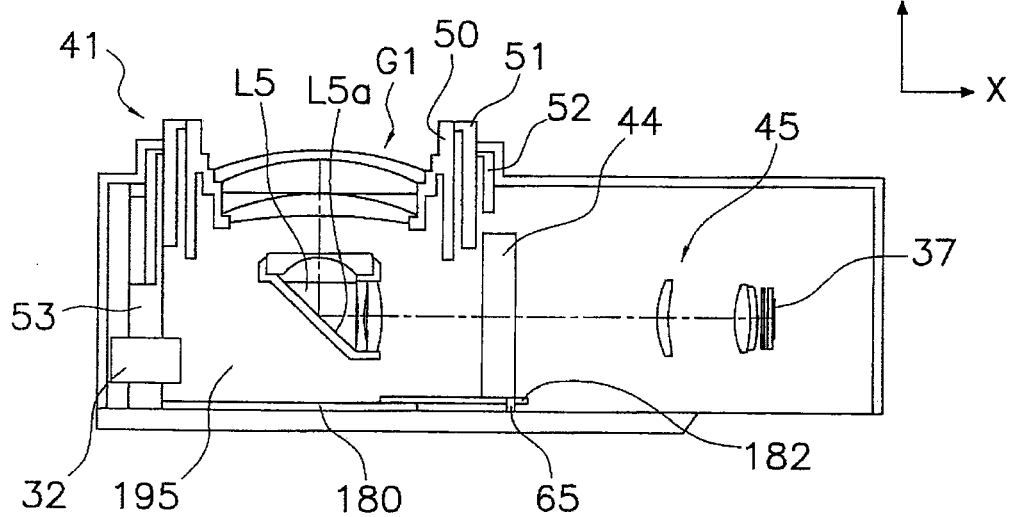
FIGS. 33A to 33C are illustrations for describing the operation of the lens barrel.
Figure 33B:
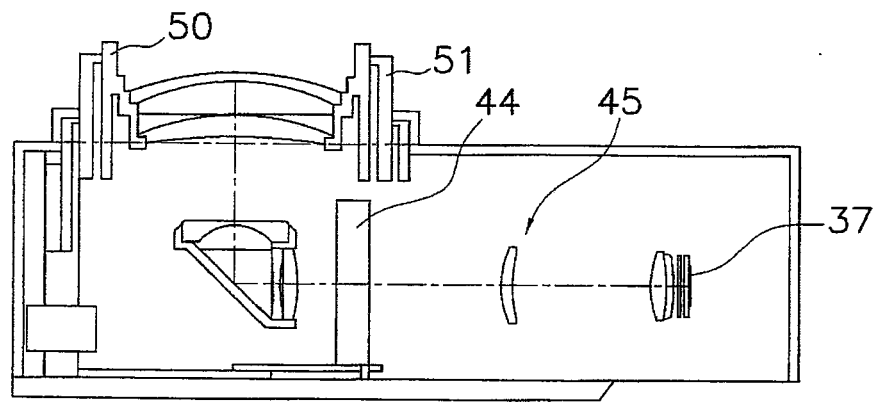
Figure 33C:
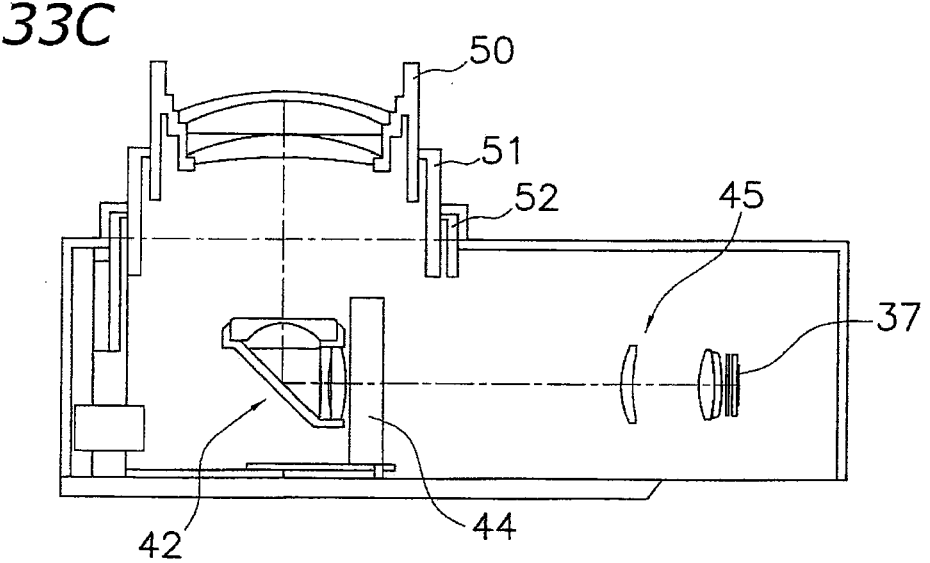

The operation of each portion of the lens barrel 31 will be described with reference to FIGS. 33A to 33C. FIGS. 33A to 33C are sections in a plane including the first optical axis A1 and the second optical axis A2 of the lens barrel 31. In the FIGS. 33A to 33C, for the convenience of explanation, a member not located on the plane including the first optical axis A1 and the second optical axis A2 is also shown. In addition, for the convenience of explanation, mainly the configurations necessary for the explanation are shown. FIG. 33A shows when the optical system 35 is located on the wide angle side. FIG. 33B shows when the optical system 35 is located in the normal position which is the middle position between the wide angle end and the telephoto end. FIG. 33C shows when the optical system 35 is located at the telephoto end.

Below, the operation of each portion when the optical system 35 is zoomed from the wide angle side to the telephoto side will be described.

First, when the motor unit 32 operates, the driving gear 53 is driven. The driving gear 53 meshes with the ring gear 180 of the base unit 43 and the driving frame 51 of the first group frame unit 41, and the rotation driving of the driving gear 53 drives the driving frame 51 and the ring gear 180 to rotate.

When the driving frame 51 is driven to rotate, the first group frame unit 41 configured as described above operates, and the first lens group G1 retained therein moves to the Y axis direction positive side.

When the ring gear 180 is driven to rotate, the drive is converted into the translational movement of the rod unit 182 to the X axis direction negative side. The protrusion portion 65 of the third group frame unit 44 engages with the rod unit 182. Therefore, the third group frame unit 44 is in translational movement to the X axis direction negative side together with the rod unit 182.

As shown in FIG. 33A, when the optical system 35 is located on the wide angle side, the third group frame unit 44 is disposed so that a portion thereof is opposite in the Y axis direction to a portion of the first group frame unit 41 on the X axis direction positive side. More specifically, a portion of the third group frame unit 44 is disposed to be opposite in the Y axis direction to a portion of the stationary frame 52 on the X axis direction positive side.

In addition, as shown in FIG. 33B, when the optical system 35 moves to the telephoto side, the first group frame 50 and the driving frame 51 move to the Y axis direction positive side, and the third group frame unit 44 moves from the X axis direction positive side into the space formed by this movement of the first group frame 50 and the driving frame 51.

Furthermore, as shown in FIG. 33C, when the optical system 35 is located at the telephoto end, the third group frame unit 44 moves all the way to a position nearest to the second group frame unit 42, within the movable range to the X axis direction.

Figure 34:
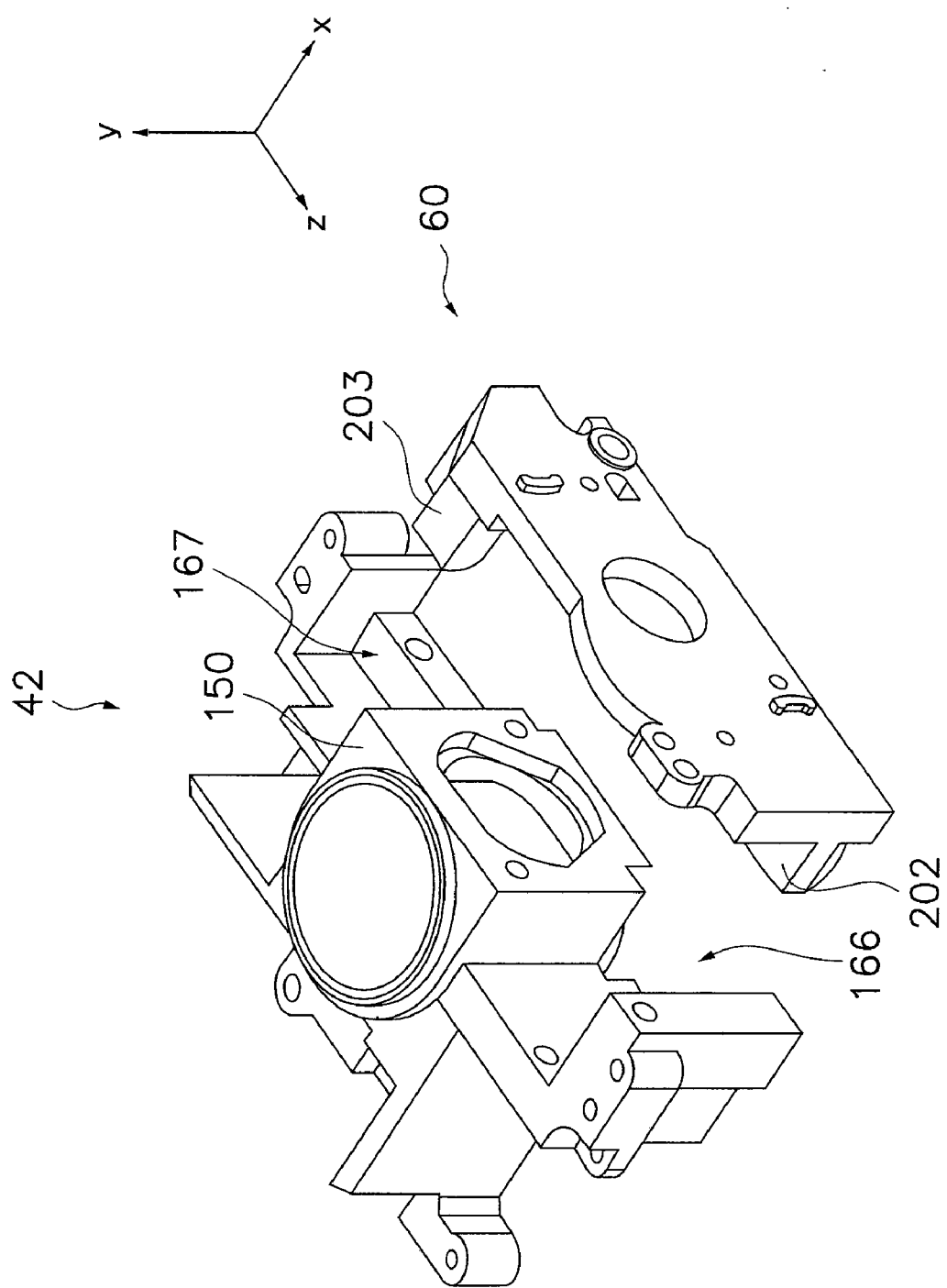
FIG. 34 is an illustration for describing the positional relationship between the second group frame unit and the third group frame unit.
Figure 35:
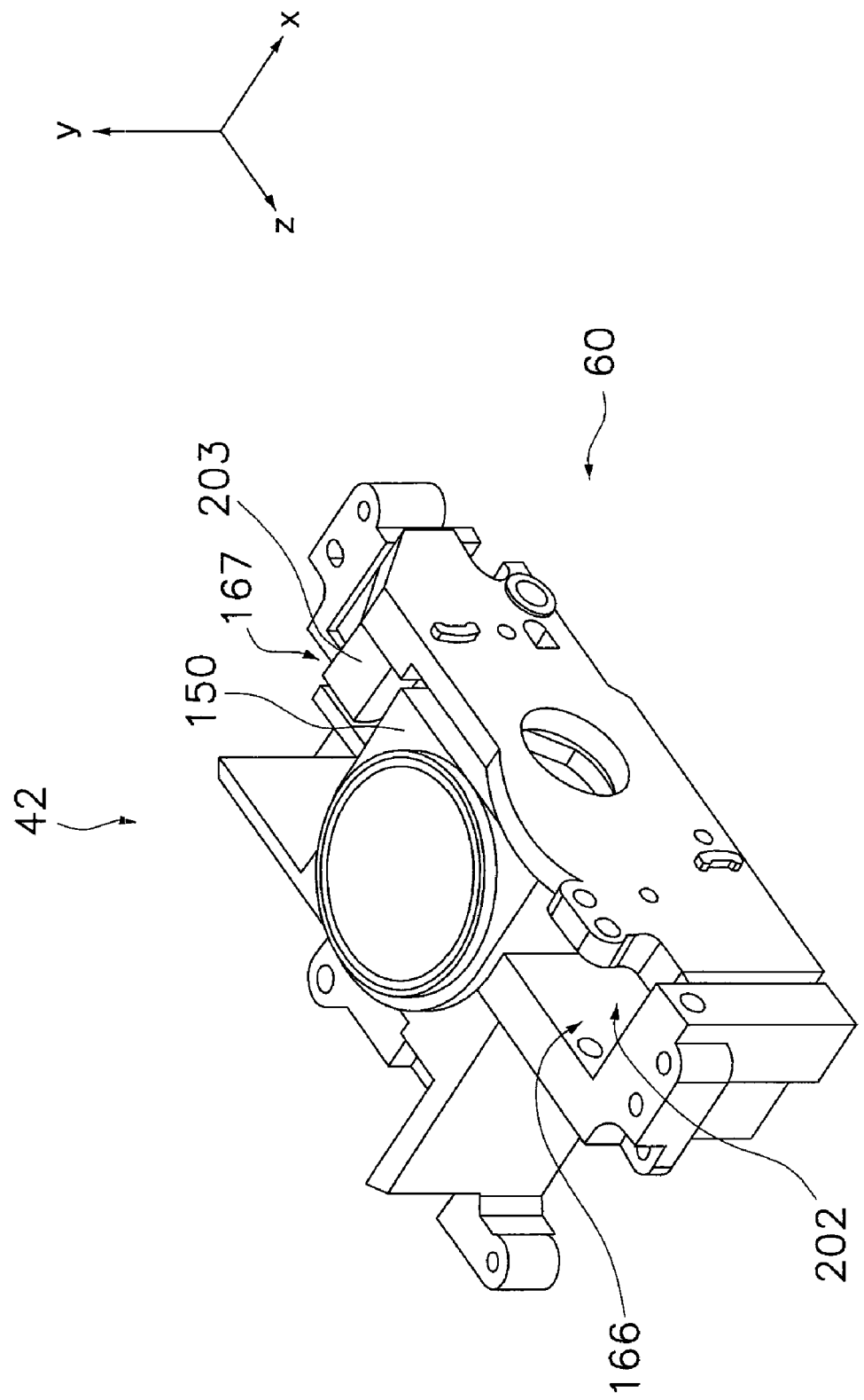
FIG. 35 is an illustration for describing the positional relationship between the second group frame unit and the third group frame unit.
Figure 36:
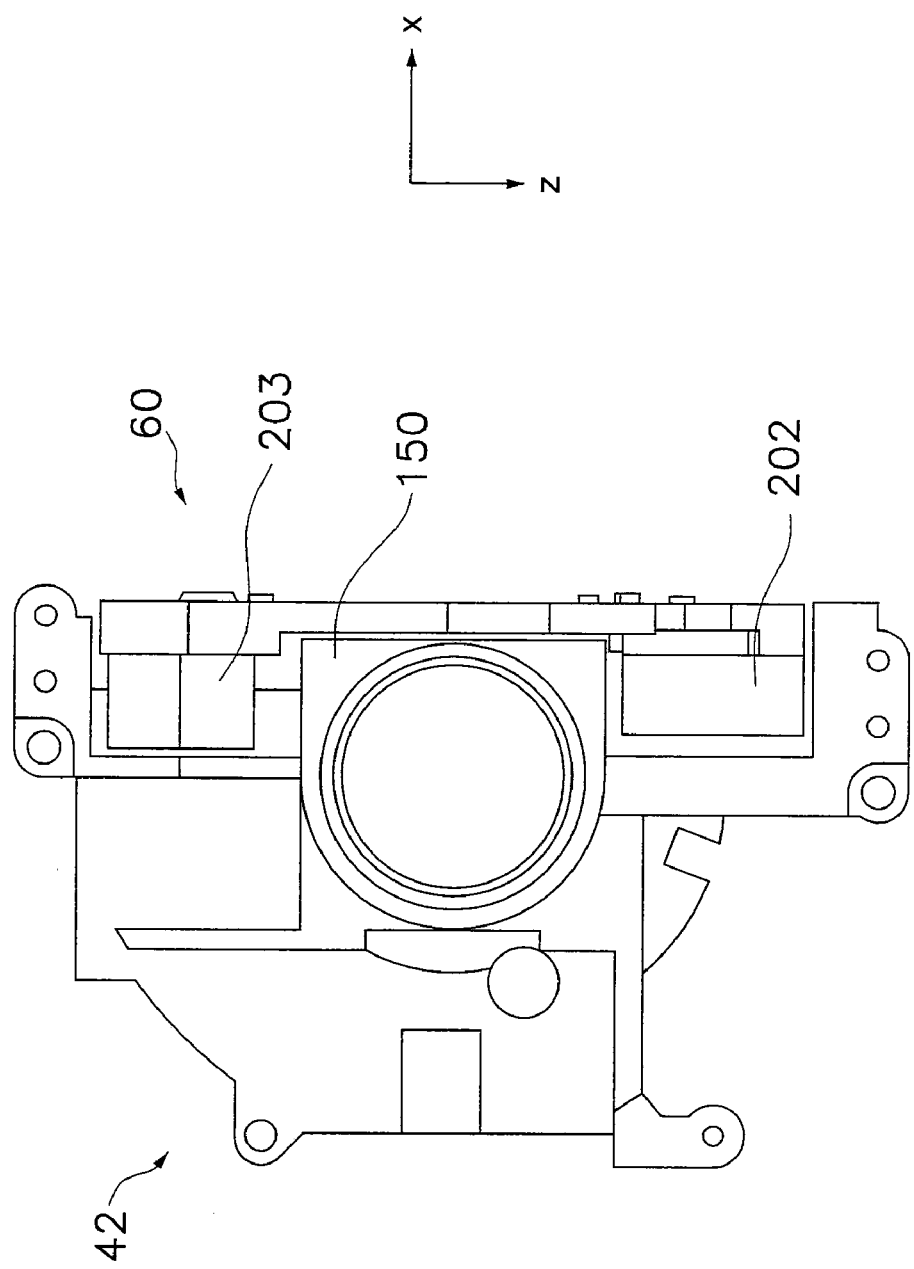
FIG. 36 is an illustration for describing the positional relationship between the second group frame unit and the third group frame unit.

Here, the positional relationship between the second group frame unit 42 and the third group frame unit 44 will be described with reference to FIGS. 34 to 36. FIG. 34 is a perspective view showing the positional relationship between the second group frame unit 42 and the shutter unit 60 of the third group frame unit 44, when the optical system 35 is located at the wide angle end. FIG. 35 is a perspective view showing the positional relationship between the second group frame unit 42 and the shutter unit 60 of the third group frame unit 44, when the optical system is located at the telephoto end. FIG. 36 is a plan view seen from the Y axis direction positive side showing the positional relationship between the second group frame unit 42 and the shutter unit 60 of the third group frame unit 44 when the optical system is located at the telephoto end.

As shown in FIG. 34, on the second group frame unit 42, concaved space 166 and concaved space 167 are formed toward the X axis direction positive side, that is, toward the side of the third group frame unit 44. The concaved space 166 and the concave space 167 are each formed in positions facing the X axis direction with respect to aperture actuator 202 and shutter actuator 203 disposed protruding to the X axis direction negative side from the third group frame unit 44. Therefore, as shown in FIG. 35, when the optical system 35 moves to the telephoto side and the shutter unit 60 moves all the way to the position nearest to the side of the second group frame unit 42, the aperture actuator 202 fits in the concaved space 166, and the shutter actuator 203 fits in the concaved space 167.

In addition, as shown in FIG. 36, the aperture actuator 202 and the shutter actuator 203 are provided to be spaced in the Z axis direction with the second optical axis A2 sandwiched, and this gap is larger than the Z axis direction width of the second group frame 150. Therefore, when the shutter unit 60 moves all the way to the position nearest to the side of the second group frame unit 42, the second group frame 150 fits in the center portion in the Z axis direction between the aperture actuator 202 and the shutter actuator 203.

Since the second group frame unit 42 and the third group frame unit 44 are configured as described above, it becomes possible to enlarge the movable range of the third lens group G3 in the X axis direction. In other words, while forming the lens barrel 31 to be compact in the X axis direction, it is possible to make the maximum distance in the X axis direction between third lens group G3 and the CCD 37 larger.

By the cooperation between the first group frame unit 41 and the third group frame unit 44 described above, the optical system 35 changes the imaging magnification to the CCD 37 (refer to FIGS. 33A to 33C). The fourth group frame unit 45 corrects out-of-focus state caused by the change in this imaging magnification. The correction is realized (refer to FIG. 31) by driving the fourth group frame unit 45 in the X axis direction via voice coil-type linear motor made up of coil 68 of the fourth group frame unit 45 and the magnetic member 76 of the master flange unit 46.

Furthermore, as shown in FIGS. 33A to 33C, on the X axis direction negative side of the second group frame unit 42, motor unit 32 is disposed, using space 195 formed on the Y axis direction negative side of the first group frame unit 41. Therefore, a member having the optical system 35 is not disposed, and it becomes possible to arrange a member having the image pickup device 2 by effectively using a space which does not affect the optical system 35, and it is possible to improve the space usage efficiency.

5: Effects

The effects of the lens barrel 31 of the present invention are summarized below.

5.1

In this lens barrel 31, as shown in FIGS. 43A to 43C, since the prism L5, the sixth lens L6, and the seventh lens L7 contiguously form an integrated lens group, even if the accuracy of mounting the prism L5 with respect to the second group frame 150 slightly deteriorates, the sixth lens L6 and the seventh lens L7 follow the movement of the prism L5. As a result, it is possible to keep the positions of the sixth lens L6 and the seventh lens L7 constant, with respect to the reflecting surface L5a. By doing so, it is possible to prevent the optical performance from deteriorating due to the relative displacement between the prism L5, the sixth lens L6, and the seventh lens L7, and it is possible to obtain high optical performance of the entire lens barrel 31.

In addition, normally, the surface dimensional accuracy of the prism L5 is high compared to the second group frame 150. Therefore, by having the sixth lens L6 contact with the prism L5 and positioning the sixth lens L6 with reference to the surface of the prism L5, it is possible to suppress the fluctuation in the position of the sixth lens L6 with respect to the reflecting surface L5a, and it is possible to obtain a higher optical performance of the entire lens barrel 31.

In addition, via the first contact portions 156d and the second contact portions 156e, the position accuracy in the direction perpendicular to the reflecting surface L5a and in the direction perpendicular to the output surface L5d of the prism L5 improves, and the accuracy of mounting the prism L5 improves. Therefore, the angle of the reflecting surface L5a with respect to the first optical axis stabilizes, and the angle of the second optical axis A2 stabilizes. In addition, since the prism L5 does not rotate with respect to the second group frame 150 in the direction horizontal to the reflecting surface L5a, it is possible to prevent the sixth lens L6 and the seventh lens L7 fixed to the prism L5 from tilting with respect to the second optical axis A2. By doing so, it is possible to obtain a higher optical performance of the entire lens barrel 31.

Furthermore, since the sixth lens L6 is in contact with the output surface L5d of the prism L5, the space interval between the prism L5 and the sixth lens L6 is smaller. By doing so, it is possible to shorten the entire length of the optical system, and it is possible to miniaturize lens barrel 31.

5.2

In this lens barrel 31, as shown in FIGS. 43A to 43C, since the sixth lens L6 is in contact with the optically ineffective area L5f of the output surface L5d, the light flux reflected by the reflecting surface L5a is not affected by the contacting portion between the output surface L5d and the sixth lens L6. Therefore, it is possible to prevent deteriorating the optical performance due to the contacting portion of the sixth lens L6.

In addition, as shown in FIGS. 18 and 19, since a light shielding material is applied to the optically ineffective area L5f of the output surface L5d, it is possible to prevent unwanted light other than the light flux reflected by the reflecting surface L5a from exiting from the prism L5, or reflecting in the optically ineffective area L5f. Therefore, it is possible to prevent flare or ghost or the like from occurring. In particular, with the repeated reflection between the surface of the prism L5 and the sixth lens L6, the interference of light, ghost, flare, and the like are not likely to occur.

5.3

In this lens barrel 31, as shown in FIG. 16, since the adhesive pocket 156g is open to the opening portion 155c side, it is possible to insert the prism L5 from the opening portion 155c, to fill in adhesive agent 156h in the adhesive pocket 156g from the opening portion 155c, and to irradiate the adhesive agent 156h with ultraviolet radiation from the side of the opening portion 155c simultaneously. Therefore, it is not necessary to change the position of the second group frame 150 in the bonding step of the prism L5, like it is done conventionally, or irradiate each adhesive pocket 156g with ultraviolet radiation from different angles. By doing so, it is possible to reduce the manufacturing steps in this lens barrel 31, and it is possible to reduce the manufacturing cost.

In addition, in the adhesive pocket 156g, the capacity of the Y axis direction negative side is smaller than the capacity of the positive side. Therefore, the amount of adhesive agent 156h on the portion far away from the source of the ultraviolet light irradiation becomes less, and compared with the conventional way, it becomes easier to cure the adhesive agent 156h via the ultraviolet light irradiation. Therefore, it is possible to reduce the time of the ultraviolet light irradiation, and it is possible to reduce the manufacturing cost.

Furthermore, by forming the adhesive pocket 156g in the shape shown in FIG. 17A, when the adhesive agent hardens and contracts, a force that biases the prism L5 to the side of the reflecting surface L5a in the Y axis direction is generated. As a result, it is possible to prevent the adhesive pocket 156g from being uplifted due to the contraction of the adhesive agent, and it is possible to improve the accuracy of mounting the prism L5. In addition, since the adhesive pocket 156g includes a portion in a staircase pattern, it is possible to enlarge the surface area of the adhesive pocket 156g, and it is possible to enlarge the adhesive area. In other words, it is possible to improve the adhesive strength.

5.4

In this lens barrel 31, as shown in FIG. 16, since the second group frame 150 includes three supporting surfaces 155b, it is possible to reliably support the fourth lens L4. In addition, since the supporting portions of the fourth lens L4 are scattered, it becomes easier to correct the mold of the second group frame 150, than to support with one large surface. In addition, since the supporting surfaces 155b are not arranged on the outer circumference side of the sixth lens L6, for example, even if a load acts on the supporting surfaces 155b when mounting the fourth lens L4, the shape of the mounting portion of the sixth lens L6 does not change. Therefore, the accuracy of mounting the sixth lens L6 does not deteriorate.

In addition, in the bonding step, sometimes the remaining adhesive agent drops like a thread from the tip portion of the needle that is used for filling the adhesive agent. However, since the non-contact surfaces 156m are formed in the vicinity of the adhesive pocket 156g, it is possible to attach the remaining adhesive agent on the non-contact surface by moving the needle above the non-contact surface 156m, and therefore, it is possible to prevent the remaining adhesive agent from attaching onto the supporting surfaces 155b that supports the fourth lens L4. By doing so, it is possible to prevent the accuracy of mounting the fourth lens L4 from deteriorating, and it is possible to obtain high optical performance. In addition, the non-contact surfaces 156m are arranged on the Y axis direction negative side with respect to the entrance surface L5g of the prism L5. Therefore, even if in the case that the adhesive agent is filled more than the capacity of the adhesive pocket 156g, the adhesive agent flowing out from the adhesive pocket 156g only spread onto the non-contact surfaces 156m, and does not flow inside the optically effective area of the entrance surface L5g.

5.5

In this lens barrel 31, since the positional relationship between the adhesive pocket 156g and the center of gravity G of the prism L5 is configured as shown in FIG. 17B, it is possible to efficiently support the area around the center of gravity G of the prism L5, and it is possible to fix the prism L5 firmly on the second group frame 150. Therefore, since it is possible to obtain the adhesive strength of the prism L5 even with the minimum adhesive area, it is possible to minimize the amount of the adhesive agent. Therefore, it is possible to reduce the time of the ultraviolet light irradiation to the adhesive agent, and it is possible to reduce the manufacturing cost.

In addition, since it is possible to minimize the range of the adhesive pockets 156g, it is not necessary to form the adhesive pockets 156g deeply. Therefore, it is possible to make the distance thereof to the reflecting surface L5a of the prism L5 greater, and it is possible to suppress the flow of the adhesive agent to the reflecting surface L5a from the adhesive pockets 156g, through the gap between the prism L5 and the second group frame 150.

5.6

In this lens barrel 31, as shown in FIG. 17A, since the groove portions 156i are included, even if the adhesive agent 156h flows into between the prism retaining frame 156 and the prism L5, the adhesive agent 156h accumulates in the groove portions 156i, and the adhesive agent 156h does not flow into between the reflecting surface L5a and the antireflection portion 156c. As a result, it is possible to prevent the adhesive agent 156h from attaching onto the reflecting surface L5a, and it is possible to prevent flare or ghost or the like from occurring due to unwanted reflected light.

Since wall portions 156j are included, it is possible to enlarge the space formed between the groove portions 156i and the prism L5, and it is possible to reliably prevent the adhesive agent 156h from flowing into between the reflecting surface L5a and the antireflection portion 156c. In addition, with the effect of the surface tension, the adhesive agent 156h does not flow to the side of the antireflection portion 156c, crossing over the wall portions 156j. Therefore, it is possible to reliably prevent problems such as flare or ghost from occurring due to unwanted reflected light. In addition, it is possible to obtain these effects, even with only either the groove portions 156i or the wall portions 156j.

In addition, since the antireflection portion 156c includes a plurality of concave-convex portions, it is possible to reduce unwanted reflected light, and it is possible to prevent flare or ghost or the like from occurring.

6: Other Matters

The embodiment of the present invention is described above. However, the present invention is not limited to the above described embodiment, and it is possible to make various changes within the scope not deviating from the substance of the invention. Below, other modified embodiments will be described. In addition, configurations identical with the above described embodiment will be described using the same numerals.

6.1: Examples of Modifications in the Fixation Method of the Lens

Examples on the modifications in the fixation method of the fourth lens L4, the prism L5, the sixth lens L6, and the seventh lens L7 described above will be described.

6.1.1: First Modified Embodiment

Figure 37:
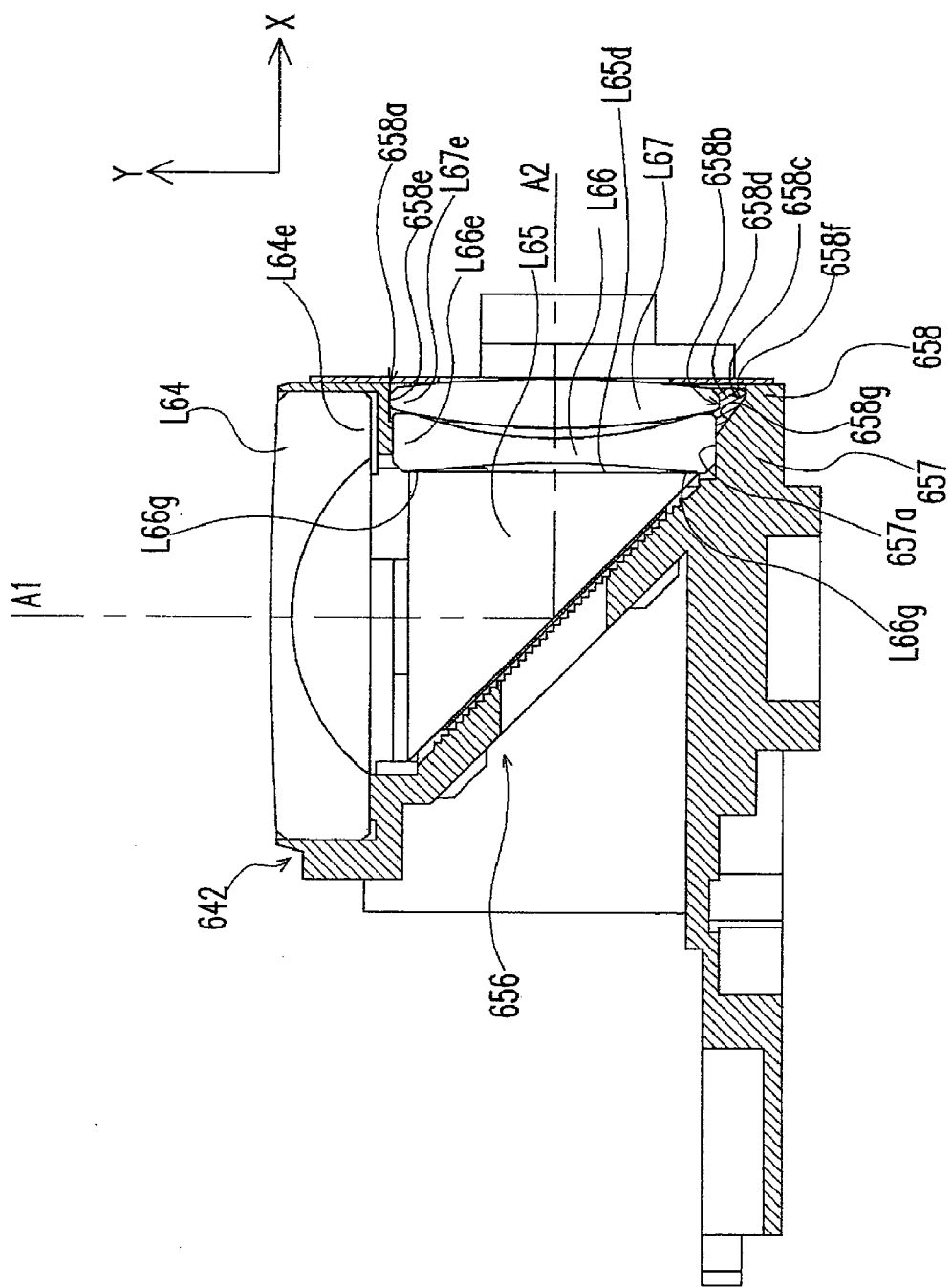
FIG. 37 is a figure showing a first modified embodiment of the fixation method of the lens.
Figure 38:
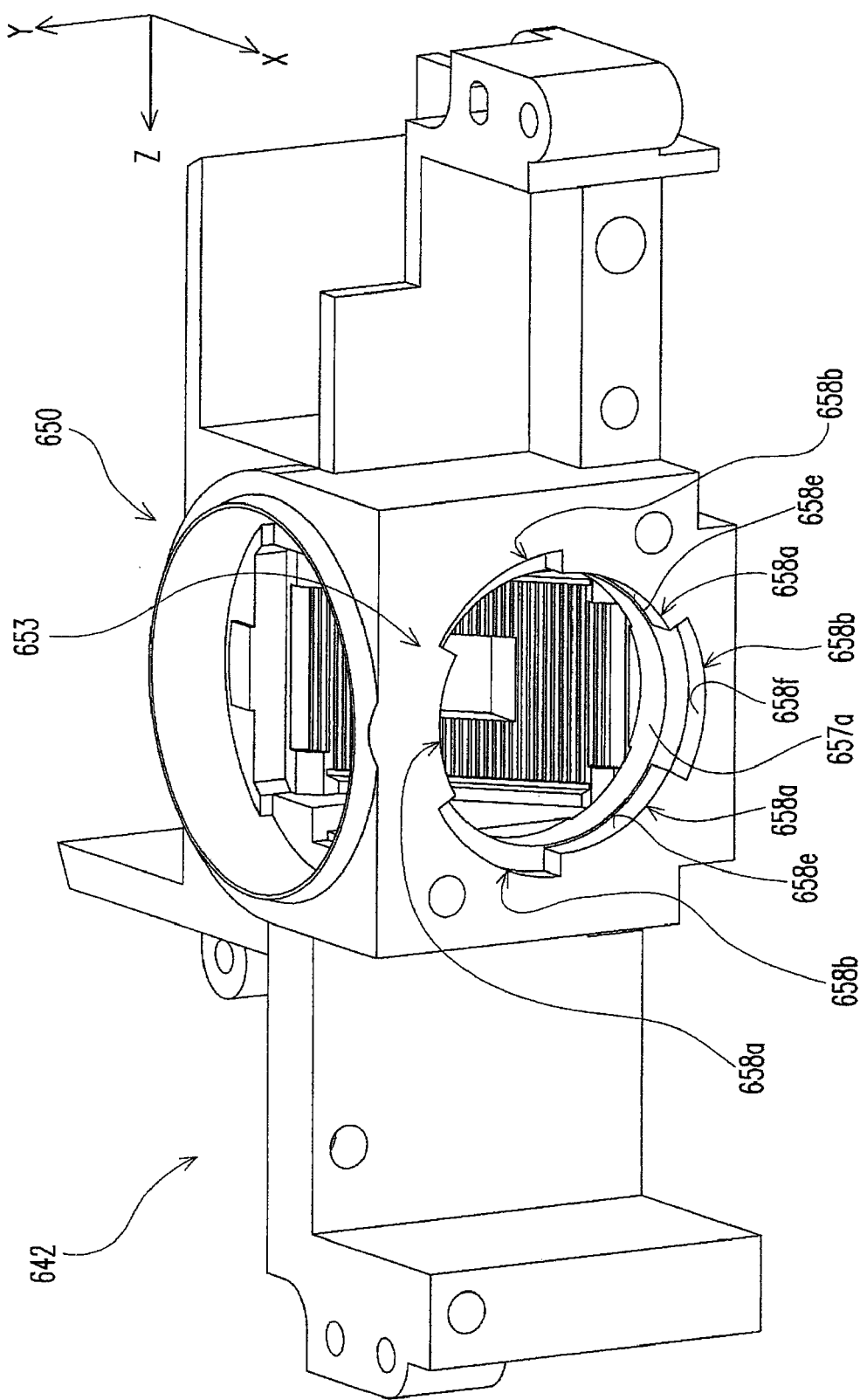
FIG. 38 is a side view looking from the X axis direction positive side of the second group frame.

Using FIGS. 37 and 38, a second group frame unit 642 as a first modified embodiment will be described. FIG. 37 is a section view of the second group frame unit 642, as the first modified embodiment. FIG. 38 is side elevation of the second group frame 650 looking from the X axis direction positive side. As shown in FIG. 37, in this second group frame unit 642, the shape of the portions corresponding to the supporting portions 158a and the fixation portions 158b of the seventh lens retaining frame 158 slightly differs, and the sixth lens L66, with the seventh lens L67, is fixed to the second group frame 650 via adhesive. More specifically, as shown in FIGS. 37 and 38, the second group frame 650 includes mainly the prism retaining frame 656, the sixth lens retaining frame 657, and the seventh lens retaining frame 658.

The sixth lens retaining frame 657 integral with the prism retaining frame 656 is formed, on the X axis direction positive side of the prism retaining frame 656. The sixth lens retaining frame 657 has an inner diameter that substantially matches the outer diameter of the sixth lens L66, and includes a circular inner circumference surface 657a that extends in the X axis direction. The sixth lens L66 fits in the sixth lens retaining frame 657, in the state of being in contact in the X axis direction with the output surface L65d of the prism L65.

The seventh lens retaining frame 658 integral with the sixth lens retaining frame 657 is formed, on the X axis direction positive side of the sixth lens retaining frame 657. The seventh lens retaining frame 658 includes three supporting portions 658a as second supporting portions that support the seventh lens L67 in the radius direction, and three fixation portions 658b as second fixation portions that fix the seventh lens L7 by adhesive and arranged between the adjacent supporting portions 658a. The supporting portions 658a and the fixation portions 658b correspond to the supporting portions 158a and the fixation portions 158b of the seventh lens retaining frame 158 in the above described embodiment. The supporting portions 658a in the present modified embodiment includes a first inner circumference surface 658e that forms a portion of an imaginary cylinder having an inner diameter substantially matching the outer diameter of the seventh lens L67. In the state of being in contact in the X axis direction with the sixth lens L66, the seventh lens L67 fits in the three supporting portions 658a.

The fixation portions 658b include a concave portion 658c as a second concave portion formed between the adjacent supporting portions 658a, and an adhesive agent 658d filled in the concave portion 658c. The concave portion 658c has a second inner circumference surface 658f that is opposite to the seventh lens L7, and the second inner circumference surface 658f forms a portion of an imaginary cylinder having a greater inner diameter than the first inner circumference surface 658e. In addition, on the X axis direction negative side of the second inner circumference surface 658f, a tapered surface 658g is formed, and is formed so that the radius thereof becomes smaller as it approaches the X axis direction negative side, and extends to the outer circumference portion on the X axis direction positive side of the sixth lens L66. In other words, the seventh lens L67 and the sixth lens L66 are fixed by adhesive to the seventh lens retaining frame 658 and the second group frame 650 including the seventh lens retaining frame 658, via the three fixation portions 658b.

In addition, each fixation portion 658b is arranged evenly in the circumferential direction, for example, positioned substantially on the 2 o'clock, 6 o'clock, and 10 o'clock positions looking from the X axis direction positive side (refer to FIG. 38). In other words, on the Y axis direction positive side of the opening portion 653 (12 o'clock position), a fixation portion 658b is not arranged.

As described above, in the second group frame unit 642 in the present modified embodiment, it is not necessary to conduct thermal caulking when fixing the lens, like it is done conventionally. With the thermal caulking, a large load acts on the second group frame 650 and the prism L65. It is possible to prevent the sixth lens L66 and the prism L65 from relatively moving. In addition, since the sixth lens L66 is in contact with the prism L65, even if the prism L65 contracts due to the change in temperature, and even if the prism L65 moves a little due to the vibration, it is possible to prevent the prism L65 and the sixth lens L66 from relatively moving. By doing so, it is possible to prevent the optical performance from deteriorating due to the relative displacement between the prism L65 and the sixth lens L66, and it is possible to obtain high optical performance.

In addition, it is possible to simultaneously attach the sixth lens L66 and the seventh lens L67 to the second group frame 650 via the fixation portions 658b. Therefore, compared to the case of separately attaching the sixth lens L66 and the seventh lens L67, it is possible to reduce the manufacturing steps, and it is possible to reduce the manufacturing cost.

In addition, since the sixth lens L66 fits in the sixth lens retaining frame 657, it becomes easy to position accurately in the Y axis direction and the Z axis direction of the sixth lens L66. Furthermore, since a flat surface portion L66g of the sixth lens L66, as a second flat surface portion arranged on the X axis direction negative side thereof, is in contact with the output surface L65d of the prism L65 as a second flat surface portion, it is easy to position accurately the sixth lens L66 in the X axis direction. Moreover, in addition to that, since it is configured to be in contact with the flat surfaces manufactured with high precision, positioning is easily possible without tilting the sixth lens L66 to the prism L65, and it is possible to obtain high optical performance.

In addition, the positioning of the seventh lens L67 in the Y axis direction and the Z axis direction is determined via the seventh lens retaining frame 658, and it is configured that the spherical surface on the X axis direction negative side thereof is in contact with the circular arc disposed on the interface between flat surface and the spherical surface of the sixth lens L66 on the X axis direction positive side, and therefore, it is possible to obtain high optical performance further easily. The reason is that, even if the seventh lens L67 rotates along the above described curve, the position of the spherical center of the spherical surface on the X axis direction negative side of the seventh lens L67 does not change. In addition, this configuration of the curved surface shape of the sixth lens L66 and the seventh lens L67 is not limited to spherical surfaces, and even if the sixth lens L66 and the seventh lens L67 are not in a shape of a spherical surface, if the configuration is the same with respect to the local curved surfaces around each of the contacting positions, it is possible to obtain the exact same effects. In addition, in the present invention, since the curvature radius of the two spherical surfaces of the seventh lens L67 is configured so that the one on the X axis direction negative side is smaller, the stability of the position of the spherical center of the above described spherical surface on the X axis direction negative side has a higher effect on the optical performance than that of the position of the spherical center of the spherical surface on the X axis direction positive side, and by adopting the above described configuration, it is possible to be manufactured more stably.

In this way, the characteristic of keeping the position of the spherical center of the spherical surface on the X axis direction negative side of the seventh lens L67 constant, is further achieved by fixing via adhesive the seventh lens using the fixation portions 658b, and it is also one effect of the present invention. When the seventh lens L67 is fixed by thermal caulking and the like, as it is done conventionally, an unequal load acts on the circumferential direction on the outer circumference portion of the seventh lens, and the uplift of the seventh lens L67 from the above described curve occurs frequently, as variations in the manufacturing in mass production. In this kind of situation, since the position of the spherical center on the X axis direction negative side of the seventh lens L67 moves in the Y axis or the Z axis direction (within the YZ flat surface), the optical performance deteriorates. However, in the configuration (or the assembly method to be described later) of the present invention, since the seventh lens L67 is fixed by adhesive, a load is not added on the outer circumference portion of the seventh lens, and it is possible to have the spherical surface on the X axis direction negative side of the seventh lens L67 stably contact with the circular arc disposed on the interface between the flat surface and the spherical surface on the X axis direction positive side of the sixth lens L66. In addition, when attaching the seventh lens L67, the center portion of the seventh lens L67 is pressed with extent of a load of 0.2 to 1.0 (kgf) on the X axis direction negative side from the X axis direction positive side while applying an adhesive agent, and the adhesive agent can be cured by ultraviolet light irradiation without releasing the pressing force.

Furthermore, in the present invention, since the sixth lens L66 and the seventh lens L67 are attached integrally at the same time, it is possible to further stabilize the contact state of the two. In other words, since a portion of the sixth lens L66 and the seventh lens L67 are arranged on the inner circumference side of the fixation portions 658b, the adhesive agent is filled in the concave portion 658c, and by applying ultraviolet light irradiation, it is possible to fix by adhesive the sixth lens L66 and the seventh lens L67 simultaneously on the sixth lens retaining frame 657 and the seventh lens retaining frame 658. In this case, as described above, by pressing the center portion of the seventh lens L67 on the X axis direction negative side, it is also possible to press the sixth lens L66 to the output surface L65d of the prism L65, and therefore, it is possible to fix the sixth lens L66 without tilting thereof to the prism L65. According to the above, it is possible to position and fix the relative positional relationship and the tilting of the prism 65, the sixth lens L66, and the seventh lens L67 extremely accurately.

In addition, as shown in FIG. 37, the fourth lens L64, the sixth lens L66, and the seventh lens L67 include a first facing portion L64e, a second facing portion L66e, and a third facing portion L67e that face in the Y axis direction. The first facing portion L64e is positioned in the outer circumference side of the fourth lens L64 and is a portion around the area on the Y axis direction negative side and on the X axis direction positive side, and the second facing portion L66e is positioned in the outer circumference side of the sixth lens L66 and is a portion on the Y axis direction positive side. As it is clear in FIGS. 37 and 38, the fixation portions 658b are arranged on regions other than between the first facing portion L64e and the second facing portion L66e, between the first facing portion L64e and the third facing portion L67e.

In this case, it is possible to reduce the distance between the first facing portion L64e and the second facing portion L66e or between the first facing portion L64e and the third facing portion L67e, and it is possible to arrange the fourth lens L64 near the sixth lens L66 and the prism L65. By doing so, it is possible to reduce the dimension in the Y axis direction of the lens barrel.

In addition, in the case of arranging the fourth lens L64 near the sixth lens L66 and the prism L65, for example, if the fixation portions 658b are arranged between the first facing portion L64e and the second facing portion L66e or the first facing portion L64e and the third facing portion L67e, the thickness of the second group frame 650 of this portion becomes extremely thin, and it becomes difficult to shape the second group frame unit at the time of integrally manufacturing by injection molding and the like. On the thinner portion, compared to other portions, at the time of injection molding, it is difficult to deliver resin, and shape accuracy deteriorates after cooling the injection molding. In addition, in a worst case, insufficient resin causes a short circuit, thus a hole appears between the first facing portion L64e and the second facing portion L66e. As a result, the shape accuracy (circularity, cylindricality) of the cylinder portion of the opening portion 653 deteriorates, and in a worst case, a burr protrudes in the opening portion 653 and assembly is not possible. In addition, also at the time of thermal caulking or fixing the fourth lens L64 by adhesive, strength of the second group frame 650 deteriorates if there is a thin portion, and the shape of the second group frame 650 changes due to the load added at the time of thermal caulking or fixing by adhesive, and the position accuracy of the fourth lens L64 deteriorates.

However, in this lens barrel, since the fixation portions 658b are arranged on regions other than between the first facing portion L64e and the second facing portion L66e, it becomes unnecessary to fix the fourth lens L64 or the sixth lens L66 to the thin portion, and it is possible to improve the accuracy of mounting the sixth lens L66, and it is possible to prevent the fixing strength of the sixth lens L66 from deteriorating.

In addition, in the embodiment described above, it is possible for the portion having the same configuration to obtain the same effects described above.

6.1.2: Second Modified Embodiment

Figure 39:
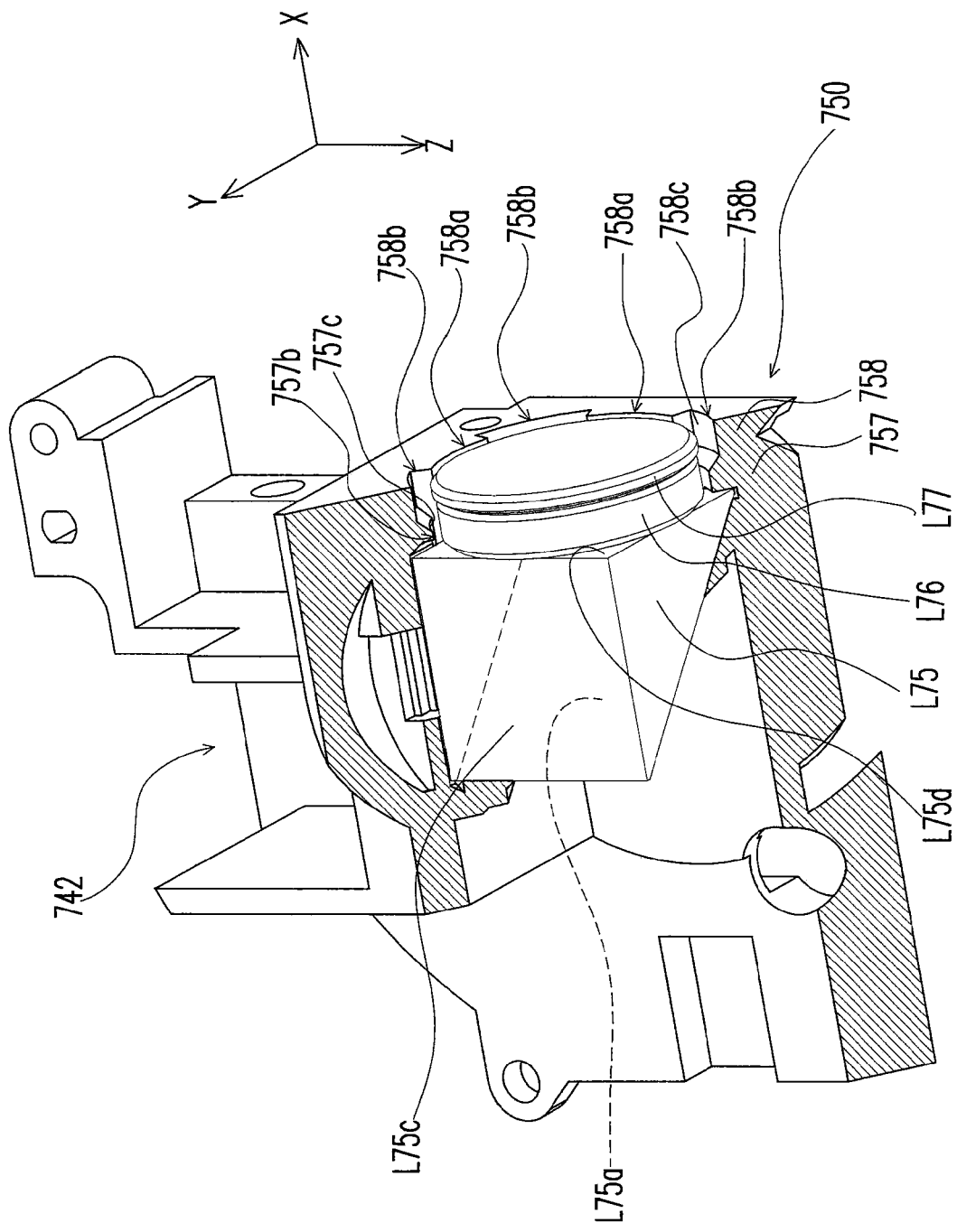
FIG. 39 is a figure showing a second modified embodiment of the fixation method of the lens.
Figure 40:
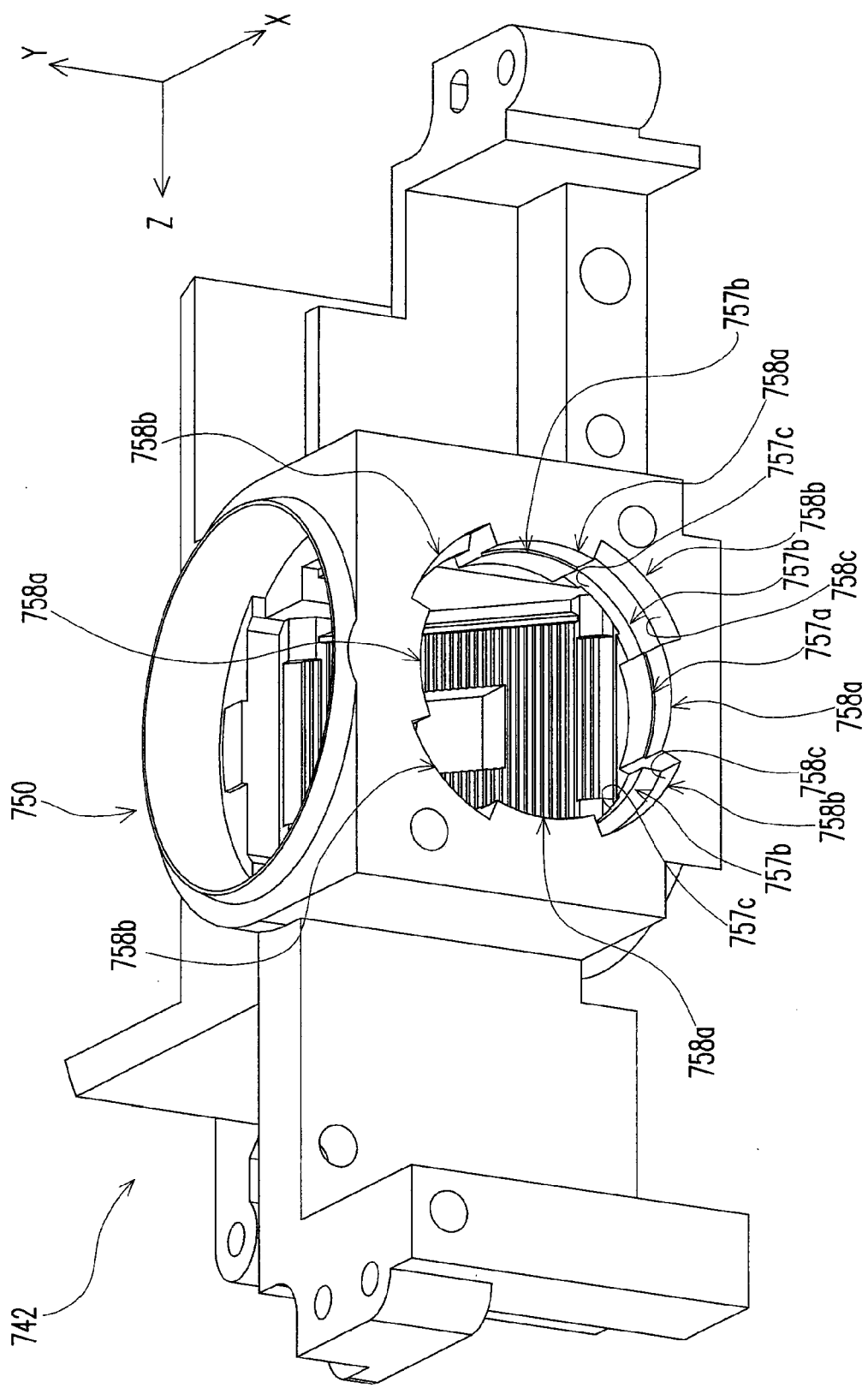
FIG. 40 is a side view looking from the X axis direction positive side of the second group frame.

Using FIGS. 39 and 40, a second group frame unit 742 as a second modified embodiment will be described. FIG. 39 is a perspective view of the second group frame unit 742 as the second modified embodiment, being cut out in a direction at an angle of 45 degrees. In FIG. 39, the prism L75, the sixth lens L76, and the seventh lens L77 are shown as they are, without cutting away. FIG. 40 is a side view looking from the X axis direction positive side of the second group frame 750 as the second modified embodiment.

As shown in FIG. 39, the second group frame 750 of this second group frame unit 742 includes a sixth lens retaining frame 757 and a seventh lens retaining frame 758, same as the first modified embodiment described above. The seventh lens retaining frame 758 includes second supporting portions 758a corresponding to the supporting portions 658a, and second fixation portions 758b corresponding to fixation portions 658b. In this modified embodiment, different from the above described first modified embodiment, four second supporting portions 758a and four second fixation portions 758b are arranged, and the second fixation portions 758b are positioned substantially on the 2 o'clock, 5 o'clock, 8 o'clock, and 11 o'clock positions, looking from the X axis direction positive side. In other words, the second fixation portions 758b are arranged on positions corresponding to areas around the four corners of the output surface L75d of the prism L75.

In addition, different from the first modified embodiment, in this second group frame 750, furthermore, the sixth lens retaining frame 757 includes four first supporting portions 757a and four first fixation portions 757b. The first supporting portions 757a and the first fixation portions 757b are arranged in positions corresponding to the second supporting portions 758a and the second fixation portions 758b. In a state that the sixth lens L76 an the seventh lens L77 are fitted, the first concave portion 757c of the first fixation portions 757b and the second concave portion 758c of the second fixation portions 758b are in communication in the X axis direction. In other words, in the above described first modified embodiment, the concave portion 658c of the fixation portions 658b in which adhesive agent is filled, only had a depth that reaches the sixth lens L66, but in the present modified embodiment, it has a depth that reaches the prism L75.

In this case, when adhesive agent is filled in the second concave portion 758c, the adhesive agent also fills the first concave portion 757c, and as a result, the sixth lens L76 and the seventh lens L77 are fixed by adhesive to the sixth lens retaining frame 757 and the seventh lens retaining frame 758, and in addition to that, the sixth lens L76 and the prism L75 are fixed by the adhesive. For this reason, the sixth lens L76 retains the prism L75, and it is possible to prevent the prism L75 from relatively moving to the X axis direction negative side. In addition, since the first concave portion 757c and the second concave portion 758c are in communication in the X axis direction, by filling adhesive agent in the second concave portion 758c, it is easily possible to fix by adhesive the prism L75, the sixth lens L76, and the seventh lens L77. In addition, same as the first modified embodiment, since the sixth lens L76 is fixed in a state of being in contact with the prism L75, the two do not relatively move, and it is possible to prevent the optical performance from deteriorating, and it is possible to obtain high optical performance.

In addition, in this case, in order to have the adhesive agent filled in the second concave portion 758c property reach the output surface L75d of the prism L75, as shown in FIG. 40, the second fixation portions 758b are arranged on portions corresponding to areas around the four corners of the prism L75. By arranging the second fixation portions around the four corners this way, the adhesive agent filled in the fixation portions 752 reaches the entrance surface L75c and the reflecting surface L75a of the prism L75, and it also has an effect of being able to simultaneously prevent the problem of the deterioration of optical performance.

6.1.3: Third Modified Embodiment

Figure 41:
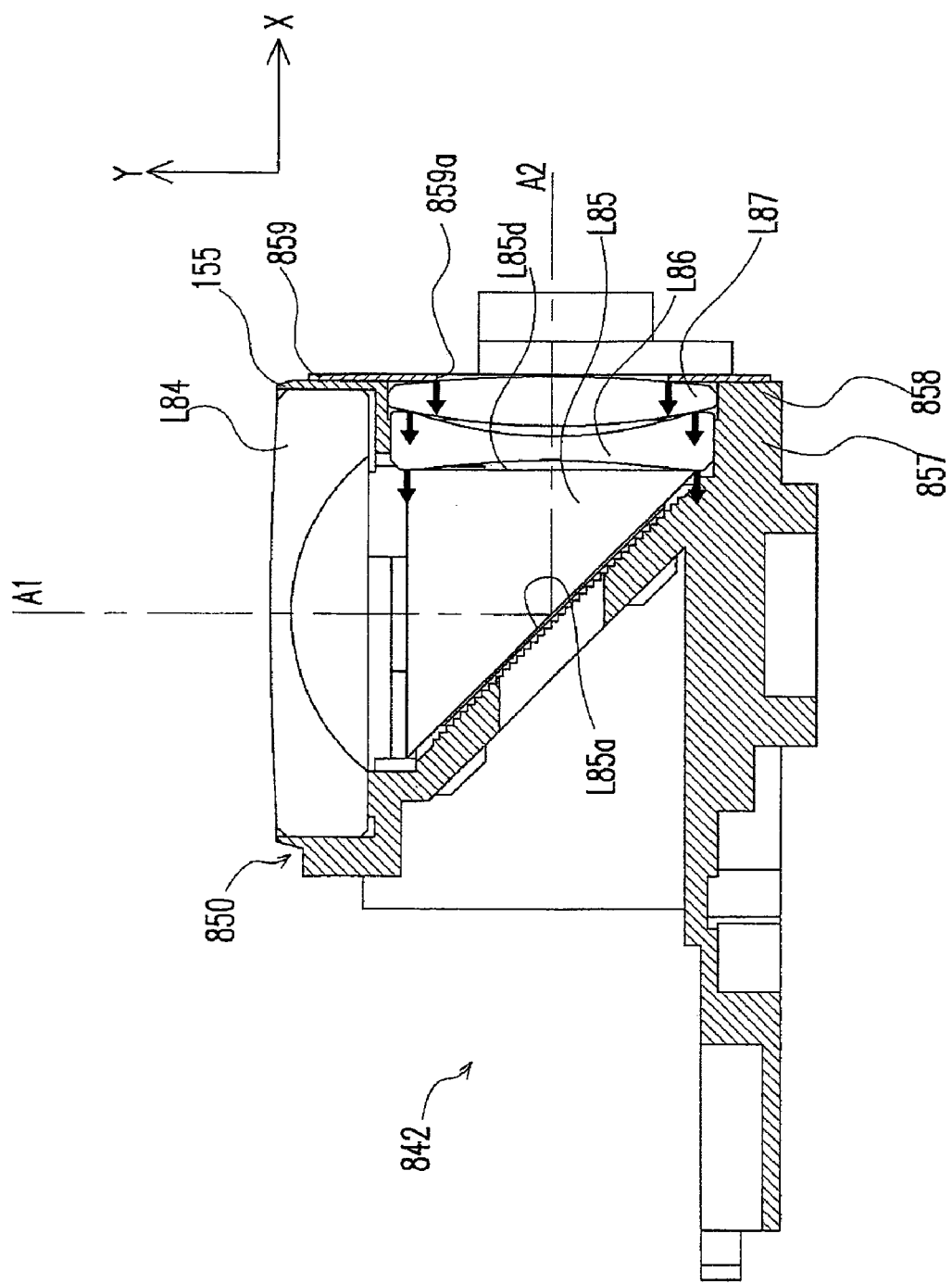
FIG. 41 is a figure showing a third modified embodiment of the fixation method of the lens.
Figure 42:
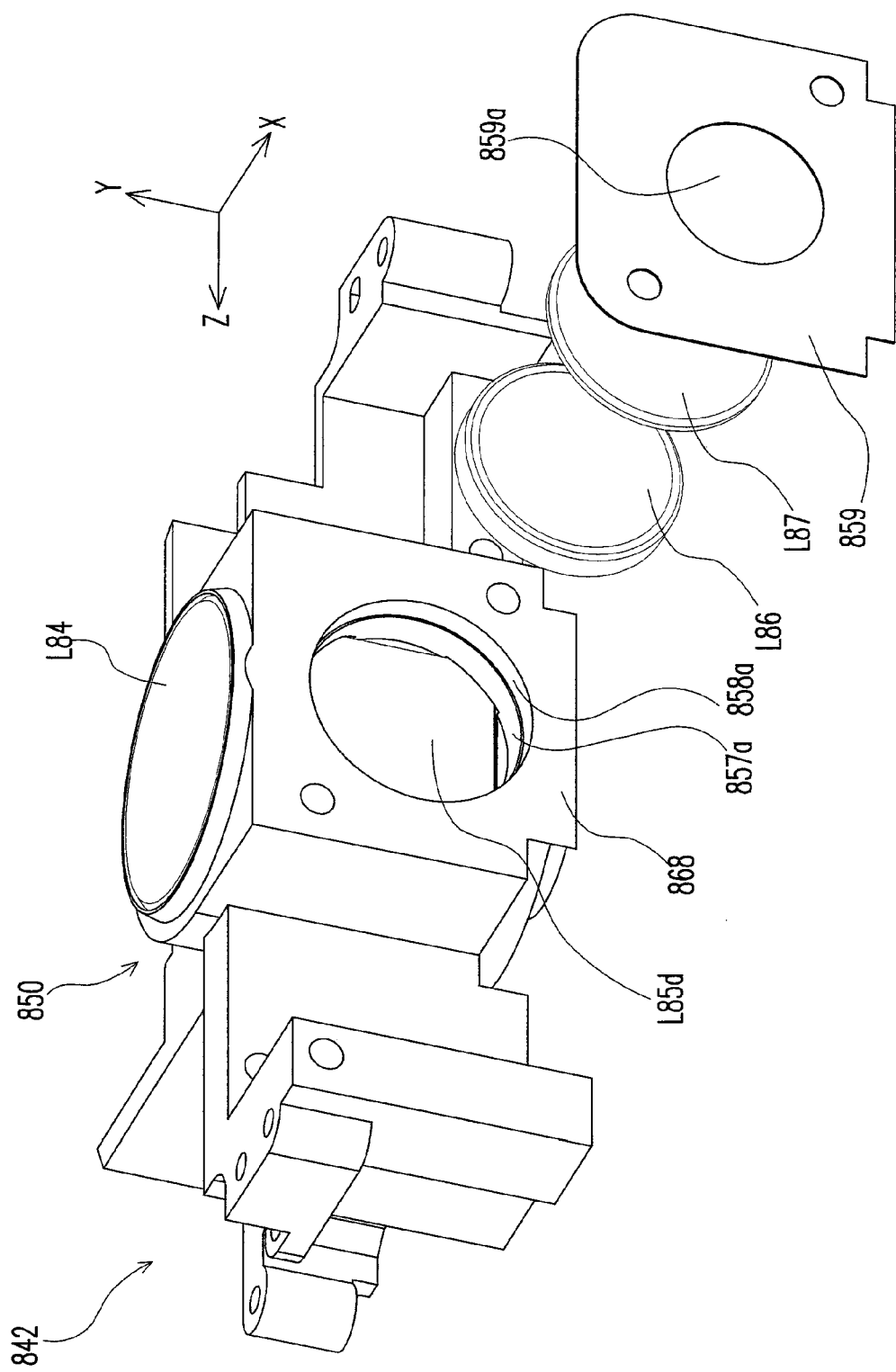
FIG. 42 is an exploded perspective view of the second group frame unit as the third modified embodiment.
Figure 43:
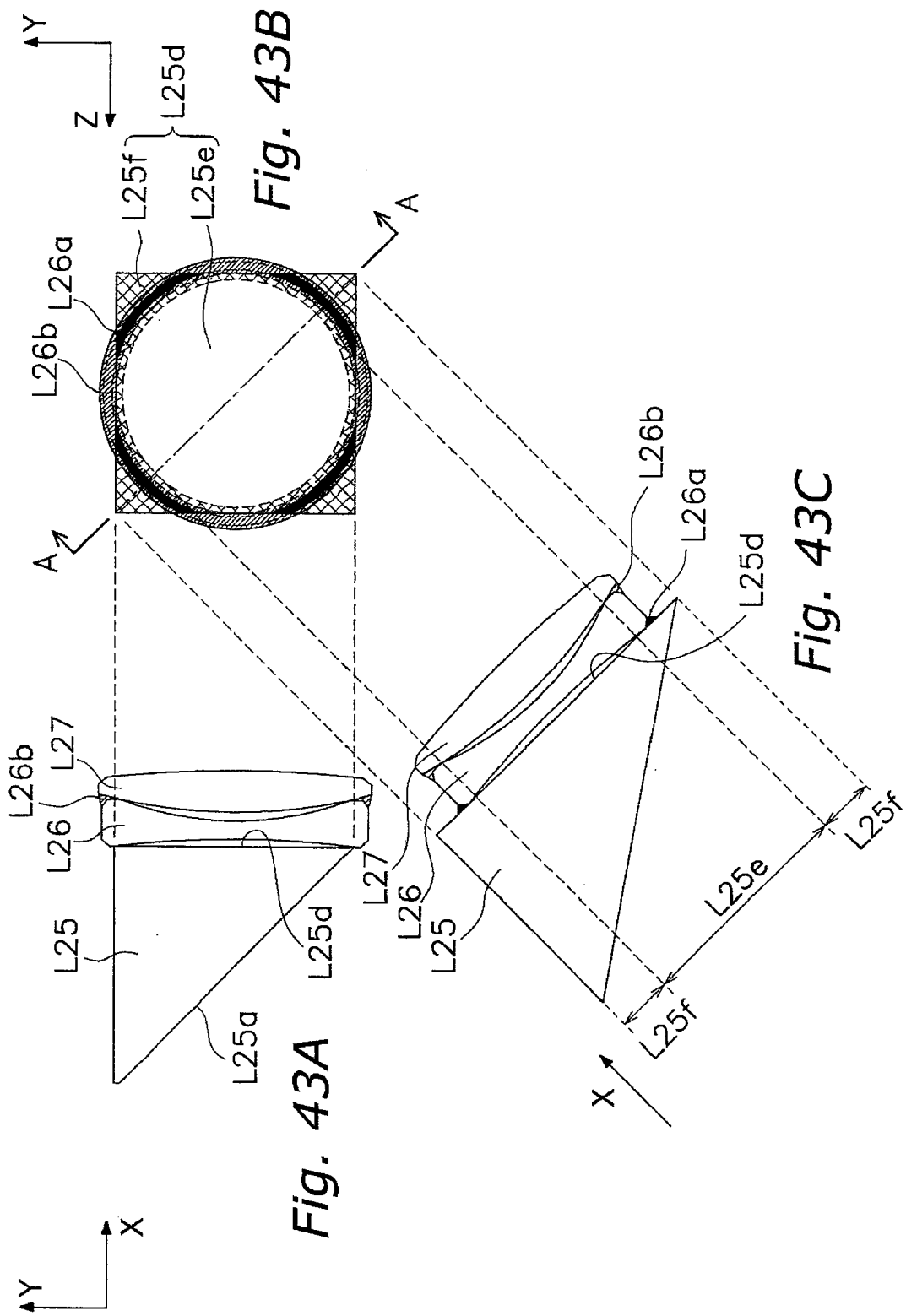
FIGS. 43A to 43C are figures showing a fourth modified embodiment of the fixation method of the lens.

Using FIGS. 41 and 42, a second group frame unit 842 as a third modified embodiment will be described. FIG. 41 is a section view of the second group frame unit 842 as the third modified embodiment. FIG. 42 is an exploded perspective view of the second group frame unit 842 as the third modified embodiment. As shown in FIGS. 41 and 42, in this second group frame unit 842, the sixth lens L86 and the seventh lens L87 are not fixed by adhesive, and are biased via a biasing member having elastic force. More specifically, the second group frame 850 of the second group frame unit 842 includes the sixth lens retaining frame 857 and the seventh lens retaining frame 858, but different from the first and the second modified embodiments, it does not include portions corresponding to fixation portions. The sixth lens retaining frame 857 and the seventh lens retaining frame 858 both include inner circumference surfaces 857a and 858a that are almost completely circular. The sixth lens L86 and the seventh lens L87 fit in the inner circumference surface 857a of the sixth lens retaining frame 857 and the inner circumference surface 858a of the seventh lens retaining frame 858, and are able to move in the X axis direction. The prism L85 is fixed by adhesive to the second group frame 850, and the surface on the X axis direction negative side of the sixth lens L86 is in contact with the output surface L85d. The surface on the X axis direction negative side of the seventh lens L87 is in contact with the sixth lens L86.

On the X axis direction positive side of the second group frame 850, an opening member 859 as a biasing member is fixed by a screw. The opening member 859 is a plate member having an opening 859a on almost the center portion thereof, and is mounted to the seventh lens retaining frame 868 so that the center of the opening 859a matches the second optical axis A2. The portion that fixes the opening member 859 of the second group frame 850 via the screw is arranged on the X axis direction negative side with respect to the seventh lens L87. For this reason, the inner circumference edge (outer circumference edge of the opening 859a) of the opening member 859 is in contact in the X axis direction with the seventh lens L87, and the opening member 859 is fixed in a state where the opening member 859 thereof is elastically deformed on the X axis direction positive side. In other words, via the elastic force of the opening member 859, the seventh lens L87 is biased to the X axis direction negative side. By doing so, the sixth lens L86 and the seventh lens L87 are held down in a state of being in contact with the prism L85.

In this case, even if the prism L85 moves with respect to the second group frame 850, the sixth lens L86 and the seventh lens L87 follow the movement of the prism L85. Therefore, the positions of the sixth lens L86 and the seventh lens L87 are kept constant with respect to the reflecting surface L85a of the prism L85, and it is possible to obtain high optical performance. In addition, since adhesive agent is not used, it is possible to omit the step of filling the adhesive and the step of the ultraviolet light irradiation, and it is possible to reduce manufacturing cost. Furthermore, since the opening member 859 is a platy member, it hardly protrudes out to the X axis direction positive side from the second group frame unit 842. For this reason, it is possible to bring the second group frame unit 842 and the third group frame unit 44 close, prevent zoom magnification from deteriorating, and it is possible to obtain the above described effects.

In addition, it is not necessary for the opening member 859 to be a different member from the second group frame 850, for example, the configuration may be such that the seventh lens retaining frame 158 is a separate member from the second group frame 850, the opening member 859 is integrated with the seventh lens retaining frame 858, and the integrated opening member 859 and the seventh lens retaining frame 858 are mounted to the second group frame 850.

In addition, in the case of having the fourth lens L84 contact with the prism L85, the opening member 859 is fixed to the fourth lens retaining frame 155. It is possible to obtain the above described effects also in this case. In addition, the configuration may be such that the fourth lens retaining frame 155 and the opening member 859 are integrated.

6.1.4: Fourth Modified Embodiment

Using FIGS. 13 and 43A to 43C, a second group frame unit as a fourth modified embodiment will be described. FIG. 43A is a section view of the prism L25, the sixth lens L26, and the seventh lens L27 in a plane including the X axis and the Y axis, FIG. 43B is a figure looking from the X axis direction, and FIG. 43C is a section view at A-A in FIG. 43B.

In the above described modified embodiment, the sixth lens and the seventh lens are fixed to the second group frame. However, in the present modified embodiment, these lenses are fixed directly to the prism without being fixed to the second group frame. More specifically, as shown in FIG. 43B, the surface on the X axis direction negative side of the sixth lens L26 is in contact with the area around the four corners of the output surface L25d, and an adhesive agent L26a is filled in four places between the chamfered portion on the outer circumference side of the sixth lens L26 and the output surface L25d of the prism L25. In this way, the sixth lens L26 is directly fixed to the prism L25, in a state of being in contact with the output surface L25d of the prism L25. In other words, the sixth lens L26 is fitted in the sixth lens retaining frame, but not fixed to the sixth lens retaining frame.

As described above, the sixth lens L26, not through the second group frame, is fixed directly to the prism L25. As a result, the prism L25 and the sixth lens L26 include an integrated lens group.

In addition, the seventh lens L27 is fixed by adhesive to the sixth lens L26. More specifically, as shown in FIGS. 43A and 43C, the surface on the X axis direction negative side of the seventh lens is in contact with the surface on the X axis direction positive side of the sixth lens L26. The adhesive agent L26b is filled between the chamfered portion on the outer circumference side of the sixth lens L26 and the seventh lens L27, and the seventh lens L27 is directly fixed to the sixth lens L26 in a state of being in contact with the sixth lens L26. In other words, the seventh lens L27 is fitted in the seventh lens retaining frame 258, but not fixed to the seventh lens retaining frame 258.

As described above, the seventh lens L27, not through the second group frame 250, is fixed directly to the sixth lens L26. As a result, the prism L25, the sixth lens L26, and the seventh lens L27 include an integrated lens group.

In this way, since the sixth lens L26 and the seventh lens L27 are fixed directly to the prism L25, without being fixed to the second group frame, even if the accuracy of mounting with respect to the second group frame of the prism L25 slightly deteriorates, the sixth lens L26 and the seventh lens L27 follow the movement of the prism L25. As a result, it is possible to keep the positions of the sixth lens L26 and the seventh lens L27 with respect to the reflecting surface L25a constant. As a result, it is possible to prevent optical performance from deteriorating due to the relative displacement between the prism L25, the sixth lens L26, and the seventh lens L27, and it is possible to obtain high optical performance of the entire lens barrel.

In addition, normally, the surface dimensional accuracy of the prism L25 is high, compared to the second group frame. Therefore, by having the sixth lens L26 contact with the prism L25, and positioning the sixth lens L26 with reference to the surface of the prism L25, it is possible to suppress the fluctuation in the position of the sixth lens L6 with respect to the reflecting surface L25a, and it is possible to obtain a higher optical performance of the entire lens barrel 31.

Furthermore, same as the above described embodiment, the sixth lens L26 is fixed by adhesive to the optically ineffective area L25f arranged on the outer circumference side of the optically effective area L25e of the output surface L25d of the prism L25. Therefore, the attached portion does not affect the optical performance.

6.1.5: Fifth Modified Embodiment

Figure 44:
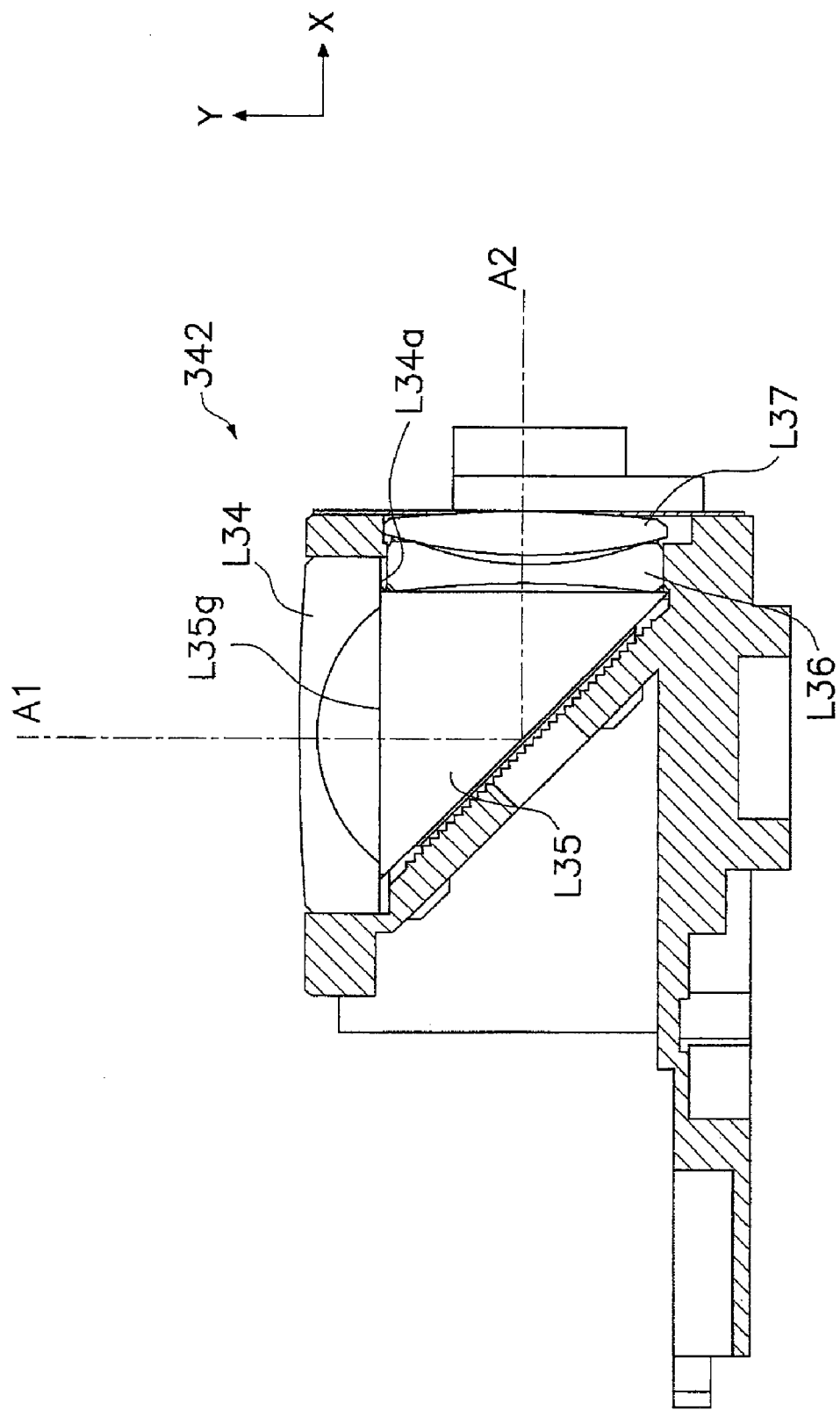
FIG. 44 is a figure showing a fifth modified embodiment of the fixation method of the lens.
Figure 45:
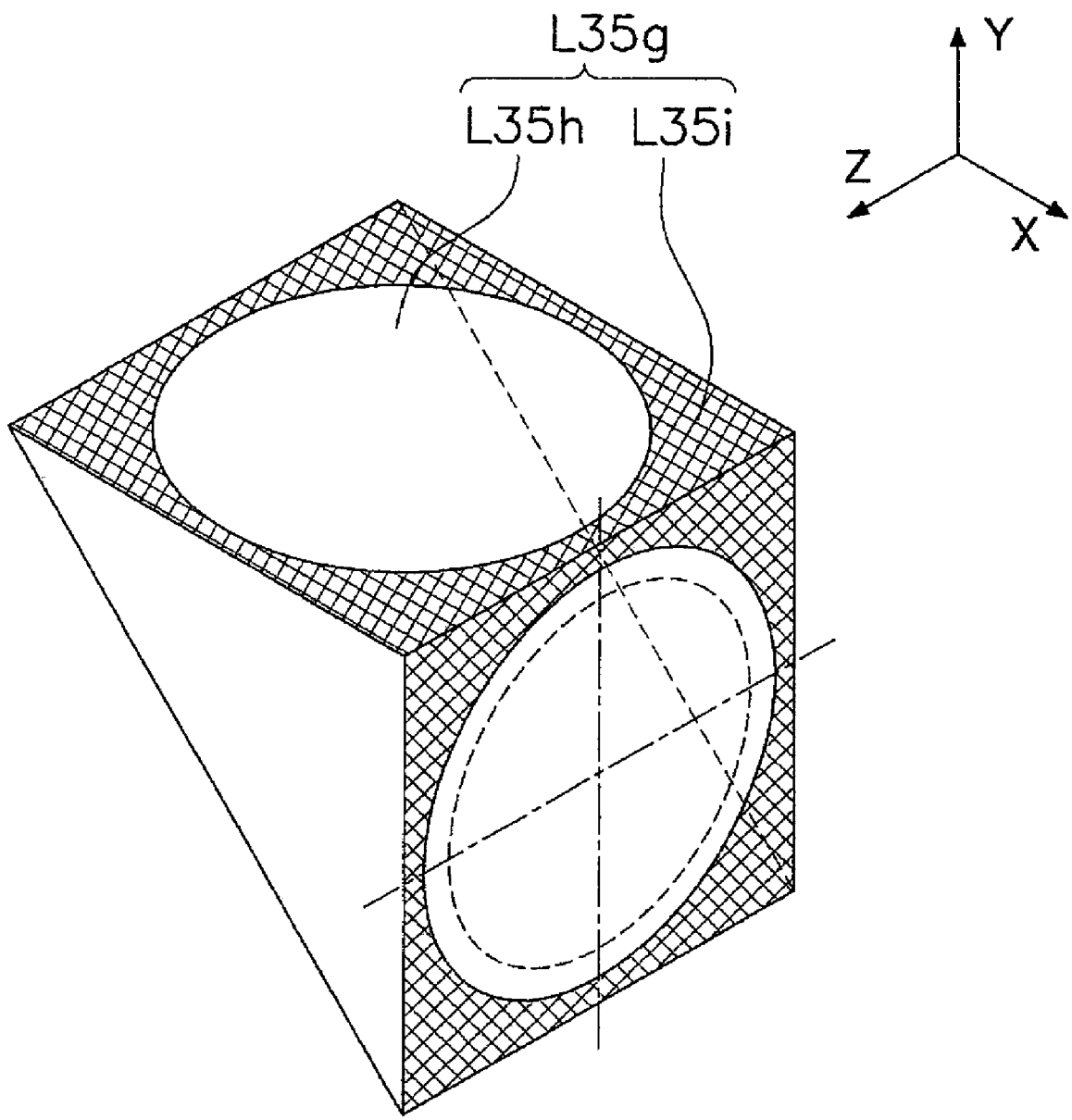
FIG. 45 is a perspective view of a prism in the fifth modified embodiment of the fixation method of the lens.

Using FIGS. 44 and 45, a second group frame unit 342 as a fifth modified embodiment will be described. FIG. 44 is a section view of the second group frame unit 342 as the fifth modified embodiment. FIG. 45 is a perspective view of the prism L35.

As shown in FIG. 44, in this second group frame unit 342, in addition to the sixth lens L36 and the seventh lens L37, a fourth lens L34 is fixed by adhesive to the entrance surface L35g, as a first flat surface portion of the prism L35. More specifically, the fourth lens L34 has an outer diameter that is smaller than the fourth lens L4 of the above described embodiment, and includes a circular flat surface L34a as a first flat surface portion on the Y axis direction negative side. The inner circumference side of the circular flat surface L34a is in contact with the entrance surface L35g of the prism L35. The fourth lens L34 is fixed by an adhesive agent in a state of being in contact with the prism L35.

In addition, as shown in FIG. 45, the entrance surface L35g of the prism L35 includes an optically effective area L35h as a first region, and an optically ineffective area L35i as a second region. The optically effective area L35h includes a region through which the light flux from the fourth lens L34 passes. For this reason, the optically effective area L35h can be said to be a region that directly affects the optical performance. On the other hand, the optically ineffective area L35i is arranged on the outer circumference side of the optically effective area L35h, and is a region through which the light flux from the fourth lens L34 does not pass. Therefore, the optically ineffective area L35i can be said to be a region that does not directly affect the optical performance. However, since there is the possibility that unwanted light reflects in the optically ineffective area L35i and indirectly affects the optical performance, a black color light shielding material, for example, Indian ink and the like, is applied on the optically ineffective area L35i. Furthermore, the fourth lens L34 is in contact with the optically ineffective area L35i, same as the above described embodiment.

In this case, the fourth lens L34, the prism L35, the sixth lens L36, and the seventh lens L37 include an integrated lens group. By doing so, it is possible to obtain high optical performance of the entire lens barrel 31. In addition, since the fourth lens L34 is in contact with the optically ineffective area L35i of the prism L35, the fourth lens L34 does not touch the optically effective area L35h of the entrance surface L35g. As a result, the light flux passing through the fourth lens L34 is not affected by the contact portion of the entrance surface L35g and the fourth lens L34. Therefore, it is possible to prevent the optical performance from deteriorating by the contact portion of the fourth lens L34, and it is possible to obtain high optical performance. Furthermore, since a light shielding material is applied to the optically ineffective area L35i of the entrance surface L35g, it is possible to prevent unwanted light other than the light flux passing through the fourth lens L34 from entering the prism L35, or reflecting in the optically ineffective area L35i. Therefore, it is possible to prevent flare or ghost or the like from occurring. In particular, with the repeated reflection between the surface of the prism L35 and the fourth lens L34, the interference of light, flare or ghost or the like are not likely to occur.

6.1.6: Sixth Modified Embodiment

Figure 46:
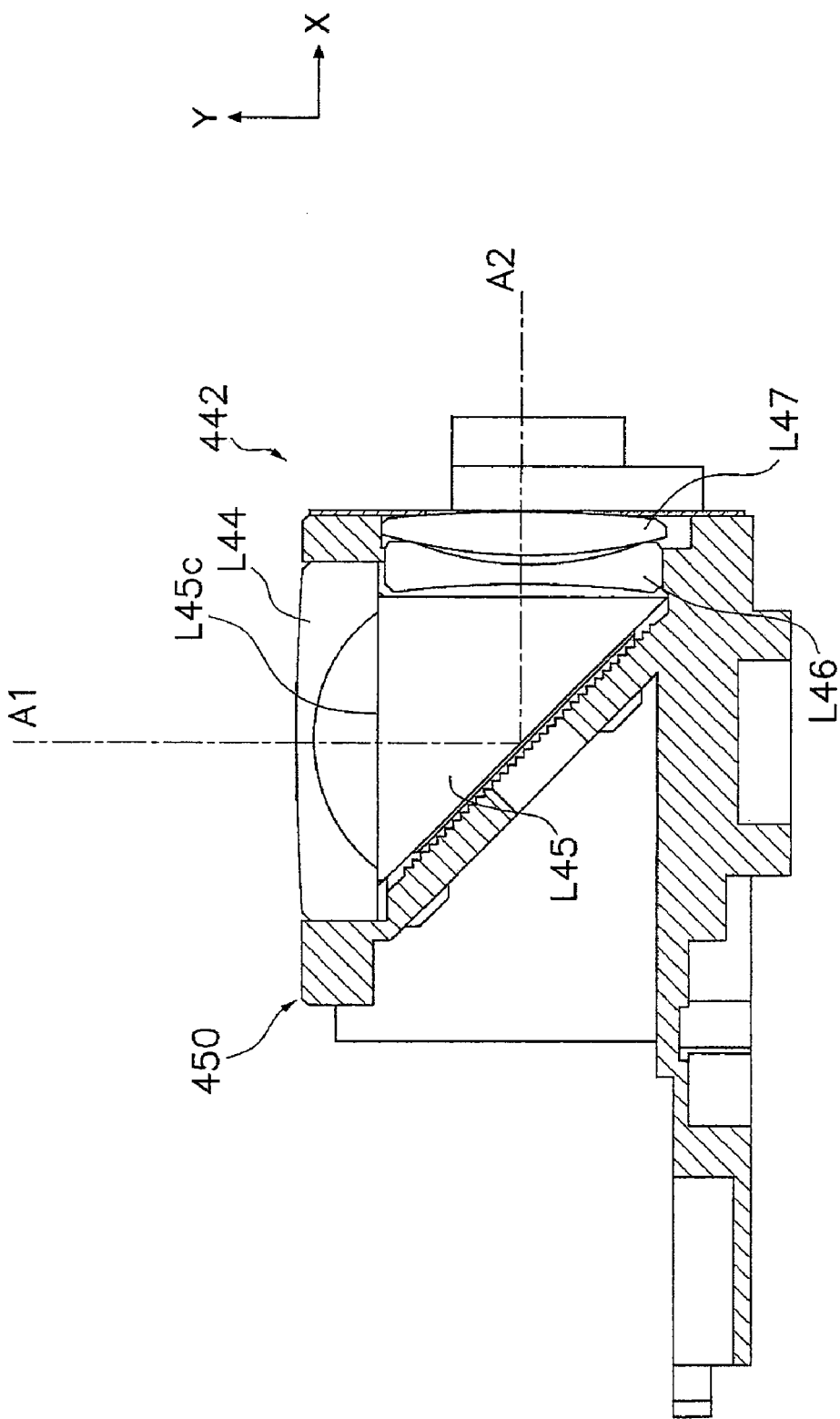
FIG. 46 is a figure showing a sixth modified embodiment of the fixation method of the lens.

Using FIG. 46, a second group frame unit 442 as a sixth modified embodiment will be described. FIG. 46 is a section view of the second group frame unit 442 as a sixth modified embodiment. As shown in FIG. 46, in this second group frame unit 442, the fourth lens L44 is fixed by adhesive to the entrance surface L45c of the prism L45. However, the sixth lens L46 and the seventh lens L47 are fixed to the second group frame 450, without directly fixing by adhesive to the prism L45. Even in this case, it is possible to prevent the fourth lens L44 and the prism L45 from relatively moving, and it is possible to obtain high optical performance.

6.1.7: Seventh Modified Embodiment

Figure 47:
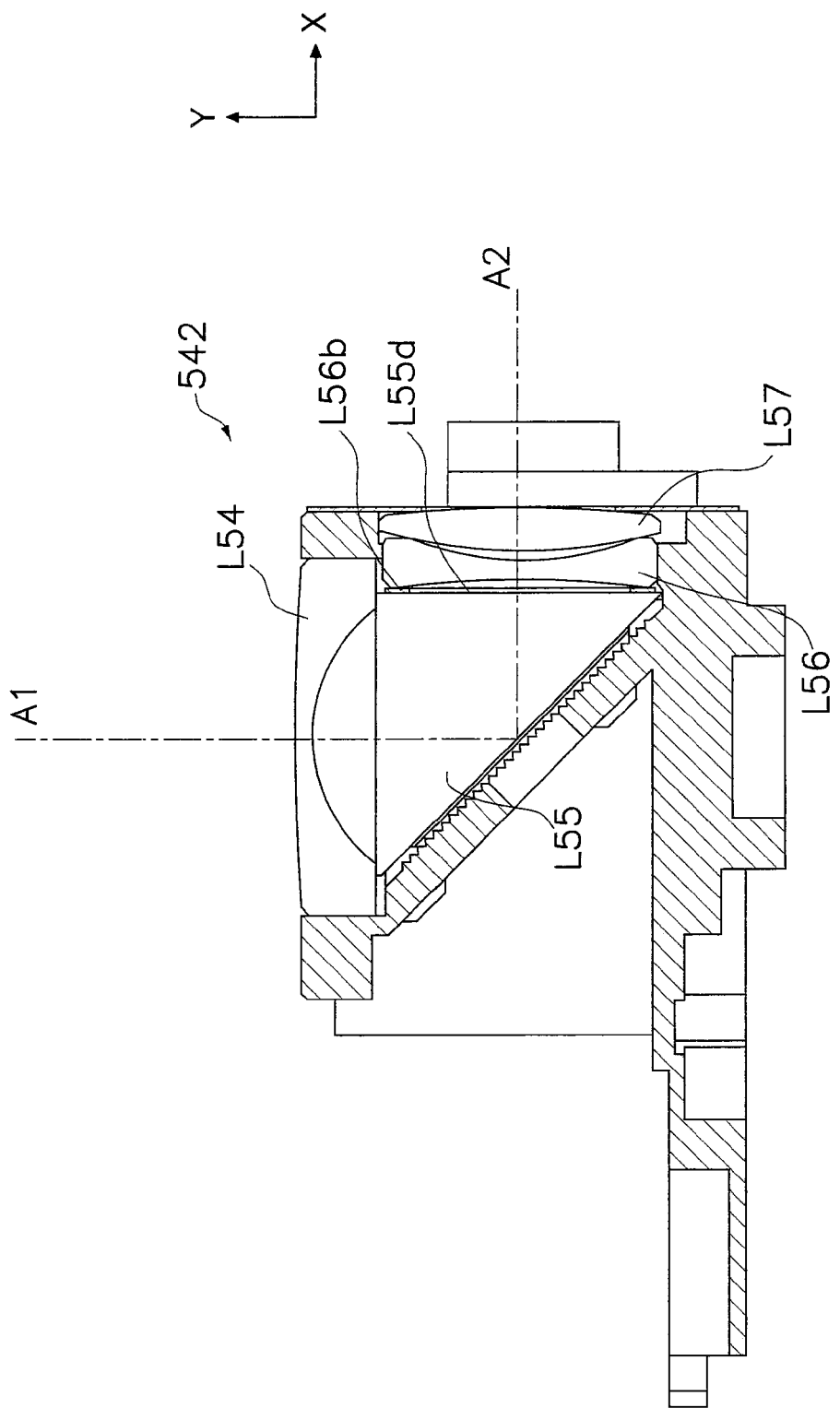
FIG. 47 is a figure showing a seventh modified embodiment of the fixation method of the lens.

Using FIG. 47, a second group frame unit 542 as a seventh modified embodiment will be described. FIG. 47 is a section view of the second group frame unit 542 as the seventh modified embodiment. As shown in FIG. 47, in this second group frame unit 542, a light shielding sheet L56b (light shielding member) is sandwiched between the prism L55 and the sixth lens L56, and the light shielding sheet L56d and the sixth lens L56 are fixed by adhesive to the output surface L55d of the prism L55. The light shielding sheet L56b is a circular member, and includes an opening having an inner diameter that is nearly equal to the outer diameter of the optically effective area L5e of the first embodiment described above. The seventh lens L7 is fixed by adhesive to the sixth lens L6, same as the embodiment described above. In this case, the light shielding sheet L56d functions the same as the light shielding material that filled in the optically ineffective area L5f of the first embodiment described above. Furthermore, by preparing light shielding sheets L56d having different thicknesses, and by selecting and assembling the light shielding sheet L56d having the optimal thickness with respect to the fluctuation in the accuracy of processing the thickness of the sixth lens L56, it is possible to suppress the variation of focusing length due to the fluctuation in the accuracy of processing the sixth lens L56, and it is possible to obtain fine optical performance. In addition, since the prism L55, the light shielding sheet L56d, and the sixth lens L56 include an integrated lens group, it is possible to obtain high optical performance of the entire lens barrel. In addition, in the present embodiment, the light shielding sheet L56d is arranged between the prism L55 and the sixth lens L56, but it may be arranged between the prism L55 and the fourth lens L54. In this case, the light shielding sheet L56b is a circular member having an opening with an inner diameter that is nearly equal to the outer diameter of the optically effective area L35h described in the fifth modified embodiment described above. By preparing light shielding sheets L56b having different thicknesses, and by selecting and assembling the light shielding sheets L56b having different thickness corresponding to the fluctuation in the accuracy of processing the fourth lens L54, it is possible to further suppress the variation of focusing length due to the fluctuation in the accuracy of processing the fourth lens L54.

6.2: Modified Embodiment of the Prism L5

6.2.1: First Modified Embodiment

Figure 48:
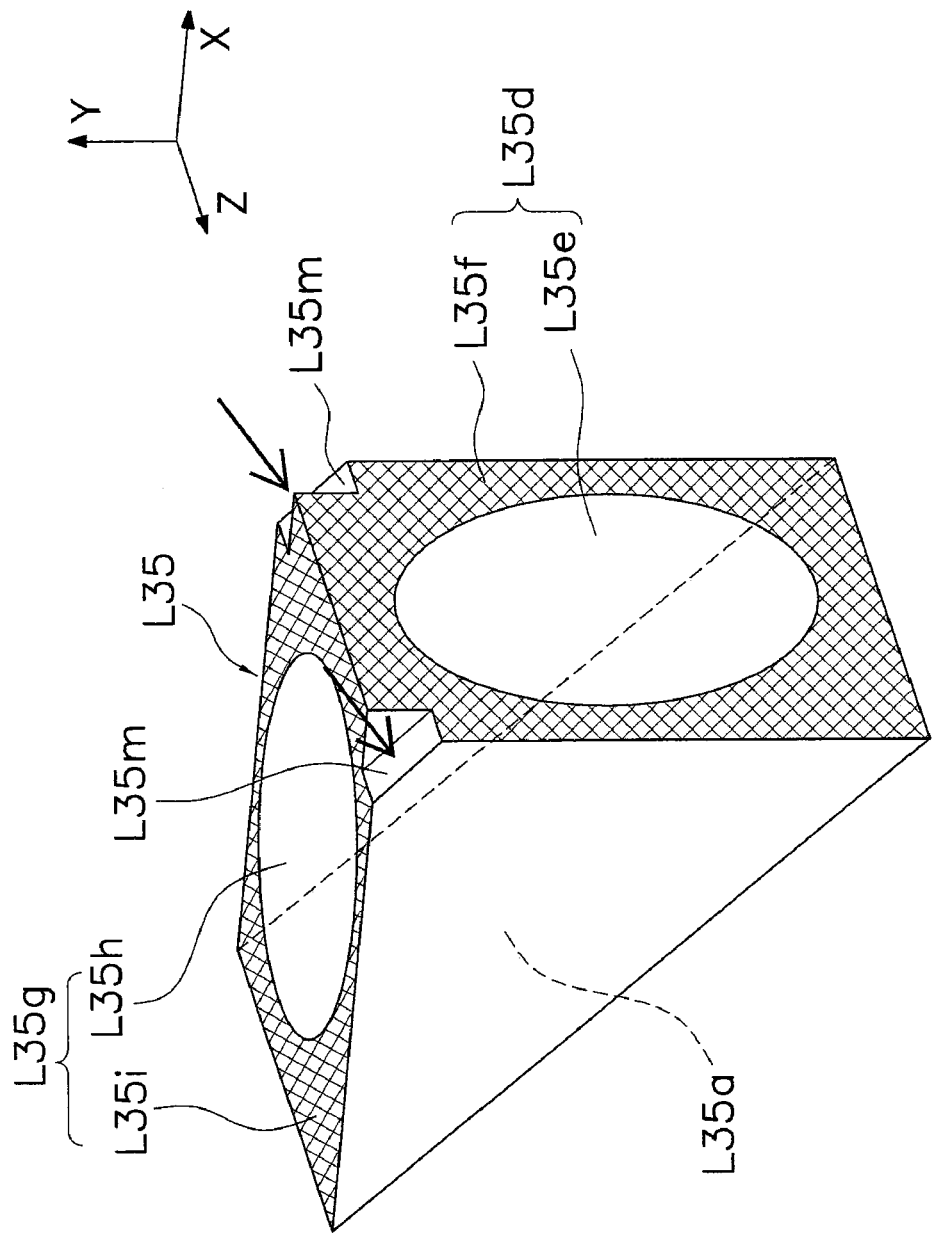
FIG. 48 is a perspective view of a prism as a first modified embodiment.

Using FIG. 48, a prism L35 as a first modified embodiment will be described. FIG. 48 is a perspective view of the prism L35. As shown in FIG. 48, this prism L35 includes two first pressing surfaces L35m. The first pressing surfaces L35m are surfaces parallel to the reflecting surface L35a, and are formed in the corners on the opposite side of the reflecting surface L35a. The corners of the prism L35 are removed by, for example, cutting and the like. The portions that are removed are arranged on the optically ineffective areas L35f and L35i of the entrance surface L35g and the output surface L35d, and therefore, they do not affect the optical performance of the prism L35.

In the bonding step, by holding the first pressing surfaces L35m down, it is possible to add a load to the prism L35 in the direction perpendicular to the reflecting surface L35a. As a result, it is possible to fix the prism L35 to the second group frame 150, in a state where the reflecting surface L35a is pressed to the first contact portion 156d. Therefore, it is possible to improve the accuracy of mounting the prism L35, and it is possible to obtain higher optical performance.

6.2.2: Second Modified Embodiment

Figure 49:
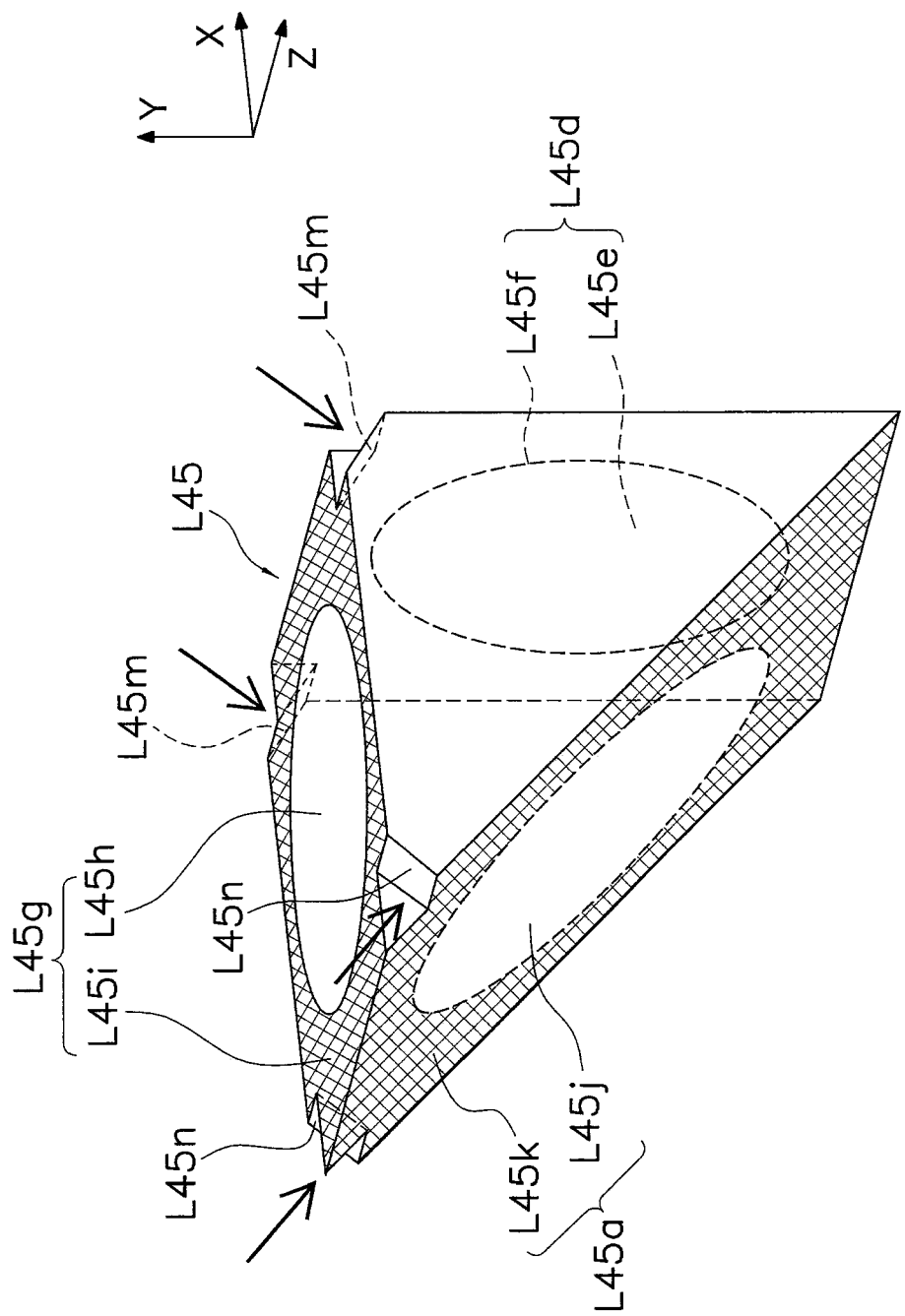
FIG. 49 is a perspective view of a prism as a second modified embodiment.

Using FIG. 49, a prism L45 as a second modified embodiment will be described. As shown in FIG. 49, this prism L45 further includes two second pressing surfaces L45n, in addition to two first pressing surfaces L45m. The first pressing surfaces L45m have the same configuration as the above described first pressing surfaces L35m. The second pressing surfaces L45n are surfaces perpendicular to the reflecting surface L45a, and are formed in the corners on the opposite side of the output surface L45d. If the optically effective areas of the entrance surface L45g, the output surface L45d, and the reflecting surface L45a are L45e, L45h, and L45j, and the optically ineffective areas are L45f, L45i, and L45k, as shown in FIG. 49, since the portions with the corners removed are arranged on the optically ineffective areas L45f, L45i, and L45k of the entrance surface L45g, the output surface L45d, and the reflecting surface L45a, they do not affect the optical performance of the prism L45.

In this case, in the bonding step, it is also possible to press the second pressing surfaces L45n, in addition to the first pressing surfaces L45m. As a result, it is possible to add a load to the prism L45 in the direction horizontal to the reflecting surface L45a, and it is possible to fix the prism L45 to the second group frame 150, in a state where the output surface L45d is pressed to the second contact portions 156e (see FIGS. 16 and 17B). As a result, it is possible to improve the accuracy of mounting the prism L45, and it is possible to obtain higher optical performance.

In addition, even with only the second pressing surfaces L45n, it is possible to improve the accuracy of mounting the prism L45.

Figure 50:
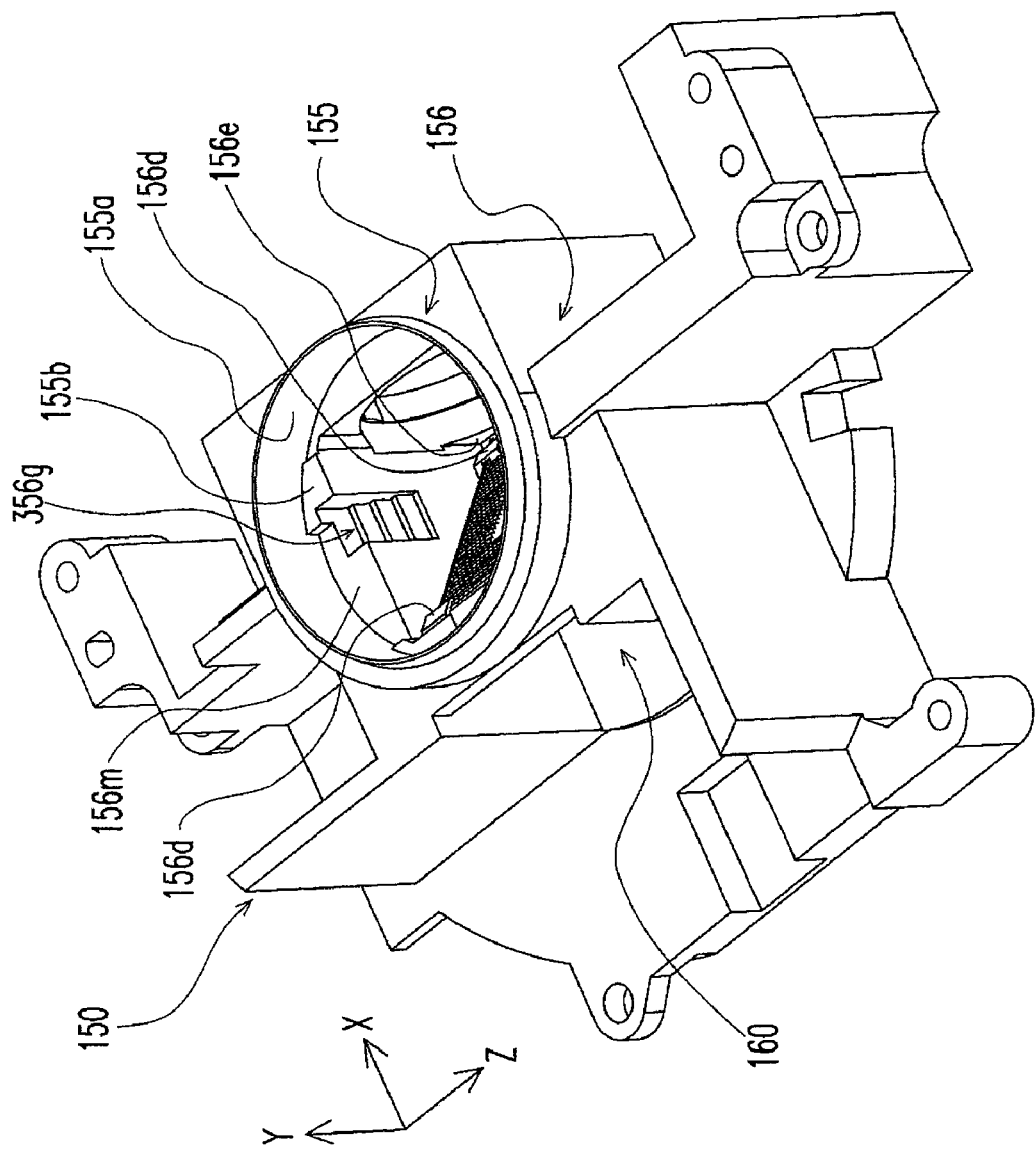
FIG. 50 is a perspective view of a second group frame including an adhesive pocket as a first modified embodiment.
Figures 51A, 51B:
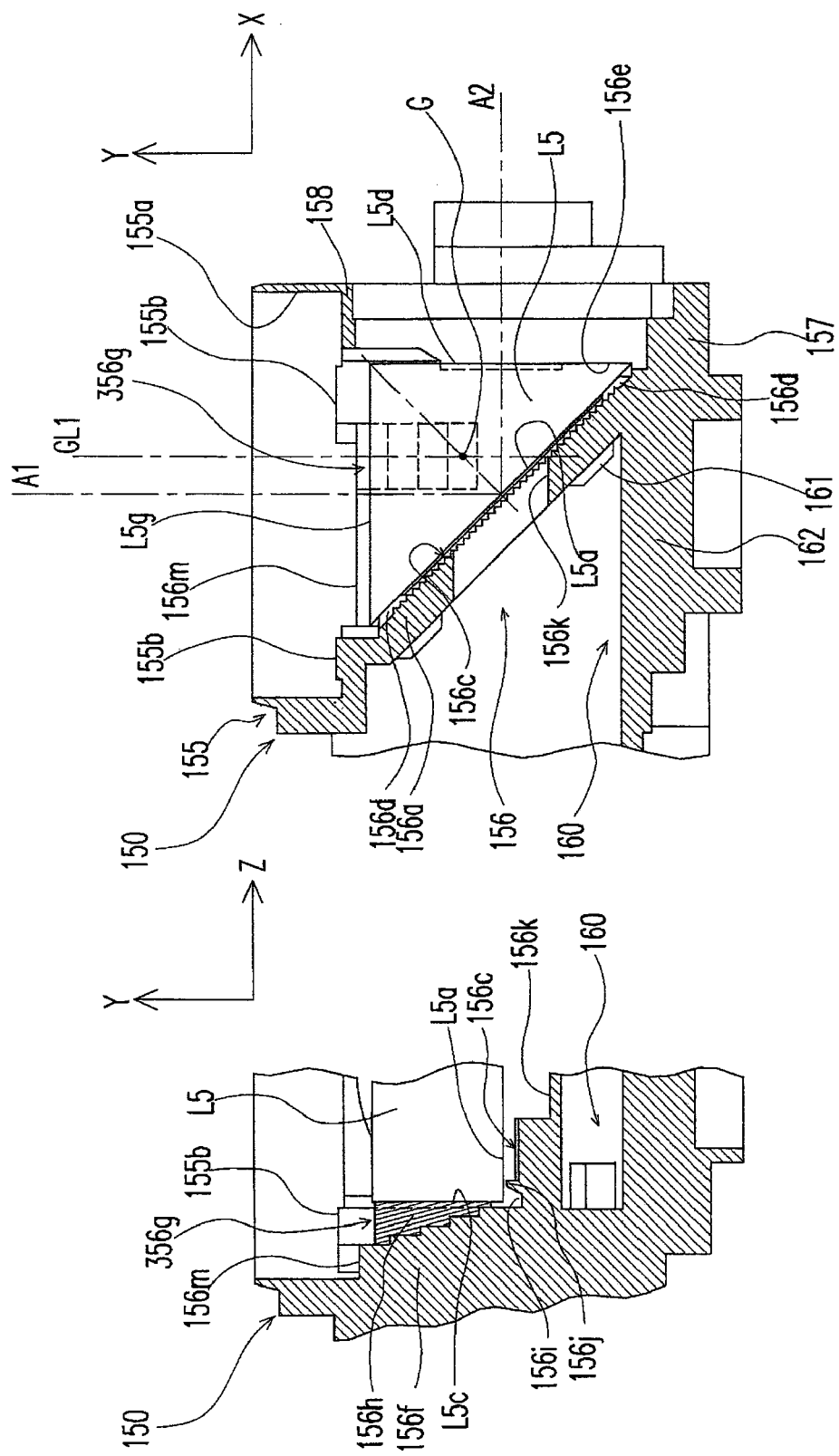
FIGS. 51A and 51B are illustrations of the adhesive pocket as a first modified embodiment.

6.3: Modified Embodiment of the adhesive pockets 6.3.1: First Modified Embodiment Using FIGS. 50 and 51, an adhesive pocket 356g as a first modified embodiment will be described. FIG. 50 is a perspective view of the second group frame 150 including the adhesive pocket 356g as a first modified embodiment. FIG. 51A is a section view corresponding to FIG. 17A. FIG. 51B is a section view corresponding to FIG. 17B.

As shown in FIGS. 50 and 51A, this adhesive pocket 356g is formed deeper than the adhesive pockets 156g of the above described embodiment. More specifically, suppose that there is an imaginary surface that includes the first optical axis A1 and the second optical axis A2. The figure shown in FIG. 51B is a figure looking from the direction (Z axis direction) perpendicular to the first optical axis A1 and the second optical axis A2. Therefore, the imaginary surface here can be arranged on FIG. 51B, and the projection image on the imaginary surface will be described using the figure shown in FIG. 51B.

In this case, when projecting the center of gravity G of the prism L5 and the adhesive pocket 356g on the imaginary surface, the projection image of the center of gravity G is arranged within the range of the projection image of the adhesive pocket 356g on the imaginary surface. In addition, the adhesive pocket 356g is arranged so that the projection image of the center of gravity G is positioned on the center of the left and right (X axis direction) of the projection image of the adhesive pocket 356g. By doing so, it is possible to support the areas around the center of gravity G of the prism L5 further more efficiently than the above described embodiment, and it is possible to fix the prism L5 to the second group frame 150 more strongly.

In addition, as shown in FIGS. 50 and 51B, the portion of the adhesive pocket 356g as the first modified embodiment is opposite to the prism L35 is formed in a staircase pattern. However, it may be a sloped surface like the second modified embodiment to be described below.

6.3.2: Second Modified Embodiment

Figure 52:
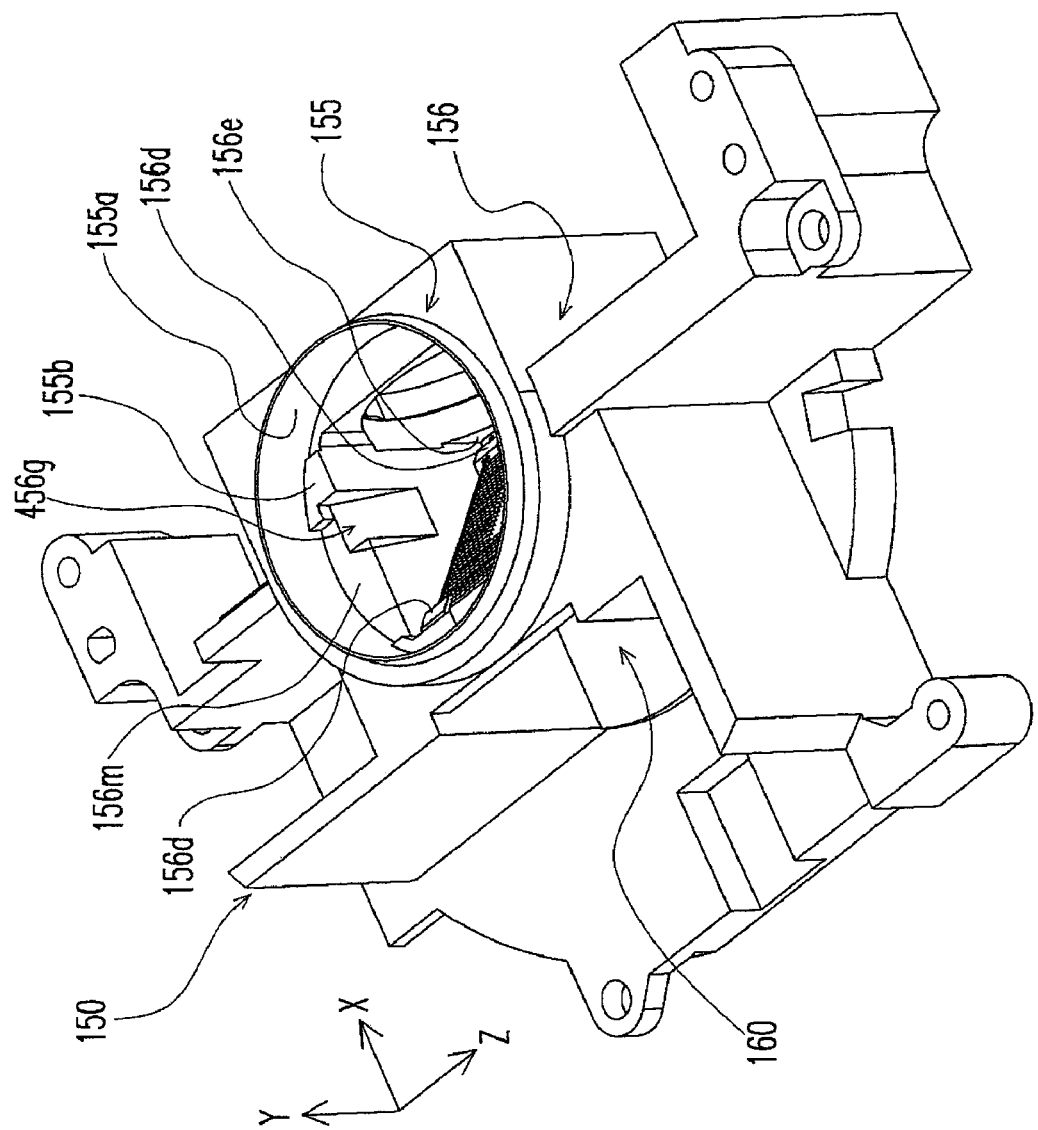
FIG. 52 is a perspective view of a second group frame including an adhesive pocket as a second modified embodiment.
Figures 53A, 53B:
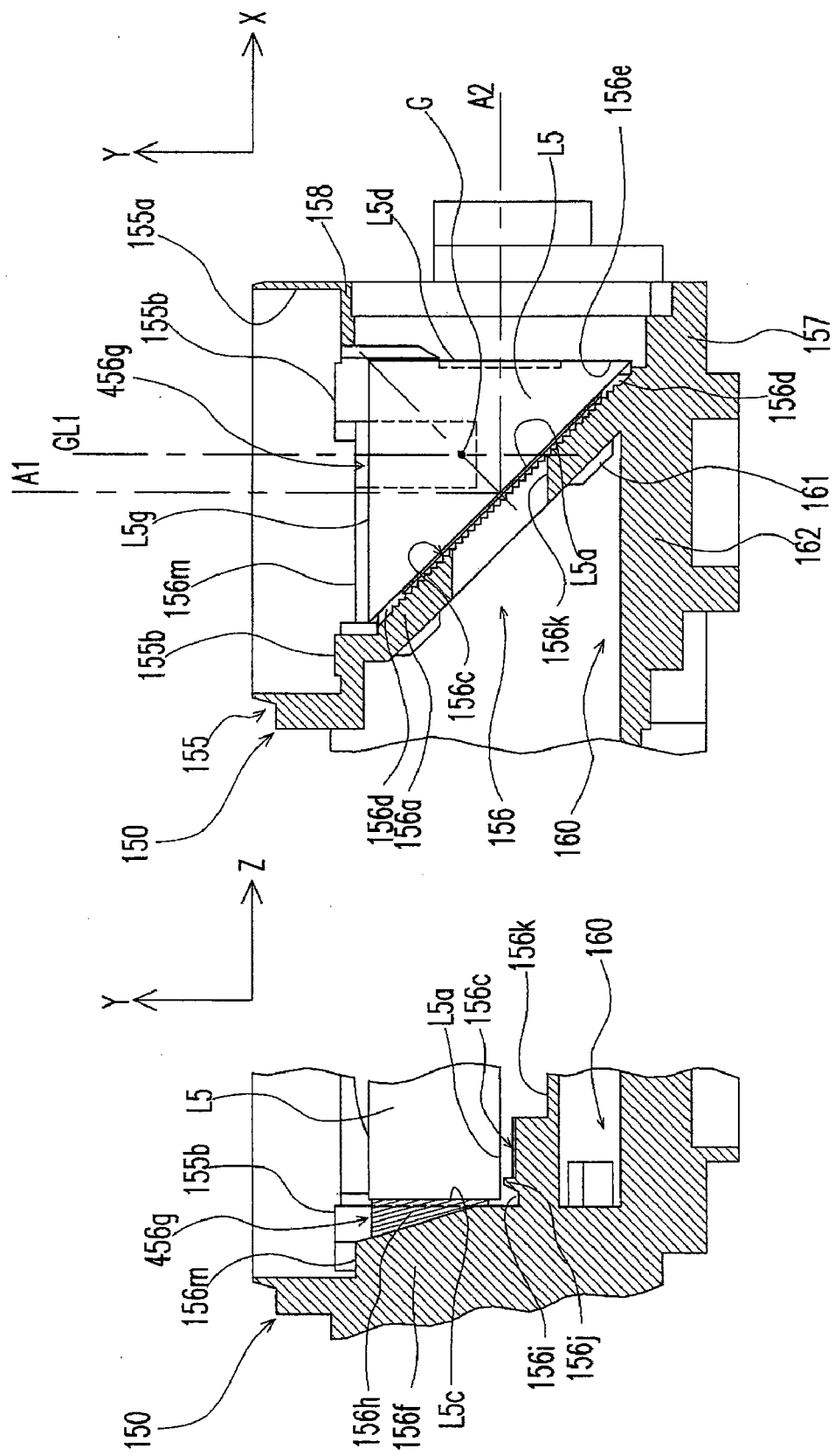
FIGS. 53A and 53B are illustrations of the adhesive pocket as a second modified embodiment.

Using FIGS. 52 and 53, an adhesive pocket 456g as a second modified embodiment will be described. FIG. 52 is a perspective view of the second group frame 150 including the adhesive pocket 456g as a second modified embodiment. FIG. 53A is a section view corresponding to FIG. 17A. FIG. 53B is a section view corresponding to FIG. 17B.

This adhesive pocket 456g has a different shape from the adhesive pocket 156g of the above described embodiment. More specifically, as shown in FIGS. 52 and 53, the surface of the adhesive pocket 456g that is opposite to the prism L5 is a flat surface tilted in the Y axis direction. The sectional area perpendicular to the Y axis direction of the adhesive pocket 456g gradually becomes smaller as being closer to the Y axis direction negative side. Therefore, it becomes easy for the adhesive agent 156h on the portion far away from the source of the ultraviolet light irradiation to harden, and it is possible to reduce the time of the ultraviolet light irradiation, and it is possible to reduce the manufacturing cost.

In addition, if the adhesive agent 156h cures and contracts, a force that biases the prism L5 to the Y axis direction negative side generates on the adhesive portion. Thus, it is possible to prevent the accuracy of mounting the prism L5 from deteriorating due to the contraction of the adhesive agent 156h.

In addition, the entire surface of this adhesive pocket 456g that is opposite to the prism L5 is a flat surface. However, it may include a portion in a staircase pattern, like the above described embodiment. In this case, it is possible to enlarge the adhesive area, and it is possible to improve the adhesive strength.

6.3.3: Third Modified Embodiment

Figure 54:
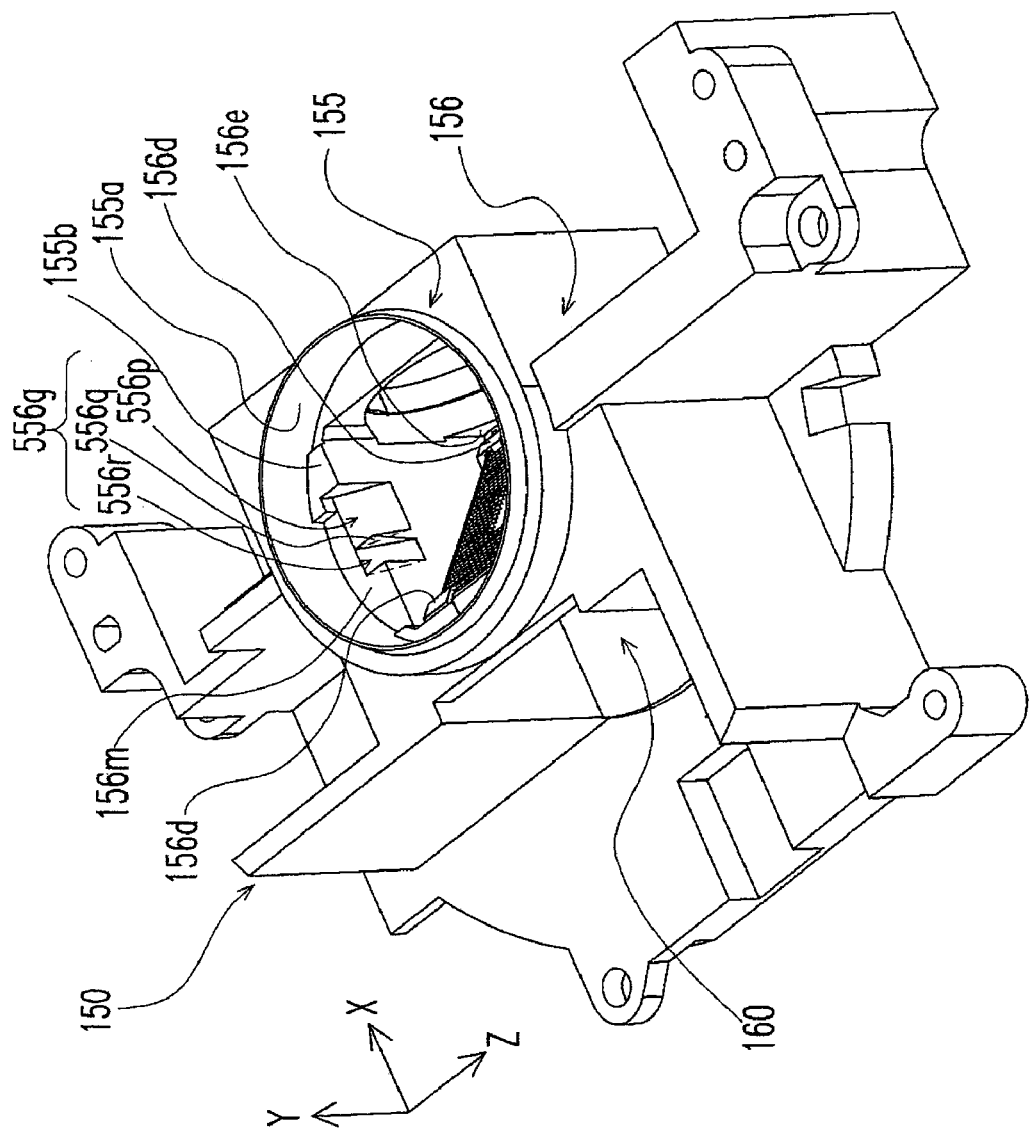
FIG. 54 is a perspective view of a second group frame including an adhesive pocket as a third modified embodiment.
Figures 55A, 55B:
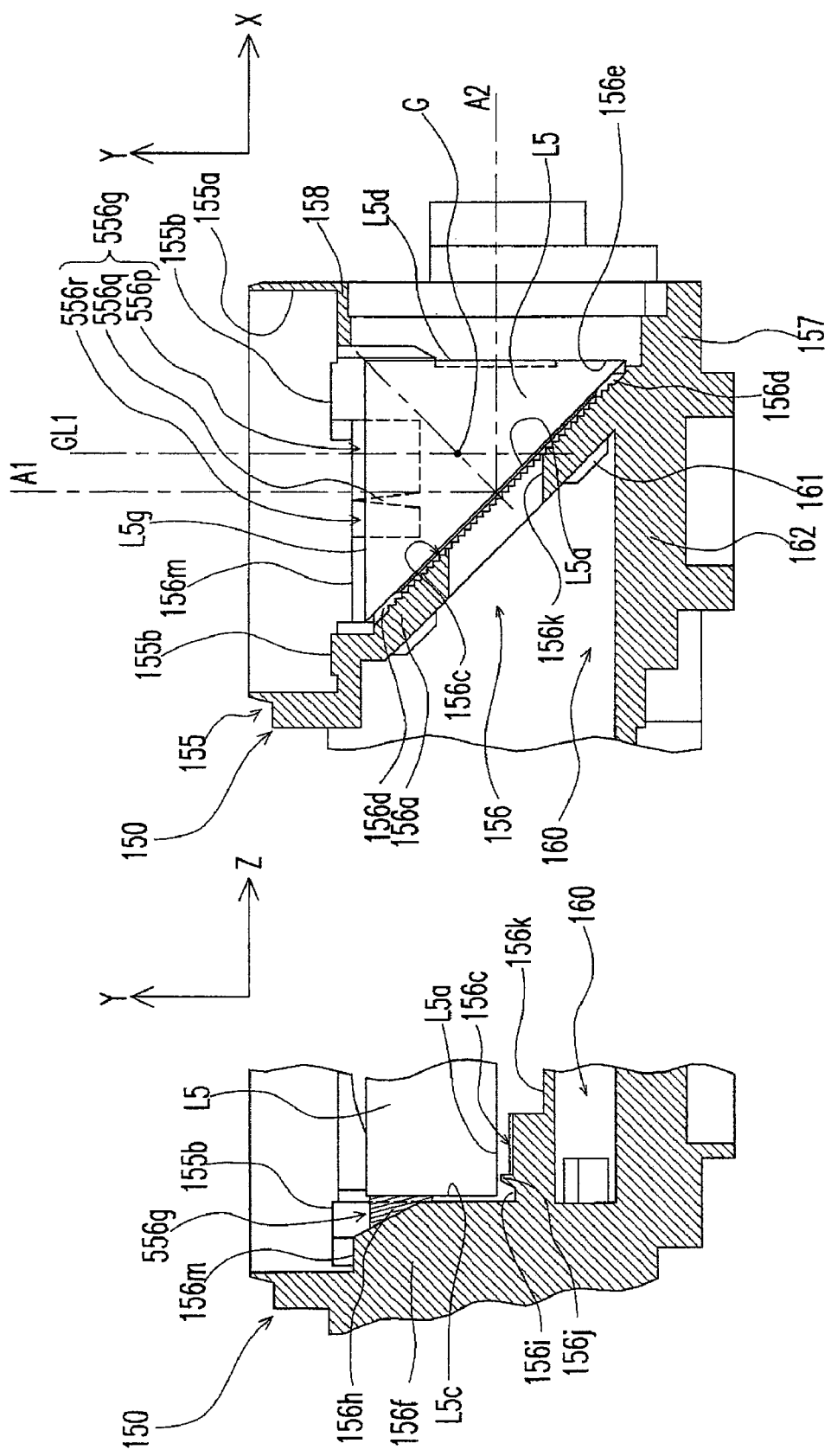
FIGS. 55A and 55B are illustrations of the adhesive pocket as a third modified embodiment.

Using FIGS. 54 and 55, an adhesive pocket 556g as a third modified embodiment will be described. FIG. 54 is a perspective view of the second group frame 150 including the adhesive pocket 556g as a third modified embodiment. FIGS. 55A and 55B are section views corresponding to FIG. 17A. FIG. 55(b) is a section view corresponding to FIG. 17B.

This adhesive pocket 556g is divided into a plurality of spaces. More specifically, as shown in FIGS. 54 and 55A and 55B, the adhesive pocket 556g includes a partition wall 556q (middle portion) in the interior thereof, and is divided into a first adhesive pocket 556p and a second adhesive pocket 556r by the partition wall 556q.

The partition wall 556q is a plate portion that extends in the Y axis direction and the Z axis direction, and gradually becomes thinner as being closer to the Y axis direction positive side. The tip of the partition wall 556q in the Y axis direction is sharp, and is arranged on the Y axis direction negative side with respect to the supporting surface 155b that supports the fourth lens L4, so that it does not touch the fourth lens L4. Adhesive agent 156h is filled in the first adhesive pocket 556p and the second adhesive pocket 556r.

In this case, even if remaining adhesive agent drops like a thread from the tip of the needle when filling the adhesive agent 156h, it is possible to separate off the remaining adhesive agent via the partition wall 556q. For example, first, the first adhesive pocket 556p is filled with the adhesive agent 156h, then the second adhesive pocket 556r is filled with the adhesive agent 156h, after that, by moving the needle again from the second adhesive pocket 556r to the first adhesive pocket 556p, it is possible to separate off the remaining adhesive agent, and it is possible to prevent the remaining adhesive agent from attaching to out of the range of the first adhesive pocket 556p and the second adhesive pocket 556r. Since the tip of the partition wall 556q is sharp, it is possible to more reliably separate off the remaining adhesive agent. In addition, by arranging the partition wall 556q, it is possible to enlarge the adhesive area of the adhesive pocket 556g, and it is possible to improve the adhesive strength.

In addition, the first adhesive pocket 556p and the second adhesive pocket 556r shown in FIGS. 54 and 55A include a sloped surface. However, they may include a portion that is in a staircase pattern, same as the above described embodiment. In addition, a plurality of partition walls 556q may be arranged in one adhesive pocket 556g. In addition, adhesive agent may be filled in only one of the adhesive pockets, and the other adhesive pocket may be used only for separating off the remaining adhesive agent.

6.3.4: Fourth Modified Embodiment

Figure 56:
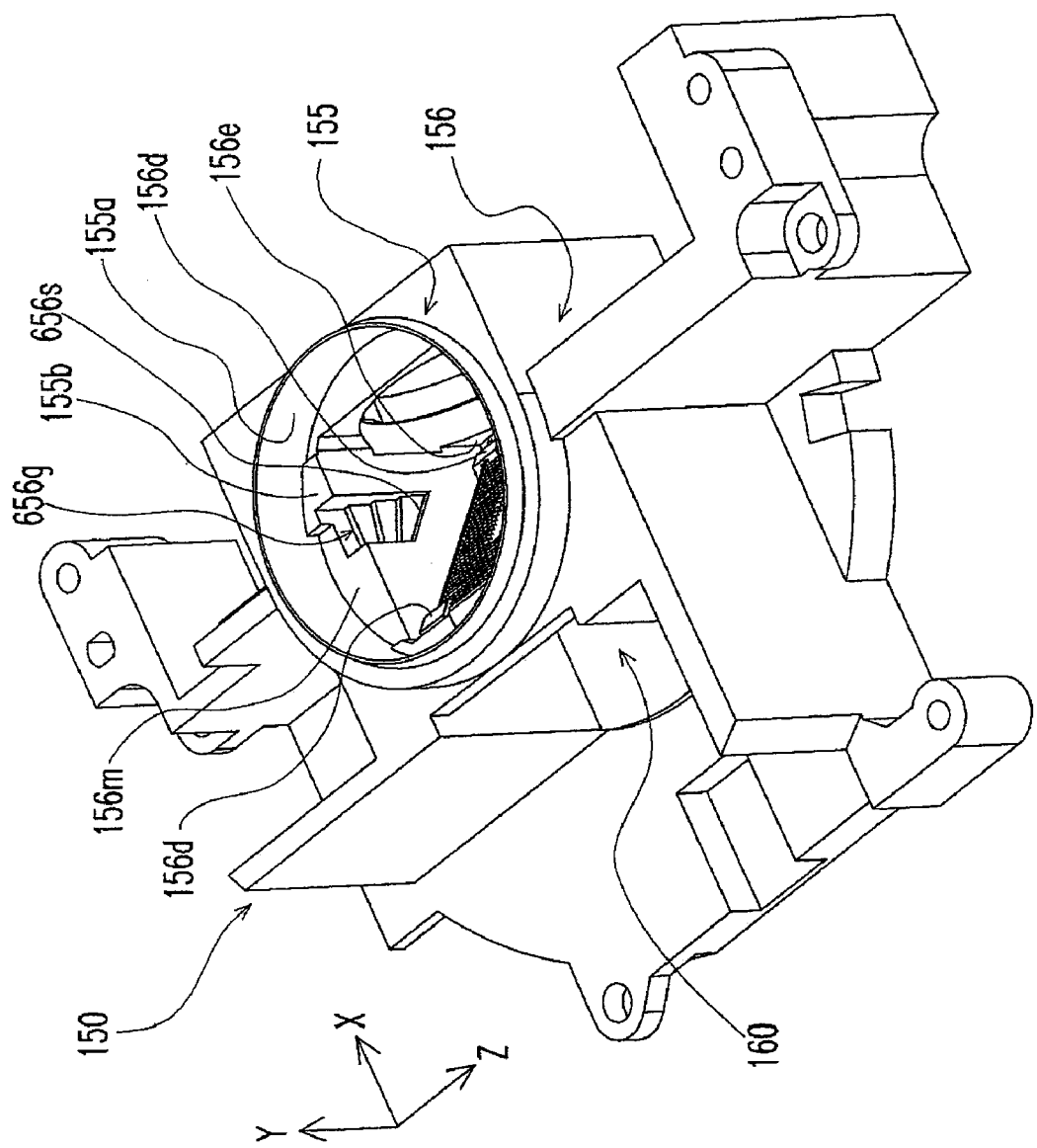
FIG. 56 is a perspective view of a second group frame including an adhesive pocket as a fourth modified embodiment.
Figures 57A, 57B:
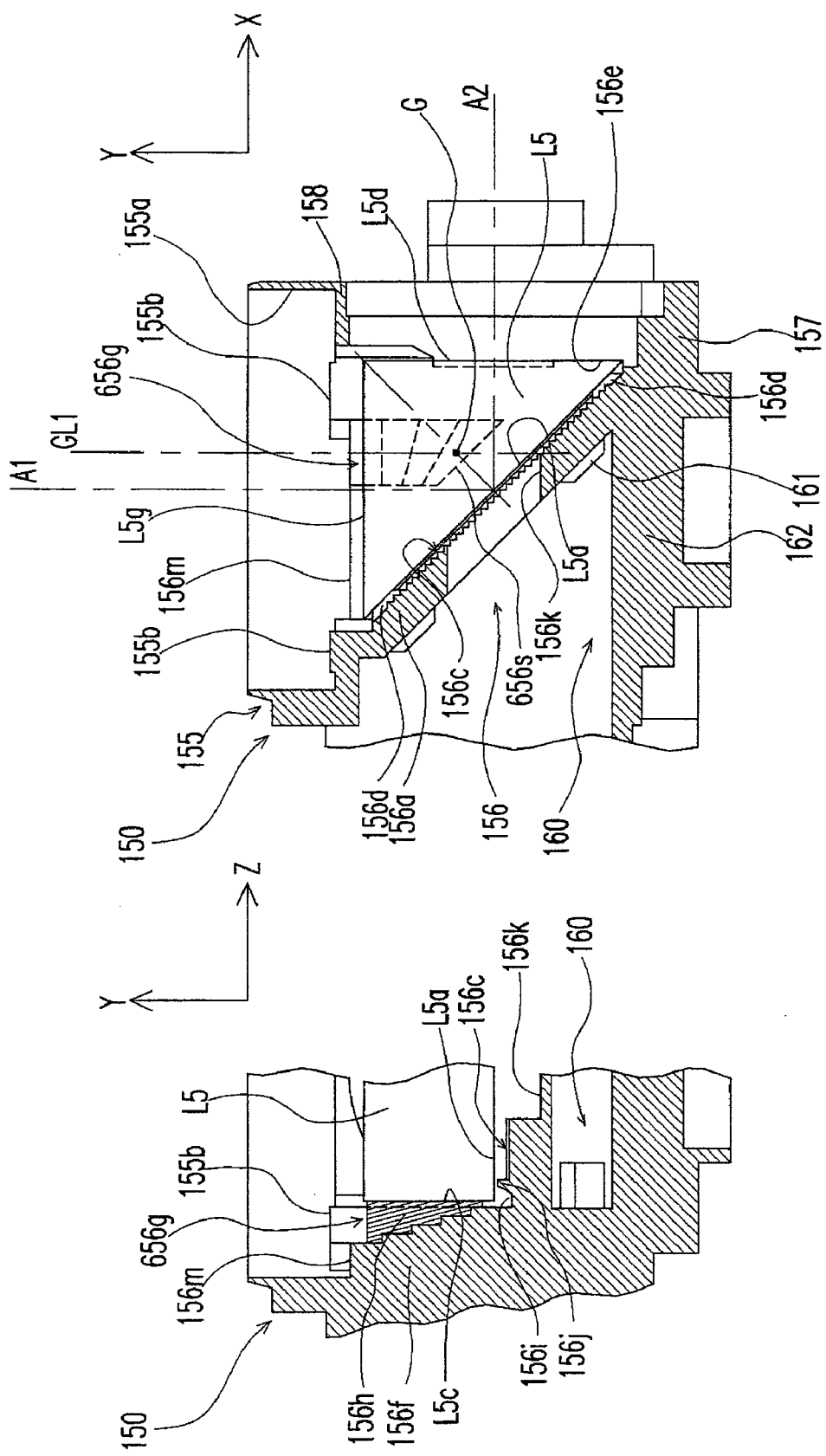
FIGS. 57A and 57B are illustrations of the adhesive pocket as a fourth modified embodiment.

Using FIGS. 56 and 57, an adhesive pocket 656g as a fourth modified embodiment will be described. FIG. 56 is a perspective view of the second group frame 150 including the adhesive pocket 656g as a fourth modified embodiment. FIG. 57A is a section view corresponding to FIG. 17A. FIG. 57B is a section view corresponding to FIG. 17B.

This adhesive pocket 656g has a different shape from the adhesive pocket 156g of the above described embodiment. More specifically, as shown in FIGS. 57A and 57B, in the case of supposing an imaginary surface including the first optical axis A1 and the second optical axis A2, an end surface 656s on the Y axis direction negative side of the adhesive pocket 656g is sloped toward the X axis direction positive side with respect to the X axis, and the projection image of the end surface 656s and the projection image of the reflecting surface L5a of the prism L5 are arranged to be parallel.

In this case, since it is possible to make the distance between the end surface 656s of the adhesive pocket 656g and the reflecting surface L5a of the prism L5 large, it is possible to prevent the adhesive agent from flowing to the side of the reflecting surface L5a. In addition, in the present embodiment, the projection image of the end surface 656s and the projection image of the reflecting surface L5a are arranged to be parallel. However, it is not necessary to arrange them parallel, as long as at least a part of the end surface 656s slopes toward the X axis direction positive side with respect to the X axis.

6.3.5: Other Modified Embodiments

In addition, other modified embodiments may include those shown in FIGS. 58A to 58E. It is possible to obtain the above described same effects with these adhesive pockets 701 to 705.

6.4: Manufacturing Method of the Lens barrel

Figure 59:
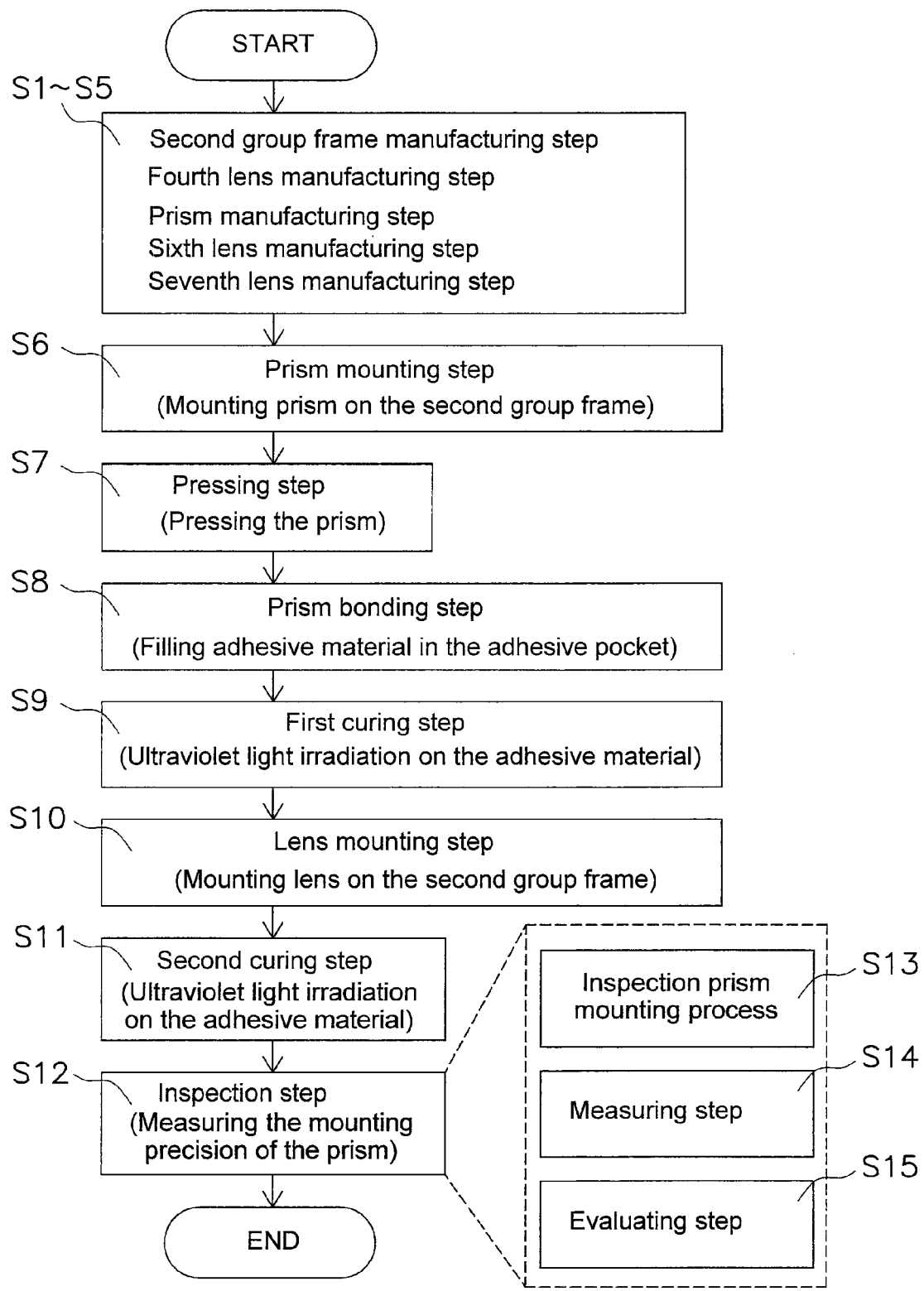
FIG. 59 is a flow diagram of a manufacturing step.

This lens barrel 31 has a characteristic also in the manufacturing method thereof. Below, using FIG. 59, the manufacturing method of the lens barrel 31, in particular, the manufacturing method of the second group frame unit 42 will be described. In addition, descriptions of details on the manufacturing method of units other than the second group frame unit 42 will be omitted, since it is no different from that of the conventional method. FIG. 59 shows the flow of the manufacturing process of the lens barrel 31.

As shown in FIG. 59, the manufacturing process of the lens barrel 31 mainly includes a second group frame manufacturing step S1, a fourth lens manufacturing step S2, a prism manufacturing step S3, a sixth lens manufacturing step S4, a seventh lens manufacturing step S5, a prism mounting step S6, a prism bonding step S8, a pressing step S7, a first curing step S9, a lens mounting step S10, a second curing step S11, and an inspection step S12.

In each of the manufacturing steps S2 to S5, the second group frame 150, the fourth lens L4, the prism L5, the sixth lens L6, and the seventh lens L7 are manufactured. Descriptions of details on each of the manufacturing steps S2 to S5 will be omitted, since they are no different from that of the conventional manufacturing steps.

Figure 60:
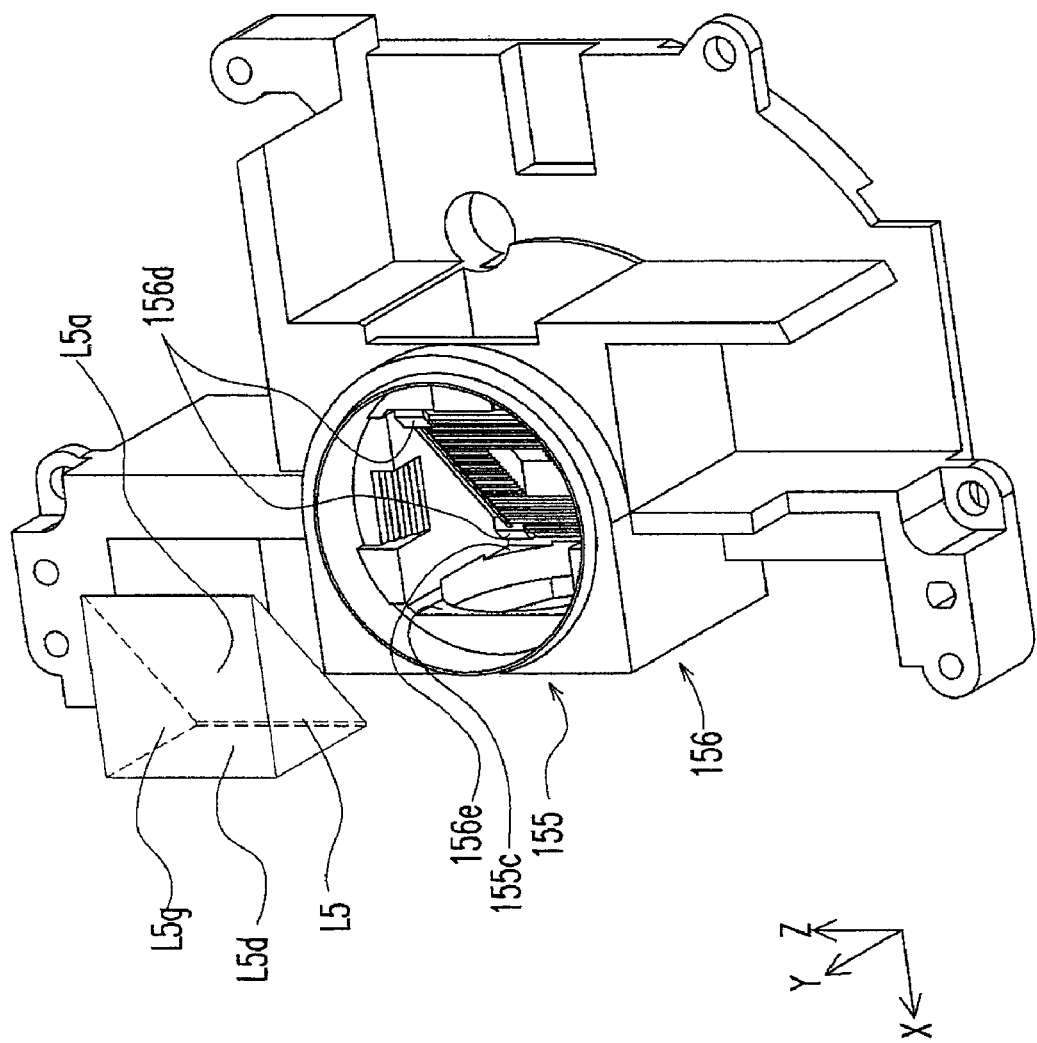
FIG. 60 is an illustration of a prism mounting step.

In the prism mounting step S6, the prism L5 is mounted in the second group frame 150. More specifically, the prism L5 is inserted from the opening portion 155c into the prism retaining frame 156 of the second group frame 150, and the prism L5 is fitted in the prism retaining frame 156 (refer to FIG. 60).

Figure 61:
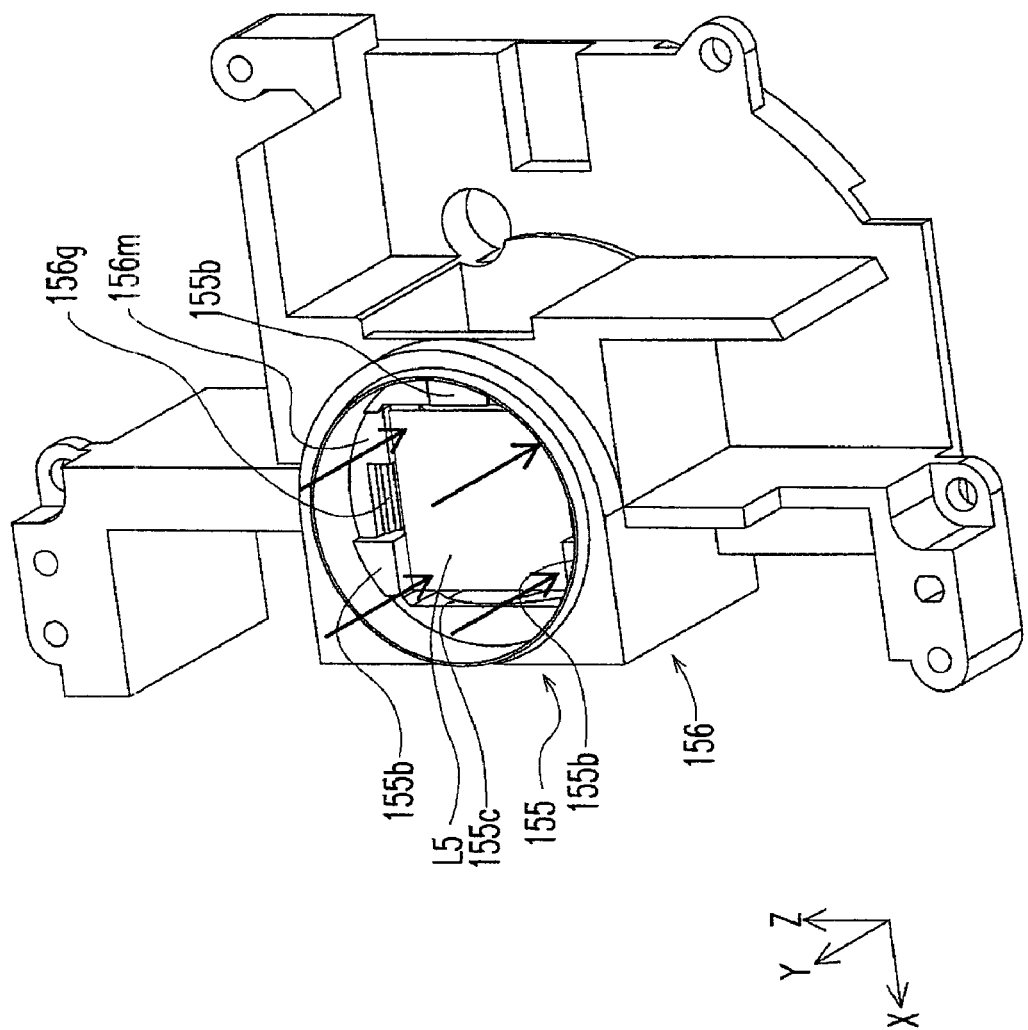
FIG. 61 is an illustration of a pressing step.

In the pressing step S7, the prism L5 is pressed to the second group frame 150. More specifically, the optically ineffective area of the entrance surface L5g of the prism L5 is pressed to the Y axis direction negative side, and the reflecting surface L5a is pressed against the first contact portions 156d of the prism retaining frame 156 and the output surface L5d is pressed against the second contact portions 156e (refer to FIG. 61). By doing so, the accuracy of mounting the prism L5 with respect to the second group frame 150 improves.

In addition, as described in the modified embodiment of the prism L5 described above, the first pressing surfaces L35m and the second pressing surfaces L35n are arranged on the prism L5, and the first pressing surfaces L35m and the second pressing surfaces L35n may be pressed (refer to FIG. 49).

Figure 62:
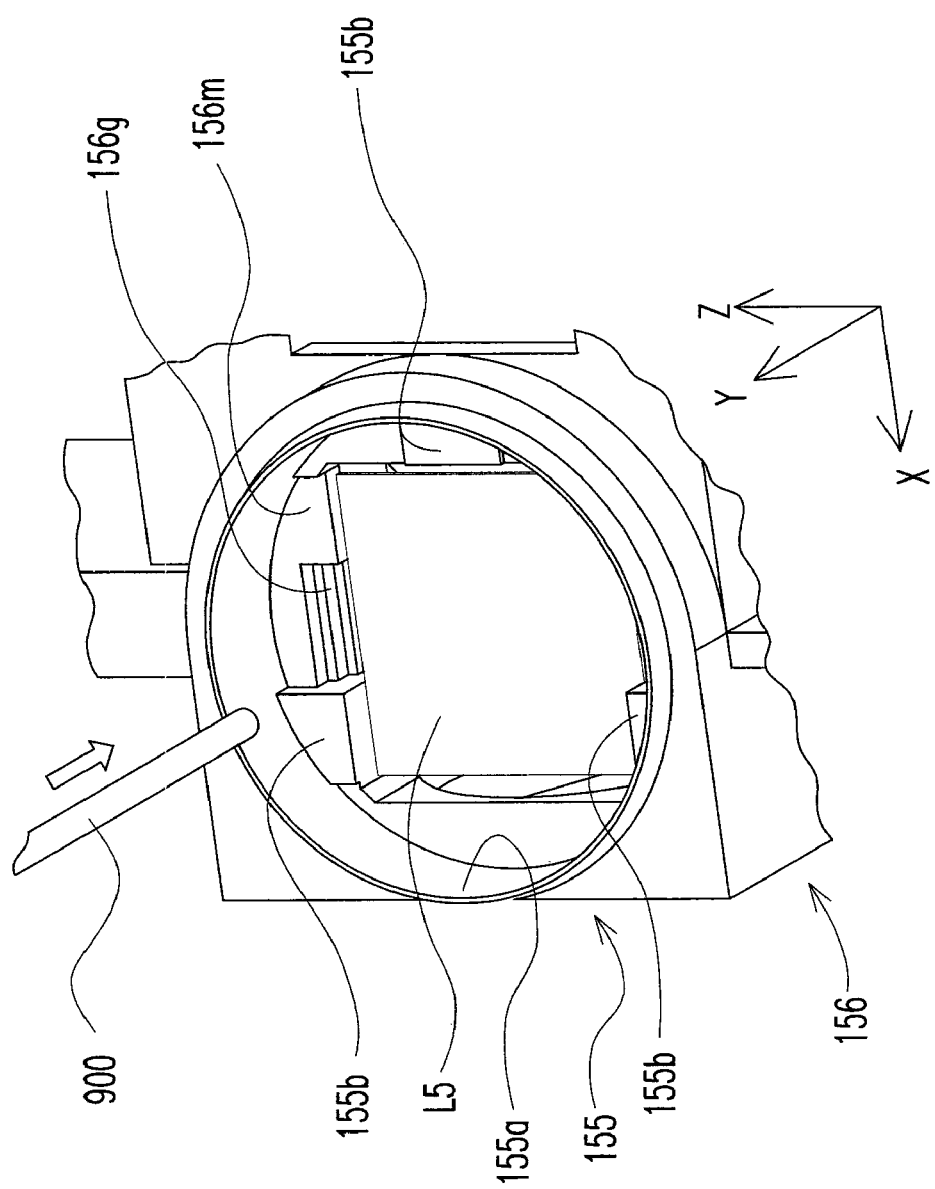
FIG. 62 is an illustration of a prism bonding step.
Figure 63:
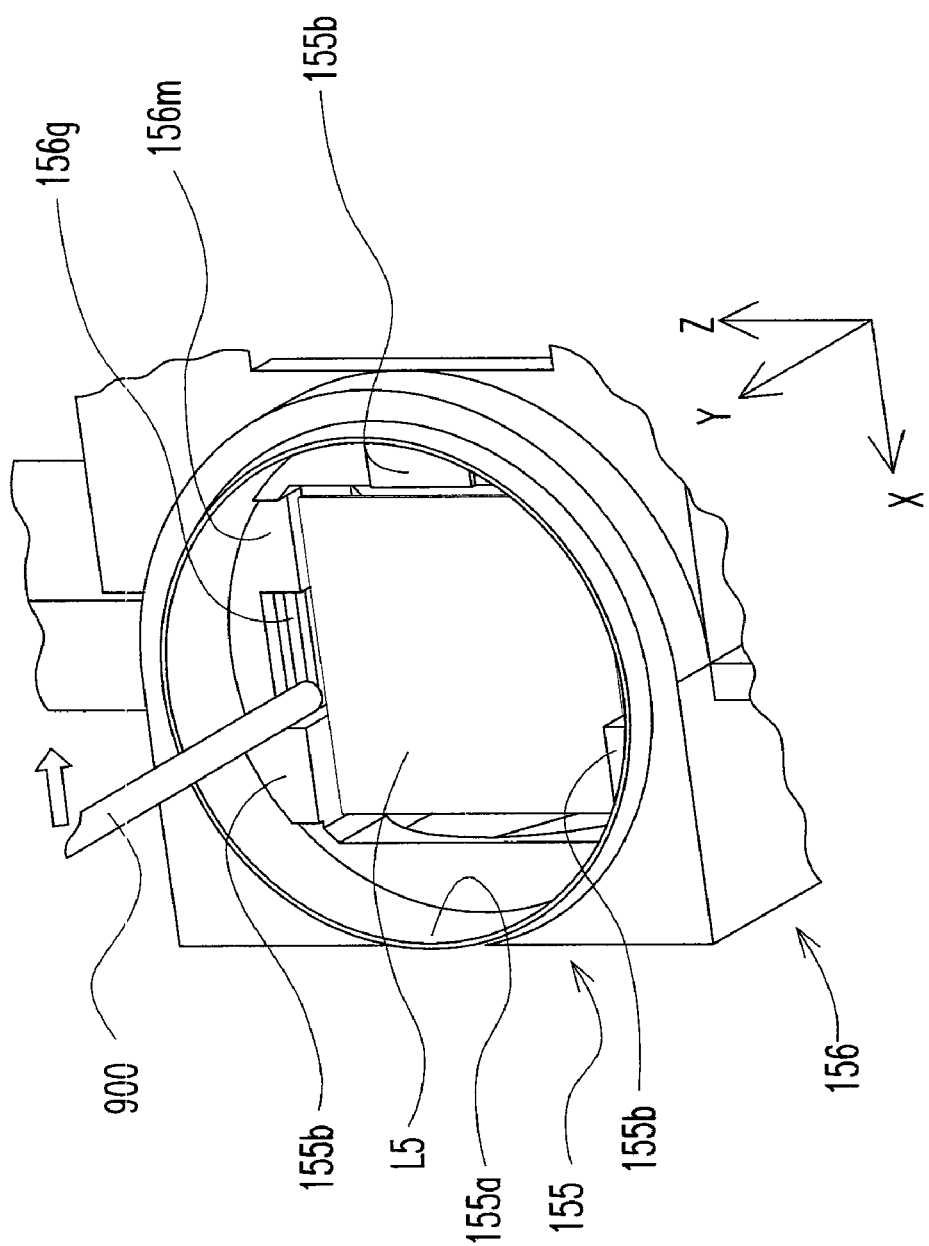
FIG. 63 is an illustration of a prism bonding step.
Figure 64:
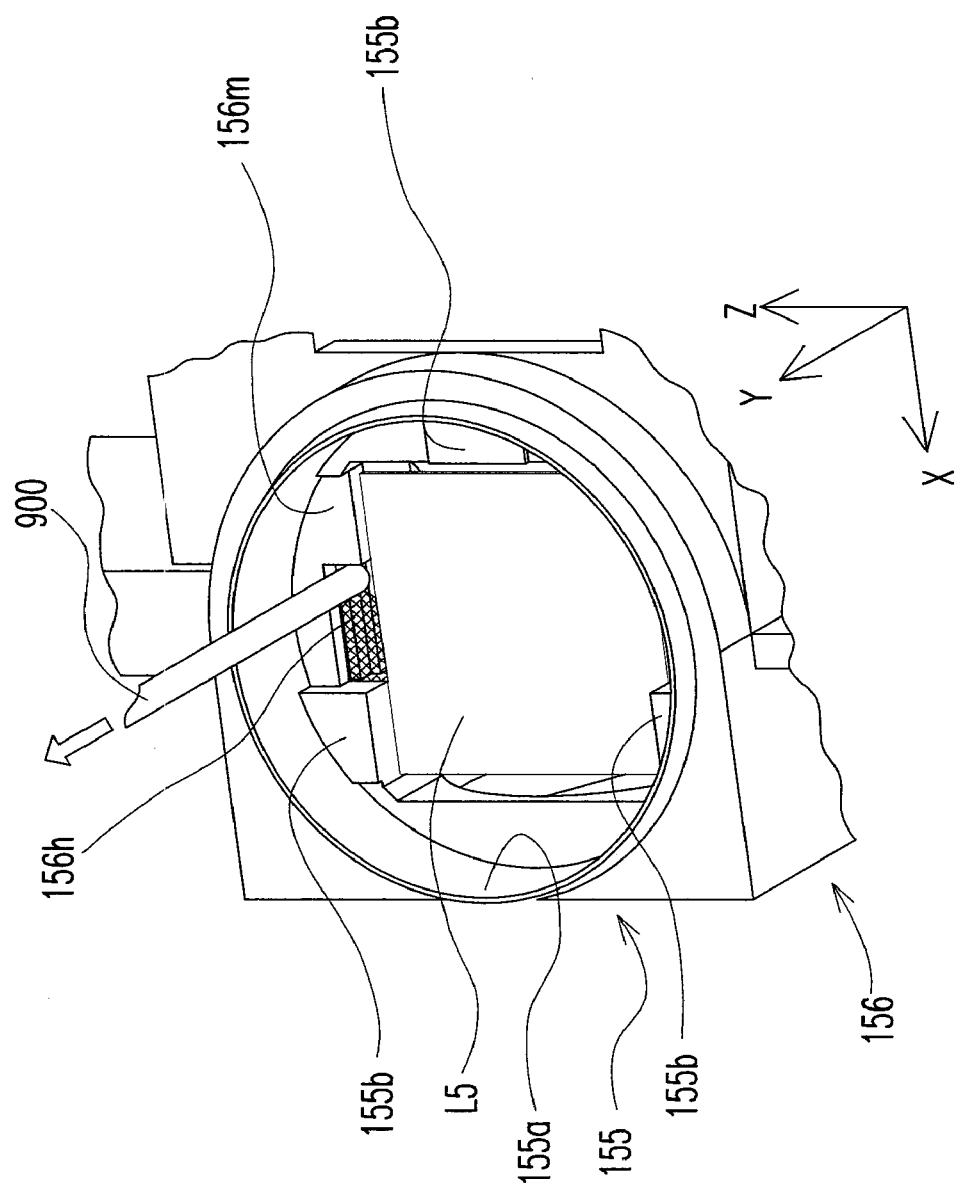
FIG. 64 is an illustration of a prism bonding step.

In the prism bonding step S8, adhesive agent 156h is filled between the second group frame 150 and the prism L5. More specifically, in the state that the pressing force is kept in the pressing step S7, a needle 900 for filling the adhesive agent moves down to the Y axis direction negative side, and is inserted into the second group frame 150 from the opening portion 155c (FIG. 62). At this time, the tip of the needle 900 is inserted into the adhesive pocket 156g (FIG. 63) on the X axis direction positive side (the side of the adjacent supporting surface 155b). Then, the adhesive agent 156h is discharged from the tip of the needle 900, and in this state, the needle 900 moves to the X axis direction negative side (FIGS. 63 and 64). When the needle 900 reaches the X axis direction negative side of the adhesive pocket 156g (the side of the adjacent non-contact surface 156*m*), the discharge of the adhesive agent 156*h* stops, and the needle 900 moves up to the Y axis direction positive side.

At this time, the remaining adhesive agent drops like a thread from the tip of the needle 900. For this reason, for example, if the needle 900 is moved to the other adhesive pocket 156*g* or another second group frame unit 42, there is the possibility that the remaining adhesive agent may attach to the second group frame 150, the prism L5, or the like. In particular, if the adhesive agent attaches to the supporting surface 155*b* that supports the fourth lens L4 and the inner circumference surface 155*a*, the accuracy of mounting the fourth lens L4 deteriorates.

Figure 65:
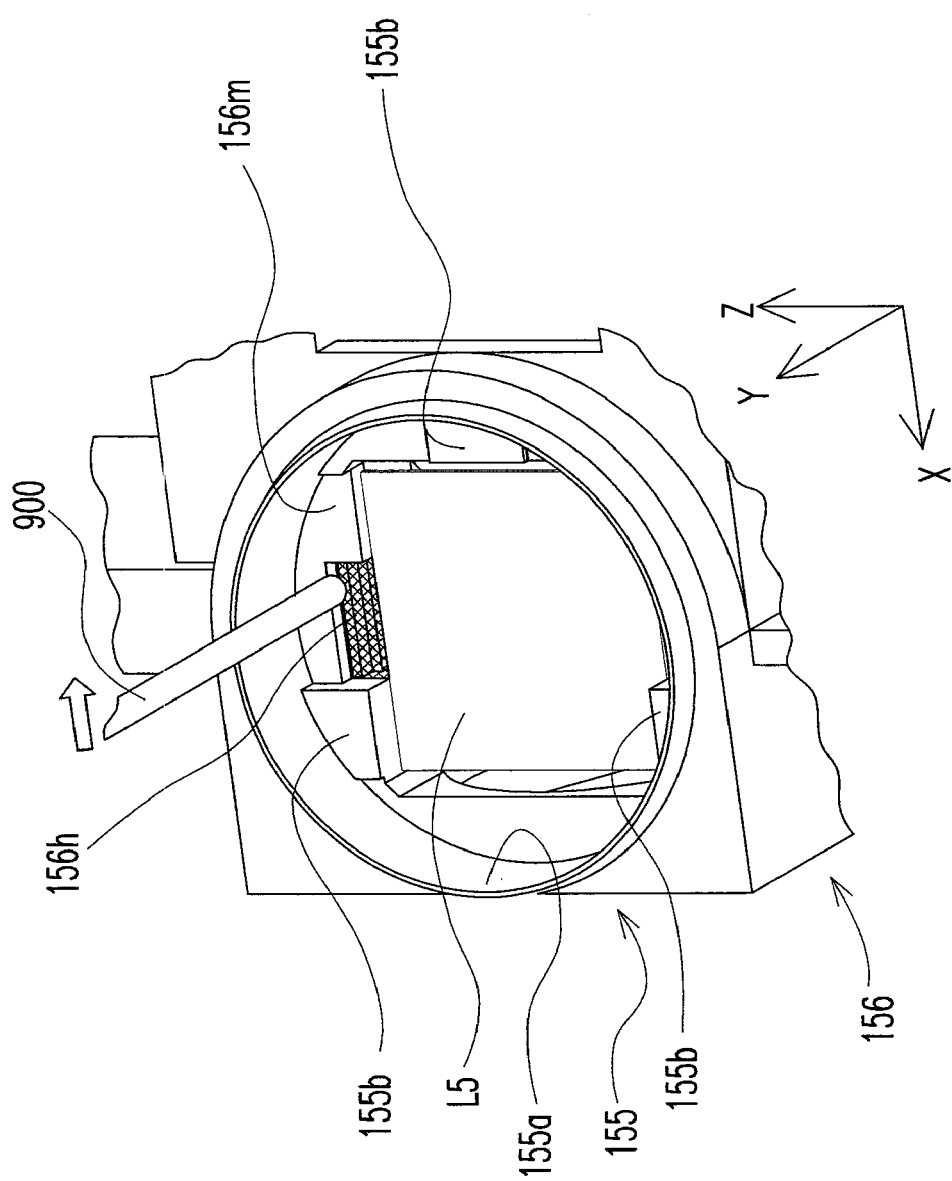
FIG. 65 is an illustration of a prism bonding step.
Figure 66:
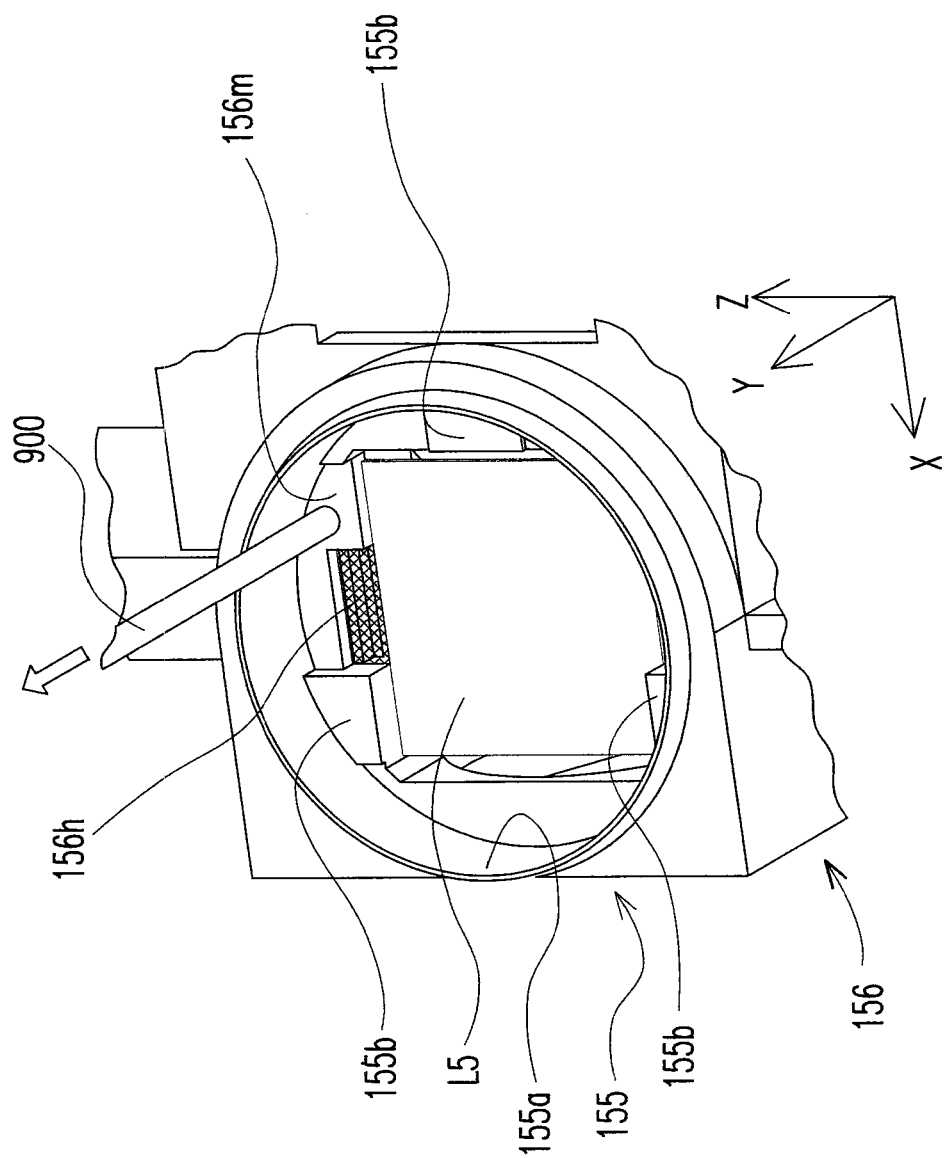
FIG. 66 is an illustration of a prism bonding step.

Therefore, in this manufacturing method, the upward movement of the needle 900 is stopped at the time that the tip of the needle 900 is positioned on the Y axis direction positive side with respect to the non-contact surface 156*m*, and the needle 900 is moved, to the area around the center of the non-contact surface 156*m* on the X axis direction negative side, and stopped above the area around the center (FIGS. 65 and 66). As a result, the remaining adhesive agent that drops like a thread from the tip of the needle 900 attaches to the non-contact surface 156*m*, and it is possible to prevent the remaining adhesive agent from attaching to the other portions. This non-contact surface 156*m* is arranged on the Y axis direction negative side with respect to the supporting surface 155*b*, and therefore, even if remaining adhesive agent attaches to the non-contact surface 156*m*, the accuracy of mounting the fourth lens L4 does not deteriorate.

Figure 67:
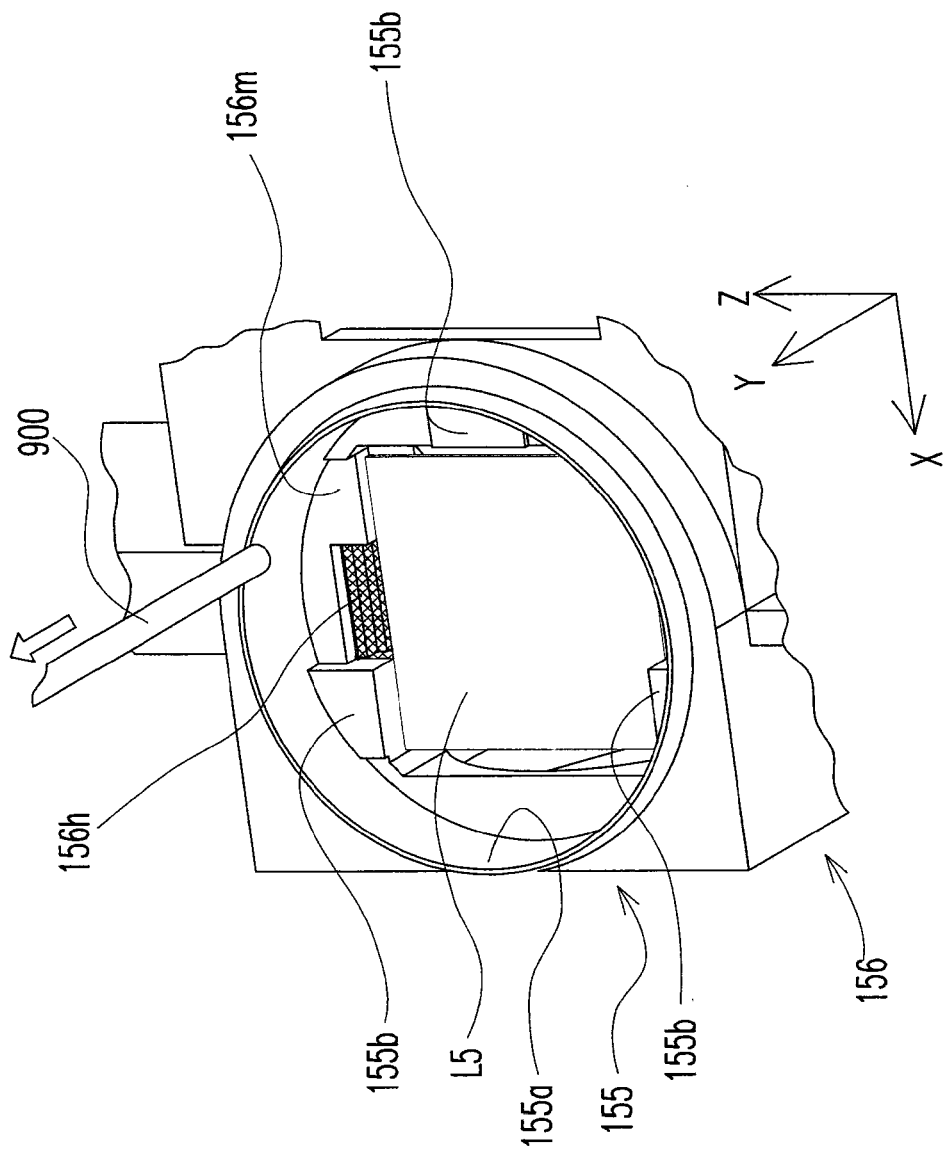
FIG. 67 is an illustration of a prism bonding step.

Then, the needle 900 is moved upward to the Y axis direction positive side, and moved to the other adhesive pocket 156*g*, and the above described step repeats (FIGS. 66 and 67). In this way, the filling of the adhesive agent 156*h* into the adhesive pockets 156*g* is being done.

Furthermore, in the first curing step S9, in the state that the pressing force in the pressing step S7 is kept, through the opening portion 155*c*, the adhesive agent 156*h* filled in the adhesive pockets 156*g* is irradiated with ultraviolet light, and the adhesive agent cures. Here, since the adhesive pockets 156*g* open on the opening portion 155*c* side, it is possible to simultaneously irradiate the adhesive agent 156*h* filled in the plurality of adhesive pockets 156*g* with ultraviolet light through the opening portion 155*c*. Therefore, it is not necessary to change the position of the second group frame or perform ultraviolet light irradiation from different directions for each of the plurality of adhesive portions, in the curing step as it is done conventionally. Therefore, it is possible to reduce the manufacturing steps, and it is possible to reduce the manufacturing cost.

In addition, when the positional relationship between the center of gravity G of the prism L5 and the adhesive pocket 156*g* is as described in the embodiment above, it is possible to minimize the amount of the adhesive agent. Therefore, it is possible to reduce the time of the ultraviolet light irradiation to the adhesive agent, and it is possible to reduce the manufacturing cost.

Figure 68:
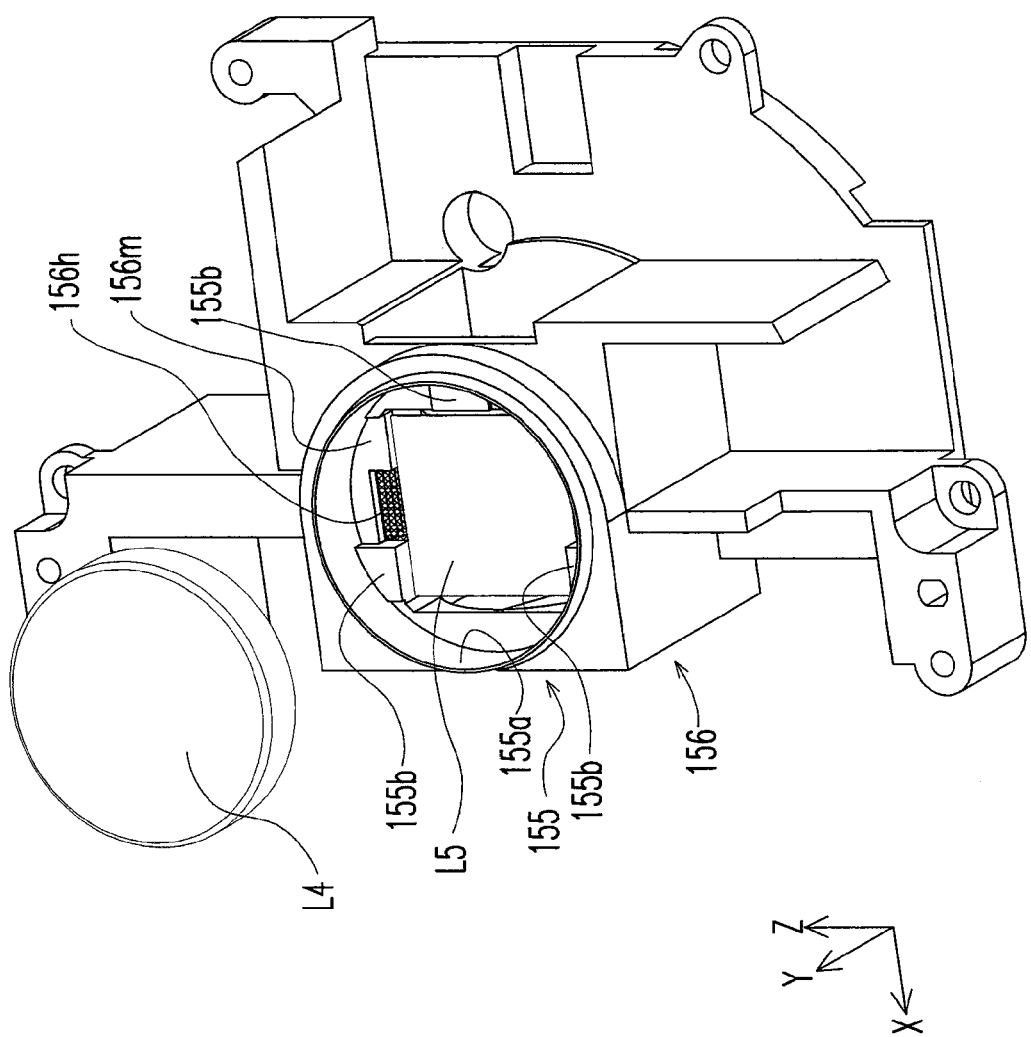
FIG. 68 is an illustration of a lens mounting step.
Figure 69:
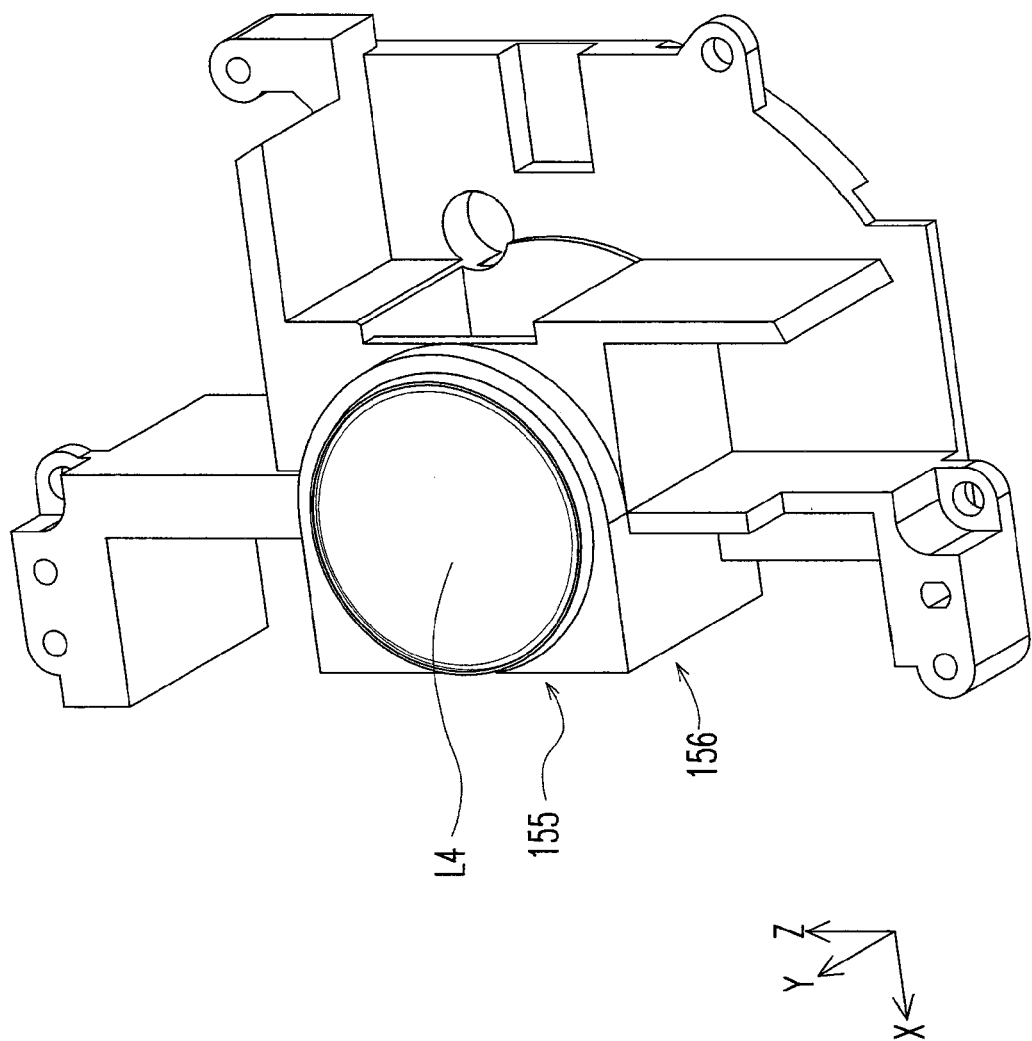
FIG. 69 is an illustration of a lens mounting step.
Figure 70:
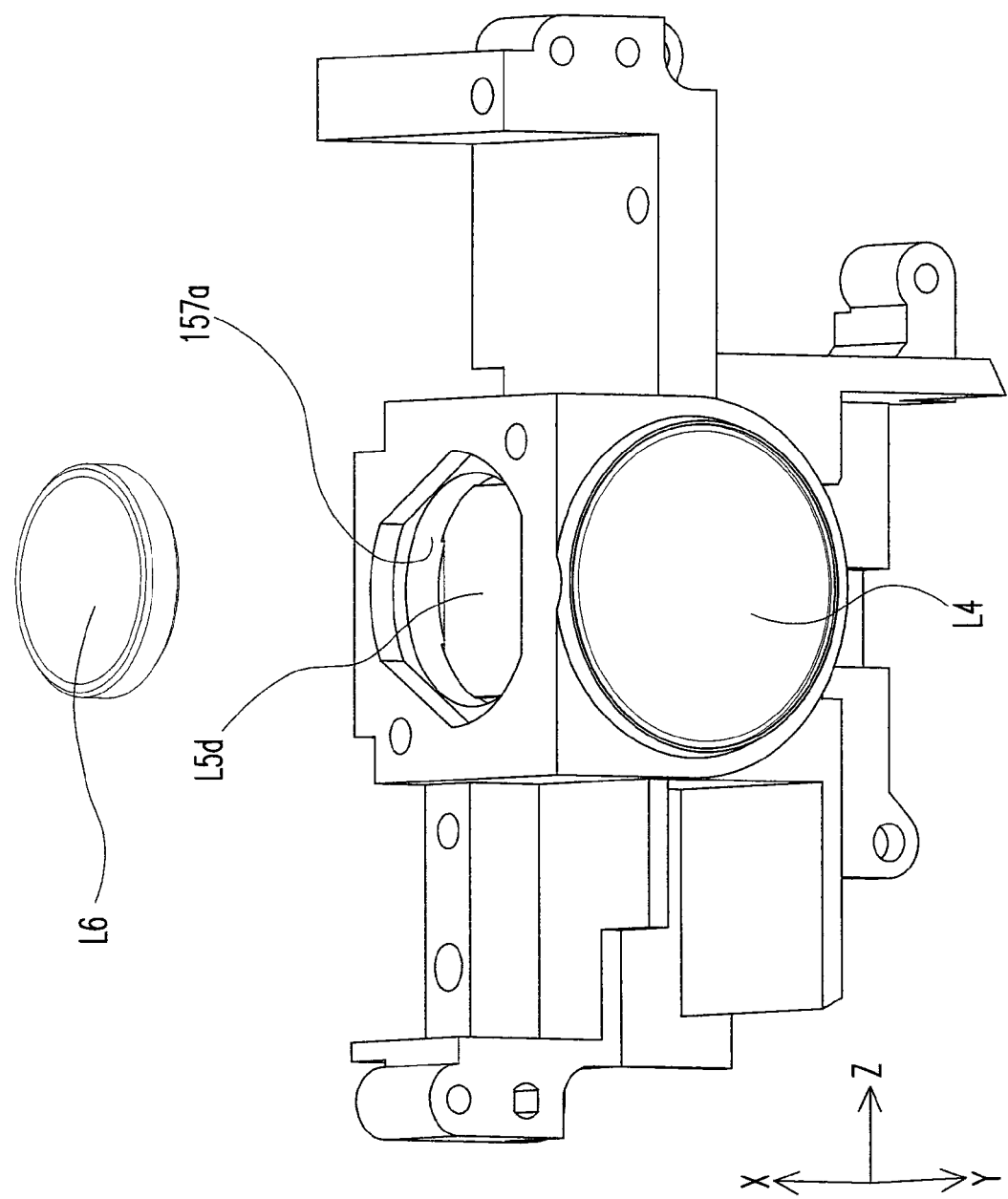
FIG. 70 is an illustration of a lens mounting step.
Figure 71:
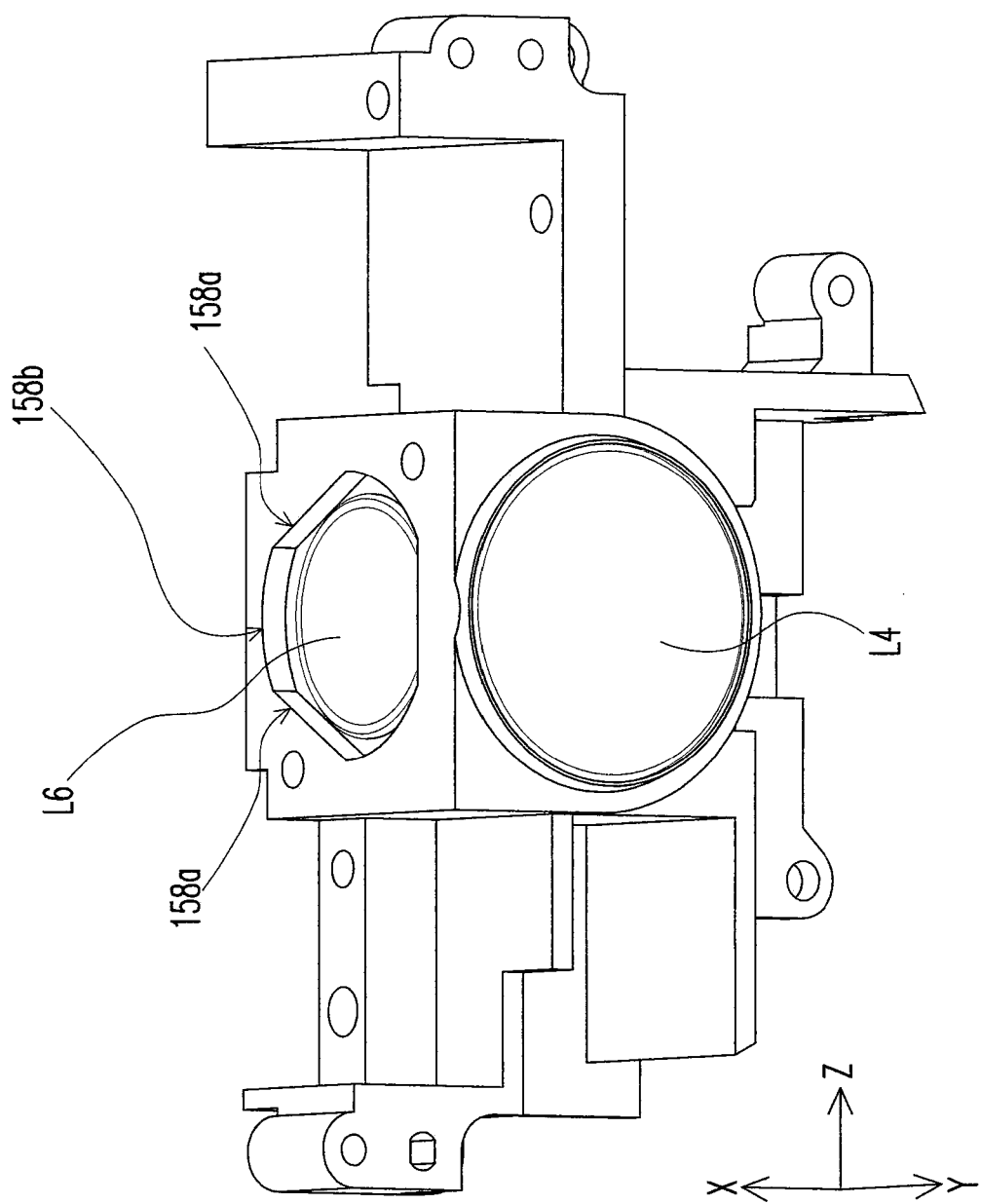
FIG. 71 is an illustration of a lens mounting step.
Figure 72:
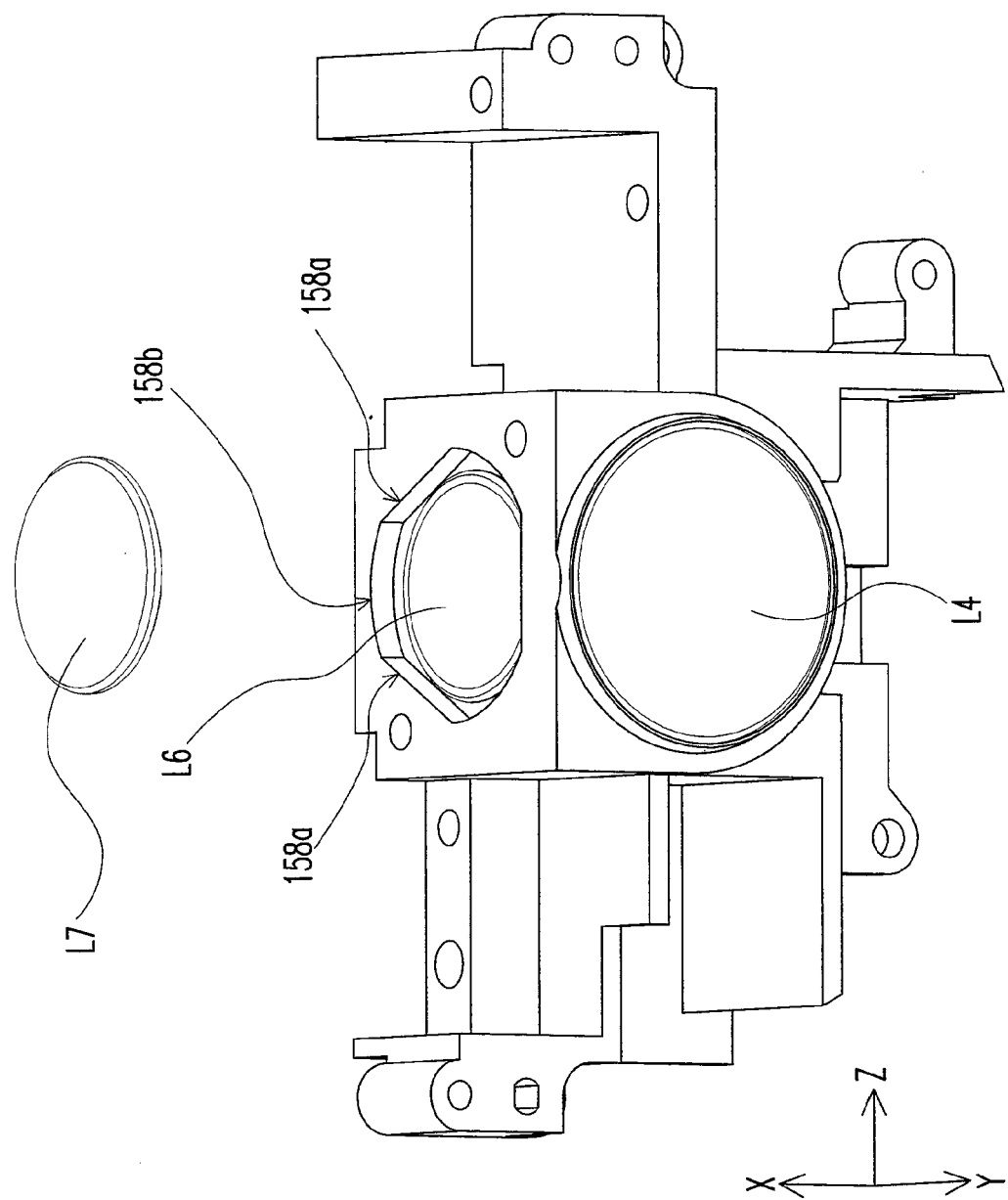
FIG. 72 is an illustration of a lens mounting step.
Figure 73:
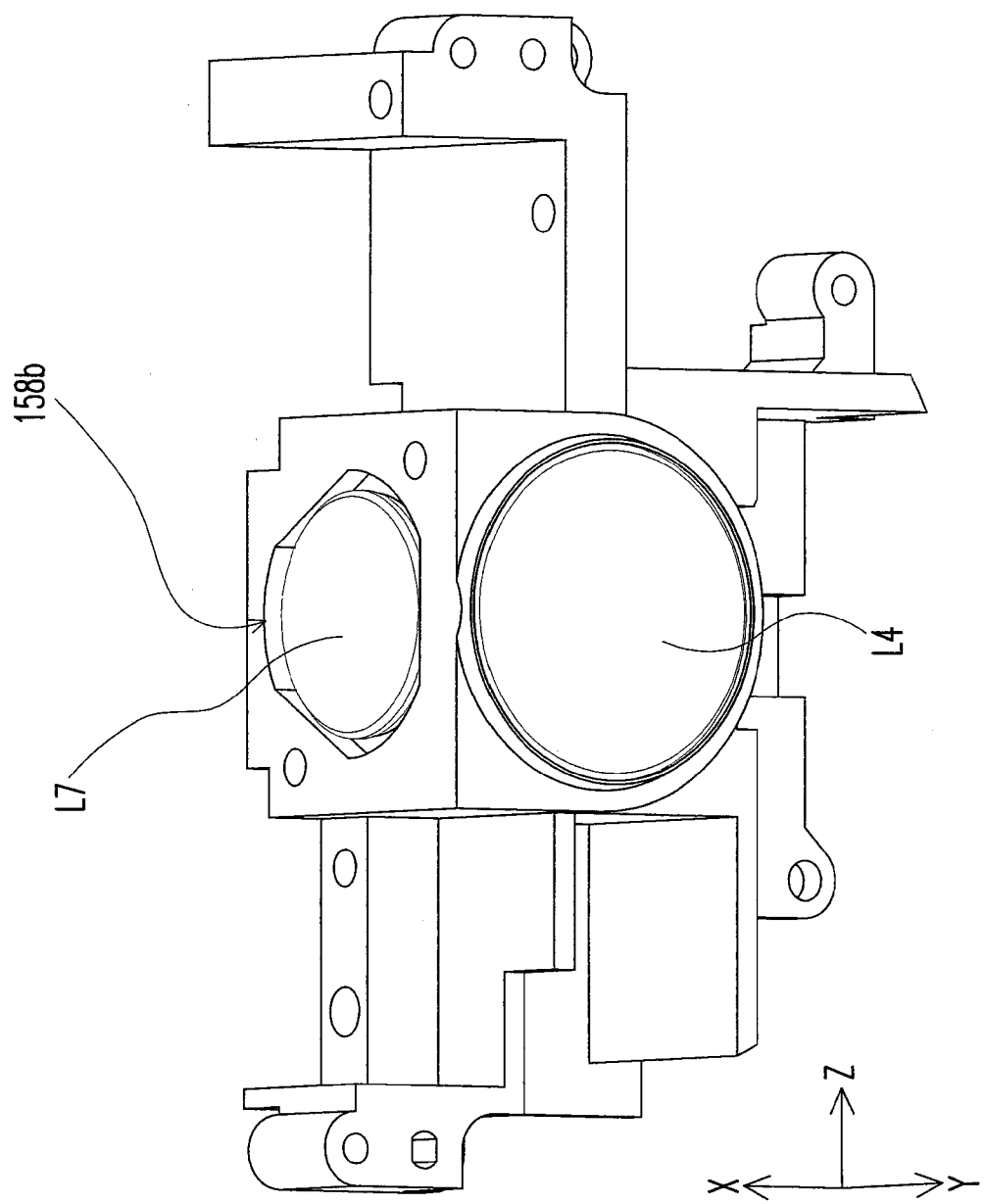
FIG. 73 is an illustration of a lens mounting step.
Figure 74:
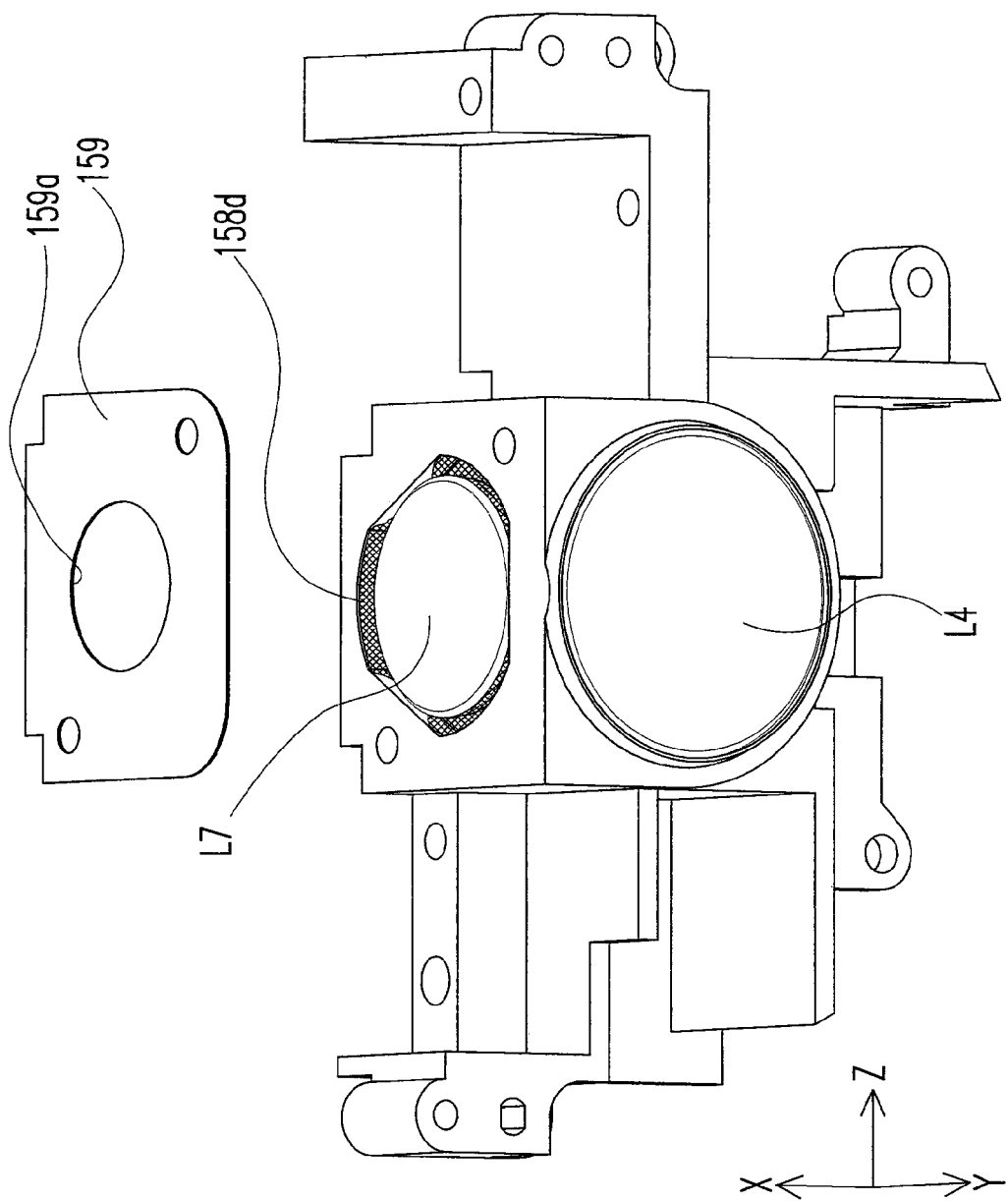
FIG. 74 is an illustration of a lens mounting step.
Figure 75:
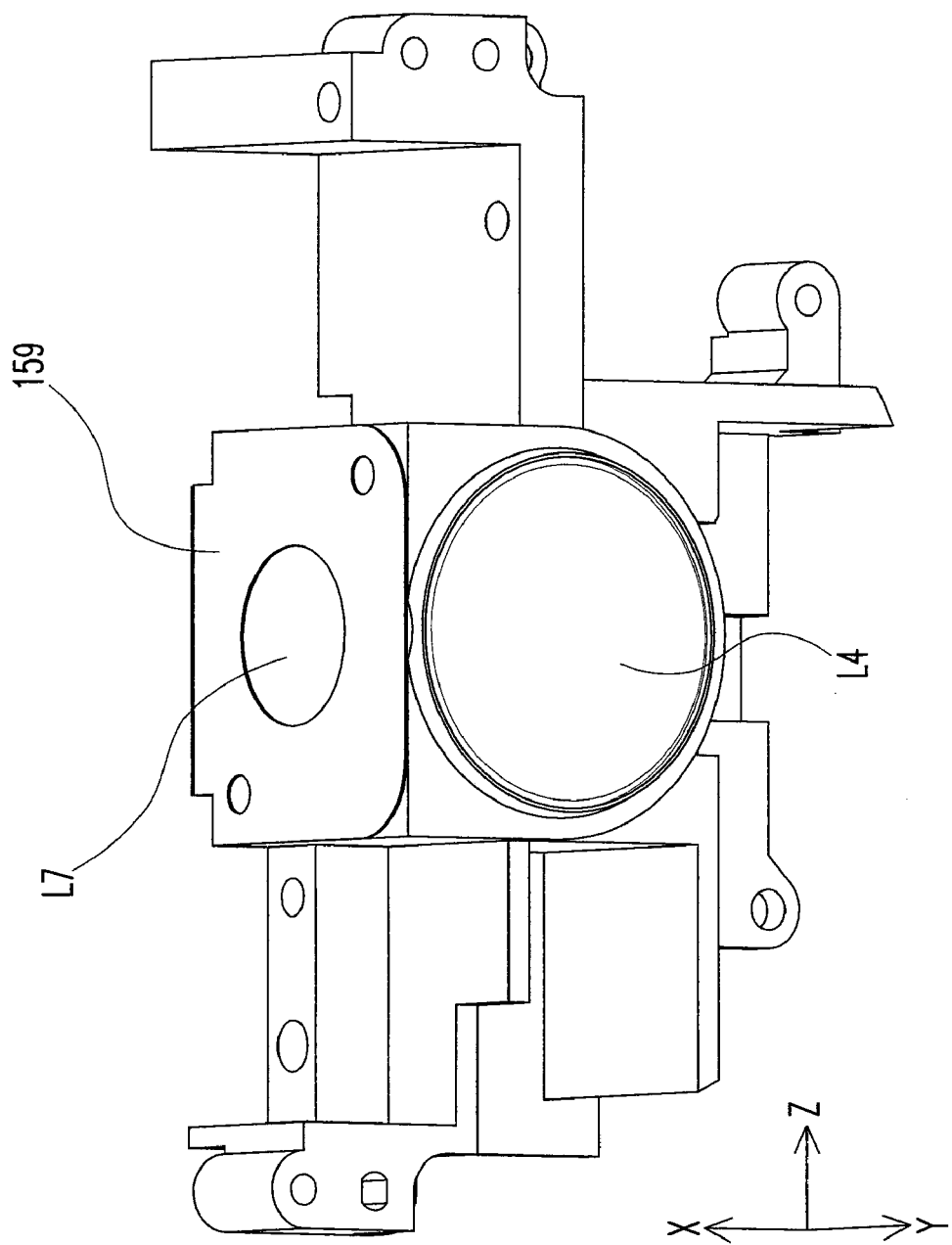
FIG. 75 is an illustration of a lens mounting step.

In the lens mounting step S10, the fourth lens L4, the sixth lens L6, and the seventh lens L7 are mounted to the second group frame 150. In the lens mounting step S10, first, the fourth lens L4 is fitted into the fourth lens retaining frame 155 (FIG. 68), and fixed via thermal caulking (FIG. 69). Then, the sixth lens L6 is fitted into the sixth lens retaining frame 157 (FIGS. 70 and 71) so that it touches the output surface L5*d* of the prism L5, and the seventh lens L7 is fitted into the seventh lens retaining frame 158 (FIGS. 72 and 73) so that it touches the sixth lens L6. Then, in the state that the seventh lens L7 is pressed to the side of the sixth lens L6 and the side of the prism L5, adhesive agent 158*d* is filled in each concave portion 158*c* (FIGS. 72, 73, and 74) of the seventh lens retaining frame 158. In the state that the pressing force to the seventh lens L7 is kept, the adhesive agent 158*d* is irradiated with ultraviolet light and the adhesive agent 158*d* cures. As a result, the seventh lens L7 is fixed by adhesive to the second group frame 150 (FIG. 74) via the seventh lens retaining frame 158. The pressing force to the seventh lens L7 is released after the adhesive agent 158*d* is cured, and the opening member 159 is mounted to the second group frame 150 (FIGS. 74 and 75).

As described above, the sixth lens L6 is not fixed by adhesive. However, by fixing the seventh lens L7 to the second group frame 150 via adhesive, the seventh lens L7 acts as a retainer of the sixth lens L6, and the positioning of the sixth lens L6 in the axis direction is being done.

In addition, by fixing through adhesive the seventh lens L7 via the fixation portions 158*b*, it is possible to skip the bonding step of the sixth lens L6, and it is possible to reduce the manufacturing cost.

Furthermore, since the adhesive agent cures in the state that the seventh lens L7 is being pressed, the accuracy of mounting the sixth lens L6 and the seventh lens L7 improves.

In addition, in the second group frame unit 642 as the first modified embodiment of the above described [6.1: Examples of Modifications in the Fixation Method of the Lens], in the above described lens mounting step S10, when the adhesive agent is filled from the X axis direction positive side into the concave portion 158*c*, it is possible to simultaneously apply adhesive agent to the sixth lens L6 and the seventh lens L7. Therefore, it is possible to reduce the manufacturing steps, and it is possible to reduce the manufacturing cost.

In the second curing step S11, the adhesive agent applied in the lens mounting step S10 is irradiated with ultraviolet light, and the adhesive agent is cured. According to the above manufacturing steps, the second group frame unit 42 is manufactured.

Figure 76:
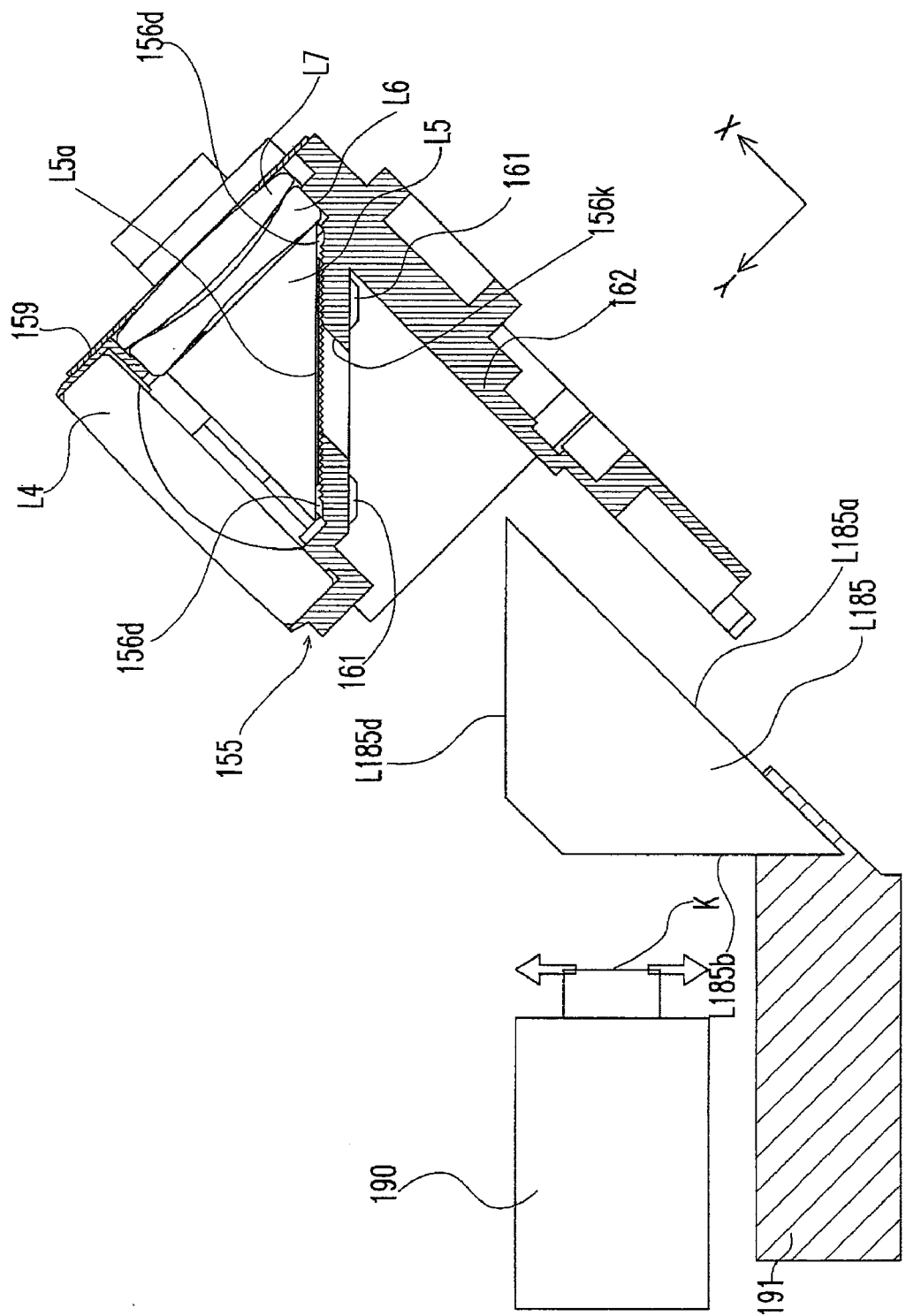
FIG. 76 is an illustration of an inspection step.
Figure 77:
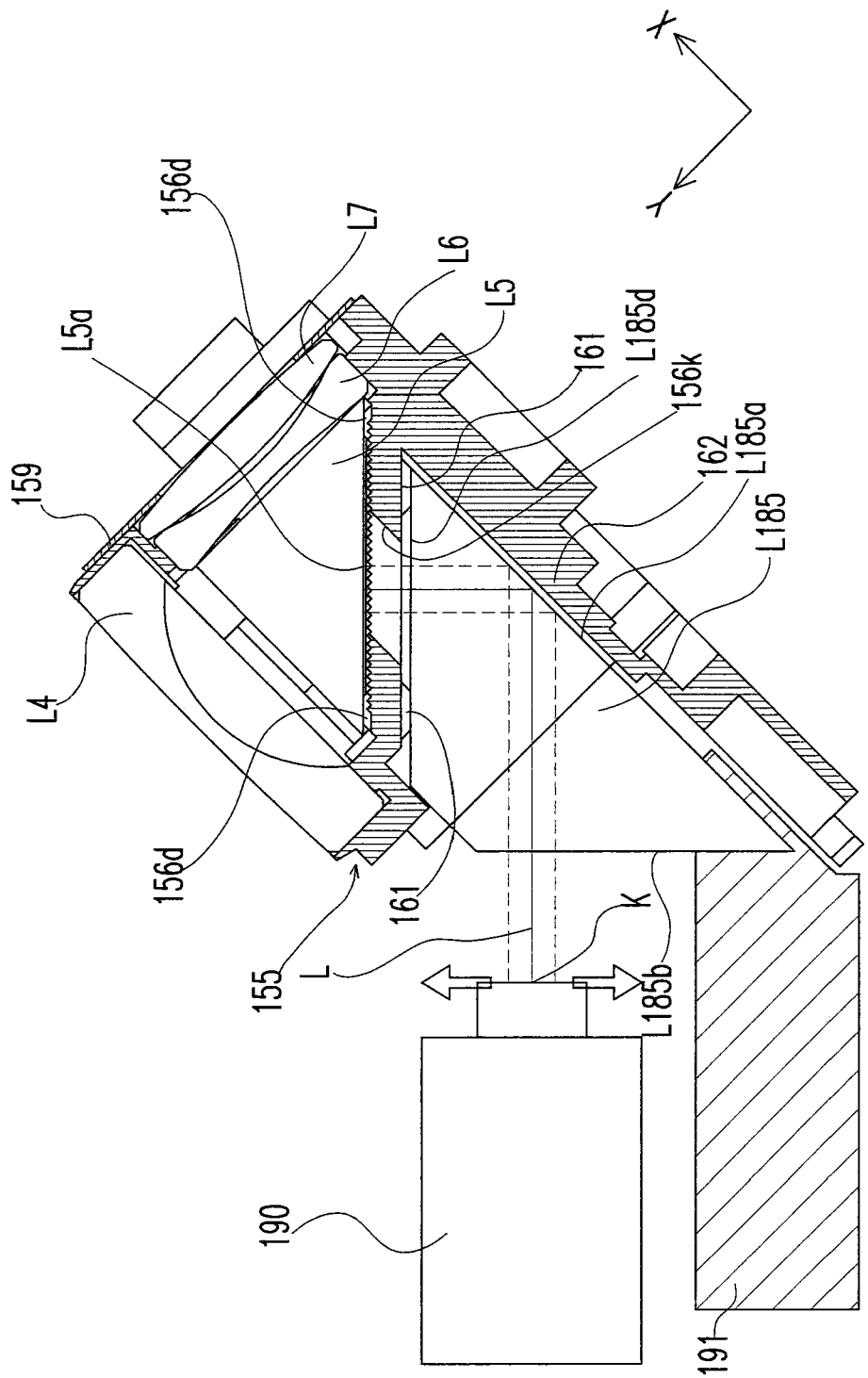
FIG. 77 is an illustration of an inspection step.

In the inspection step S12, the accuracy of mounting the prism L5 is inspected. Using FIGS. 76 and 77, details on the inspection step S12 will be described. FIGS. 76 and 77 are section views of the second group frame unit 42 including the first optical axis A1 and the second optical axis A2 in the inspection step S12.

The inspection step S12 includes an inspection prism mounting step S13, a measuring step S14, and an evaluating step S15 (refer to FIG. 59). In the inspection prism mounting step S13, as shown in FIG. A51, the above described inspection prism insertion portion 160 is inserted into an inspection prism L185 that is fixed to a prism fixation jig 191, inspection prism and in this way, the second group frame unit 42 is mounted. More specifically, the inspection prism L185 is an internal reflecting prism in which the light flux is reflected by the reflecting surface L185*a*, and is fixed by the prism fixation jig 191 in a state that the reflecting surface L185*a* is faced to the Y axis direction positive side. Then, the inspection prism L185 is inserted in the inspection prism insertion portion 160. At this time, by having the inspection prism L185 contact with four third contact portions 161, the positioning of the second group frame 150 is done. If the angle formed by the reflecting surface L185*a* of the inspection prism L185 and the output surface L185*d* is angle α, in this embodiment, angle α is set to be 45 degrees.

At this time, if the inspection prism L185 is fixed so that the output surface L185*d* of the inspection prism L185 becomes substantially horizontal, with only the weight of the second group frame unit 42, the four third contact portions 161 are reliably in contact with the output surface L185*d* of the inspection prism L185. As a result, the reflecting surface L5*a* of the prism L5 becomes substantially horizontal with respect to the output surface L185*d* of the inspection prism L185.

With this kind of configuration, since the four third contact portions 161 are reliably in contact with the output surface L185d of the inspection prism L185 without adding a load or the like from the exterior, negative effects such as the deformation of the second group frame does not occur, and it is possible to implement a measuring step that is safe and proper simply.

Figure 78:
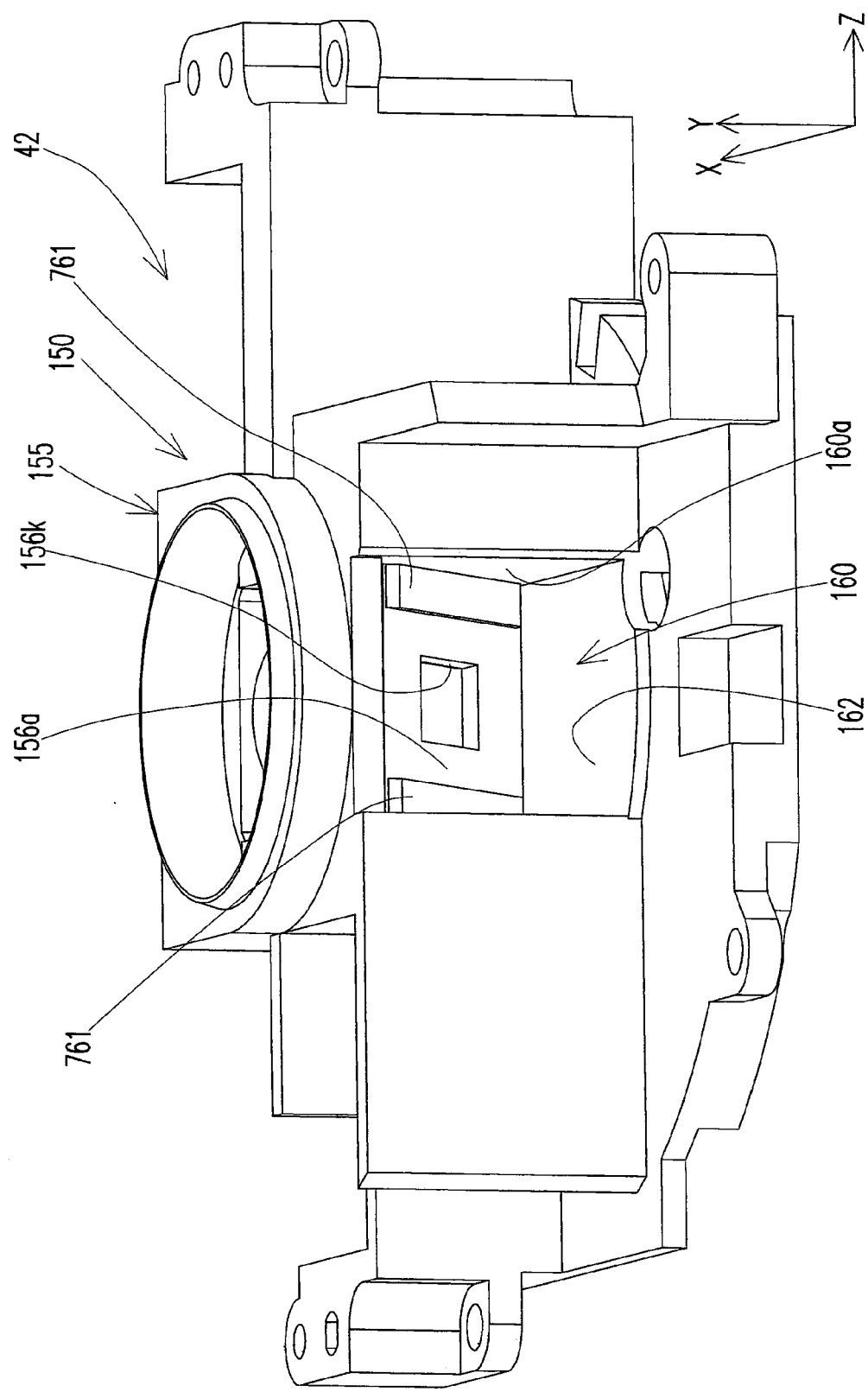
FIG. 78 is another modified embodiment of an inspection prism insertion portion.
Figures 79A, 79B:
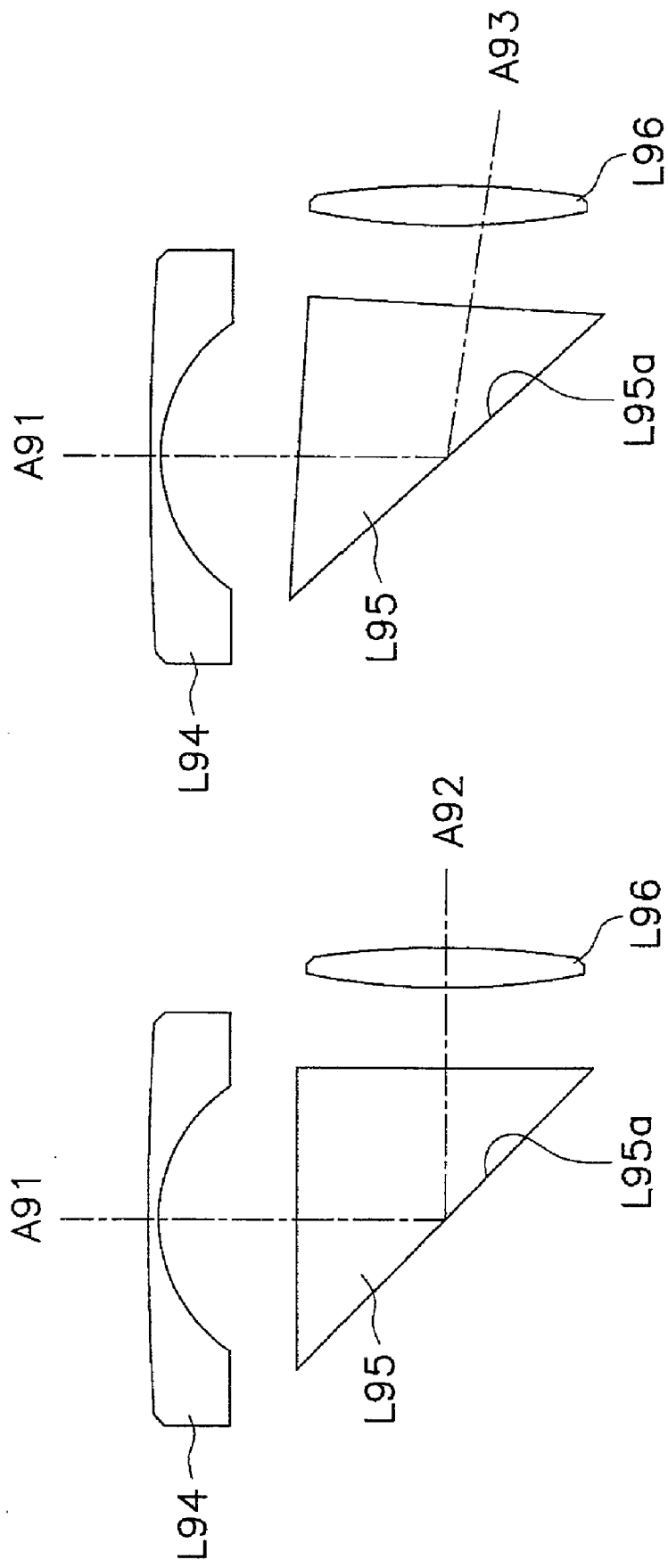
FIGS. 79A and 79B are illustrations for describing the relationship between the accuracies of mounting the lens and the optical performance.

In addition, as a modified embodiment of the third contact portion 161, as shown in FIG. 78, a third contact portion 761 that extends in the Y axis direction and the X axis direction along the sloped portion 156a can also be considered. In this case, it is possible to obtain the same effects described above.

In the measuring step S14, the accuracy of mounting the prism L5 is measured by a laser measuring instrument 190 and the like (refer to FIG. 59). More specifically, as shown in FIG. 77, a measuring laser L that is sent horizontally from the laser measuring instrument 190 passes through a first surface L185b of the inspection prism L185 and is reflected by the reflecting surface L185a. The reflected laser L passes through a second surface L185c and an opening portion 156k, and is reflected by the reflecting surface L5a of the prism L5. Then, the laser L is received by the laser measuring instrument 190 via the inspection prism L185, and it is possible to measure the distance from the benchmark of the laser measuring instrument 190 to the reflecting surface L5a of the prism L5.

Then, the position of the laser measuring instrument 190 is moved, and the distances of a plurality of points on the reflecting surface L5a of the prism L5 are measured. As shown in FIG. 77, since the inspection prism L185 is fixed so that the output surface L185d of the inspection prism L185 is substantially a horizontal surface, it is only necessary to move the laser measuring instrument 190 in the vertical direction. Therefore, even if the laser measuring instrument 190 is moved, it is possible to measure the distances with the same conditions.

In addition, other than the laser measuring instrument 190, an autocollimator may be used to measure the accuracy of mounting the reflecting surface L5a.

In the evaluating step S15, the accuracy of mounting the prism L5 is evaluated based on a plurality of distance data measured in the measuring step S14 (refer to FIG. 59). For example, if the maximum value of the shaped width of each distance data stays within a standard value, the second group frame unit 42 is judged to be acceptable, and if it exceeds the standard value, the accuracy of mounting the prism L5 is seen as being poor and an adjustment of the position of the prism L5 and the like is performed.

By the inspection step S12 described above, it is possible to easily inspect the accuracy of mounting the prism L5, and it is possible to reduce the work of the inspection step. In addition, it is possible to evaluate the accuracy of mounting the prism L5 more properly, and it is possible to obtain high optical performance in the lens barrel 31.

In addition, if distances can be measured without being in contact and the optical system can be used, other measuring instruments may be used for the laser measuring instrument 190.

6.5

The appearance and the configuration of the digital camera 1 and the main body 3 described using FIGS. 1 to 3 in the above described embodiment is not limited to those described.

For example, members that are included in the digital camera 1 and the arrangements thereof are not limited to those described above.

6.6

The configuration of the optical system 35 is not limited to the configuration described. For example, each of the lens group G1 to G5 may be realized by combining other lenses. In addition, it is not necessary for the lens barrel on the photographic object side to be multistage.

6.7

The configuration of the first group frame unit 41 is not limited to the configuration described. For example, cam pins and cam grooves that are formed on each of the first group frame 50, the driving frame 51, and the fixed frame 52 may be realized by another configuration, if the same functions are performed.

6.8

The configuration of the adhesive pockets 156g is not limited to the configuration described. For example, the adhesive pockets 156g may be open to the X axis direction positive side. In this case, ultraviolet light irradiation is performed from the X axis direction positive side. In addition, the portion that is formed in a staircase pattern may be formed from other concave and convex portions.

6.9

The order of the above described manufacturing steps is not limited to the configuration described. For example, the inspection step S12 may be performed after the first curing step S9. In addition, the pressing step S7 may be continuously performed during the first curing step S9. In other words, ultraviolet light irradiation may be performed while holding down the prism L5.

What is claimed is:

1. A lens barrel, comprising:
    a first lens configured and arranged to take in a light flux incident along a first optical axis;
    a bending member including a reflecting surface configured and arranged to reflect the light flux passing through the first lens to a direction along a second optical axis intersecting with the first optical axis; and
    a second lens configured and arranged to take in the light flux reflected by the bending member,
    at least one of the bending member and the second lens including a second flat surface portion having a planar shape,
    the bending member and the second lens being in contact with each other via at least a part of the second flat surface portion, and
    the bending member further including an output surface having a third region that receives the light flux reflected by the reflecting surface, and a fourth region positioned on the outer peripheral side of the third region and including the second flat surface portion.

2. The lens barrel according to claim 1, wherein
    at least a part of the fourth region is covered by a light shielding material.

3. The lens barrel according to claim 1, further comprising
    a first lens group configured and arranged to both move relative to the bending member and to take in the light flux incident along the first optical axis;
    a first movement mechanism adapted to retain the first lens group, and configured to move the first lens group and the bending member along the first optical axis;
    a driving unit configured to drive the first movement mechanism; and
    a second lens group configured and arranged to take in the light flux reflected by the bending member.

4. An image pickup device, comprising
    the lens barrel according to claim 3; and
    an image pickup device configured to receive the light flux exiting from the lens barrel.

5. The lens barrel according to claim 1, wherein the first optical axis is substantially orthogonal to the second optical axis.

6. The lens barrel according to claim 1, wherein the first lens is directly affixed to the bending member.

7. The lens barrel according to claim 6, wherein the second lens is directly affixed to the bending member.

8. A lens barrel, comprising:
a first lens configured and arranged to take in a light flux incident along a first optical axis;
a bending member including a reflecting surface configured and arranged to reflect the light flux passing through the first lens to a direction along a second optical axis intersecting with the first optical axis;
a second lens configured and arranged to take in the light flux reflected by the bending member; and
a third lens abutting the second lens, and being configured and arranged to take in the light flux passing through the second lens,
at least one of the first and second lenses abutting the bending member,
at least one of the second and the third lens includes a third flat surface portion having a planar shape,
the second and third lenses being in contact with each other via at least a part of the third flat surface portion, and
the second lens further including a fifth region that receives the light flux from the bending member, and a sixth region positioned on the outer peripheral side of the fifth region and including the third flat surface portion.

9. The lens barrel according to claim 8, wherein the sixth region being in direct contact with the third lens.

10. A lens barrel, comprising:
a first lens configured to take in a light flux incident along a first optical axis;
a bending member including a reflecting surface configured and arranged to reflect the light flux passing through the first lens to a direction along a second optical axis intersecting with the first optical axis;
a second lens configured and arranged to take in the light flux passing through the bending member; and
at least one circular light shielding member arranged between and abutting the bending member and at least one of the first and second lenses.

11. The lens barrel according to claim 10, wherein at least one of the light shielding member and the first lens including a first flat surface portion having a planar shape, and
the light shielding member and the first lens being in direct contact with each other via at least a part of the first flat surface portion.

12. The lens barrel according to claim 11, wherein the bending member further including an entrance surface having a first region that receives the light flux existing from the first lens, and a second region located on the outer peripheral side of the first region and including the first flat surface portion.

13. The lens barrel according to claim 10, wherein at least one of the light shielding member and the second lens including a second flat surface portion having a planar shape, and
the light shielding member and second lens being in direct contact with each other via at least a part of the second flat surface portion.

14. The lens barrel according to claim 13, wherein the bending member further including an output surface having a third region that receives the light flux reflected by the reflecting surface passes, and a fourth region located on the outer peripheral side of the third region and including the second flat surface portion.

15. The lens barrel according to claim 10, further comprising
a third lens abutting the second lens, and being configured and arranged to take in the light flux passing through the second lens.

16. The lens barrel according to claim 15, wherein at least one of the second and third lenses including a third flat surface portion having a planar shape, and
the second and third lenses being in contact with each other via at least a part of the third flat surface portion.

17. The lens barrel according to claim 16, wherein the second lens further including a fifth region that receives the light flux from the bending member, and a sixth region located on the outer peripheral side of the fifth region and including the third flat surface portion.

18. The lens barrel according to claim 10, wherein the light shielding member is directly in contact with the bending member and the first lens.

19. The lens barrel according to claim 10, wherein the light shielding member is directly in contact with the bending member and the second lens.

20. The lens barrel according to claim 10, wherein the bending member further including a flat entrance surface having a first region that receives the light flux exiting from the first lens, and a second region located on the outer peripheral side of the first region, the second region being directly in contact with the light shielding member.

21. The lens barrel according to claim 20, wherein the bending member further including a flat output surface having a third region that receives the light flux reflected by the reflecting surface, and a fourth region located on the outer peripheral side of the third region, the fourth region being directly in contact with the light shielding member.

22. The lens barrel according to claim 10, wherein the bending member further including a flat output surface having a third region that receives the light flux reflected by the reflecting surface, and a fourth region located on the outer peripheral side of the third region, the fourth region being directly in contact with the light shielding member.

23. A lens barrel, comprising:
a first lens configured and arranged to take in a light flux incident along a first optical axis;
a bending member including a reflecting surface configured and arranged to reflect the light flux passing through the first lens to a direction along a second optical axis intersecting with the first optical axis; and
a second lens configured and arranged to take in the light flux reflected by the bending member,
at least one of the first and second lenses abutting the bending member, and
the bending member further including a flat output surface having a third region that receives the light flux reflected by the reflecting surface, and a fourth region positioned outside of the third region, the fourth region directly touching the second lens.

24. The lens barrel according to claim 23, wherein the fourth region including a second shielding region covered by a light shielding material to reduce scattered light within the lens barrel, and the second lens being in contact with the second shielding region.

* * * * *